US012717311B2

(12) United States Patent
Nixon et al.

(10) Patent No.: US 12,717,311 B2
(45) Date of Patent: Aug. 25, 2026

(54) NEBULA FLEET MANAGEMENT

(71) Applicant: FISHER-ROSEMOUNT SYSTEMS, INC., Round Rock, TX (US)

(72) Inventors: Mark J. Nixon, Thorndale, TX (US); Jason A. Jordan, Round Rock, TX (US); Brian LaMothe, Round Rock, TX (US); Gary K. Law, Georgetown, TX (US); Narayanan Doraiswamy, Round Rock, TX (US); Ayub Lakhani, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 382 days.

(21) Appl. No.: 18/479,277

(22) Filed: Oct. 2, 2023

(65) Prior Publication Data

US 2024/0028006 A1 Jan. 25, 2024

Related U.S. Application Data

(63) Continuation-in-part of application No. 18/223,405, filed on Jul. 18, 2023.

(60) Provisional application No. 63/417,861, filed on Oct. 20, 2022, provisional application No. 63/418,006, filed on Oct. 20, 2022, provisional application No. 63/398,441, filed on Aug. 16, 2022, provisional application No. 63/390,238, filed on Jul. 18, 2022.

(51) Int. Cl.
*G05B 19/418* (2006.01)

(52) U.S. Cl.
CPC .............................. *G05B 19/41835* (2013.01)

(58) Field of Classification Search
CPC ...................... G05B 19/41835; G05B 19/4184
See application file for complete search history.

(56) References Cited

U.S. PATENT DOCUMENTS

| | | | |
|---|---|---|---|
| 7,281,250 | B2 | 10/2007 | Ohsawa et al. |
| 7,293,080 | B1 | 11/2007 | Clemm et al. |
| 8,924,103 | B2 | 12/2014 | Dammeyer et al. |

(Continued)

FOREIGN PATENT DOCUMENTS

| | | | |
|---|---|---|---|
| CN | 115 052 033 | A | 9/2022 |
| DE | 10 2019 119 714 | A1 | 1/2021 |

(Continued)

OTHER PUBLICATIONS

"Kubernetes—Web UI (Dashboard)," (2021).

(Continued)

*Primary Examiner* — Kidest Worku
(74) *Attorney, Agent, or Firm* — MARSHALL, GERSTEIN & BORUN LLP

(57) ABSTRACT

A process plant and industrial control system architecture includes a generalized compute fabric that is agnostic or indifferent to the physical location at which the compute fabric is implemented. One or more applications, executing via the location-agnostic compute fabric, provide for access, management, and/or reconfiguration of various aspects of one or more process control systems across one or more physical sites operated by an enterprise. The one or more applications may, for example, provide for viewing of operational parameters and/or health statuses based upon information accessed from one, two, three four or more physical sites.

29 Claims, 32 Drawing Sheets

(56) References Cited

U.S. PATENT DOCUMENTS

| | | | |
|---|---|---|---|
| 9,183,560 B2 | 11/2015 | Abelow et al. | |
| 9,451,012 B1 | 9/2016 | Neill et al. | |
| 9,521,115 B1 | 12/2016 | Woolward | |
| 9,934,671 B1 | 4/2018 | Anderson et al. | |
| 9,992,726 B2 | 6/2018 | Shepard et al. | |
| 10,303,576 B1 | 5/2019 | Seymour et al. | |
| 10,360,050 B2 | 7/2019 | He et al. | |
| 10,382,203 B1 | 8/2019 | Loladia et al. | |
| 10,547,521 B1 | 1/2020 | Roy et al. | |
| 10,574,729 B2 | 2/2020 | Hadfield et al. | |
| 10,663,956 B2 | 5/2020 | Jundt et al. | |
| 10,915,081 B1 | 2/2021 | Nixon et al. | |
| 10,977,070 B2 | 4/2021 | Li et al. | |
| 11,126,469 B2 | 9/2021 | Reque et al. | |
| 11,281,492 B1 | 3/2022 | Rebeja et al. | |
| 11,513,877 B2 | 11/2022 | Biernat et al. | |
| 11,541,447 B2 | 1/2023 | Beyfuss et al. | |
| 11,637,918 B2 | 4/2023 | Yarvis et al. | |
| 11,960,588 B2 | 4/2024 | Amaro, Jr. et al. | |
| 2002/0126620 A1 | 9/2002 | Heckel et al. | |
| 2003/0023795 A1 | 1/2003 | Packwood et al. | |
| 2004/0114605 A1 | 6/2004 | Karaoguz et al. | |
| 2004/0260404 A1 | 12/2004 | Russell | |
| 2005/0160413 A1 | 7/2005 | Broussard | |
| 2005/0220127 A1 | 10/2005 | Cane et al. | |
| 2006/0167886 A1 | 7/2006 | Kantesaria et al. | |
| 2007/0006228 A1 | 1/2007 | Grobman et al. | |
| 2007/0076742 A1 | 4/2007 | Du et al. | |
| 2009/0083843 A1 | 3/2009 | Wilkinson, Jr. et al. | |
| 2009/0327606 A1 | 12/2009 | Galloway et al. | |
| 2010/0235831 A1 | 9/2010 | Dittmer et al. | |
| 2010/0263025 A1 | 10/2010 | Neitzel et al. | |
| 2010/0290351 A1 | 11/2010 | Toepke et al. | |
| 2011/0021131 A1 | 1/2011 | Chen | |
| 2011/0125921 A1 | 5/2011 | Karenos et al. | |
| 2011/0265077 A1 | 10/2011 | Collison et al. | |
| 2012/0102492 A1 | 4/2012 | Iwata et al. | |
| 2012/0259436 A1 | 10/2012 | Resurreccion et al. | |
| 2013/0031249 A1 | 1/2013 | Gunzert et al. | |
| 2013/0031294 A1 | 1/2013 | Feng et al. | |
| 2013/0086594 A1 | 4/2013 | Cottrell | |
| 2013/0212129 A1 | 8/2013 | Lawson et al. | |
| 2014/0019491 A1 | 1/2014 | Hamel | |
| 2014/0344269 A1 | 11/2014 | Dong et al. | |
| 2015/0026292 A1* | 1/2015 | Cochran | H04L 67/561 709/217 |
| 2015/0378356 A1 | 12/2015 | Hefeeda et al. | |
| 2016/0019084 A1 | 1/2016 | Forestiero et al. | |
| 2016/0033006 A1 | 2/2016 | Leverington | |
| 2016/0043866 A1 | 2/2016 | Nixon | |
| 2016/0124742 A1* | 5/2016 | Rangasamy | H04L 41/20 717/103 |
| 2016/0134596 A1 | 5/2016 | Kovacs et al. | |
| 2016/0164743 A1 | 6/2016 | Cimprich et al. | |
| 2016/0299772 A1 | 10/2016 | Seenappa et al. | |
| 2016/0373310 A1 | 12/2016 | Banikazemi et al. | |
| 2017/0026677 A1 | 1/2017 | Kim et al. | |
| 2017/0095405 A1 | 4/2017 | Afsarifard et al. | |
| 2017/0149843 A1 | 5/2017 | Amulothu et al. | |
| 2017/0279770 A1 | 9/2017 | Woolward | |
| 2017/0308330 A1 | 10/2017 | Suresh et al. | |
| 2017/0344408 A1 | 11/2017 | Tan et al. | |
| 2017/0359245 A1 | 12/2017 | Dintenfass et al. | |
| 2017/0366551 A1 | 12/2017 | Brandwine | |
| 2018/0052628 A1 | 2/2018 | Endo et al. | |
| 2018/0067848 A1 | 3/2018 | Baldwin et al. | |
| 2018/0112795 A1 | 4/2018 | Anderson et al. | |
| 2018/0113442 A1 | 4/2018 | Nixon et al. | |
| 2018/0114414 A1 | 4/2018 | Law et al. | |
| 2018/0144144 A1 | 5/2018 | Luo et al. | |
| 2018/0164791 A1 | 6/2018 | Debes et al. | |
| 2018/0227369 A1 | 8/2018 | DuCray et al. | |
| 2018/0299849 A1 | 10/2018 | Martin et al. | |
| 2018/0316729 A1 | 11/2018 | Chauvet et al. | |
| 2018/0341241 A1 | 11/2018 | Song | |
| 2018/0375936 A1 | 12/2018 | Chirammal et al. | |
| 2019/0041824 A1 | 2/2019 | Chavez et al. | |
| 2019/0041830 A1 | 2/2019 | Yarvis et al. | |
| 2019/0042378 A1 | 2/2019 | Wouhaybi et al. | |
| 2019/0109820 A1 | 4/2019 | Clark et al. | |
| 2019/0140918 A1 | 5/2019 | Xu et al. | |
| 2019/0294124 A1 | 9/2019 | Law et al. | |
| 2019/0317465 A1 | 10/2019 | Wei et al. | |
| 2019/0324431 A1 | 10/2019 | Cella et al. | |
| 2019/0369574 A1 | 12/2019 | Val et al. | |
| 2019/0379590 A1 | 12/2019 | Rimar et al. | |
| 2020/0067789 A1* | 2/2020 | Khuti | H04L 41/5009 |
| 2020/0092254 A1 | 3/2020 | Goeringer et al. | |
| 2020/0092271 A1 | 3/2020 | Kumar et al. | |
| 2020/0099531 A1 | 3/2020 | Chidambaram et al. | |
| 2020/0102507 A1 | 4/2020 | Sun et al. | |
| 2020/0112442 A1 | 4/2020 | Wentz | |
| 2020/0174462 A1 | 6/2020 | Sirohi et al. | |
| 2020/0209816 A1 | 7/2020 | Cebasek et al. | |
| 2020/0225649 A1 | 7/2020 | Cahill et al. | |
| 2020/0226123 A1 | 7/2020 | Nixon et al. | |
| 2020/0228316 A1 | 7/2020 | Cahill | |
| 2020/0228342 A1 | 7/2020 | Nixon et al. | |
| 2020/0241903 A1 | 7/2020 | Wang et al. | |
| 2020/0310394 A1 | 10/2020 | Wouhaybi et al. | |
| 2020/0322286 A1 | 10/2020 | Mehta et al. | |
| 2020/0387136 A1 | 12/2020 | Pöschmann et al. | |
| 2020/0387144 A1 | 12/2020 | Nixon et al. | |
| 2020/0387145 A1 | 12/2020 | Nixon et al. | |
| 2020/0387146 A1 | 12/2020 | Nixon et al. | |
| 2020/0396225 A1 | 12/2020 | Bhatia et al. | |
| 2020/0401116 A1 | 12/2020 | McLaughlin et al. | |
| 2021/0011772 A1 | 1/2021 | Zhou et al. | |
| 2021/0044564 A1 | 2/2021 | Victor et al. | |
| 2021/0058399 A1 | 2/2021 | Kapoor et al. | |
| 2021/0089015 A1 | 3/2021 | Law et al. | |
| 2021/0089354 A1 | 3/2021 | Nixon et al. | |
| 2021/0089526 A1 | 3/2021 | Nixon et al. | |
| 2021/0089542 A1 | 3/2021 | Nixon et al. | |
| 2021/0089592 A1 | 3/2021 | Nixon et al. | |
| 2021/0089593 A1 | 3/2021 | Nixon et al. | |
| 2021/0092173 A1 | 3/2021 | Nixon et al. | |
| 2021/0109658 A1 | 4/2021 | Mallick et al. | |
| 2021/0149637 A1 | 5/2021 | Hallman, Jr. et al. | |
| 2021/0271489 A1 | 9/2021 | Singhal | |
| 2021/0294659 A1 | 9/2021 | Amit | |
| 2021/0333762 A1* | 10/2021 | Govindaraj | G05B 23/0237 |
| 2021/0356944 A1 | 11/2021 | Chauvet et al. | |
| 2021/0384058 A1 | 12/2021 | Harada et al. | |
| 2022/0012137 A1 | 1/2022 | Xiao et al. | |
| 2022/0019475 A1 | 1/2022 | Dobson et al. | |
| 2022/0043431 A1* | 2/2022 | Sayyarrodsari | G05B 19/41835 |
| 2022/0058012 A1 | 2/2022 | Kaushik et al. | |
| 2022/0070112 A1 | 3/2022 | Mazzitelli et al. | |
| 2022/0091583 A1 | 3/2022 | Biernat et al. | |
| 2022/0103580 A1 | 3/2022 | Manickam et al. | |
| 2022/0108806 A1 | 4/2022 | Kommalapati et al. | |
| 2022/0128982 A1 | 4/2022 | Mansfield | |
| 2022/0229707 A1 | 7/2022 | Lange et al. | |
| 2022/0283571 A1 | 9/2022 | Vieira et al. | |
| 2022/0404798 A1 | 12/2022 | Amaro, Jr. et al. | |
| 2024/0004688 A1 | 1/2024 | Shigemori | |
| 2024/0031370 A1 | 1/2024 | Ubach et al. | |

FOREIGN PATENT DOCUMENTS

| | | |
|---|---|---|
| EP | 1 492 310 A2 | 12/2004 |
| EP | 2 790 101 A1 | 10/2014 |
| EP | 3 382 546 A1 | 10/2018 |
| GB | 2 403 043 A | 12/2004 |
| GB | 2 410 573 A | 8/2005 |
| GB | 2 481 753 A | 1/2012 |
| GB | 2 575 758 A | 1/2020 |
| GB | 2 589 710 A | 6/2021 |
| WO | WO-2014/124701 A1 | 8/2014 |
| WO | WO-2016/090292 A1 | 6/2016 |
| WO | WO-2017/064560 A1 | 4/2017 |
| WO | WO-2017/066304 A1 | 4/2017 |
| WO | WO-2017/121928 A1 | 7/2017 |

(56) References Cited

FOREIGN PATENT DOCUMENTS

| | | | |
|---|---|---|---|
| WO | WO-2018/234741 | A1 | 12/2018 |
| WO | WO-2020/202126 | A1 | 10/2020 |
| WO | WO-2020/251828 | A1 | 12/2020 |
| WO | WO-2021/079357 | A1 | 4/2021 |

OTHER PUBLICATIONS

Aftab et al., "Analysis of identifiers in IoT platforms", Digital Communications and Networks, 6(3):333-340 (2019).
Alaasam et al., "Stateful Stream Processing for Digital Twins," International Multi-Conference on Engineering, Computer and Information Sciences (Oct. 21, 2019).
Bellini et al., "High Level Control of Chemical Plant by Industry 4.0 Solutions," Journal of Industrial Information Integration, vol. 26 (Sep. 2, 2021).
Computer and Information Security Handbook, 3rd Edition (2017). Select pages.
Dobaj et al., "A Microservice Architecture for the Industrial Internet-Of-Things", Computational Biology and Bioinformatics (Jul. 4, 2018).
Emerson & PreScouter, "Software Defined Architecture for Embedded Applications," Research Support Service (2020).
Greevenbosch, "Use Cases and Requirements for Authentication, Authorisation and Revocation in the Internet of Things; draft-greevenbrosch-dice-authent-author-revoc-00.txt," Standardworkingdraft, Internet Society (2013).
Hmaity et al. "Virtual Network Function Placement for Resilient Service Chain Provisioning", 978-4673-9023-1, 2016, IEEE (Year: 2016).
Houmani et al., "Enhancing microservices architectures using data-driven service discovery and QoS guarantees", 2020 20th IEEE/ACM International Symposium on Cluster, Cloud and Internet Computing (CCGRID), IEEE (May 11, 2020).
International Search Report and Written Opinion for Application No. PCT/US2023/027978, dated Dec. 11, 2023.
International Search Report and Written Opinion for Application No. PCT/US2023/027988, dated Oct. 25, 2023.
International Search Report and Written Opinion for Application No. PCT/US2023/028003, dated Oct. 25, 2023.
International Search Report and Written Opinion for Application No. PCT/US2023/028005, dated Oct. 26, 2023.
International Search Report and Written Opinion for Application No. PCT/US2023/028027, dated Nov. 7, 2023.
International Search Report and Written Opinion for Application No. PCT/US2023/028029, dated Oct. 27, 2023.
International Search Report and Written Opinion for Application No. PCT/US2023/033926, dated Mar. 18, 2024.
International Search Report and Written Opinion for Application No. PCT/US2023/034272, dated Jan. 22, 2024.
International Search Report and Written Opinion for Application No. PCT/US2023/034349, dated Jan. 18, 2024.
International Search Report and Written Opinion for Application No. PCT/US2023/034351, dated Jan. 22, 2024.
International Search Report and Written Opinion for Application No. PCT/US2023/035611, dated Jan. 25, 2024.
International Search Report and Written Opinion for Application No. PCT/US2023/035613, dated Jan. 26, 2024.
International Search Report and Written Opinion for Application No. PCT/US2023/035618, dated Mar. 21, 2024.
Jairo et al., "Deliverable D1.1. Review of Reference Architectures for IoT Enabled Agriculture Development. Consultandy Design of a reference architecture for an IoT sensor network. Company International Center for Tropical Agriculture (CIAT)", (Apr. 29, 2019).
Jin et al., "Secure Edge Computing Management Based on Independent Microservices Providers for Gateway-Centric IoT Networks", IEEE Access, IEEE, 8:187975-187990 (2020).
Kashyap: "Yokogawa Cloud Architecture for Smart Manufacturing", Yokogawa technical report (Nov. 10, 2023).
Khalyly et al., "Smart Agent Edge Microservices Deployment pproach", 2020 International Conference On Decision Aid Ciences and Application (DASA), IEEE (Nov. 8, 2020).
Koziolek et al., "Self-Commissioning Industrial IoT-Systems in Process Automation," IEEE International Conference on Software Architecture, pp. 196-205 (2018).
Madiwalar et al., "Plug and produce for Industry 4.0 using software-defined networking and OPC UA", 24th IEEE International Conference on Emerging Technologies and Factory Automation (ETFA), pp. 126-133 (Sep. 2019).
Malakuti et al., "A Four-Layer Architecture Pattern for Constructing and Managing Digital Twins," Advances in Databases and Information Systems, 231-246 (2019).
NAMUR Recommendation, NAMUR Open Architecture NOA Concept (2020).
Pontarolli et al., "Towards Security Mechanisms for an Industrial Microservice-Oriented Architecture," 14th IEEE International Conference on Industry Applications (2021).
Pribis et al., "An Industrial Communication Platform for Industry 4.0—Case Study," Cybernetics & Informatics, pp. 1-8 (2020).
Profanter et al., "OPC UA for Plug & Produce: Automatic Device Discovery Using LDS-ME," 22nd IEEE Interational Conference on Emerging Technologies and Factory Automation, pp. 1-8 (2017).
Radchenko et al., "Micro-Workflow: Kafka and Keplar Fusion to Support Digital Twins of Industrial Processes," IEEE/ACM International Conference on Utility and Cloud Computing Companion (Dec. 17, 2018).
Search Report for Application No. GB2208755.5, dated Feb. 10, 2023.
Search Report for Application No. GB2208756.3, dated Feb. 23, 2023.
Search Report for Application No. GB2208757.1, dated Feb. 10, 2023.
Search Report for Application No. GB2208758.9, dated Dec. 16, 2022.
Search Report for Application No. GB2208759.7, dated Dec. 16, 2022.
Search Report for Application No. GB2208766.2, dated Feb. 16, 2023.
Search Report for Application No. GB2208768.8, dated Dec. 7, 2022.
Search Report for Application No. GB2208769.6, dated Dec. 7, 2022.
Search Report for Application No. GB2208770.4, dated Dec. 7, 2022.
Search Report for Application No. GB2208771.2, dated Dec. 12, 2022.
Search Report for Application No. GB2208780.3, dated Feb. 22, 2023.
Search Report for Application No. GB2208794.4, dated Jan. 17, 2023.
Search Report for Application No. GB2208795.1, dated Jan. 17, 2023.
Search Report for Application No. GB2208796.9, dated Nov. 10, 2022.
Search Report for Application No. GB2208797.7, dated Dec. 1, 2022.
Search Report for Application No. GB2208821.5, dated Mar. 31, 2023.
Search Report for Application No. GB2208856.1, dated Jan. 18, 2023.
Search Report for Application No. GB2208857.9, dated Nov. 18, 2022.
Search Report for Application No. GB2208858.7, dated Nov. 18, 2022.
Steindl et al., "Semantic Microservice Framework for Digital Twins," Applied Sciences, 11(12):1-19 (2021).
Sung et al., "Description lookup based UPnP extension for wireless sensor networks", Proceedings of the 2009 6th annual international mobile and ubiquitous systems: Networking & Services, MobiQuitous (Jul. 2009).

(56) References Cited

OTHER PUBLICATIONS

Tomarchio et al., "TORCH: A TOSCA-Based Orchestrator of Multi-Cloud Containerised Applications," Journal of Grid Computing (2021).
Tundo et al., "Declarative Dashboard Generation," IEEE Internation Symposium on Software Reliability Engineering Workshops (2020).

* cited by examiner

400

Software Defined Application Layer 412

Control Services 435

Sub-Systems 438

Other Services 440

3rd Party Services 448

Storage Entities 413

Packer Router / Switch Service 442

445

428

HCI Adaptor Layer 430

432

Software Defined Networking Layer / Operating System 410

SD Compute 415

SD Storage 418

SD Networking 420

Other SD OS Services and Functions 425

SD Orchestration / Orchestrator 422

QoS Config SVCS 452

Fault Tolerance SVCS 455

Load Balancing SVCS 458

Other Performance-Related SVCS 460

Physical Layer/Computing Platform 405

$C_1$ $C_2$ $C_n$ $N_1$ $N_2$ $N_n$

402

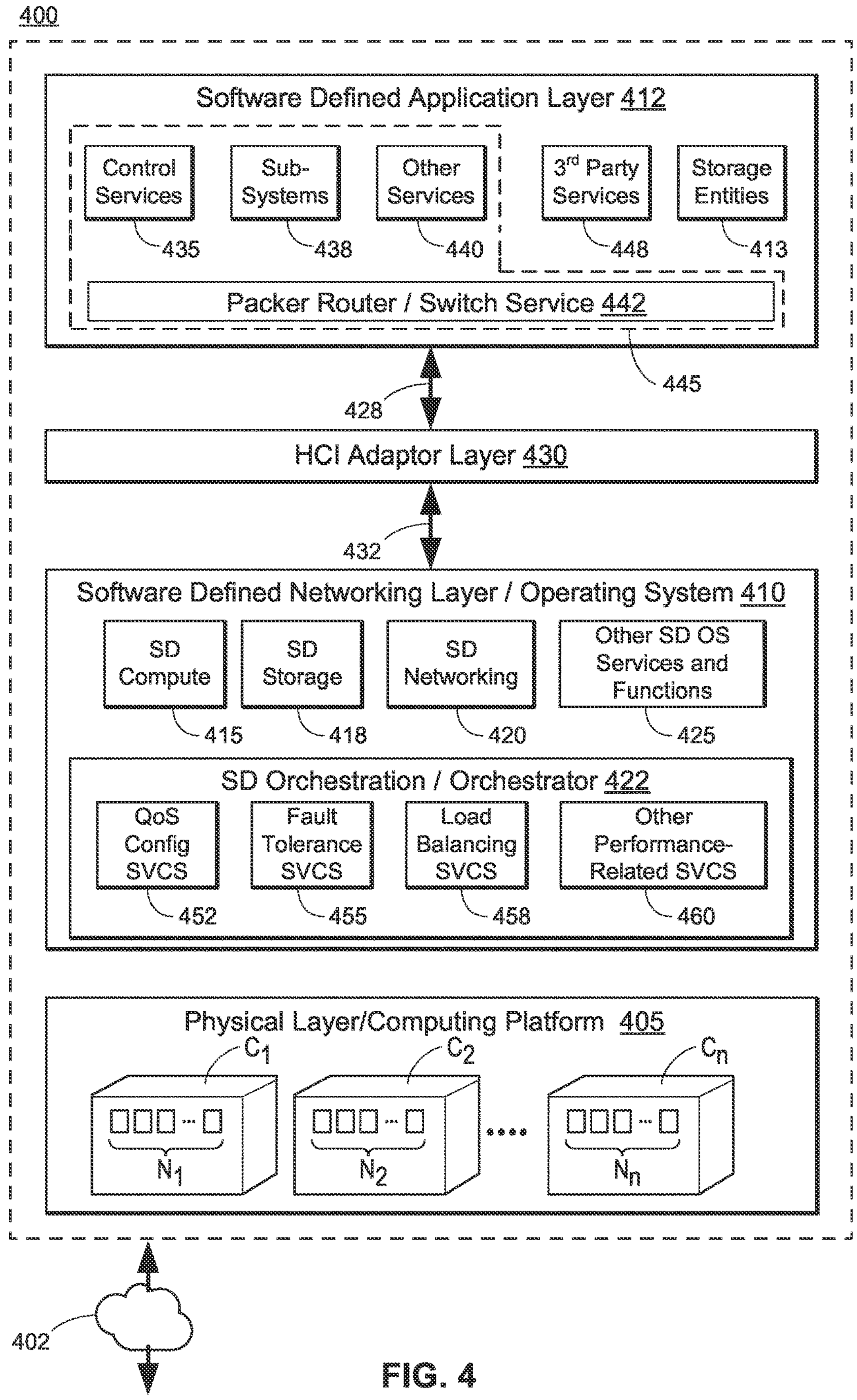

FIG. 4

| | Site 1 | Site 2 |
|---|---|---|
| System Integrity | Good | Uncertain |
| Alarm & Alerts | 3 | 0 |
| Security | 0 | 1 |
| Notifications | 0 | 1 unack |
| Networking | Good | Good |
1070
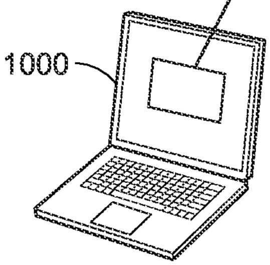
Compute Fabric
On-Premises
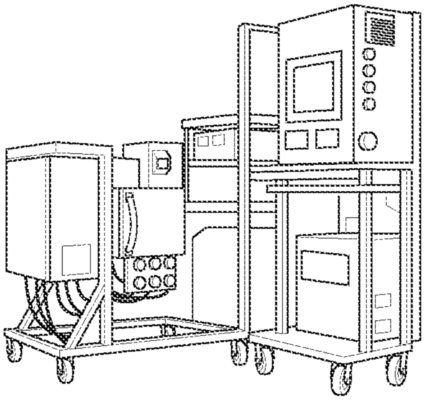
SITE 1
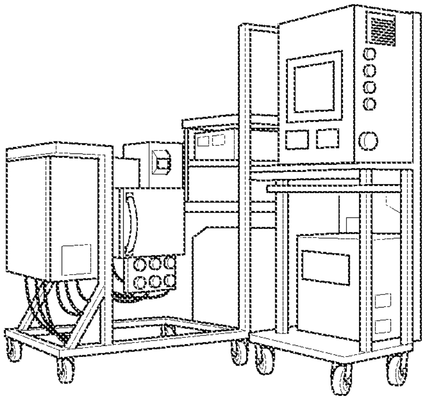
SITE 2
FIG. 10G

NEBULA FLEET MANAGEMENT

CROSS-REFERENCE TO RELATED APPLICATIONS

This application is a continuation-in-part of U.S. Non-Provisional application Ser. No. 18/223,405, entitled "Management Functionalities and Operations for Provider of Process Control and Automation System" and filed Jul. 18, 2023, which claims priority to U.S. Provisional Patent Application Ser. No. 63/390,238, entitled "Next Generation Process Control and Automation System" and filed Jul. 18, 2022; U.S. Provisional Patent Application Ser. No. 63/398,441, entitled "Securing Next Generation Process Control and Automation Systems" and filed Aug. 16, 2022; U.S. Provisional Patent Application Ser. No. 63/417,861, entitled "Configuration Features of Next Generation Process Control and Automation Systems" and filed Oct. 20, 2022; and U.S. Provisional Patent Application Ser. No. 63/418,006, entitled "Enterprise-Level Features Provided by the NGPCAS" and filed Oct. 20, 2022. The entire disclosures of each of these applications are hereby expressly incorporated by reference herein.

TECHNICAL FIELD

The present application relates generally to industrial process control systems and automation systems of industrial process plants, and in particular, to location-agnostic systems for accessing, managing, and/or reconfiguring aspects of a process control and automation system across multiple physical locations.

BACKGROUND

For decades, distributed process control systems and automation systems of various enterprises (such as distributed or scalable process control and/or automation systems used in power generation, chemical, petroleum, or other industrial processes such as pharmaceutical or other types of manufacturing) have typically included one or more dedicated process controller devices communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates). In many industrial processes, there may be hundreds, thousands, or even tens of thousands of field devices operating to send data to and/or receive commands from the one or more dedicated controller devices.

The process controllers, which are typically located within the plant environment (i.e., within the physical confines of plant and, in particular, in the vicinity of the field devices), receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, generally are communicatively disposed between a controller and one or more field devices, enabling communications therebetween (e.g., by converting electrical signals into digital values and vice versa). Typically, an I/O card functions as an intermediary device between a process controller and one or more field devices that have inputs or outputs configured for the same communication protocol or protocols as those utilized by the I/O card.

The field devices, controllers, and I/O devices are generally referred to collectively as "process control devices," and are generally located, disposed, or installed in a field environment of a process control system or plant. The network formed by one or more controllers, the field devices communicatively connected to the one or more controllers, and the intermediary devices facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator or other user such as a configuration engineer or a maintenance personnel to, e.g., configure the process controller, the I/O devices and the field devices, change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

Generally speaking, a communication network (e.g., an I/O network in a process control environment) includes communication nodes which are the senders and recipients of data and communication links or paths connecting the communication nodes. Additionally, communication networks typically include dedicated routers (including firewalls) responsible for directing traffic between communication nodes, and, optionally, dedicated devices responsible for configuring and managing the network. Some or all of the communication nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some communication nodes may be capable of sending and receiving relatively little traffic over the same period of time. Additionally, the connections between communication nodes on a network may have different throughput capabilities and different attenuation characteristics. A fiber optic cable, for example, may be capable of providing a bandwidth several orders of magnitude higher than a wireless link because of the difference in the inherent physical or fundamental limitations of the medium.

Industrial control system providers and users have, for many years, organized control systems for industrial processes around the Purdue Model for Control Hierarchy logical framework standardized by ISA (International Society of Automation) 95.01—IEC (International Electrotechnical Commission) 62264-1 ("the Purdue model"). The Purdue model is a network segmentation model for industrial control systems that helps conceptualize and organize concepts of industrial process architecture and, in particular, the security of the various network segments within an industrial process.

Much like the OSI model for network communications conceptually organizes computer communication networks into layers, the Purdue model divides an industrial process architecture into multiple levels and zones. Levels 0, 1, 2, and 3 represent, respectively, the physical process (e.g., the physical equipment being controlled—field devices and attendant physical I/O devices), basic control (e.g., the controllers, PLCs, etc. that monitor and control Level 0 equipment and safety instrumented systems), area supervisory control (e.g., operator workstations and the human machine interface (HMI), historian databases, configuration, etc., as well as supervisor and data acquisition (SCADA) functionality and other control logic that analyzes and acts on Level 1 data), and site operations (e.g., plant-wide control and monitoring, data aggregation, reporting, etc.), and are part of a manufacturing zone. Levels 4 and 5, respectively, represent business and logistics systems of the enterprise (e.g., database servers, application servers, file servers, etc.), and the enterprise or corporate network (e.g., a broader set of enterprise Information Technology (IT) systems, including connections to the public Internet), and are part of an enterprise zone. A demilitarized zone (DMZ) sits between the enterprise and manufacturing zones. The process control levels 0-2 generally require a higher level of trust in the safety and validity of messages, packets, and other communications, while manufacturing, corporate, and enterprise systems in levels 3-5 generally require a lower level of trust. For example, process plant systems, networks, and devices at security levels 0-3 may be protected against threats from enterprise networks at security levels 4-5, and/or from any external networks higher than security level 5 exploiting the enterprise networks, e.g., by using the DMZ and/or one or more firewalls.

As industrial processes and the associated control systems for those processes have become more complex, the operation technology (OT) that enables industrial control (i.e., the systems that monitor events, processes and devices, and make adjustments in industrial operations) has started to converge with the information technology (IT) (i.e., the systems used for data-centric computing and analysis) that has developed around it. Data from the OT system is now sought after for, and analyzed by, various IT systems. For instance, data from the operational levels of the plant may be used by various IT systems (e.g., at the enterprise level) to monitor plant efficiency, to create or update production schedules, product delivery schedules, and deliveries of input materials, and for myriad other uses. However, achieving desired levels of security within the Purdue model is exceedingly difficult, as the desired levels of security require significant infrastructure and correspondingly difficult configuration that can take upwards of a month or more during plant commissioning. Transporting the data between the layers of the Purdue model (e.g., sending data from layer 2 to layers 3 or 4), while retaining a modicum of security, has necessitated numerous security workarounds including data relays, data diodes, and a proliferation of firewall devices. In some implementations, in order to alleviate communications issues caused by these complex security features, system providers and/or site engineers have circumvented the Purdue model to send data directly from control devices to the cloud, which undermines the plant security features provided by the Purdue model.

Complicating things further, the OT systems are frequently older systems that are incompatible with generally accepted tenets of good security hygiene on IT networks, because the OT networks were frequently designed without IT security in mind. For instance, OT systems typically do not support modern identity and authentication/authorization protocols or practices, at least not at the level of the field devices and controllers. This often leads to a variety of data transfer practices that are incompatible with highly-secure networks. For example, there may be three or more domains between layers 2 and 4 of the process, and security policy may differ at each such domain. As a result, cross-layer connectivity can be challenging, leading to implementations in which holes are punched in firewalls to get data between layers, credentials are hardcoded into devices or applications and/or are passed in unencrypted form to maintain connectivity, and the like. Further still, integration of third-party software is difficult, error prone, and often insecure for the reasons described above, and vulnerabilities are frequently left unpatched because the necessary down-time would result in significant costs to plant operators. These shortcomings result in the process control network being, at best, complex, disorganized, and exceedingly difficult to maintain and, at worst, insecure.

More recently, some providers and users of industrial control systems have attempted to move portions of the industrial control system into multi-purpose computing resources such as the cloud, and to virtualize certain aspects of the industrial control system. Such attempts have had as their purpose the desire to capture and analyze ever-expanding quantities of data generated in industrial control systems, and to create virtualized redundancy, for example. However, adherence to the Purdue model and the associated security practices it requires have resulted in these attempts each suffering from one or more of the drawbacks elaborated upon above, while also having ancillary effects. Integrating cloud-based components into the Purdue model can drastically complicate the security issues by requiring data from lower levels of the Purdue model (e.g., OT systems) to traverse IT infrastructure that it was never intended to traverse. The resulting additional security infrastructure required, when added to the traversal of the IT infrastructure (whether on premise or off) can increase latency—especially with respect to control signals—to sometimes unacceptable levels.

Additionally, some providers of industrial control systems have attempted to decouple from purpose-built controller hardware (e.g., virtualize) the control algorithms that control the industrial processes. To that end, entire controllers have been virtualized so that they can execute on less specialized hardware (e.g., on servers or shared computing hardware), allowing multiple copies of the control algorithms to execute in parallel on different hardware such that one instance can serve as a backup to another, primary instance. If the primary instance fails or becomes unstable, control can shift to the backup instance, and the original, primary instance can be shut-down and re-instantiated on the same or different hardware. While such systems have some advantages in terms of controller redundancy because entire controllers can be instantiated multiple times on different hardware, and even moved between hardware, they continue to suffer from the limitations imposed by the Purdue model. Moreover, these systems require that all of the elements of the virtualized device (e.g., a controller) be replicated or moved together or at the same time, which limits the flexibility of these systems.

SUMMARY

A next generation process plant and industrial control and/or automation system architecture enables significant amounts of both computer processing and IT infrastructure that is used to support a process plant, an industrial control facility or other automation facility (referred to herein as a compute fabric) to be implemented in a shared, in an offsite and/or in a virtualized manner, which alleviates many of the communications and security issues present in current process and industrial control systems that attempt to implement control using shared or virtualized computing resources, such as cloud based computing or system resources. In particular, the next generation control system (which may be used to implement control, monitoring and configuration activities in any process plant or industrial manufacturing or automation facility), does not attempt to follow the well-known, generally followed and accepted Purdue model when integrating and providing communications between plant devices (such as field devices), equipment controllers, supervisory controllers, site business operations and enterprise operations. As a result, the system architecture is able to implement control functions, communications and security measures in a manner that can effectively use communications and security features developed for general purpose computing uses outside of the process plant environment in a more effective manner when supporting control functions associated with a process plant or an industrial automation facility.

More particularly, the next generation control system architecture includes a compute fabric that is agnostic or indifferent to the physical location at which the compute fabric is implemented and includes one or more physical controlled devices (referred to herein as a pool of physical devices), such as valves, transmitters, I/O devices, etc., located at one or more specific plants, facilities, sites, or physical locations at which a product or process is being manufactured or implemented and further includes a transport network that enables or provides communications between the compute fabric and the pool of physical devices in a robust and secure manner.

Generally speaking, the compute fabric includes a physical layer comprising one or more computer processing and/or storage devices and an application layer that includes computer implemented software modules that may be implemented on the physical layer to perform various control, monitoring and configuration activities using the pool of physical devices. In one case, the application layer of the compute fabric may be implemented as one or more sets of configured containers or as a containerized system in which various different configured containers and types of containers perform different computer implemented functions with respect to the facility or enterprise in which the control system is being implemented. The physical layer of the compute fabric may be implemented in any desired computer processing, storage, and networking equipment, such as on one or more computer processors and computer databases in the cloud, on one or more computer processors and databases at one or more dedicated offsite locations separated from the plant(s), facilities, or site(s) at which the pool of physical devices are located, on computer equipment located at the physical plant or facility at which the pool of physical devices are located or any combination thereof. The next generation control system architecture also includes a networking layer that is disposed in between the physical layer and the application layer and that provides administration, management, and usage of physical layer resources and logical (e.g., software-based) resources as and when required for the application layer activities, and in particular to support the timing and other needs that are specific to and required by industrial process control and automation.

Still further, the various components of the application layer, e.g., the various configured containers making up the application layer, may be executed in any desired computing equipment associated with the physical layer in any desired and configurable manner. Thus, the configured containers of the application layer may be implemented in a redundant manner in various ones of the same or different computer processing equipment of the physical layer, may be moved between different computer processing equipment of the physical layer to provide for better computing and communications performance, may be replicated in various different processors or databases of the physical layer to provide for redundancy and/or for controlling replicated physical equipment, etc.

The pool of physical devices may include devices that perform physical functions utilized to control an industrial or automation processes implemented at various different locations, site, or facilities of an enterprise. For example, the pool of physical devices, which may include field devices such as valves, valve positioners, actuators, switches, regulators, sensors, etc., perform physical functions, control, and/or other types of functionality associated with controlling the industrial or automation process using the physical hardware that is located at one or more manufacturing facilities of an enterprise, and that interacts with the process material or products being manufactured to provide measurement of and control of the physical phenomena being controlled/implemented as part of the manufacturing or automation process. The pool of physical devices may be disposed or physically located at different physical locations or environments associated with an enterprise or may be entirely disposed or located at only a single physical location or environment.

During operation, the compute fabric may be communicatively connected with the pool of physical equipment disposed at one or more physical locations using one or more transport networks. The transport networks may use any desired communication infrastructure and communication protocols, including any desired wired and/or wireless communications equipment/protocol. Such protocols may be any of various process control protocols such as HART, WirelessHART, Foundation Fieldbus, Profibus, OPC UA, etc. protocols, and/or may be any of various general computing communication protocols. For example, the transport networks may use any IP based or packetized protocol, including protocols which utilize publications and subscriptions such as MQ Telemetry Transport (MQTT) and Advanced Message Queueing Protocol (AMQP). Still further, the transport networks may use or include any desired communication network physical layers, such as Ethernet, 802.11, advanced physical layer (APL), etc. physical layers. In this manner, the pool of physical devices may send data or information to and may receive data or information from one or more configured containers in the compute fabric in packetized form via one or more of the transport networks to enable the compute fabric to implement process control, monitoring and configuration activities with respect to the pool of physical devices. Further, in some embodiments, virtual networks such as VNets may be used to communicatively connect different remote infrastructures (e.g., which may be implemented via different cloud computing systems and/or via other suitable means) and to communicatively connect different physical locations (e.g., on-premises infrastructures) with remote infrastructures. For network security reasons, virtual networks may be routed through Virtual Private Networks (VPNs). For reliability purposes, different VNets may be used for different network providers (for example, AT&T and Verizon). A more detailed description of VPNs is provided elsewhere within this document.

The compute fabric may be implemented on a scalable hardware platform, portions of which can be physically located across one or more physical locations that may or may not be the same physical locations associated with the pool of physical devices. Thus, in some embodiments, at least a portion of the compute fabric may be implemented on a cloud computing platform, the hardware of which may be disposed remotely from physical location(s) of the field environment at which the pool of physical devices is located.

Generally speaking, the compute fabric supports the creation, execution, removal, maintenance, administration, and management of a plurality of containerized applications, containerized services, or other containerized components (e.g., configured containers). The pool of containerized components may include applications that have been configured into containers and/or services that have been configured into containers, each of which executes to provide a specific functionality and/or operation utilized by the control system to control, monitor and/or configure one or more of the pool of physical devices, to support process and/or automation control and system management, and to administer, maintain, and manage the system and its components across the lifetime of the system. Generally speaking, the containerized components provide functionalities that traditional process control and automation techniques typically implement via a plethora of systems, networks, computing devices, DMZs, firewalls, and applications operating across Levels 2-5 of the Purdue model, e.g., from the supervision, monitoring, and control of physical industrial processes and data acquisition at level 2 to enterprise-level IT functionalities that provide business directions and functionalities related to the system at Level 5. Further, the containerized components may provide even higher-level functionalities such as coordination and/or management between multiple systems of an enterprise or even coordination between multiple enterprises. Accordingly, and advantageously, rather than utilizing the cumbersome and resource-costly traditional architecture of Purdue Levels 2-5 and all of the numerous data diodes, firewalls, DMZs, etc. necessary to secure a process control or automation system in the traditional architecture, the control architecture described herein simply utilizes the set of containerized components executing in the compute fabric to perform the same or similar sets of process control and automation core functionalities and related functionalities without compromising security of the system, and in some arrangements, provide greater security than is possible with traditional architectures.

Moreover, different functionalities may be implemented by different containerized components within the compute fabric and so a single application or service can be configured into multiple different containerized components (e.g., different instances of the application or service being implemented in respective containers). In this manner, similar or related configured containers may execute in conjunction with different physical devices and may execute on different portions of the hardware platform of the compute fabric, for example, to create redundancy or hot spares, etc. Advantageously, various containerized components can be created (e.g., spun up) and/or removed as or when needed and, collectively, a group of containerized components may operate to form or provide a logical process control or automation system which may be implemented as a "virtual process control system" for controlling one or more industrial or physical processes.

Moreover, during execution, each containerized component can communicatively connect to a particular physical component or physical device or to another containerized component via a respective, packet-based connection over the transport network, so that each containerized component and each physical component can be identified within the system by a unique name or identity which can be associated with a particular address (e.g., IP address) within the transport network. To maintain a high level of communication security, containerized components and physical components may be authorized and authenticated on a per-component basis and optionally pair-wise with each other, e.g., by using keys or any other suitable authorization and authentication technique. Upon successful authorization and authentication, two endpoint components may communicate data, instructions, and other information with each other during a session that the two endpoint components establish over the one or more transport networks.

To further secure the system, the one or more transport networks may include one or more virtual private networks (VPNs) so that, for example, a specific containerized component communicatively connects with a specific physical component or with other containerized components using a point-to-point or peer-to-peer connection, such as a VPN, that is exclusive to only the specific containerized component(s) and the specific physical component(s). In this manner, the components may securely communicate data, messages, instructions, and/or other information with each other via the exclusive, point-to-point or peer-to-peer connection. The exclusive point-to-point or peer-to-peer connections may be established and/or torn down as or when needed. Still further, multi-point connections (e.g., VPNs or other suitable implementations) may be used to provide highly secured communications between a plurality of containerized and/or physical components. In some implementations, point-to-point or peer-to-peer networking connections may be utilized to further secure the system instead of or in addition to one of more point-to-point or peer-to-peer connections. Point-to-point connections, peer-to-peer connections, and VPNs of the transport networks may be implemented over one or more public and/or private networks, including private enterprise networks and/or the public Internet.

Advantageously, the architecture of the compute fabric abstracts (e.g., disconnects) higher level, business logic services, subsystems, and other software components of the application layer from specific computing platforms or hardware associated with the compute fabric, and enables the higher level software defined services, subsystems, and other software components to dynamically, automatically, and responsively direct and cause changes to the usage of the hardware and software resources of nodes and clusters of the computing platform using, for example, APIs, operating system (OS) support, and other services of the networking layer, without requiring any human intervention or direction. Thus, the management of the resources of the computing platform may be dynamically responsive to changes in configurations and to the needs of the higher level software defined services, subsystems, and other software components of the application layer.

In one example, industrial process control, automation, and other associated business logic is performed by higher level software defined services, subsystems, and other software components associated with the compute fabric, e.g., at the application layer. For example, a set of software defined application layer components may collectively form a logical process control or automation system that executes in conjunction with the physical components disposed at one or more physical locations or sites to implement an industrial process. Moreover, a set of third-party business logic services may also execute at the compute fabric application layer and these third-party services may be generated by a software development kit associated with the compute fabric, via which users may develop, generate, install, and manage third-party services at the application layer.

In another example, a controller or a control service in the compute fabric may be configured with one or more process control module services, parameters, and values associated with an industrial process plant, such as tags of inputs and outputs, reference values, and the like, thereby forming a configured or programmed controller service. The controller or control service may be functionally equivalent to a traditional, dedicated, hardware controller device as understood in the Purdue model, or the controller service may be functionally equivalent to a control routine or control module which is configured into and executed by the traditional, dedicated hardware controller device. A container may be configured with an instance of the configured controller service, thereby forming a container image or instance of the configured controller service that is executable to perform the specific, configured set of process control logic, e.g., by using the configured control module containers, tags, reference values, etc., when so configured. Multiple instances or container images of a configured controller service (or of other configured applications and services) may be instantiated and executed by the compute fabric.

Some configured containers in the compute fabric may be allocated or assigned to respective compute nodes of a compute fabric, and dynamically re-assigned to different compute nodes by a software defined compute service based on dynamically changing configurations, performance requirements, and other needs of the logical process control or automation system. In some situations, configured containers may be assigned (and re-assigned) to be executed by particular processors or particular processor cores of one or more compute nodes. Some configured containers, though, may be pinned to respective compute nodes and so are not dynamically re-assigned by the compute service due to dynamically occurring conditions. Configured containers may additionally or alternatively be pinned to other physical or logical components of the compute fabric. For example, a configured container may be pinned to another configured container, to a specific data cluster, to a particular processing resource (e.g., a particular physical processor or a particular physical processor core of a compute node), to a physical rack or portion of a physical rack serviced by a particular power supply (where the physical rack physically houses the hardware of one or more compute nodes), etc. Further, configured containers may be nested within other configured containers, which is particularly useful in configuring and organizing the logical process control or automation system.

The application layer of the compute fabric may include other types of application layer services such as operator displays and interfaces, diagnostics, analytics, safety routines, reporting, data historization, service configuration, communications with external or other systems, enterprise-level applications, etc. Moreover, a set of subsystems at the application layer of the compute fabric may provide or implement other virtual or logical process control-related subsystems of the logical process control system. For example, a historian subsystem may include a read service, a write service, and a search service, respective configured containers of which are nested in the configured historian subsystem container. In another example, a batch process control subsystem may include a unit procedure service, a recipe service, and a regulatory record generation service, which may be nested within the configured batch process control system container.

Generally, the subsystems allow control services and other services to be easily and coherently grouped and/or managed. In one case, each compute node of the compute fabric hosts a respective instance of each subsystem of the set of subsystems so that subsystem services are proximately and readily available to other application layer services that are executing on each compute node. Accordingly, changes to one or more of the subsystems may be coordinated among the corresponding instances thereof executing at each compute node. As such, the set of subsystems is highly and proximately available for any application layer service executing on a compute node and, in the event of a compute node failure, a compute node component failure, or a particular subsystem failure, the functionalities provided by the set of subsystems may be easily maintained for the logical process control system. The subsystems may include continuous process control, event driven process control, batch process control, state-based control, ladder logic control, historian, process user, alarm, licensing, event, version control, process configuration, process I/O, to name a few.

Still further, in some implementations, the compute fabric may implement digital twins of various software defined application services, the entire software defined application layer, various software defined support services, and/or the entire software defined networking layer. A digital twin of the target components/layers may execute in concert with the active target components/layers on top of the computing platform, and thereby receive run-time data from the field environment of the industrial process plant and operate accordingly, with the same logic, states, timing, etc. as the active target components/layers. However, the I/O and other types of data generated by the digital twin are prevented from being delivered to the field environment. In this manner, should the active targets/components fail, the digital twin of the field targets/components may simply be activated to seamlessly maintain run-time operations of the industrial process plant. Still further, in some implementations, the compute fabric may implement a digital twin of a physical component which may serve as a proxy for the physical component during run-time operations.

Likewise, the compute fabric may be used to support various enterprise level services and functions, such as real time monitoring of an enterprise functionality across multiple facilities associated with an enterprise, real time monitoring of one or more physical locations of an enterprise, providing or implementing plant or facility operator displays to enable operator input from any location, providing containerized services from any location, providing and instantiating control, other enterprise services, portions of or even an entire process control system from any location, moving the execution of services across different locations or sites, providing subscription or third-party services with respect to the enterprise, providing centralized upgrades for the enterprise, and providing centralized monitoring of the compute fabric associated with an enterprise, as well as others.

In an embodiment, a method is provided of a fleet management application executing in a compute fabric associated with one or more process control or automation systems of an enterprise. The method may include (1) first accessing, via a first one or more application programming interfaces (APIs), a first one or more micro-encapsulated execution environments (MEEEs) executing in the compute fabric, (2) second accessing, via a second one or more APIs, a second one or more MEEEs executing in the compute fabric, (3) via the first accessing, obtaining, from the first one or more MEEEs, a first set of operational parameter values regarding a first one or more operations of the one or more process control or automation systems of the enterprise at a first one or more physical sites, and/or (4) via the second accessing, obtaining, from the second one or more MEEEs, a second set of operational parameter values regarding a second one or more operations of the one or more process control or automation systems of the enterprise at a second one or more physical sites. The method may include additional, fewer, and/or alternate actions, including various actions described in this disclosure.

In another embodiment, a provided system is configured to implement fleet management applications associated with process control or automation systems of an enterprise. The system may include (1) a first one or more micro-encapsulated execution environments (MEEEs) executing in a compute fabric associated with one or more process control or automation systems of the enterprise, (2) a second one or more MEEEs executing in the compute fabric, (3) a first one or more application programming interfaces (APIs) via which the first one or more MEEEs are accessed to obtain a first set of operational parameter values regarding a first one or more operations of the one or more process control or automation systems of the enterprise at a first one or more physical sites, (4) a second one or more APIs via which the second one or more MEEEs are accessed to obtain a second one or more operations of the one or more process control or automation systems of the enterprise at a second one or more physical sites, and/or (5) a fleet management application executing in the compute fabric, the fleet management application configured to utilize the first and the second APIs to thereby obtain the first and the second sets of operational parameter values. The system may include additional, fewer, and/or alternate components, including various components described in this disclosure. Moreover, the system may be configured to perform additional, fewer, and/or alternate actions, including actions described in this disclosure, in various embodiments.

BRIEF DESCRIPTION OF THE DRAWINGS

FIG. 4 is a block diagram of an example architecture of a compute fabric which may be included in the NGPCAS of FIGS. 1A and 1B.

FIG. 10G depicts another example diagnostics GUI for multiple physical sites in an NGPCAS.

DETAILED DESCRIPTION

Figure 1A:
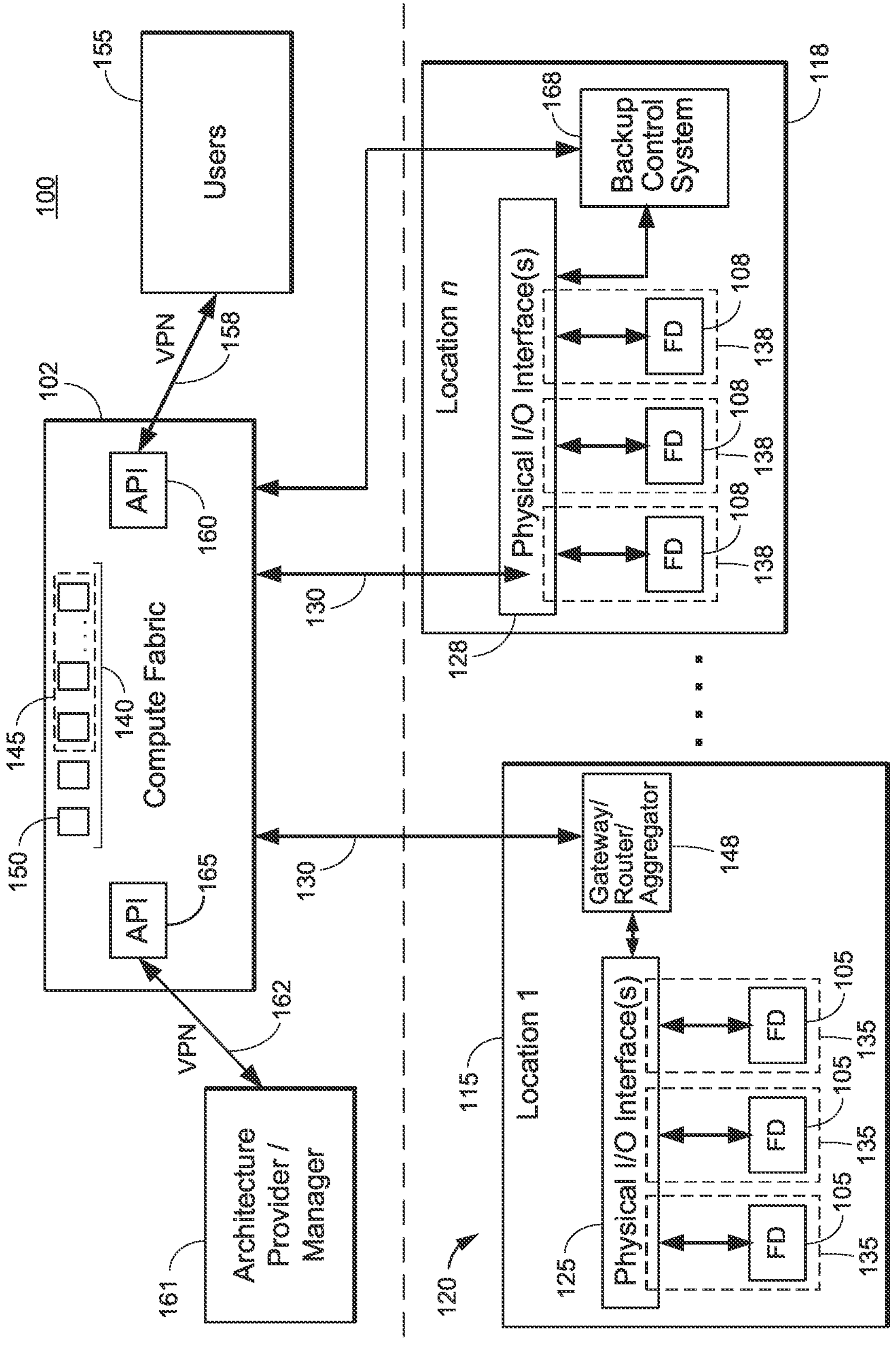
FIG. 1A is a block diagram of an example architecture of a Next Generation Process Control and Automation System ("NGPCAS") which may be utilized to control industrial and/or automation processes.

The following disclosure describes a next generation process plant and industrial control and/or automation system architecture relying on a shared compute fabric to implement control, monitoring and configuration activities in any process plant or industrial manufacturing or automation facility. The compute fabric is a high-performance computing system consisting of loosely coupled storage, resource management, security, networking and parallel processing functions linked by high bandwidth interconnects (such as 10 Gigabit Ethernet), and may include any one or more of a commercial multipurpose platform such as Microsoft's Azure Services platform; platforms owned, operated, and maintained by an enterprise or system provider and dedicated to implementation of process control at one or more enterprises; compute clusters situated on-premises and local to a process plant; etc. The shared resources of the compute fabric, which may be shared among process plants within an enterprise, or by multiple enterprises each operating one or more process plants, and the fact that the next generation architecture does not attempt to follow the well-known, generally followed and accepted Purdue model, allows a variety of improvements and innovations in system configuration, control, monitoring, and management.

While the architecture will be described in detail below, the following examples illustrate several scenarios implementing in a system the concepts described in this specification and highlight the advantages of such implementations. The examples should not be considered limiting in the functionality available, the personnel performing various tasks, the physical separation or location of various elements, or in any other manner. Instead, these examples are intended to introduce various system elements and aspects of the operation of the system, each of which will be described in greater detail elsewhere in this description.

Example 1

A system provider provides and manages a compute fabric serving one or more enterprises, and provides a variety of tools and programs for configuring, commissioning, controlling, and monitoring one or more process plants using the compute fabric. These tools and programs include tools for configuring control modules and control strategies to control the process plant, tools for configuring operator workstations to monitor and control the process plant, tools for performing asset management (e.g., tracking calibration, maintenance, etc.), and tools for instantiating and managing the control modules that, after being configured and instantiated in the compute fabric, ultimately control process plant, among others. Each enterprise included in a plurality of enterprises accesses and makes use of the compute fabric and the available tools and programs to implement one or more enterprise-owned and/or -operated industrial processes in one or more respective process plants. Each of the process plants implements various aspects of its process control via a variety of containerized applications and services instantiated in the compute fabric. These include control algorithms, input-output, and security functions, among others, and the use of the containerized applications and services may facilitate various quality-of-service (QoS) features, including load balancing, fault tolerance, and redundancy implemented and managed by either the system provider or the enterprise, or by the enterprise with assistance from the provider.

With these tools available, a first enterprise owner implements at a first process plant, a refinery, a continuous process producing various products by refining a petroleum product. That process plant has disposed therein a variety of field devices (e.g., valves, tanks, distillation columns, sensors/transmitters, and the like) that sense parameters in the refinery and perform control actions in response to control algorithms that use as inputs the sensed parameters. Each of the field devices has a corresponding input/output device that receives the signal(s) from the field device, coverts the signals into a common format (e.g., Ethernet packets), and transmits the data from the field devices to the compute fabric. A pre-configured gateway/router/aggregator, facilitating secure communication between the first process plant (e.g., I/O devices and field devices, collectively comprising a set of physical devices) and the compute fabric, is among the only non-field device or I/O device hardware that is located on the premises of the first process plant.

A configuration engineer for the enterprise and/or the process plant accesses the tools made available by the system provider to configure the operation of the process plant. The configuration engineer creates the necessary control algorithms by instantiating function blocks for receiving data from the field devices via the I/O devices and sending commands and data to the field devices via the I/O devices, instantiating various processing function blocks that utilize the data received from the field devices as input to a control algorithm and generate the outputs that are sent to the field devices, and implementing operator workflows that allow the plant operators to monitor and respond to conditions in the run-time process plant. However, in contrast to known, conventional or traditional systems, these function blocks and control modules are not downloaded to a dedicated hardware controller at the process plant. Instead, once the process plant is commissioned (e.g., the physical devices are installed and wired at the process plant), the function blocks and control modules are instantiated as containerized services and/or other types of micro-encapsulated execution environments ("MEEES," also referred to herein as "microservices" or "granules") in the compute fabric.

Generally, a microservice, granule, or MEEE which is instantiated in the compute fabric may be an independent software process that can run on its own deployment schedule and can be updated independently of other microservices. Examples of MEEEs may include function blocks, control modules, control applications, and other applications and services which relate to business logic of the process plant and/or otherwise support the process plant, to name a few. Groups of microservices or MEEEs may interact collaboratively to achieve some desired outcome. For example, to control a reactor, multiple strategies such as Feed, Reactor, Products, Utilities, and Flare may defined by respective MEEEs, and this set of multiple MEEEs may cooperatively operate (e.g., in conjunction with each other) during runtime of the process plant to implement the desired reactor control strategy. In another example, for a process control analytics application, various MEEEs may be defined to execute respective statistical computations and/or statistical algorithms, and the various MEEEs may be combined as desired and executed in combination to provide an overall prediction analytics application. A single, individual microservice or MEEE may be configured to execute an application ranging from very broad (e.g., a control strategy of an entire system or plant) to very granular (e.g., only a portion of a control routine or control module), as will be discussed in more detail elsewhere within this document. As such, due to its flexibility of being configurable to execute various process control and process control-related applications ranging from broad to granular, a microservice or MEEE is interchangeably referred to herein as a "granule."

At any rate, the configuration engineer may also use the configuration tools to specify various QoS metrics for each of the function blocks and control modules, for individual signals or variables, and for the process as a whole. Each of the microservices, MEEEs, or granules communicates with one another and with the I/O devices via one or more secured point-to-point (PTP) and/or peer-to-peer (P2P) connections (which may include one or types of secured, encrypted PTP and/or P2P connections, such as VPN(s)), and each is authenticated via a digital security certificate. These secured, point-to-point and/or peer-to-peer connections and security certificates are managed automatically within the compute fabric with minimal to no input from the personnel at the enterprise.

With respect to the QoS metrics, an orchestration service operating within the computing fabric (and provided by the system provider) implements various load balancing and redundancy schemes to ensure that the QoS metrics for the plant are met. For example, the orchestration service ensures that a redundant configured container is always instantiated for any configured container executing any portion of the control algorithm, and that the redundant configured container maintains corresponding inputs and outputs (i.e., maintains a parallel state) to the primary configured container such that, if there is a failure of the primary container, control may be shifted to the redundant container nearly instantaneously (e.g., within milliseconds). The orchestration service ensures that configured containers are executing on separate hardware and powered by separate power supplies to maintain sufficient redundancy according to policies set by the enterprise. For some microservices, configured containers, MEEEs, or granules, the orchestration service instead maintains redundant state databases storing the state of the microservices/configured containers/MEEEs/granules, such that if a microservice/configured container/MEEE/granule fails or is otherwise taken offline, a new microservice/configured container/MEEE/granule may be instantiated nearly instantaneously (e.g., within milliseconds) and restored to the state of operation of the previous instantiation of the configured container when it was taken offline.

The orchestration service also provides load balancing services to maintain sufficient memory, processing, and network resources to meet QoS requirements for individual microservices/MEEEs/granules and for the plant as a whole. For example, maximum latency requirements require certain configured containers to be executing on compute fabric resources that are physically closer to the process plant and/or have greater network bandwidth between the resources and the process plant.

To maintain security, and as described above, all containerized applications and services communicate via one or more secured, encrypted point-to-point connections, such as VPNs. In some cases, a pair of endpoints (e.g., a pair of containerized applications or services, or a containerized application/service and a physical component) communicates via a dedicated VPN, while other VPNs include multiple containerized applications/services communicating with one another via respective sessions established over the VPNs. Other VPNs facilitate communication between enterprise-level containerized applications/services and plant-level containerized applications/services, other VPNs still facilitate communication between provider level containerized applications/services and containerized applications/services at the enterprise and/or plant level, and still other VPNs facilitate communications between user interface devices and the system. In any event, any human user, and any third-party application executing to facilitate a service in the enterprise or the process plant, interacts with the system one or more APIs through which necessary actions may be performed after the user or third-party application is authenticated (e.g., using multi-factor authentication).

In this manner, relative to known systems, the control of the first process plant is implemented with fewer dedicated computing resources, while maintaining (or improving) QoS metrics, maintaining (or even improving) security, and removing or reducing the need to periodically and manually adjust the type or quantity of local computing resources according to changes in the process plant.

Example 2

At some point after the commissioning of the first process plant, the first enterprise owner decides to duplicate the first process plant in a second process plant. Because the control algorithms and necessary software are already configured for use with the first process plant, setting up the field devices and I/O hardware at the second process plant is among the most time-consuming portions of commissioning the process plant.

In this case, the enterprise owner opts to remove the physical I/O devices from the process plant setup and instead perform the functions of the I/O devices as microservices, MEEEs, or granules instantiated in the compute fabric. The enterprise owner installs the field devices at the site of the second process plant. Each field device is configured as it normally would be—with a device tag, ranges, limits, scale, and other data for operating the field device. Because the second process plant is a duplicate of the first process plant, each field device is configured and programmed according to its corresponding device in the first process plant, using an automated process to decrease the time required for commissioning. Each device is coupled, by its corresponding communication media, to a media converter that converts between the device's native communication media (e.g., Foundation Fieldbus, HART, WirelessHART, OPC UA, 4-20 mA, Ethernet, etc.) and an Ethernet protocol. Each media converter packetizes (in Ethernet packets) the variety of data received from the corresponding field device and transmits the packets to a pre-configured on-site gateway of the second process plant. The gateway facilitates secure communication between the second process plant (media converters) and the compute fabric, and is among the only non-field device hardware that is located on the premises of the second process plant.

The configuration engineer, having opened the stored configuration of the first process plant within a user interface application provided by the compute fabric, drags a loop over the compute fabric canvas (the workspace showing for the first process plant the configured containers instantiated in the compute fabric) to select all of the configured containers and, by dragging the selected configured containers to a new compute fabric canvas, copies to the second process plant the set of configured containers (e.g., containerized applications and services) instantiated in the first process plant.

The configuration engineer instantiates, within the compute fabric, for each field device of the second process plant, a digital twin of the field device and corresponding I/O microservices/MEEEs/granules, taking the place of the physical I/O devices that would previously have coupled physical field devices to the controllers. This digital twin is, to the rest of the process control software executing in the compute fabric, indistinguishable from the hardware field device operating in the process plant. The digital twin is configured identically, and maintains to the extent necessary (and possible, as described below) the same data as is present on the field device itself. That is, as the field device updates the values of measured parameters or status values, those values are uploaded, via the media converters, to the digital twins within the compute fabric. It is the digital twins, however, that interact with the instantiated function blocks, control modules, and other control algorithms in the compute fabric. By the same token, the function blocks, control modules, and other control algorithms instantiated in the compute fabric (or in a hardware controller) send commands and data to the digital twins, which communicate those commands and data back to the hardware field devices of the second process plant via the media converters.

With the hardware field devices in place and coupled via the media converters to the digital twins executing in the compute fabric, the configuration engineer instructs the compute fabric to bring the process online at the second process plant, e.g., by activating a single user control. Responsively, the compute fabric initializes the process control system, and the system is online and ready to begin testing and/or operating within minutes thereafter, vastly simplifying the process of bringing the second process plant online.

In addition to simplifying its commissioning, the digital twins contribute to the robustness of the operation of the second process plant. In the event that a particular field device becomes unavailable (momentarily or otherwise), the digital twin may prevent an abnormal condition in the operation of the process plant as a whole. For example, a momentary loss of connectivity or increase in latency between the process plant and the compute fabric may have no effect on the process as a whole, because the digital twins may continue to provide data (e.g., simulation data, presumed steady-state data, etc.) to the control algorithms (within safety parameters, of course) during the momentary anomaly. Similarly, if the self-reported (or system-determined) status for a sensor changes to indicate that the sensor value is no longer reliable, the digital twin may be programmed to provide data from another source (e.g., simulated values, values calculated based on other measured parameters, etc.) in place of the unreliable sensor data.

The use of the digital twins also contributes to the cost-effective maintainability of the process plant. In the event that a hardware sensor (e.g., a thermocouple or pressure sensor) fails, the sensor can, in many instances, be replaced without stopping or disrupting the operation of the process, because the digital twin can continue to provide data (simulated, or otherwise) to the control algorithms even when the hardware sensor is offline.

Example 3

With the first and second process plants up and running, the enterprise owner (or its users) can manage both of them at an enterprise level using a variety of tools available from the system provider. Because the various facilities owned by the enterprise are executing in the compute fabric, the enterprise owner may securely access data related to the process plants individually, or to the enterprise as a whole, at any time and from anywhere. As indicated above, all human and/or third-party application access to the system is provided via APIs, access to which requires multi-factor authentication. Thus, after authenticating, the user can access tools, metrics, and other functions that allow for the management of the enterprise and its various process plants.

The enterprise-level user can create or use any number of dashboards and tools for facilitating enterprise-level views of the process plants individually or collectively. The enterprise-level user may decide to view real-time production metrics (e.g., production output volumes, quality metrics, etc.) for a single plant, and also to compare real-time metrics between plants, charting metrics for the respective plants over time for comparison. Upon noticing that one plant is performing differently from the other (e.g., outputting higher quality product, operating more efficiently, etc.) the enterprise-level user may decide to dig more deeply into why the plants are performing differently. Turning to an application or service marketplace hosted by the system provider, the enterprise-level user may purchase or subscribe to an analysis service or tool, which, upon purchase or subscription is instantiated in the compute fabric and can be used by the enterprise-level user to analyze the performance of the process plants.

The analysis shows that the tuning of one of the process plants could be optimized to perform better, and recommends a different tool that can re-tune and optimize the process plant. The enterprise-level user may reach out to the control operators at the plant to inform them of the available tool. The tool is then subscribed to or purchased for the enterprise or for just the individual plant, and instantiated in the compute fabric at the plant level and/or at the enterprise level.

The tool may determine that the process plant requires retuning in a manner that requires an updated copy of one or more control algorithms. In that event, the tool proceeds (with input from the operator) to create updated control algorithms. The updated control algorithms are instantiated in the compute fabric, but are not initially placed in control of the process plant. Instead, the updated control algorithms are implemented in parallel (e.g., in simulation mode) with the active control algorithms to ensure that they will not adversely affect the operation of the process plant and will, in fact, improve the operation of the process plant. The operator then switches control of the process to the new control algorithms instantaneously (e.g., without interrupting the process) when satisfied that the updated control modules will function properly.

At the same time, the operator of one of the process plants may notice that the tuning of the process for which the operator is responsible appears to be fluctuating. The operator reaches out to a customer service representative from the system provider for assistance to determine what is causing the fluctuation in tuning, and using dashboards available to the system provider representative, they determine that the fluctuations in tuning may be the result of several related factors in the compute fabric including the movement of microservices/MEEEs/granules between hardware resources for load balancing, changes in available processing and network bandwidth, and physical distance between the compute fabric resources and the process plant in question. The customer service representative may recommend the use of a real-time tuning application.

The real-time tuning application monitors latency between the compute fabric and the physical resources in the process plant, and automatically adjusts the tuning of the control algorithms to account for changes in the latency as a result of network conditions, physical distance, and processor bandwidth. In this example, after implementing the real-time tuning application, the operator notices that the subject process is generally more stable.

However, if the real-time tuning application indicates that there is one control loop that the real-time tuning application is unable to automatically tune, the operator and customer service representative, working cooperatively, may determine that the control loop in question requires minimal latency and, as a result, the customer service representative may "pin" the configured containers related to the control loop to physical hardware resources in the compute fabric that meet the latency requirements and, in particular, that meet the latency requirements because of their physical proximity to the process plant in question. For good measure, the customer service representative may additionally dedicate specific hardware resources for the configured containers related to the control loop, to prevent those resources from becoming loaded to an extent that would cause latencies to detune the process.

Example 4

The enterprise owner, now having multiple process plants running, may determine that it would be more efficient to consolidate the operators that manage the various processes. While some number of maintenance and other personnel must be physically present at each process plant, the fact that the compute fabric is securely accessible, essentially from anywhere with a sufficient network connection, allows the operators to be located anywhere. Accordingly, the enterprise owner may determine that it can consolidate all of its operations into three operations centers, spaced roughly equally around the world, such that its operations can continue 24 hours/day without any of its employees working outside of first shift (business) hours in their respective locale.

The enterprise owner staffs each operations center with operators in numbers sufficient to operate all of its plants operating around the world. As a result of the consolidated operations centers, the numbers of staff required for redundancy (e.g., to account for staff illnesses, vacations, etc.) is reduced.

Example 5

Separately, a second enterprise that is looking to improve efficiency in its traditionally-architected (first) process plant and to expand to add additional process plants desires to do so by implementing a system provided by the system provider. The system provider establishes accounts for the second enterprise, and the second enterprise personnel subscribe to and/or purchase the necessary and desired tools and packages. The second enterprise's configuration engineers use tools available from the system provider to convert the configuration files that currently operate the legacy controllers in the first process plant into a configuration of containerized services (e.g., microservices, MEEEs, or granules) that will execute on the compute fabric. At the same time, the system provider arranges to install, at the site of the first process plant, a pre-configured gateway securely coupling the I/O devices to the compute fabric. After ensuring that the compute fabric is configured to meet the necessary QoS metrics, the configuration engineers and operators of the first process plant simulate operation the process plant using the configured compute fabric to confirm that it appears to be properly configured, and then bring the process plant online using the compute fabric.

While the newly reconfigured process plant is operating using the compute fabric, and the legacy controller hardware is no longer operating the process plant, the second enterprise owner, rather than decommissioning the legacy controller configuration, maintains it. In fact, the system provider assists the enterprise personnel in configuring the legacy configuration of the first process plant such that, in the event that the compute fabric (or the network connection thereto) becomes unavailable or unstable, control of the process plant can fail over to local control using the legacy system. As such, the legacy system is run in parallel as a backup control solution.

At the same time, the second enterprise owner may decide to keep the safety-instrumented systems (SIS) for the process in place at the first process plant, rather than migrating them to the compute fabric.

As the second enterprise owner moves toward expanding to add new process plants, the second enterprise owner purchases the necessary field devices for installing in and operating those process plants. Each of the field devices includes a burned-in hardware ID that indicates its make, model, options, and the like. Upon purchasing the field devices, the burned-in hardware IDs for the purchased devices are registered to the second enterprise owner in a database that facilitates the configuration of the field devices in the new process plants. The configuration engineers, while configuring the control modules, can select each device from the database, causing the compute fabric to create a digital twin for each that is programmed accordingly. A plant engineer configuring the physical field devices in the new process plant scans each device and places each device according to its hardware ID. When the physical devices are connected to the compute fabric via their respective media converters, each is automatically associated with its digital twin based on the hardware ID, and is programmed (if programmable) according the programming of its digital twin.

While the additional process plants are configured to operate on remote compute fabric, the second enterprise owner decides that, because only one network provider serves some of the process plant locations, it remains prudent to have a control solution that can maintain safety, if not full operation, of the process plant locations in the event that the network connection to the remote compute fabric becomes unavailable. For that reason, the enterprise owner physically locates certain compute fabric resources on-site such that, in the event of a communication failure between a process plant and the remote compute fabric, the on-premises compute fabric can maintain safety and/or operation of the process plant. The on-premises compute fabric resources execute redundant containerized services, microservices, MEEEs, or granules (orchestrated by the orchestrator service in the compute fabric) such that control of the process plant can fail over to the on-premises compute fabric if necessary.

Example Next Generation Process Control and Automation System Architecture

FIG. 1A is a block diagram of an example architecture of a Next Generation Process Control and Automation System ("NGPCAS") 100 which may be utilized to control industrial and/or automation processes. For example, the NGPCAS 100 may be used by chemical, petroleum, industrial, manufacturing, filling and packaging, or other types of enterprises to manufacture, refine, transform, generate, or produce physical materials or products. For ease of reading, the NGPCAS 100 is interchangeably referred to herein as the "architecture 100" or the "system 100."

The NGPCAS 100 includes a compute fabric 102 communicatively connected to a plurality (e.g., a pool) of physical devices 105, 108. The plurality or pool of physical devices 105, 108 includes devices that perform physical functions utilized to control an industrial or automation process provided by an enterprise. For example, the plurality of physical devices 105, 108 may include field devices such as valves, valve positioners, actuators, switches, regulators, sensors, (e.g., temperature, pressure, level and flow rate sensors), spectrometric devices, pumps, motors, transmitters, and the like, some of which may be intelligent field devices. Some of the physical devices 105, 108 may have respective on-board processors, memories, and computer-executable instructions stored on the memories, where the stored computer-executable instructions are executable by the on-board processors to perform, for example, control and/or other types of calculations, alarming functions, and/or other functionality associated with controlling the industrial or automation process using the physical device 105, 108. Physical devices 105, 108 may responsively operate and/or change their behavior based on control signals and/or other instructions received from the compute fabric 102, as is described in more detail elsewhere herein.

The pool of physical devices 105, 108 of the system 100 may be disposed or physically located at different physical locations, sites, plants, or environments 115, 118 (such as illustrated in FIG. 1A), or the pool 105, 108 of physical devices may be entirely disposed or located at only a single physical location, site, plant, or environment (not shown). The one or more physical locations 115, 118 at which the physical devices 105, 108 are disposed are generally and collectively referred to herein as the "field environment 120" of the system 100. For example, the field environment 120 of the NGPCAS 100 may include one or more buildings, fields or outdoor sites, plants, oil rigs or platforms, rooms, cabinets, etc. in or at which at least one physical device 105, 108 of the system 100 is physically located and in which the at least one physical device 105, 108 operates in conjunction with the compute fabric 102 to control the industrial process or automation process. The term "field environment 120" is interchangeably referred to herein as the "process environment 120," the "automation environment 120," the "plant environment 120," or the "physical environment 120" of the NGPCAS 100.

Each physical location or environment 115, 118 at which at least one physical device 105, 108 of the system 100 is disposed includes one or more on-premises physical I/O (Input/Output) interfaces 125, 128 configured to receive, condition, and deliver (e.g., to the compute fabric 102 via one or more transport networks 130) I/O signals or I/O data generated by the on-premises physical devices 105, 108, and optionally to provide control signals, instructions, and/or other information generated by the compute fabric 102 and received at the location 115, 118 via the one or more transport networks 130 to designated recipient on-premises physical devices 105, 108. Each on-premises physical device 105, 108 physically connects to the on-premises physical I/O interfaces 125, 128, e.g., via respective wired or wireless links. As such, in an embodiment, the on-premises physical I/O interfaces 125, 128 may include a pool of I/O hardware ports (which may include wired and/or wireless ports or interfaces) and/or other I/O hardware resources that are shared among multiple on-premises physical devices 105, 108 at a respective location 115, 118. Additionally or alternatively, the on-premises physical I/O interfaces 125, 128 may include individual instances of I/O hardware resources, where each individual instance is included in or exclusively connected to one and only one on-premises physical device 105, 108. Generally speaking, the present disclosure utilizes the term "physical component" 135, 138 to collectively refer to the combination of a single physical device 105, 108 (e.g., a single field device) and the physical I/O interface 125, 128 utilized by the single physical device (e.g., the attendant physical I/O interface(s) of the single physical device 105, 108) to communicate information over the transport networks 130. As such, terminology-wise, the NGPCAS 100 includes a pool of physical components 135, 138, each of which includes an individual field device 105, 108 and the respective physical I/O interface resources 125, 128 that the individual field device 105, 108 utilizes to communicate with the compute fabric 102. Generally speaking, the physical components 135, 138 of the NGPCAS 100 operate or would be included in Level 0 of the Purdue model of a traditional process control system.

As shown in FIG. 1A, the physical components 135, 138 at each location 115, 118 communicatively connect to the compute fabric 102 via one or more transport networks 130. The one or more networks 130 may include one or more wired and/or wireless networks. Further, the one or more networks 130 may typically include one or more packet networks, such as one or more Ethernet-compatible packet networks, each of which may or may not include an advanced physical layer (APL). As such, the physical I/O interfaces 125, 128 enable the I/O data or information generated by the physical devices 105, 108 to be delivered in packetized form via the one or more transport networks 130. For example, the physical I/O interfaces 125, 128 may convert the I/O data or information generated by the physical devices 105, 108 into packets, may wrap the I/O data or information in packets, or may otherwise transform the I/O data or information into a packetized format for delivery to the compute fabric 102 via the packet network(s) 130.

In some embodiments, a physical site or location 115 may include a gateway/router/aggregator 148 which, for ease of discussion, is referred to herein as a "gateway 148." Generally speaking, the gateway/router/aggregator 148 receives outgoing data and information that is to be sent to the compute fabric 102 and causes the outgoing data and information to be sent over the transport networks 130 (e.g., in individual packets and/or in packets in which data/information generated by multiple physical components 138 are aggregated into a single packet), and the gateway/router/aggregator 148 receives incoming data and information that is received from the compute fabric 102 (e.g., in individual packets and/or aggregated packets), and routes the information, instructions, and/or data included therein to designated recipient physical components 138 at the site 115. A physical location may include respective gateway 148 (e.g., location 115), a physical location may exclude any gateways 148 (e.g., location 118), and in some configurations, multiple physical locations may share a single gateway 148 (not shown in FIG. 1A), for example.

Turning now to the compute fabric 102 of the NGPCAS 100, the compute fabric 102 is implemented on a scalable hardware platform, portions of which can be physically located across one or more physical locations (not shown in FIG. 1A). The physical locations at which at least portions of the hardware platform of the compute fabric 102 are physically located may or may not be the physical locations 115, 118 at which the physical devices 105, 108 of the system 100 are physically located. For example, an entirety of the hardware platform on which the compute fabric 102 is implemented may be remotely located from any location 115, 118 of the field environment 120 of the system 100 (e.g., as illustrated in FIG. 1A), or a respective portion of the hardware platform on which the compute fabric 102 is implemented may be located at one or more of the physical device locations 115, 118 of the field environment 120 (not shown in FIG. 1A). In some embodiments, at least a portion of the compute fabric 102 may be implemented on a cloud computing platform, the hardware of which may be disposed remotely from and/or at physical locations 115, 118 of the field environment 120 of the system 100.

The compute fabric 102 of the NGPCAS 100 supports the creation, execution, removal, maintenance, administration, and management of a plurality or pool of containerized applications and/or services 140, that are generally referred to interchangeably herein as a "plurality or pool of containerized components 140," a "plurality or pool of micro-encapsulated execution environments 140 (MEEEs 140)," or a "plurality or pool of granules 140" of the NGPCAS 100. That is, the pool of containerized components/micro-encapsulated execution environments/granules 140 may include applications and/or services that have been configured into containers and/or other types of micro-encapsulated execution environments or granules, each of which can execute to provide a specific functionality and/or operation utilized by the system 100 to control the physical devices 105, 108, to support process and/or automation control and system management, and to administer, maintain, and manage the system 100 and its components across the lifetime of the system 100. Generally speaking, the containerized components/MEEEs/granules 140 of the NGPCAS 100 provide functionalities that traditional process control and automation techniques typically implement via a plethora of systems, networks, computing devices, DMZs, firewalls, and applications operating across Levels 1-5 of the Purdue model, e.g., from the basic control of physical industrial equipment and processes of the system 100 at Level 1 to enterprise-level IT functionalities that provide business directions and functionalities related to the system 100 at Level 5. Further, the containerized components/MEEEs/granules 140 may provide even higher-level functionalities such as coordination and/or management between multiple systems 100 of an enterprise or even coordination between multiple enterprises. Accordingly, and advantageously, rather than utilizing the cumbersome and resource-costly traditional architecture of Purdue Levels 1-5 and all of the numerous data diodes, firewalls, DMZs, etc. necessary to secure a process control or automation system in the traditional architecture, the NGPCAS 100 simply utilizes the set of containerized components/MEEEs/granules 140 executing in the compute fabric 102 to perform the same or similar set of process control and automation core and related functionalities without compromising security of the system 100, and often, with increased security for the system 100. A more detailed discussion of security techniques utilized within the architecture of the NGPCAS 100 is provided elsewhere within this disclosure.

Typically, different functionalities are implemented by different containerized components/MEEEs/granules 140 within the compute fabric 102. A single application or service can be configured into multiple different containerized components/MEEEs/granules 140 (e.g., different instances of the application or service implemented in respective containers), if desired, for example, to execute in conjunction with different physical devices, to execute on different portions of the hardware platform of the compute fabric 102, to create redundancy or hot spares, etc. Various containerized components/MEEEs/granules 140 can be created (e.g., spun up) and/or removed as or when needed by the system 100. Collectively, a group of containerized components/MEEEs/granules 140 may operate to form or provide a logical process control or automation system 145 (also referred to herein interchangeably as a "virtual process control system" 145) for controlling one or more industrial or physical processes by controlling and utilizing the physical components 105, 108 disposed in the field environment 120 of the NGPCAS 100. Typically, but not necessarily, the group of containerized components/MEEEs/granules 140 forming the logical process control system 145 is a subset of the entirety of containerized components/MEEEs/granules 140 provided by the compute fabric 102.

During execution, each containerized component/MEEE/granule 140 can communicatively connect to a particular physical component 135/138 or to another containerized component/MEEE/granule 140 via a respective, packet-based connection over the transport networks 130. As such, each containerized component/MEEE/granule 140 and each physical component 135/138 of the NGPCAS 100 is identified within the system 100 by a unique name, identifier, or identity which can be associated with a particular address (e.g., IP address) within the transport networks 130. Generally speaking, a physical component 135/138 may be a sender or provider of I/O data and information that one or more containerized components/MEEEs/granules 140 receive or consume. In some scenarios, a containerized component/MEEE/granule 140 can be a sender or provider of control signals or other instructions that a physical component 135/138 receives or consumes. In some scenarios, a containerized component/MEEE/granule 140 can be a sender or provider of data that another containerized component/MEEE/granule 140 receives or consumes. To maintain security of the NGPCAS 100, containerized components/MEEEs/granules 140 and physical components 135/138 may be authorized and authenticated on a per-component basis and optionally pair-wise with each other, e.g., by using keys or any other suitable authorization and authentication technique. Upon successful authorization and authentication, two endpoint components 140, 135/138 may communicate data, instructions, and other information with each other during a session that the two endpoint components 140, 135/138 establish over the one or more networks 130.

To further secure the NGPCAS 100, the one or more transport networks 130 may include one or more secured, point-to-point (PTP) and/or peer-to-peer (P2P) connections, which may include one or more secured, encrypted point-to-point and/or peer-to-peer connections such as virtual private networks (VPNs) and other types of secured, encrypted PTP and/or P2P connections. In an embodiment, a specific containerized component/MEEE/granule 140 communicatively connects with a specific physical component 135/138 using a secured, encrypted point-to-point or peer-to-peer connection (such as a VPN or other suitable implementation) that is exclusive to only the specific containerized component/MEEE/granule 140 and the specific physical component 135/138. For example, the specific physical component 135/138 and the specific containerized component/MEEE/granule 140 can be the endpoints of an exclusive point-to-point VPN that is utilized by only the two endpoint components 135/138 and 140 (e.g., and by no other components of the system 100) so that the components 135/138, 140 may securely communicate data, messages, instructions, and/or other information with each other via the exclusive, point-to-point VPN. In a similar manner, a particular containerized component/MEEE/granule 140 can communicatively connect with another particular containerized component/MEEE/granule 140 using a secured, encrypted peer-to-peer (P2P) connection (which may or may not be implemented via a VPN) that is exclusive to only the two containerized components/MEEEs/granules, and the two containerized components/MEEEs/granules may securely communicate data, instructions, and/or other information with each other via their exclusive, secured and encrypted peer-to-peer connection. The exclusive point-to-point and/or peer-to-peer connections between a single containerized component/MEEE/granule 140 and either a single physical component 135/138 or a single other containerized component/MEEE/granule 140 may be established as or when needed, and may be torn down when desired (e.g., upon completion of a data exchange, when system resources need to be freed up, etc.).

In an embodiment, a single physical location 115, 118 can be communicatively connected to the compute fabric 102 via a secured, encrypted location-to-location PTP or P2P connection (such as a location-to-location VPN or other suitable implementation) that is exclusive to the specific location 115/118 and the compute fabric 102 (not shown). Physical components 135/138 disposed at the specific location 115/118 and containerized components/MEEEs/granules 140 executing on the compute fabric 102 may communicate data and information to each other via the location-to-location PTP or P2P connection. To illustrate, in the example arrangement shown in FIG. 1A, Location 1 (reference 115) includes an on-premises gateway/router/aggregator 148 that establishes a location-to-location VPN with the compute fabric 102, e.g., so that the on-premises gateway 148 is one endpoint of the location-to-location VPN, and a VPN gateway application 150 executing on the compute fabric 102 is the other endpoint of the location-to-location VPN. Containerized components/MEEEs/granules 140 and physical components 105 disposed at the location 115 can authenticate to the location-to-location VPN and establish respective sessions over the location-to-location VPN (e.g., via the VPN gateway application 150 and the on-premises gateway 148) for communicating data and information with each other. Additionally or alternatively, the architecture 100 may support subnets of the location-to-location VPN, so that various physical components 135/138 disposed at the location 115 and various containerized components/MEEEs/granules 140 communicate with each other via one or more subnets within the location-to-location VPN. Further, in the above illustration, types of secured, encrypted PTP and/or P2P connections other than VPNs may be additionally or alternatively utilized.

In an embodiment, a multi-location (e.g., multi-point) secured, encrypted connection may exclusively service the compute fabric 102 and the physical components 135/138 that are disposed at multiple, selected physical locations 115, 118 of the system 100, where the selected physical locations are a subset of an entirety of all physical locations serviced by the system 100. In this embodiment, each of the multiple physical locations 115, 118 may include a respective on-premises gateway 148 to the multi-location secured, encrypted connection, and may be associated with one or more gateway applications 150 executing on the computing fabric 102. Various physical components 135/138 disposed at the multiple locations and the containerized components/MEEEs/granules 140 corresponding to the multiple locations may authenticate to the multi-location secured and encrypted connection, and may establish sessions over the multi-location secured and encrypted connection (e.g., via the one or more gateway applications 150 and the respective on-premises gateways 148) for sending and receiving data and information to/from other components 140, 135, 138. A multi-location, secured encrypted connection may be implemented by using a VPN or other suitable mechanism, as desired, such as multiple PTP and/or P2P connections, point-to-multipoint (PTM) connections, etc.

In an embodiment, all of the containerized components/MEEEs/granules 140 of the compute fabric 102 and all of the physical components 135/138 of all of the physical locations 115/118 of the NGPCAS 100 may be serviced by a single, system-wide secured, encrypted connection, which may be implemented as a system-wide VPN or other suitable type system-wide, secured, encrypted connection. Each of the containerized components/MEEEs/granules 140 and the physical components 135/138 of the system 100 can authenticate to the system-wide connection, and can establish sessions with other components 140, 135, 138 over the secured, encrypted system-wide connection (e.g., via respective on-premises gateways 148 and one or more gateway applications 150) for sending and receiving data and information to/from the other components 140, 135, 138.

Further, if desired, various secured, encrypted PTP, P2P, PTM, and/or multi-point connection techniques may be combined (e.g., by utilizing subnets) to provide even more security. For example, a specific physical component 135/138 and a specific containerized component/MEEE/granule 140 can establish and utilize an exclusive point-to-point VPN as a subnet of a location-to-location VPN, a group of containerized components/MEEEs/granules 140 may be included in a subnet supported by the computing fabric 102, etc. Still further, any of the secured, encrypted connection techniques used within the NGPCAS 100 may be utilized in conjunction with endpoint authorization and authentication techniques to thereby provide even greater security for the NGPCAS 100.

Still further, in some implementations and as discussed above, in addition to or instead of using VPNs, the one or more transport networks 130 may utilize one or more point-to-point private connections (such as point-to-point and/or peer-to-peer Ethernet connections over private enterprise networks, and/or other types of secured, encrypted PTP, P2P, MTP, and/or multi-point connections) to securely deliver information between components of one or more NGPCAS systems 100. For example, point-to-point private connections can be established between two components 138, 140, between a physical site 115, 118 and the compute fabric 102, etc. For ease of discussion herein, though, the description refers to "VPN" techniques (not for limitation purposes) but to generally and categorically describe secured transport over the networks 130, although it is understood that any of the systems, methods, and techniques described herein may additionally or alternately utilize other types of secured, encrypted point-to-point, peer-to-peer, and/or multi-point connections for secured transport.

A user 155 of the NGPCAS 100 may authenticate to a VPN 158 in order to interact with the NGPCAS 100 (e.g., to interact with components 140, 135/138 of the NGPCAS 100) to, for example, view or obtain data and/or other information, change parameter values, configure or modify configurations of control routines and other aspects of the system 100, etc. As utilized herein, a "user" 155 may be a person or human user, or a user 155 may be an application or service executing on an external computing device that is not included in the system 100, e.g., an automated user. The users 155 depicted in FIG. 1A may be equivalent to the people and applications/services which accessed data and information related to a traditional process control or automation plant at any of Levels 1-5 of the Purdue model, for example.

A human user 155 may be a person who is an agent of the enterprise that owns, manages, operates, or otherwise is associated with the NGPCAS 100. For example, a user 155 may be an enterprise configuration engineer, system operator, asset manager, supply chain manager, project or product manager, technician, installer, authorized third-party (e.g., a contractor), business manager, etc. Typically, a human user 155 interacts with the NGPCAS 100 via a computing device operated by the user (e.g., laptop, tablet, mobile computing device, in-vehicle computing device, etc.) on which an application, web browser, or similar executable executes to provide both a user interface operable by the human user 155 and a secure communicative connection with the NGPCAS 100 via a VPN 158. For instance, to utilize his or her computing device to interface with the NGPCAS 100, a human user 155 may utilize a particular MEEE 140 that has been configured and authorized to execute at the user-operated computing device (e.g., an app that has been downloaded from the compute fabric 102), or the human user 155 may utilize a web browser executing at the user-operated computing device. In another example, a user 155 may be an automated user such as an external application or service, e.g., an application or service executing on an external computing device or system. An automated user 155 may not provide any user interface for human users, yet nonetheless may establish a communicative connection with the NGPCAS 100 via the VPN 158 to obtain or provide data and/or other information. Examples of automated users 155 include third-party generated applications, external data sources (such as weather data sources, materials management systems, etc.), and the like. In some situations, an automated user 155 may be a particular containerized component or MEEE 140 that has been configured and authorized to execute on a remote computing device or system.

At any rate, irrespective of whether the user 155 is a human user or an automated user, the user 155 utilizes (via the VPN 158 to which the user 155 has authenticated) an API (Application Programming Interface) 160 to securely access data and/or other information at the NGPCAS 100. In an example implementation, different APIs 160 may be utilized by a user 155 to access different containerized components/MEEEs/granules 140 and physical components 135/138 of the compute fabric 400. In an additional or alternate implementation, a single API 160 may be utilized by the user 155 to access the NGPCAS 100, and the API 160 may form communicative connections, within the NGPCAS 100, with containerized components/MEEEs/granules 140 and physical components 135/138 as necessary to obtain or provide desired data and/or information to/from the user 155. The one or more APIs 160 may themselves be containerized components/MEEEs/granules 140 of the compute fabric 102, for example.

A particular user 155 of interest that is depicted separately in FIG. 1A is an architecture provider/manager 161 of the NGPCAS 100. Generally, the architecture provider/manager 161 provides administration, management, and support of the NGPCAS 100 and optionally of other systems 100 of the enterprise and/or one or more systems of other enterprises (e.g., of the systems' respective architectures, hardware and software resources, etc.). For example, the architecture provider/manager 161 may be under the purview of a provider of the system 100. The architecture provider/manager 161 may have exclusive access to a set of applications and services (e.g., which may, in an embodiment, be a subset of an entirety of the set of containerized components/MEEEs/granules 140 provided by the compute fabric 102) which may be created, configured, and/or executed by the provider and/or manager 161 of the NGPCAS 100. In a sense, the architecture provider/manager 161 administers and manages the architectural platform resources utilized by one or more NGPCASs 100 via this set of applications and services and, as such, may typically perform logic functionalities of a broader scope, such as engineering across various enterprise systems; providing an application/service "store" that includes a library of various applications and/or services, instances of which the architecture provider/manager 161 can configure and distribute to NGPCASs 100 for their uses; distributing and/or re-allocating system resources among different physical locations; etc. Each application or service that is created, configured, and utilized by the architecture provider/manager 161 may be implemented by one or more containerized components/MEEEs/granules 140. Additionally, as shown in FIG. 1A, the architecture provider/manager 161 (whether a human user or an application or service executing on a remote computing device) may authenticate to a VPN 162, and may utilize one or more APIs 165 to securely read and/or write data and/other information, send instructions, and/or otherwise interface with various other containerized components/MEEEs/granules 140 and physical components 135/138 of the NGPCAS 100. The one or more APIs 165 may themselves be containerized components/MEEEs/granules 140 of the compute fabric 102, for example.

In an embodiment, different subsets of containerized components/MEEEs/granules 140 may communicate with a particular physical component 135/138, a particular location 115, a particular set of multiple locations, an entirety of all of the physical locations of an enterprise, or respective physical components and/or respective physical locations of multiple, different enterprises via respective VPNs 162. For example, containerized components/MEEEs/granules 140 that are exclusively utilized by the architecture provider/manager 161 may communicatively connect with other containerized components/MEEEs/granules 140 and/or physical components 135/138 of an enterprise via a different, provider-specific VPN 162 than the VPN(s) utilized by the other containerized components/MEEEs/granules 140 of the enterprise to communicate with the physical components 135/138 of the enterprise location(s). In another example, the containerized components/MEEEs/granules 140 that are provided by the architecture provider/manager 161 may utilize a first enterprise-specific VPN 162 to communicate with containerized components/MEEEs/granules 140 and physical components 135/138 of a first enterprise, and may use a different, mutually exclusive enterprise-specific VPN to communicate with containerized components/MEEEs/granules 140 and physical components 135/138 of a second enterprise (not shown). As such, the architecture provider/manager 161 is able to securely and independently administer and manage the respective resources of different portions of a single enterprise and/or of different enterprises in a highly secure manner. Indeed, by using one or more of the VPN techniques described herein, either alone or in combination, the security of the NGPCAS 100 (and in some situations, of multiple NGPCASs 100 supported by the architecture provider/manager 161) may be customized as desired or needed.

Thus, in view of the above discussion, containerized components/MEEEs/granules 140 provided by the compute fabric 102 of the NGPCAS 100 include run-time logic functionalities (e.g., control and automation logic, data acquisition, etc.) that traditional process control and automation systems typically implement at Levels 1 and 2 of the Purdue model. The containerized components/MEEEs/granules 140 also include other logic functionalities that are related to the run-time logic and that traditional process control and automation systems typically implement at Levels 2 and 3 of the Purdue model, such as: system and component deployment; engineering; configuration; provisioning; commissioning; security of the system, devices, applications/services, and users; safety logic and systems; networking; monitoring; analytics; maintenance and diagnostics of the industrial process and equipment/assets; simulation; testing; fault and performance degradation detection and repair/recovery; operator interfaces; redundancy, backup, and other functionality related to availability of the system 100 and its components and equipment; historization of data; regulatory compliance; management of manufacturing or production workflow, execution, and operations; etc. Further, the containerized components/MEEEs/granules 140 may include logic functionalities that are typically provided in traditional process control systems at the higher Levels 4-5 of the Purdue model, such as enterprise resource planning, production scheduling, material use, shipping, inventory levels, and other enterprise-level functionalities. Still further, such containerized components/MEEEs/granules 140 can include logic functionalities that are introduced into the compute fabric 102 via third parties, such as applications and/or services that have been authored by third-parties, and that have been approved and authorized by the enterprise to be utilized within the NGPCAS 100.

Further, the set of containerized components/MEEEs/granules 140 provided by the compute fabric 102 may include containerized components/MEEEs/granules 140 of a networking layer (not shown in FIG. 1A) of the compute fabric 102, where such containerized components provide lower-level logic functionalities which can be utilized by or with respect to other containerized components/MEEEs/granules 140 as needed. Such lower-level logic functionalities may include, for example, the set of APIs 160, 165 that are utilized by users 155 to interface with various containerized components/MEEEs/granules 140 and physical components 135/138 of the NGPCAS 100; compute functionalities (e.g., for assigning and re-assigning various containerized components to compute fabric nodes Ny and/or data center clusters Cx, which is discussed in more detail elsewhere within this document); storage functionalities (such as management and allocation of storage areas for working data associated with an executing containerized component); networking functionalities (e.g., for data and information delivery between various containerized components, mechanics thereof, timing, etc.); other services which may be utilized by containerized components/MEEEs/granules 140 executing at an application layer (not shown in FIG. 1A) of the compute fabric 102 (e.g., discovery, security, encryption, certificate authority, key management, authentication, time synchronization, service location, console support, service life cycle management, etc.); and the like.

Still further, the set of containerized components/MEEEs/granules 140 provided by the compute fabric 102 may include still lower-level logic functionalities (such as calculations, utilities, primitives, and the like) which may be utilized by containerized components/MEEEs/granules 140 at the application layer and at the networking layer of the compute fabric 102. Examples of such functionalities include computational functions (e.g., data aggregations and/or manipulations, such as averages, maximums, minimums, etc.); more complex calculations or algorithms (e.g., principal component analysis (PCA), partial least squares (PLS) predictions, and other types of statistical calculations and/or analytics); and process control-specific or automation-specific calculations (e.g., function block, shadow block, control module operations, etc.), to name a few.

Additionally, FIG. 1A depicts Location n 118 as including a backup control system 168, which may be partially or entirely failed-over to maintain run-time operations of the process control system 100 at Location n 118 when one or more remote portions of the system 100 (e.g., the transport networks 130, the compute fabric 102, etc.) are compromised, uncommunicative, or otherwise not operational. For example, the backup control system 168 may include a traditional, legacy control system, and/or may include a backup copy or virtual twin of at least a part of the virtual process control system 145 which executes on a computing platform that is located on premises to Location n 118.

Therefore, in view of the above, the compute fabric 102 of the NGPCAS 100 provides process control and automation functionalities and related functionalities that are required to be performed in traditional process control systems by different equipment and systems dispersed across Purdue Levels 1-5, and also provides additional, lower-level functionalities (e.g., from networking and platform resource management to calculations and primitives) which are available system-wide. Further, and advantageously, the NGPCAS 100 removes the necessity of DMZs at Level 3.5 and at other levels as well as eliminates the need for firewalls, data diodes, and other architectural security equipment and mechanisms utilized in traditional process control and automation systems, while simultaneously providing a more secured system 100.

In particular, as discussed above, any data or information transfer between two components (e.g., two different containerized components/MEEEs/granules 140, or a containerized component/MEEE/granule 140 and a physical component 125/135) of the NGPCAS 100 may be accomplished via a private session over a VPN, for example, a VPN utilized by the compute fabric 102 and a physical location at which physical components 102 are located, via a private VPN that is utilized by only the endpoint components, and/or one or more other types of VPNs. Further, for security purposes, any and all users 155/161 may be required to access the system 100 via one or more APIs 160/165 and a private VPN 158/162 established between the user 155/161 and the compute fabric 102. Still further, all users may be required to be multi-factor authenticated prior to gaining access to the system 100 via the APIs 160/165. In this manner, system data is exposed to only non-public addresses (e.g., addresses of components, compute fabric nodes, etc.) via VPN and authorized, credentialed entities. Applications may be exposed as websites or services, so that computing devices utilized by users access the system 100 via "thin" clients and do not have any system-related software (aside from, perhaps, the thin client such as a portal application) executing thereon. Further, all applications may be containerized, including the applications which execute locally at physical locations at which physical devices are disposed, and any system data may be encrypted at rest.

Additionally, within the NGPCAS 100, all communications transmitted and received over the network(s) 130 may be signed and encrypted, and plaintext protocols may be prohibited from use. Further, each NGPCAS 100 may have a single certifying authority (which can be associated with the enterprise, for example), and self-signed certificates and/or other forms of custom authentications may be prohibited.

Figure 1B:
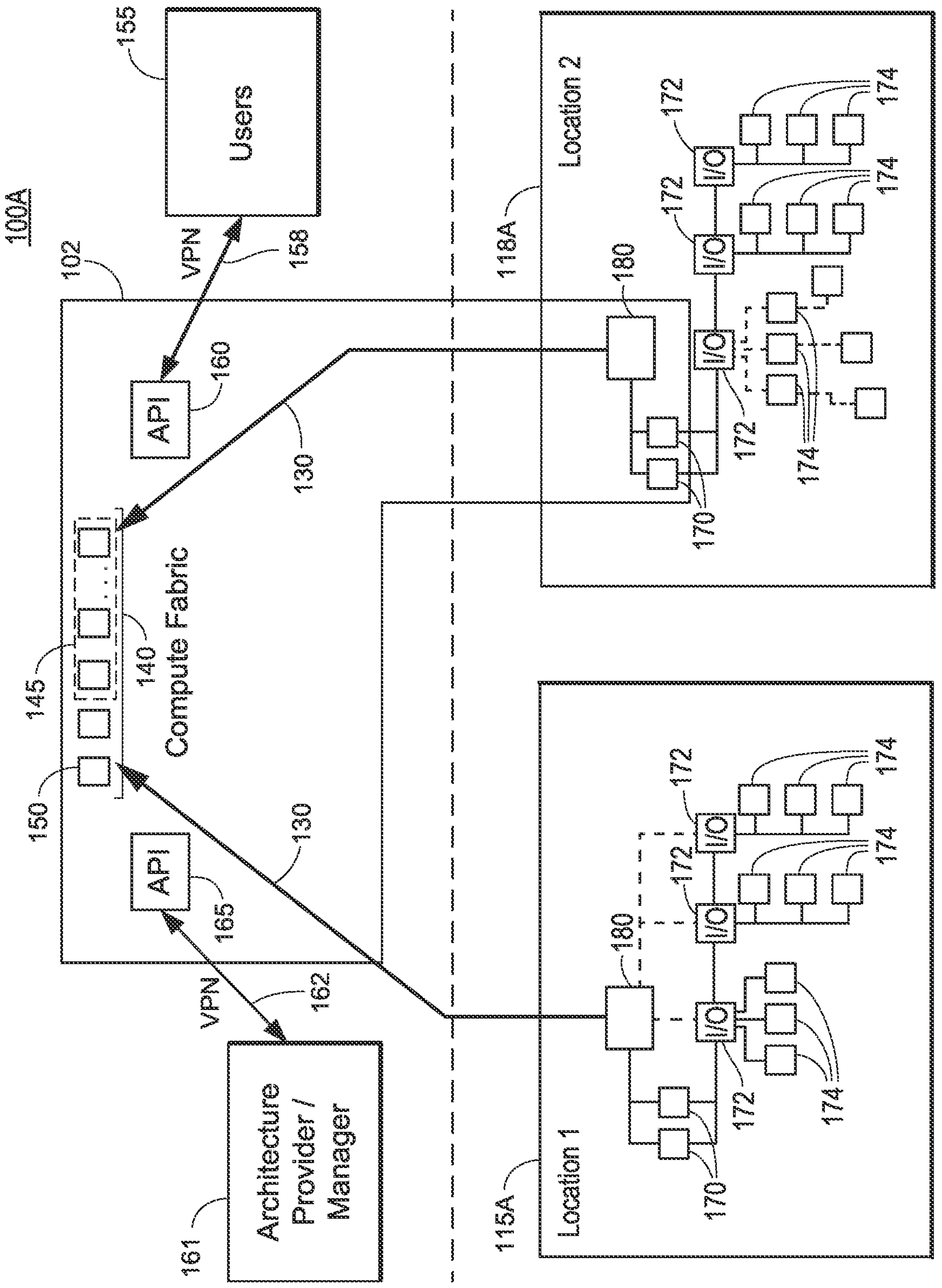
FIG. 1B is a block diagram of an example architecture of a Next Generation Process Control and Automation System ("NGPCAS") which may be utilized to control industrial and/or automation processes having installed or legacy distributed control systems therein.

FIG. 1B illustrates a block diagram of an example architecture of a Next Generation Process Control and Automation System ("NGPCAS") 100A with the basic components of the system 100 of FIG. 1A but which is configured to support industrial and/or automation processes having installed or legacy distributed control systems therein, such as a DeltaV® control system. In this case, the NGPCAS 100A includes all of the components of the system 100 of FIG. 1A but is connected to one or more plants or physical locations 115A and 118A that have already installed legacy control systems implemented therein. As illustrated in FIG. 1B, the locations 115A and 118A may have distributed controllers 170, such as DeltaV controllers, connected through various input/output (I/O) devices 172 to various field devices 174, such as smart field devices, which may communicate with the I/O devices 172 using any desired or typical wired or wireless communication networks. The field devices 174 may, for example, be 4-20 ma, HART®, WirelessHART®, FOUNDATION® Fieldbus, Profibus, Canbus, APL or any other communication protocol compatible field devices that communicate using any standard or known communication networks or physical layers and communication protocols, including process control communication protocols (e.g., HART, fieldbus, etc.) Here, the process controllers 170 may store and implement legacy control programs that may use, for example, function blocks, control blocks, etc. to control the field devices 174.

As illustrated in FIG. 1B, however, the process controllers 170 may be connected to a data aggregator and VPN gateway 180 installed at or located at the physical locations or plants 115A and 118A, and the VPN gateway 180 is connected via a secured VPN link 130 to elements within the compute fabric 102. The VPN gateway 180 operates as a data aggregator to collect data from the process controllers 170 or, in another embodiment, directly from the I/O devices 172 (illustrated by the dotted lines at the location 115A) to obtain, manage, convert, aggregate and collect data from the field devices 174. The VPN gateway 180 also operates to encrypt and provide the collected data to other components in the compute fabric 102 (which perform control or other services using that data) via a VPN or other secured and encrypted communication link 130. In the case of the location 115A, the NGPCAS 100A may simply bypass the controllers 170 to obtain data from the field devices 174 and the I/O devices 172 in a manner similar to that illustrated with the I/O interfaces 125 and 128 and field devices 135 and 138 of FIG. 1A. In this case, the controllers 170 may be operated and programmed to be a backup control system 168, such as that illustrated in FIG. 1A, such that the controllers 170 of the location 115A take over control of the field devices 174 of the location 115A in a fail-over or backup situation.

On the other hand, as illustrated with respect to the physical location 118A of FIG. 1B. the controllers 170 may be operated as part of the compute fabric 102 and have software modules, such as containers, etc., associated with the compute fabric 102 stored and operated therein. In this case, the controllers 170 (of the location 118A) are part of the compute fabric 102, which is illustrated by the compute fabric box of FIG. 1B extending down into the physical location 118A to include the controllers 170. Thus, in this case, the compute fabric 102 may include cloud-based compute devices and compute devices (e.g., the controllers 170) located at a physical plant location not within the cloud. Further, in this case, the controllers 170 of the location 118A may be operated in conjunction with other computer equipment within the compute fabric 102 (such as computer equipment within a cloud environment) to perform control of the field devices 174 of the physical location 118A.

In both examples of FIG. 1B, the data aggregator and VPN gateway 180 is included to enable the NGPCAS described herein to be connected to and to use installed legacy control system hardware (such a process controllers, field devices, I/O devices, etc.), which makes the NGPCAS described herein easier and cheaper to install in and use with plants or other physical locations that have control hardware already installed therein. The VPN gateway 180 thus enables the NGPCAS system 100A described herein to be used to quickly and easily convert a standard legacy control system, such as a distributed control system, to an NGPCAS. Of course, while FIG. 1B illustrates legacy or installed control systems as being distributed control systems, other legacy or installed control systems could be used in the same or a similar manner to support an NGPCAS.

Example NGPCAS Architecture Including Digital Twins

Figure 2A:
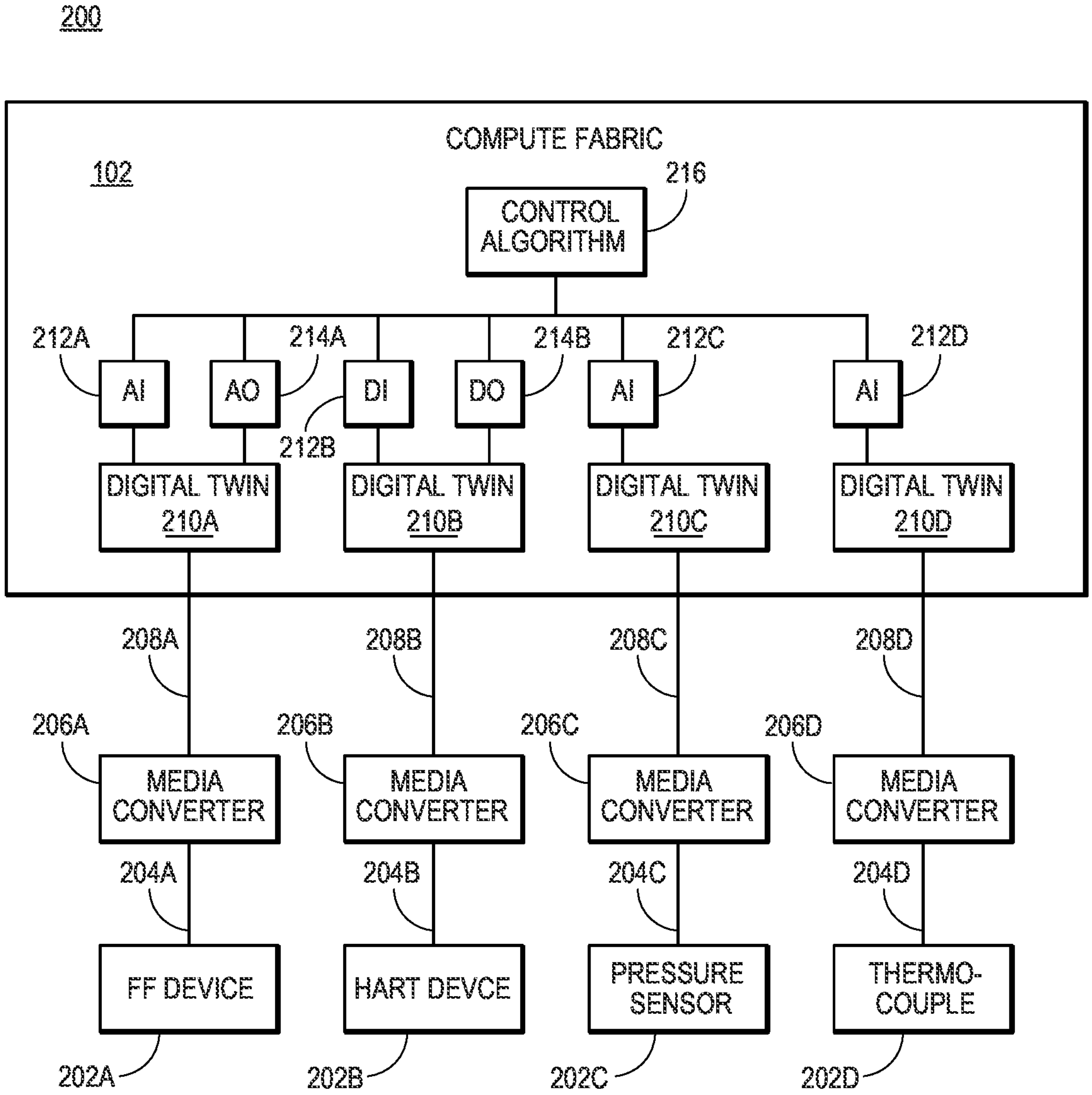
FIGS. 2A-2C depict portions of example architectures of the Next Generation Process Control and Automation System of FIGS. 1A and 1B that include digital twins.

As mentioned above, in some implementations of the NGPCAS 100, the compute fabric 102 may facilitate the use of "digital twins" of one or more of the on-premises physical devices 105, 108. FIG. 2A illustrates a system 200 which represents a portion of an example NGPCAS 100 in which a plurality of on-premises physical devices 202A-202D communicate through respective physical interfaces 204A-204D with respective media converters 206A-206D. For example, in FIG. 2A, a Foundation Fieldbus device 202A is coupled through a Foundation Fieldbus interface 204A to a media converter 206A that converts signals received from, and sent to, the device 202A between the Foundation Fieldbus protocol and an Ethernet-compatible or other suitable packet protocol. Similarly, a HART device 202B is coupled through a HART interface 204B to a media converter 206B that converts signals received from, and sent to, the device 202B between the HART protocol and the Ethernet-compatible/packet protocol. Other transmitters, sensors, and field devices may use other protocols, as will be understood. For example, the devices 202C and 202D may each be 4-20 mA devices, and the media converters 206C and 206D may convert signals from 4-20 mA to the Ethernet-compatible/packet protocol (e.g., by packetizing the value of the 4-20 mA signal and placing it on the network).

Ethernet connections 208A-208D respectively couple the media converters 206A-206D to the compute fabric 102 and, in particular, to respective digital twins 210A-210D of the on-premises physical devices 202A-202D. The Ethernet connections 208A-208D may each connect directly to the compute fabric 102 (as depicted in FIG. 2A) in embodiments or, perhaps more likely, the Ethernet connections 208A-208D may each be connected to the compute fabric 102 via one or more network switches (not shown) including, in embodiments, via one or more APL switches (not shown) and/or one or more on-premises gateways (e.g., the gateway 148).

Figure 2B:
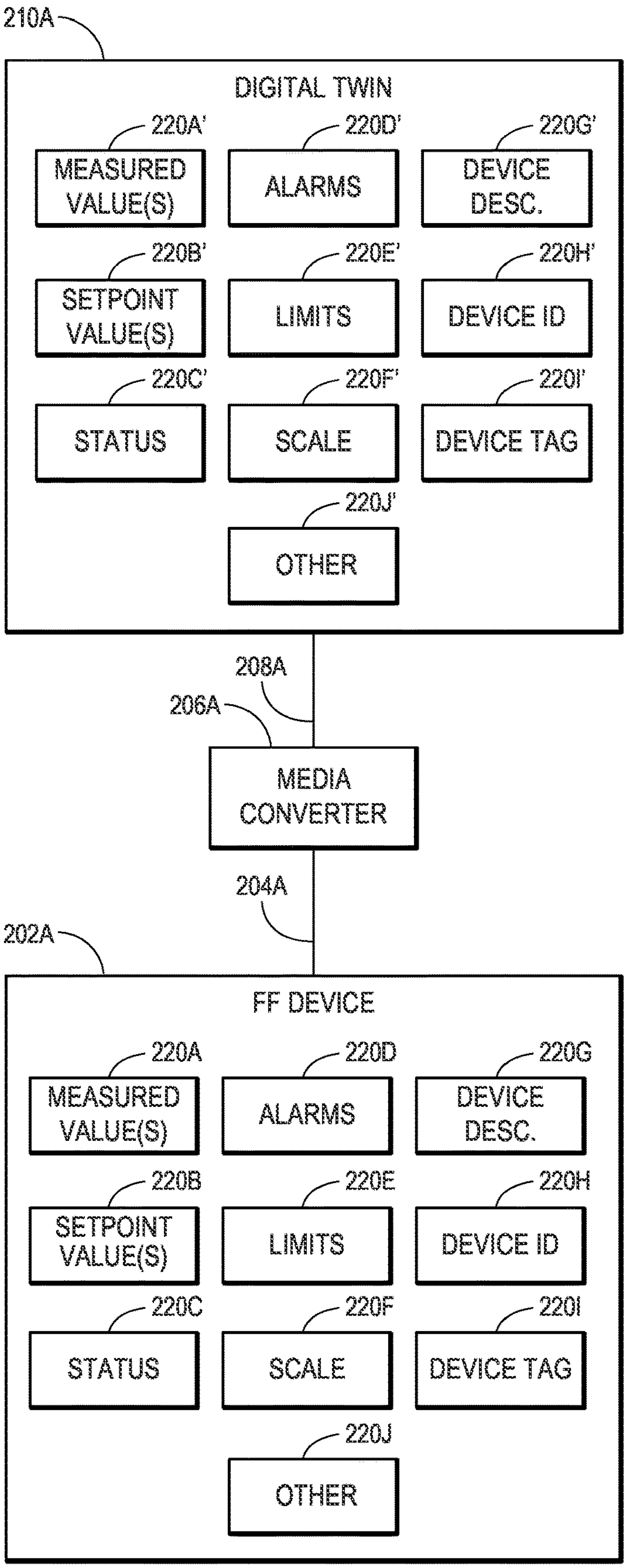

Each of the digital twins 210A-210D is, as the name implies, a "virtual twin" of the on-premises physical device, devices, or group of devices to which it is coupled (and which it represents). That is, each digital twin mimics the electronic functions, but not physical functions such as sensing and actuating, of one or more sensors, transmitters, actuators, etc. A digital twin may correspond to a single device (e.g., a pressure transmitter, a temperature transmitter, an actuator, etc.), may correspond to a group of devices (e.g., a valve having upstream and downstream pressure transmitters and a valve position sensor), or may correspond to a device class (e.g., a mass flow device). FIG. 2B depicts this concept in more detail with respect to the Foundation Fieldbus on-premises physical device 202A. As depicted in FIG. 2B, the device 202A has stored in a memory therein a number of parameters and variables 220A-220J that, in general, are addressable by and/or retrievable by and/or otherwise available to the process control system and, in particular, are available to a control algorithm controlling the device 202A. Of course, Fieldbus devices such as the device 202A include one or more of a set of parameters and values as is generally known, including measured values 220A, setpoint values 220B, high and low limits 220E, alarms 220D, one or more device statuses 220C, a device ID 220H, a device tag 2201, a device description 220G, a scale 220F, and/or other information 220J such as range information, state information, etc., while other types of devices may additionally or alternatively include other parameters and values, and still other devices may be capable only of providing a single transmitter value (e.g., pressure, temperature, etc.). The digital twin 210A corresponding to the device 202A is implemented in the compute fabric 102 (or in non-compute fabric implementations, if desired) and maintains up-to-date copies of the data 220A-220J stored in the device 202A, which are denoted in FIG. 2B by references 220A'-220J'. Additionally, the digital twin 210A writes, to the device 202A, any setpoint values, other relevant data, and/or other commands 220A'-220J' that it receives.

Referring again to FIG. 2A, each of the digital twins 210A-210D is coupled, via the compute fabric 102, to the function blocks, control modules, and other control algorithms that would normally receive data from (and/or send data to) the devices 202A-202D. For example, AI/DI function blocks 212A-212D may receive raw data from the digital twins 210A-210D and, in cases in which data typically flows to the devices 202A-202D, AO/DO function blocks 214A, 214B may send data to the digital twins 210A, 210B, which data are then transmitted back to the physical devices 202A, 202B. Control algorithm(s) 216 operate on the data, receiving data from the digital twins 210A-210D and sending data to the digital twins 210A-210D, without regard to whether the digital twins 210A-210D are physical devices or logical devices. In this manner, the ultimate hardware (e.g., the physical devices 202A-202D) are abstracted from the control algorithms 216 operating the process plant via the digital twins 210A-210D.

In the contemplated systems implementing the compute fabric 102, the digital twins 210A-210D may be implemented as microservices (or other micro-encapsulated execution environments) executing, in embodiments, in joint or individual containers. In an embodiment, each digital twin 210A-210D self-identifies, within the system 100, using the unique network identifier or address of the respective physical device 202A-202D that the digital twin 210A-210D mirrors. Thus, other containerized components of the compute fabric 102 may communicate with an intended physical device 202A-202D by using the physical device's unique identifier, and may remain ignorant or unaware of whether the entity with which it is communicating is the actual physical device 202A-202D or its digital twin 210A-210D. As such, in a sense, each digital twin 210A-210D can serve as a proxy within the system 100 for the respective physical device 202A-202D that the digital twin 210A-210D mirrors. In further embodiments, and in a manner similar to that of other containerized components/MEEEs/granules 140 of the compute fabric 102, containerized digital twins may be nested according, for example, to area of the process plant, type of device, associated control module, etc. Of course, the AI, AO, and control algorithm modules may similarly be executed as containerized services or microservices.

The digital twins 210A-210D may, in embodiments, be created automatically from the descriptions of the respective physical devices 202A-202D they represent.

There are a variety of advantages that can be realized using a digital twin scheme as described here and depicted in FIGS. 2A and 2B. One advantage is that the digital twins 210A-210D may be programmatically configured to prevent abnormal conditions in the process plant that might otherwise be caused by minor malfunctions in the physical device 202A-202D. For example, if a measured value in the physical device becomes unreliable, the digital twin 210A-210D may maintain the most recent value (or provide the expected value, or a simulated value) of the measured value to maintain stable, safe operation of the process plant, even in the absence of the actual measured value provided by the physical device 202A-202D. By the same token, a device (especially a transmitter) that is malfunctioning, requiring maintenance, or in need of calibration, may be replaced, repaired, or calibrated without necessarily requiring the entire process to be shut down, because the control algorithms 216 would not be aware that the device was not present or was not sending accurate (or any) data.

Another potential advantage of the use of digital twins is that it may contribute to the ability of the system described herein to be commissioned with less effort, expense, and time. By way of example and not limitation, a new plant (or portion thereof) identical to an existing plant (or portion thereof) may be instantiated almost entirely in the compute fabric, with the physical devices 202A-202D being coupled thereto by Ethernet. If the system, other than the physical devices 105, 108, is instantiated in the compute fabric 102, an entire process control plant (or at least elements in the compute fabric 102) can be instantiated within minutes, and automatic discovery (e.g., using device tags, including hard-coded device tags) can determine which devices to connect to the various containerized applications, containerized services, microservices, MEEEs, or granules instantiated in the compute fabric 102.

Still another advantage of employing digital twins is that the digital twins, connected directly to the control algorithms or not (i.e., whether the control algorithms interfaced with the digital twins or directly with the physical devices (e.g., 202A-202D) in the process plant) may be used to generate predictions as to the future state of the process and/or the physical devices. These future predictions could be generated using statistical models, mechanistic models, or a combination of statistical models and mechanistic models. These models, executing within the digital twin (e.g., as a nested containerized component/MEEE/granule), could receive the data from the physical devices and the control algorithm and provide assessments of the control system (e.g., the control system trending toward an abnormal state), the field devices (e.g., the sensor appears likely to fail or to have failed), etc. This information, in turn, could be used to provide to the operator, maintenance personnel, or others recommended mitigating or remedial actions.

Yet another advantage conferred by the use of digital twins is the introduction of a new source of soft-sensor data. Just as groups of physical devices (e.g., upstream and downstream sensors and a valve position sensor) may be represented by a single digital twin of the valve that embodies those three elements, groups of measurements (acquired by respective physical devices) may be collected by a digital twin and used as a "soft sensor" that gives an indirect measurement of another value. For example, a digital twin may receive values from four transmitters—two pressure transmitters together providing a differential pressure measurement, a pressure transmitter, and a temperature transmitter—and combine those into a soft sensor measurement for mass flow.

Figure 2C:
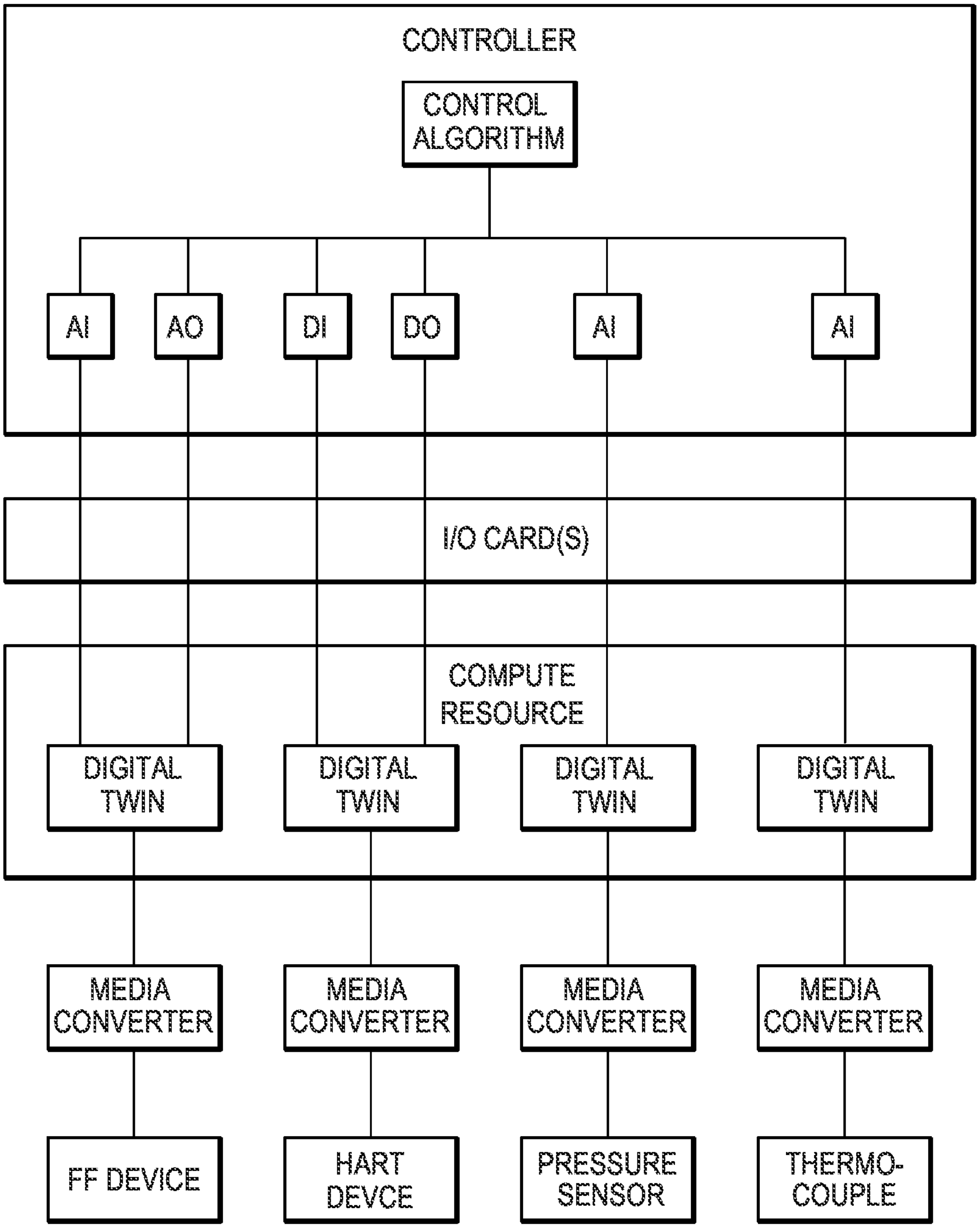

Further, digital twins as described above may also be implemented in traditional process plant environments. For example, an on-premises computing device may instantiate digital twins of the various physical devices in the process plant, even if the process plant implements traditional I/O and controllers. One such example arrangement is depicted in FIG. 2C.

Example Multi-Enterprise NGPCAS Architecture

The Next Generation Process Control and Automation System (NGPCAS) 100 described in the foregoing sections of this disclosure provides a number of enterprise-level benefits for any particular enterprise utilizing one or more NGPCASs 100 to implement industrial and/or automation processes. Examples of such benefits will be discussed herein with respect to FIGS. 3A and 3B.

Figure 3A:
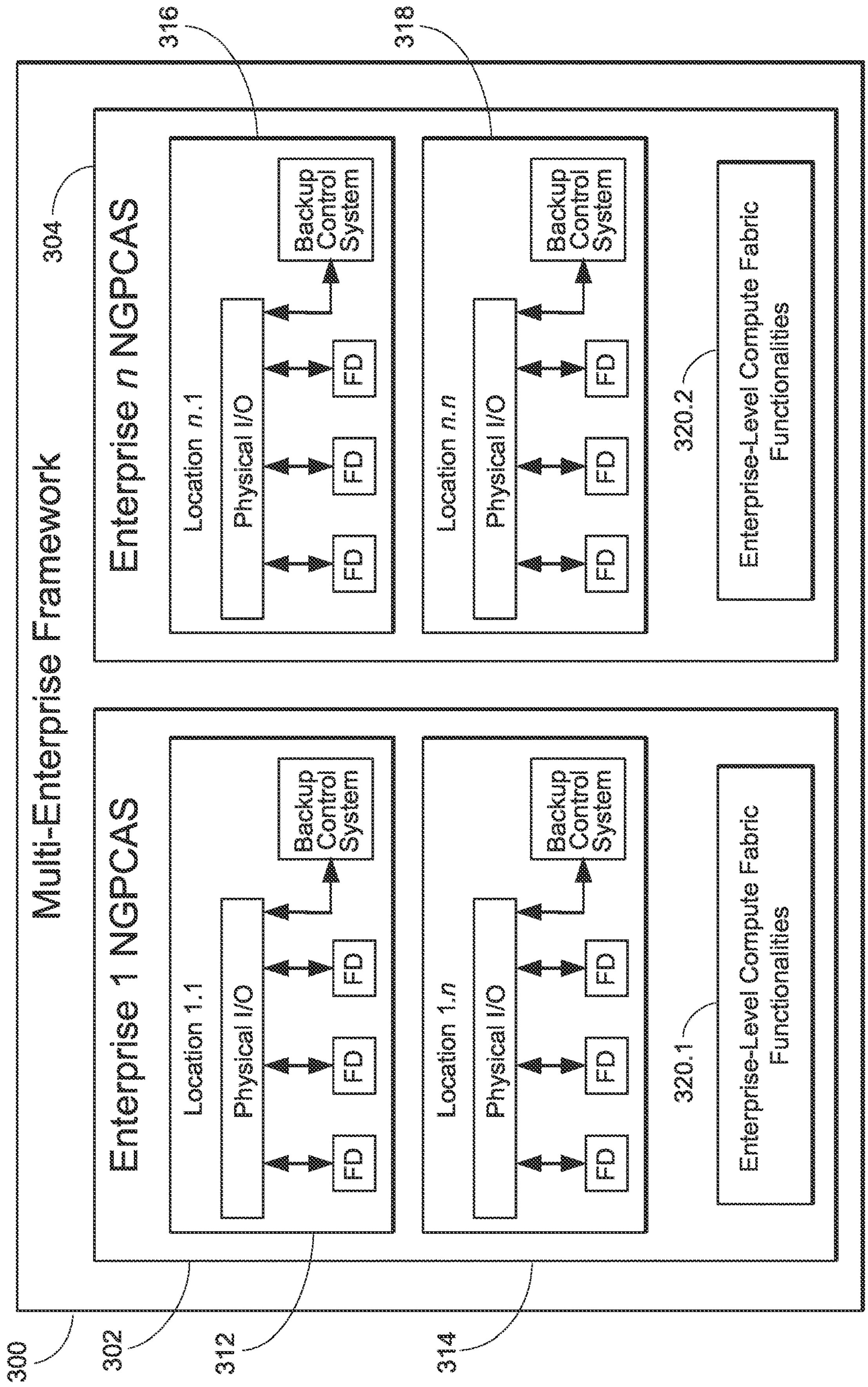
FIG. 3A is a block diagram of an example multi-enterprise framework for different Next Generation Process Control and Automation Systems of different enterprises.

FIG. 3A illustrates a logical arrangement of an example multi-enterprise framework 300, which includes different enterprises 302, 304. Each enterprise 302, 304 utilizes a respective NGPCAS to implement an industrial or automation process (or, in some cases, multiple different industrial and/or automation processes) across physical device locations 312/314 and 316/318. In an embodiment, the respective NGPCASs of the enterprises 302, 304 may be respective instances of the NGPCAS 100, each of which may be particularly configured specifically for the enterprises 302, 304. Accordingly, the present disclosure will interchangeably refer to enterprises 302, 304 as "enterprise NGPCASs 302, 304" or simply "NGPCASs 302, 304." NGPCASs 302, 304 respectively include enterprise-level compute fabric functionalities 320.1-320.2, which are composed of containerized applications and/or services that operate in the respective compute fabrics of NGPCAS 302, 304 to control process devices and provide other process functionalities to service the process(es) implemented via the NGPCASs 302, 304 (e.g., operations, maintenance, diagnostics, monitoring, etc.). For example, at least some of the enterprise-level compute fabric functionalities 320.1-320.2 may be provided by the architecture provider/manager 161, via a subscription, a download from an application or service store, etc. The enterprise-level compute fabric functionalities 320.1, 320.2 may execute, for example, in the manner described with respect to the containerized components/MEEEs/granules 140 of FIG. 1A.

In some embodiments, compute fabric functionalities 320.1, 320.2 are executed in different portions of a shared compute fabric (e.g., sharing at least some compute fabric nodes between the enterprises 302, 304), with the security to the compute fabric functionalities 320.1, 320.2 being secured to the respective enterprises 302, 304 using security mechanisms of the present disclosure (e.g., even if components of compute fabric functionalities 320.1, 320.2 execute on a same compute fabric node, such components run as separate containerized components, with security and access being managed independently for each separate containerized component). At least a portion of compute fabric functionalities 320.1, 320.2 may be accessed and operated by credentialed users/computing devices associated with respective enterprises 302, 304 (e.g., human or automated users 155 and/or the architecture provider/manager 161 of FIG. 1A).

Example Enterprise-Level Compute Functionalities

Figure 3B:
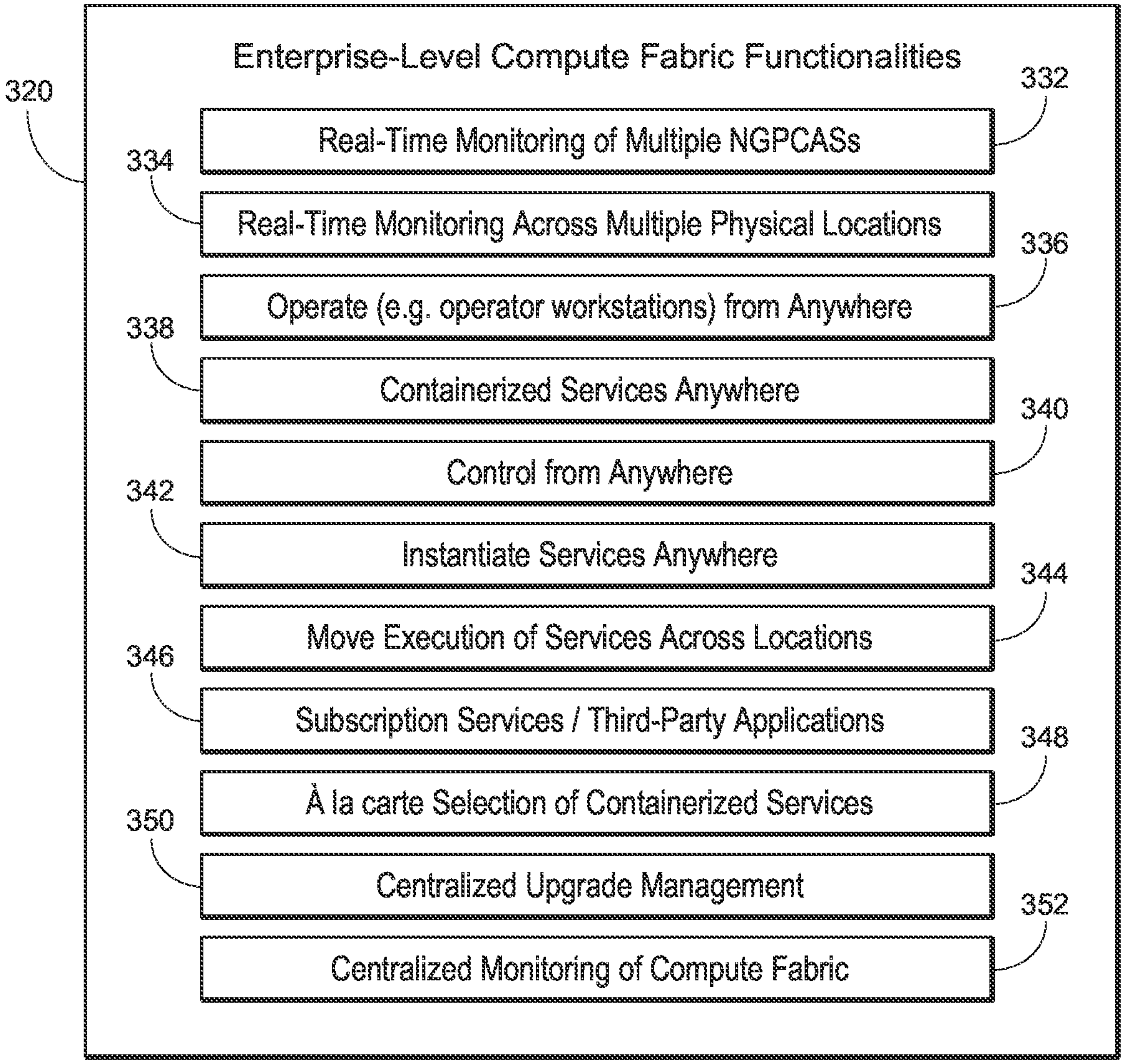
FIG. 3B depicts example enterprise-level compute fabric functionalities, which may be provided by the compute fabric of FIGS. 1A and 1B.

FIG. 3B illustrates example enterprise-level compute fabric functionalities 320 that may be included in the compute fabric functionalities 320.1, 320.2 executing on behalf of enterprises 302, 304 of FIG. 3A. Compute fabric functionalities 320 include real-time process monitoring functionalities across multiple NGPCASs of a single enterprise (332 in FIG. 3B). Either of the enterprises 302, 304 may in fact implement two, three, four or more NGPCASs, each of which may operate across a respective set of one, two, three, four, or more physical device locations. Because the location of monitoring of a process in an NGPCAS is not restricted to the physical device location(s) at which a process is physically performed, a single user at a single computing device may perform remote monitoring of processes across two, across two, three, four or more NGPCASs (and/or across multiple physical device locations associated with each NGPCAS). As an example, a single enterprise may operate multiple NGPCASs, which commonly involve operation of a particular type of boiler unit. A technician or operator familiar with operation of the boiler unit may monitor the run-time operations of the boiler units across multiple NGPCASs by receiving, at the technician's computing device via the compute fabric, process information associated with operation of each boiler unit included in the multiple NGPCASs (e.g., device identifiers, device configuration information, process measurements, process setpoints, alerts, etc.). The technician (and/or the technician's computing device) may be provided a level of authorization to view, obtain, and act upon the monitored process information, e.g., to send process commands, effect configuration changes, and/or provide other responses to handle the operation of the boiler units across the multiple NGPCAS. Analogous monitoring functionalities may be provided for configuration engineers, operators, supply chain managers, and/ or other personnel authorized to monitor at least a portion of operation of each of the multiple NGPCASs.

Similarly, the NGPCAS architecture of the present disclosure enables real-time monitoring (334) and operations functionalities (336) of an NGPCAS to be performed from multiple physical locations. That is, just as one operator or technician can remotely monitor the operation of multiple NGPCASs, various personnel across different physical locations may remotely monitor the operations of a single NGPCAS (or of a single physical device location). In embodiments, operators or technicians at operator workstations located at first, second, third, etc. physical device locations or even at other locations that are unassociated with any physical device location may monitor and perform operations associated with the run-time of portions of an industrial process (e.g., devices, groups of devices, control loops, etc.) executed at different ones of the first, second, third, etc. physical device locations. The workstation may be located at any physical location, e.g., at the physical device location at which the monitored/operated process executes, at a different physical device location, at a dedicated operations center, at a home office, in a vehicle, etc., and the workstation may be a stationary or a mobile device. The operator or technician may, for example, monitor the run-time operations of an industrial process by receiving, at the operator workstation via the compute fabric, various information associated with operation of the process (e.g., device configuration information, operator displays, process status information, equipment status information and operational parameters, process measurements, setpoints, alerts, and/or other information associated with components 135, 138 of FIG. 1A). The operator or technician may then modify or adjust various aspects of the operations of the process by sending commands from the workstation to modify the aspects of the process (e.g., to advance a step in the process or to modify a control loop in the process, with the control loop potentially itself implemented in the form of a containerized component(s) at a same or different location via the compute fabric). Moreover, authorization to monitor any particular function(s) of an NGPCAS (e.g., monitoring a particular industrial process or portion thereof, physical device location, device, group of devices, etc.) may pass on-demand (e.g., at the request of a user and/or of another containerized component) or automatically between personnel located at various physical locations that are not geographically limited to the physical location at which the monitored function(s) of the NGPCAS are executed. For example, in some embodiments, authorization to monitor the operations of an NGPCAS or portion thereof may be passed between personnel at a personnel shift change, where the personnel handing off the monitoring access are not necessarily located in the same physical location to each other or to the monitored NGPCAS or portion thereof. This ability to pass authorization for monitoring operations between physical locations may enable the functionalities of active monitoring of run-time process operations to "follow the sun," e.g., by moving the monitoring of the operations of an industrial process (or portions thereof) among multiple locations across the globe over the course of a day such that each respective location has monitoring and operations responsibility during the respective location's daylight hours.

The NGPCAS architecture of the present disclosure may further enable control of an NGPCAS process or portion thereof (e.g., a device, group of devices, control loop, etc.) from any physical location (340). Configuration and execution of control loops may be implemented as containerized components in the location-agnostic NGPCAS compute fabric, rather than needing to be implemented on-premises at a physical device location of the controlled operation(s) as in traditional process control architectures. Portions of a control system may be distributed among containerized components executing at the same physical device location, a different physical device location, and/or other physical locations not associated with physical implementation of the process.

Indeed, any containerized component in the compute fabric (e.g., containerized services and applications) may execute at any physical location (338), e.g., at a physical device location to which the containerized components pertain, at a different physical device location, and/or at still other physical locations independent of any physical devices implementing at least a portion of the process. Similarly, containerized components in the compute fabric may be instantiated from any physical location (342). Containerized components may, for example, be instantiated via human and/or automatic operations at a first physical location, while the instantiated containerized components run or execute on compute nodes (of the compute fabric) that are located at a second physical location. Moreover, execution of containerized components may transfer on-demand or automatically between various physical locations (344, e.g., via the Orchestration service 422 of FIG. 4). In some implementations, containerized components of an NGPCAS are moved globally across various physical locations to place the execution of the containerized components proximate to monitoring/control/operation workstations servicing the NGPCAS at any given time (e.g., to "follow the sun" by executing containerized components at various locations during daylight hours of the respective locations). For example, containerized components may be moved to execute at different physical locations multiple times on a daily basis to "follow the sun" and thereby execute proximate to personnel providing daytime servicing to the NGPCAS at any given hour. Containerized components may an also be moved between compute fabric nodes and/or physical locations for load-management purposes, e.g., to avoid overloading the processing capability of any specific compute fabric node or the communication bandwidth of any particular communication link in the compute fabric. Still further, execution of containerized components may be moved in the event of a failure of a compute fabric node or a portion thereof in the compute fabric, e.g., by activating a digital twin instance of the containerized component that operates at executes on a different compute fabric node and/or at a different physical location.

Access of an NGPCAS to particular containerized applications/services can be provided on a per-application or per-service basis ("a la carte," 348). In other words, an enterprise (e.g., one or more agents of the enterprise) can individually select particular monitoring applications, operational applications, control applications, dashboard applications, control modules, diagnostic applications, and/or other process functionalities to implement in the enterprise's NGPCAS to support the operation of a process. Instances of containerized components to implement the selected functionalities may be instantiated and executed on-demand or on an as-needed basis to support the scale of operation required by the enterprise NGPCAS.

In some embodiments, an architecture provider/manager (e.g., 161 in FIG. 1A) provides subscription-based access to process functionalities (346), whereby an enterprise purchases particular process functionalities at prices determined based upon the number of functionalities purchased, the number of instances of the purchased functionalities running in the enterprise's NGPCAS compute fabric, and/or the length of time for which the purchased process functionalities operate in the enterprise's NGPCAS compute fabric, for example. Third-parties may similarly provide subscription-based or one-time-purchase-based access to process functionalities, allowing a first enterprise, for example, to generate and distribute process functionalities to another one or more enterprises to allow the other one or more enterprises to run instances of the same process functionalities via containerized components and physical components of their respective NGPCASs for their own respective uses. To support subscription-based and one-time-purchase-based distribution of process functionalities, the architecture provider/manager may provide an application/service "store" that includes a library of the various process applications and/or services available for purchase (i.e., one-time purchase or subscription) by enterprises for their own respective uses. Moreover, in some embodiments, the architecture provider/manager implements virtualized testing and simulation of any of the library of applications/services on an enterprises NGPCAS, to ensure that a purchased application/service will run safely, properly, and effectively on the enterprise's NGPCAS before actual implementation in the context of the enterprise's own process architecture.

Referring again to FIG. 3A, the multi-enterprise framework 300 in view of the NGPCAS architecture enables the architecture provider/manager (e.g., 161 of FIG. 1A) to perform centralized management of upgrades (350) to applications/services utilized by enterprise NGPCASs 302, 304. Upgrades to applications/services are reflected in new instances of the said applications/services executing in enterprise NGPCASs 302, 304, thus allowing each enterprise 302, 304 to automatically access the up-to-date version of any process functionality provided to the enterprise 302, 304.

Further to providing centralized management of application/service upgrades, the architecture provider/manager (e.g., 161 of FIG. 1A) in the multi-enterprise framework 300 may provide a central point of monitoring (352) of operation of the compute fabric for enterprise NGPCASs 302 and/or 304. The architecture provider/manager may monitor NGPCAS operations, for example, to implement fault-handling or fault-protection measures, to perform load-balancing of NGPCAS functionalities, and/or to identify performance improvements for the same NGPCAS(s) 302, 304 and/or for different NGPCASs of still other enterprises.

Still other enterprise-level benefits to the NGPCAS architecture of the present disclosure will be realized from the other portions of the present description.

Example Compute Fabric Architecture

With regard to the compute fabric 102 of the Next Generation Process Control and Automation System 100 of FIG. 1A, FIG. 4 depicts a block diagram of an example architecture 400 of the compute fabric 102. Of course, the example architecture 400 may be utilized in compute fabrics and/or in process control and automation systems other than the compute fabric 102 of the NGPCAS 100. For ease of discussion herein, though, and not for limitation purposes, the architecture 400 is described below with simultaneous reference to FIG. 1A. Additionally, for ease of reading, the architecture 400 of the compute fabric 102 is interchangeably referred to herein as the "compute fabric architecture 400" or simply the "compute fabric 400."

Generally speaking, and as is described below, the compute fabric 400 utilizes a layered architecture in which business logic of the compute fabric 400 is abstracted from the physical computing platform of the compute fabric 400. For example, the compute fabric 400 may utilize one or more techniques and/or features described in U.S. patent application Ser. No. 17/487,609 filed on Sep. 28, 2021 and entitled "Software Defined Process Control System and Methods for Industrial Process Plants," the disclosure of which is entirely incorporated herein by reference. For ease of discussion herein, the compute fabric 400 is described with simultaneous reference to the system 100 of FIG. 1A; however, this is only for illustration purposes and is not limiting.

As shown in FIG. 4, the compute fabric 400 communicatively connects to the field environment 120 via one or more networks 402. The one or more networks 402 may be included in the networks 130 of FIG. 1A, for example, in embodiments in which the compute fabric 102 of the NGPCAS 100 utilizes the compute fabric architecture 400. The networks 402 typically include high bandwidth data or communication links that support packet delivery to and from the compute fabric 400, and may include one or more wired and/or wireless networks which may include public networks (such as the Internet, public Wi-Fi networks, cellular networks, etc.) and/or private networks. At least some portion of the one or more networks 402 may include an Advanced Physical Layer (APL) or some other type of physical or other protocol layer that supports Ethernet and/or other packet-based protocols.

Physical Layer of Compute Fabric

As further shown in FIG. 4, the example architecture of the compute fabric 400 includes a computing platform 405 of hardware and software resources that support the higher layers of the compute fabric 400. Accordingly, the computing platform 405 is interchangeably referred to herein as the "physical layer 405" of the compute fabric 400, as it contains physical processors, processor cores, memories, and networking interfaces. The computing platform or physical layer 405 of the compute fabric 400 includes a set of data center clusters C1, C2, . . . , Cn (which, for readability purposes, are generally referred to herein as data center clusters Cx), each of which includes a respective plurality of compute fabric nodes N1, N2, . . . , Nn (which, for readability purposes, are generally referred to herein as nodes Ny), where the respective nodes Ny included within each data center cluster Cx may be at least partly, if not entirely, interconnected. Each different cluster C1, C2, . . . , Cn may include a different total number of nodes N1, N2, . . . , Nn. Each node Ny of each data center cluster Cx includes one or more respective processors and/or processor cores, one or more respective memories, and respective networking resources, such as one or more respective physical communication interfaces that communicatively connect the node Ny to one or more other nodes Ny of the data cluster Cx. For example, a node Ny may be implemented on a single server, or may be implemented on a bank or group of servers.

Each cluster Cx includes a plurality of nodes Ny that are communicatively interconnected to each other. Further, different clusters Cx may be physically disposed at the same or different physical locations (e.g., different locations 115, 118 of the NGPCAS 100 at which physical devices 105, 108 are disposed, and/or at one or more other locations at which no physical devices of the system 100 are disposed). A particular cluster Cx may be implemented solely at a single physical location or across multiple physical locations. Additionally, each data center cluster C1, C2, . . . , Cn is communicatively connected or networked with one or more of the other data center clusters C1, C2, . . . , Cn of the computing platform 405.

It is noted that although the physical layer 405 associated with the compute fabric 400 is described above as being implemented by using physical data center clusters C1-Cn, in some embodiments, at least a portion of the physical layer 405 may be implemented as a virtualized physical layer 405. For example, the data center clusters C1-Cn (or subset thereof) may be implemented as virtual machines, e.g., which execute on a computing resource platform, such as a cloud computing system.

Software Defined Networking Layer of Compute Fabric

The example architecture of the compute fabric 400 also includes a software defined (SD) networking layer 410 that interfaces the physical layer 405 of the compute fabric 400 with the software defined application layer 412 of the compute fabric 400. Accordingly, the software defined networking layer 410 is interchangeably referred to herein as the "operating system (OS) 410" of the compute fabric 400. Generally speaking, the OS 410 of the compute fabric 400 may assign, designate, or allocate various compute fabric nodes Ny to perform respective roles or functions to support the compute fabric 400, such as computing (e.g., via the nodes' respective processors and/or processing cores) or data storage (e.g., via the nodes' respective memories). Compute fabric nodes Ny that are assigned, designated, or allocated to perform computing activities of the compute fabric 400 are respectively referred to herein as "compute nodes" or "computing nodes." Similarly, compute fabric nodes Ny that are assigned, designated, or allocated to perform storage activities of the compute fabric 400 are respectively referred to herein as "storage nodes." An individual node Ny may be utilized as only a compute node, as only a storage node, or as both a compute node and a storage node, and the role(s) of each individual node Ny may dynamically change over time, for example, as directed by the OS 410. Advantageously, the computing platform 405 is scalable, so that individual nodes Ny and/or individual clusters Cx may be easily added, removed, swapped out, etc. as needed to support the compute fabric 400, and in particular, in accordance with the requirements of the other, higher layers of the compute fabric 400. For example, different nodes Ny of the compute fabric 400 may be assigned and re-assigned to different clusters Cx, and/or different nodes Ny and/or different clusters Cx may be physically disposed at different physical locations 115, 118 of the NGPCAS 100, as desired.

The operating system 410 of the compute fabric 400 executes on the computing platform 405 and, in an embodiment, may be built based on any suitable general purpose Hyper Converged Infrastructure (HCI) operating system (OS) such as Microsoft Azure Stack, VMWare HCI, Nutanix AOS, Kubernetes Orchestration, including Linux Containers (LXC/LXD), Docker Containers, Kata Containers, etc. As such, the OS 410 provides a set of computing, storage, and networking support services in a manner somewhat similar to general purpose HCI operating systems. However, in contrast to general purpose HCI OSs, and advantageously, in the compute fabric 400 of the Next Generation Process Control and Automation System 100, the OS support services are dynamically responsive to a logical or abstracted process control or automation system and other software components provided by the software defined application layer 412 of the compute fabric 400. That is, as performance, resource needs, and configurations of the various application layer services, subsystems, and other software components of the application layer 412 dynamically change (and/or are dynamically predicted, by services within the application layer 412, to change), the operating system 410 may automatically and responsively adjust and/or manage the usage of hardware and/or software resources of the physical layer 405 to support the needs and the requirements of the application layer 412 for computing, storage, and networking, as well as for other functionalities related to industrial process control and automation. To this end, the compute fabric operating system 410 may include a set of support services including, for example, a Software Defined (SD) computing (or compute) service 415, an SD storage service 418, an SD networking service 420, an SD orchestration service 422 (also interchangeably referred to herein as an "Orchestrator 422"), and optionally one or more other process control- and/or automation-specific SD OS support services and/or functions 425. For example, the process control- and/or automation-specific SD OS support services and/or functions 425 may include compute fabric individual resource and/or resource group management services that manage individual resources and/or groupings of resources provided by the software defined networking layer 410 and/or by the physical layer 405 of the compute fabric 400 such as, for example, virtual machines, containers, networks, network security groups, clusters, servers, and the like. As such, in an embodiment, the operating system 410 of the compute fabric 400 includes a general purpose HCI operating system platform (e.g., Microsoft Azure Stack, VMWare HCI, etc.) that has been particularly customized to include the SD computing service 415, the SD storage service 418, the SD networking service 420, the SD orchestration service 422, and the other process control and/or automation SD OS support services and/or functions 425, where the set of SD support services 415-425 is automatically responsive to and particularly supports application layer software components 412 of the compute fabric 400, that include, as previously discussed, process control- and/or automation-specific applications and services.

Interface Between Software Defined Networking Layer and Application Layer of Compute Fabric In particular, as the compute fabric operating system 410 manages the allocation of the hardware and software resources of the nodes Ny of the computing platform 405 via the SD OS support services 415-425, the SD OS support services 415-425 may also serve as interface services between the OS 410 and the higher level services, subsystems, and other software components of the application layer 412 of the compute fabric 400, and/or may provide a framework for these higher level services, subsystems, and other software components of the application layer 412. As such, the software components of the compute fabric application layer 412 may interface with the OS 410 (and in some cases, particularly with one or more of the SD-specific support services 415, 418, 420, 422, 425 provided by the OS 410) via a set of Application Programming Interfaces (APIs) 428, either via an HCI Adaptor 430 (also referred to herein as an "HCI Adaptor layer" 430) and another set of APIs 432, or directly (not shown in FIG. 4). The HCI Adaptor layer 430 enables the compute fabric application layer 412 to access the SD OS support services 415, 418, 420, 422, 425 while remaining agnostic of the particulars of the general purpose HCI operating system (e.g., Microsoft Azure Stack, VMWare HCI, etc.) that has been customized with such SD-specific services 415-425 to form the OS 410. Accordingly, the HCI Adaptor 430 transforms or translates the APIs 428 utilized by the compute fabric application layer 412 into a set of APIs 432 that are understood or otherwise known to or compatible with the customized or adapted general purpose HC operating system 410 of the compute fabric 400.

Thus, unlike generalized, layered IT (Information Technology) system architectures in which business logic applications are abstracted from the hardware and software computing platform and for which the management of computing platform resources is largely governed and designed by human IT administrators, the architecture of the compute fabric 400 not only abstracts the higher level, business logic services, subsystems, and other software components of the application layer 412 from the hardware and software computing platform 405, but also enables the higher level software defined services, subsystems, and other software components 412 to dynamically, automatically, and responsively direct and cause changes to the usage of the hardware and software resources of the nodes Ny and clusters Cx of the physical layer 405 and of the software defined networking layer 410 (and optionally, of groups of hardware and/or software resources thereof), e.g., via the APIs 428 and the SD OS support services 415, 418, 420, 422, 425, and without requiring any human intervention or direction. Particularly, and advantageously, the management of the resources of the physical layer 405 and of the software defined networking layer 410 is dynamically responsive to changes in the configurations and needs of these higher level SD services, subsystems, and other software components of the application layer 412, and in particular, with respect to the particular requirements, metes, and bounds of industrial process control and automation systems, such as timing, synchronization, and/or other control- or automation-specific constraints.

Containers and Other Types of Micro-Encapsulated Execution Environments

As shown in FIG. 4, industrial process control, automation, and other associated business logic are performed by the higher level software defined services, subsystems, and other software components 435-448 provided by the application layer 412. For ease of reading herein, this disclosure categorically and interchangeably refers to these higher level SD services, subsystems, and other software components 435-448 as "software defined application layer components" or "application layer software components" of the compute fabric 400. In an embodiment, a set of software defined application layer components 435-442 (and optionally at least some of the third-party services 448 executing at the application layer 412) may collectively form a logical process control or automation system 445 (also interchangeably referred to herein as a "virtual" process control or automation system 445) that executes in conjunction with the physical components 135, 138 of the NGPCAS 100 to control an industrial (e.g., a process control or automation) process. For example, the logical process control or automation system 145 of FIG. 1A may include the logical process control system 445 of FIG. 4. Generally speaking, application layer software components may be provided by the enterprise (e.g., via the architecture provider/manager 161), users 155 who are agents of or associated with the enterprise 155, third-parties, and/or other sources.

The application layer software components 435-448 of the application layer 412 may execute in containers and/or in other suitable types of micro-encapsulated execution environments (MEEEs) or granules, e.g., as Instantiated Software Components (ISCs). For example, an ISC may be a container configured with an instance of a particular application layer software component 435-448 to form a configured container, container image, or other type of micro-encapsulated execution environment or granule for the particular application layer software component 435-448, and the container image of the particular application layer software component 435-448 may be instantiated for execution on a particular compute fabric node Ny as a specific instantiated MEEE or ISC. Said another way, a configured container may be an instance of an application layer software component 435-448 that is configured into a respective container or other type of micro-encapsulated execution environment or granule.

Generally speaking, containerized or micro-encapsulated software components or MEEEs/granules (e.g., at the application layer 412, the HCI adaptor layer 430, and the software defined networking layer 410) are included in the set of containerized/micro-encapsulated components 140 of the NGPCAS 100 and, as such, are isolated from other containerized/micro-encapsulated services and applications (e.g., other containerized/micro-encapsulated components 140) that are executing on the same node Ny. As such, the terms "configured container," "container image," and "containerized component" are utilized interchangeably herein and, for ease of discussion but not for limitation purposes, are generally and categorically utilized herein to refer to any one or more suitable types of instantiated, micro-encapsulated execution environments or granules, such as software containers, virtual machines, software agents, scripts, functions, calls, actors (e.g., lightweight processes such as Erlang, Scala, Akka, etc.), unikernels (e.g., machine images which run on bare metal and contain all components necessary to execute an application, including the operating system component), other types of bare metal software (e.g., software running directly on hardware without any intermediate managing software, such as a hypervisor or other type of container/encapsulation manager), and/or other types of micro-encapsulated execution environments or granules.

Various MEEEs or granules can be configured to execute (e.g., when instantiated) various broad to granular operations within the NGPCAS 100. To illustrate using an example, a control routine may include multiple control modules which operate cooperatively to execute the control routine, a control module may respectively include multiple function and other types of blocks which operate cooperatively to achieve the control module, and a function block may respectively include multiple granular operations which operate cooperatively to execute the function block. Accordingly, in one implementation of this example, a single MEEE can be configured to execute (e.g., when instantiated) an entirety of the control routine. In another implementation of this example, each MEEE of a group of MEEEs can be respectively configured to execute (e.g., when instantiated) a different control module or portion of the control routine, and the group of instantiated MEEEs may operate cooperatively to thereby execute, as a group, the control routine in its entirety. Indeed, in some implementations, a second group of MEEEs can be respectively configured to execute (e.g., when instantiated) different granular operations or portions of a control module (such as an input function block, an error detection function block, a control function block, a logic function block, a script, an output function block, etc.), and this second group of MEEEs, when instantiated, may operate cooperatively to thereby execute, as a group, the control module in its entirety. In still other implementations, a single MEEE may be configured to execute (e.g., when instantiated) as a process controller, a process control subsystem, a unit, an area, or even the process control system 445 as a whole.

In another example, a single, individual MEEE can be configured to execute (e.g., when instantiated) an entirety of a complex data analytics routine for the entire NGPCAS 100. Alternatively, each MEEE of a group of MEEEs can be respectively configured to execute (e.g., when instantiated) a different simple data analytics routine (or some other respective portion of the complex data analytics routine), and the execution of the instantiated group of MEEEs in cooperation may thereby cause the execution of the entirety of the complex data analytics routine. In some implementations, another group of MEEEs, when instantiated, can execute respective granular actions or operations of a simple data analytics routine (or other types of respective granular actions of a simple data analytics routine) in cooperation to thereby cause the execution of the entirety of the simple analytics routine (or the entirety of the portion of the complex data analytics routine, as the case may be). For instance, granular analytics actions or operations may include computational functions (e.g., data aggregations and/or manipulations, such as averages, maximums, minimums, etc.), simplex data analytics routines may include more sophisticated statistical calculations or algorithms (e.g., principal component analysis (PCA), partial least squares (PLS) predictions, and other types of statistical calculations and/or analytics), and complex data analytics routines may include combinations of statistical calculations or algorithms, and in some cases in combination with other type of non-statistical calculations or algorithms.

Generally speaking, MEEEs, granules, or configured containers may be provided by the enterprise (e.g., via the architecture provider/manager 161, via an application/service store, out-of-the-box, etc.), users 155 who are agents of or associated with the enterprise 155, third-parties, and/or other sources. Various instantiated MEEEs may be assigned to execute on various compute nodes Ny of the system 400, which may be disposed in different physical and/or geographical locations. Further, the instantiated MEEEs may be dynamically migrated from executing at one node to executing at another node, e.g., based on detected and/or predicted resource usage, jurisdictional requirements and/or regulations, and/or other criteria. Still further, instantiated MEEEs may be allocated, pinned, dynamically assigned, and/or dynamically migrated, e.g., via the SD compute service 415, to execute on respective nodes Ny and/or data center clusters Cx. The SD compute service 415 may dynamically change, update, maintain, and/or otherwise manage the container images and their respective assignments to compute nodes Ny as or when needed, e.g., to load-balance across compute nodes Ny, for scheduled maintenance of compute nodes Ny and/or physical components thereof, in response to detected and/or predicted resource usage and/or performance issues, to support expansion or contraction of the logical process control or automation system 445, to support expansion or contraction of the computing platform 405, based on jurisdictional regulations and/or requirements, etc. As such, the NGPCAS 100 may be viewed as a dynamic, highly-distributed set of MEEEs or as a dynamic mesh of MEEEs, where the MEEEs may be located or disposed across multiple physical and/or geographical locations, and where one or more of the MEEEs may be dynamically reassigned and migrated, during run-time operations of the NGPCAS 100, to another node and/or another physical and/or geographical location while maintaining the execution of the run-time operations of the NGPCAS 100. Moreover, components of the dynamic meh of MEEEs forming a particular application, control routine, analysis routine, etc. may be dynamically moved or migrated or reassigned to other hardware in the compute fabric individually, in sets or groups, or altogether if desired without effecting or interrupting operation of the application, routine, etc. As such, individual components of the dynamic mesh of MEEEs for a particular application or usage may be managed in the compute fabric separately from other components of the same application or usage.

Within the compute fabric 400, some configured containers, granules, or instantiated MEEEs may be allocated or assigned to respective compute nodes Ny and dynamically re-assigned to different compute nodes Ny by the SD compute service 415 based on dynamically changing configurations, performance, and needs of the logical process control or automation system 445. In some situations, configured containers may be assigned (and re-assigned) to be executed by particular processors or particular processor cores of SD compute nodes Ny. Some configured containers, though, may be pinned to respective SD compute nodes Ny (e.g., by the SD compute service 415, by a configuration, by a user, etc.) and are not dynamically re-assigned by the SD compute service 415 due to dynamically occurring conditions. That is, a pinned configured container may execute on the compute node Ny to which the configured container is pinned until the configured container is unpinned from the compute node Ny, e.g., irrespective of dynamic conditions of the logical process control or automation system 445 (other than perhaps the failure of the compute node Ny to which the configured container is pinned). Said another way, the software defined networking layer 410 may limit the utilization, by the pinned configured container, to only the hardware and/or software resources to which it is pinned, and when the configured container is unpinned, the SD networking layer 410 removes the limitation. Configured containers may additionally or alternatively be pinned to other physical or logical components of the compute fabric 400, if desired. For example, a configured container may be pinned to another configured container, to a specific data cluster, to a particular processing resource (e.g., a particular physical processor or a particular physical processor core of a compute node Ny), to a physical rack or portion of a physical rack serviced by a particular power supply (where the physical rack physically houses the hardware of one or more compute fabric nodes), etc.

Further, configured containers, instantiated MEEEs, or granules may be nested within and/or pinned to other configured containers, which is particularly useful in configuring and organizing the logical process control or automation system 445. For example, when a particular process control subsystem 438 provides a particular set of control services 435 and/or other services 440, a configured container of each provided service 435, 440 of the particular set may be nested in the configured container of the particular process control system 438. In another example, multiple control routine and/or control module configured containers may be nested within a specific controller service 435, and the specific controller service 435 may be nested within the particular process control subsystem 438. In yet another example, a controller or control service 435 may be configured with one or more process control module services 435, parameters, and values of the industrial process plant 10, such as tags of inputs and outputs, reference values, and the like, thereby forming a configured or programmed controller service. The controller or control service 435 may be functionally equivalent to a traditional, dedicated, hardware controller device as understood in the Purdue model, or the controller service 435 may be functionally equivalent to a control routine or control module which is configured into an executed by the traditional, dedicated hardware controller device. A container may be configured with an instance of the configured controller service, thereby forming a container image or instance of the configured controller service that is executable to perform the specific, configured set of process control logic, e.g., by using the configured control module containers, tags, reference values, etc., when so configured. Multiple instances or container images of a configured controller service (or of other configured applications and services) may be instantiated and executed by the compute fabric 400.

In still another example, containers, granules, or instantiated MEEEs within the SD application layer 412 may be utilized to represent and/or logically organize physical and/or logical areas, regions, and components of the NGPCAS 100. For examples, units, areas, and the like may be represented by respective configured containers, and configured containers corresponding to physical and/or logical components of each unit, area, etc. may be nested within and/or pinned to their respective configured, organizational container(s). As such, within the compute fabric 400, a configured control routine container may be nested within or pinned to the configured controller container, and the configured controller container may be nested within or pinned to another configured container, e.g., a container that has been configured for a depropanizer.

For clarity and ease of discussion herein, the term "container" is utilized herein to generally refer to an instantiated software component (ISC) that is a configured container, container image, containerized component, or other type of micro-encapsulated execution environment (MEEE) or granule, e.g., a container or other type of micro-encapsulated execution environment that has been configured to include an instance of a respective controller service, subsystem, or other service or application provided by the application layer 412 of compute fabric 400.

At any rate, and in a manner similar to that discussed for the computing resources of the computing platform 405, containerized/microencapsulated components 140 of the system 100 may be dynamically allocated and/or assigned, pinned, and/or nested, e.g., via SD storage service 418, to various compute fabric storage nodes Ny to thereby support various storage needs of the logical process control or automation system 445. For example, the SD storage service 418 may administer and manage the logical storage resources utilized by configured containers of the logical process control or automation system 445 across various physical hardware memory resources of one or more nodes Ny. For instance, the configured container and the memory needed for its operations (e.g., Random Access Memory or similar) may be stored on a particular SD storage node Ny or a particular memory device or space of an SD storage node Ny. Additionally, if desired, some containerized components/MEEEs/granules 140 may be pinned to respective SD storage nodes Ny and/or to specific memory devices or memory areas of the SD storage nodes Ny. The SD storage service 418 may change, update, or otherwise manage the physical hardware memory or memories of the computing platform 405 to support logical storage resources of the compute fabric 400 when and as needed, e.g., due to disk or other types of errors, for scheduled maintenance, due to the addition/expansion of available physical memory in the computing platform 405, etc.

Still similarly, the SD networking service 420 may administer and manage the logical or virtual networking utilized by the containerized components/MEEEs/granules 140 of the logical process control or automation system 445 and/or by other containerized components/MEEEs/granules 140, which may be implemented by the SD networking service 420 across the compute fabric nodes Ny. For example, the SD networking service 420 may administer and manage networking and hardware resources of the computing platform 405 to support the logical networking functionalities included in the logical process control system 445, such as virtual interfaces, virtual switches, virtual private networks, virtual firewall rules, and the like, as well as to support required networking between various configured containers or container images executing on the compute fabric 400. Further, as the logical process control system 445 services the physical components 135, 138 of the NGPCAS 100, the timing and synchronization of the containerized components/MEEEs/granules 140 of the compute fabric 400, the physical components 135, 138 of the field environment 120, and the networking there between is critically important, as missed and/or lost messages or communications may result in the industrial or physical process becoming uncontrolled, which may in turn lead to catastrophic consequences such as overflows, gas leaks, explosions, loss of equipment, and, in some situations, loss of human life. Fortunately, the SD networking service 420 is responsive to the critical process I/O timing and synchronization of the compute fabric 400 so that communications (and in particular, communications to/from control services 435), may be reliably delivered in a timely and deterministic manner. For example, the SD networking service 420 may support the time synchronization of data center clusters Cx to within 1 millisecond to ensure required synchronization between process control services 435, process control subsystems 438, the packet router/switch service 442, and other software defined services 440, 448 of the software defined application layer 412.

In addition to the SD compute service 415, the SD storage service 418, and the SD networking service 420, the compute fabric operating system 410 may provide other OS support services 425 that are accessible via the set of APIs 428, 432 and which may be utilized or accessed by the application layer 412 to support the logical process control system 445 and other containerized components/MEEEs/granules 140 of the application layer 412 of the compute fabric 400. For example, the other OS services 425 may include a service life cycle management service, a discovery service, a security service, an encryptor service, a certificate authority subsystem service, a key management service, an authentication service, a time synchronization service, a resource and/or resource group management service, a service location service, and/or a console support service (all not shown in FIG. 4), to name a few. In some embodiments of the compute fabric 400, one or more of the support services may execute at the application layer 412, e.g., as other software defined services 440, instead of executing at the software defined networking layer 410 as OS support services 425.

Indeed, in an embodiment, one or more of the software defined components 415-425 and 452-460 of the software defined networking layer 410 are implemented as respective configured containers or container images of the compute fabric 400. That is, one or more services and other functionalities provided at the software defined networking layer 410 of the compute fabric 400 (and in some implementations, all of the services and functionalities provided at the software defined networking layer 410) may be implemented as respective containerized components/MEEEs/granules 140 of the NGPCAS 100. As such, in manners similar to those discussed herein for containerized components/MEEEs/granules 140 of the application layer 412, containerized components/MEEEs/granules 140 of the software defined networking layer 410 may be uniquely identified within the NGPCAS 100 by a respective address, may communicatively connect to other containerized components/MEEEs/granules 140 of the NGPCAS 100 and optionally to the physical components 135, 138 of the NGPCAS 100, can be spun up and removed as or when needed, etc.

Application Layer of Compute Fabric

Now turning more specifically to the application layer 412 of the compute fabric 400, and as shown in FIG. 4, the application layer software components 412 include a set of software defined services or applications 435 (such as software defined process control- or automation-related services 435) and a set of subsystems 438 of the NGPCAS 100 (such as subsystems for software defined process control or automation), and optionally may include a set of other software defined business logic services 440 of the NGPCAS 100 (e.g., enterprise business logic services relating to process control or automation). In some implementations of the compute fabric 400, the application layer software components 412 may include a set of third-party business logic services 448. For example, third-party services 448 may be generated by a software development kit (not shown) of the compute fabric 400, via which users may develop, generate, install, and manage third-party services 448 at the SD application layer 412. Generally speaking, the services and applications 435-448 provided at the application layer 412 form the logical process control system 445 and provide related functionalities. Generally speaking, applications 435-448 may be provided by the system 100 itself, third parties, suppliers, end users 155, and/or other sources. For example, one or more of the applications 435-448 may be built on the APIs 160,165 provided by the compute fabric 102, and/or one or more of the applications 435-558 may be packaged as containers and distributed by the Orchestrator 422.

Each different control service 435 may be configured with desired parameters, values, etc. and optionally other control services 435; each instance of a configured control service 435 may execute in a respective container; and each configured container may be assigned (or pinned) to execute on a respective compute node Ny and/or cluster Cx. As such, each configured control service 435 may be a logical or software defined control entity which functionally may be configured and may perform in a manner similar to that of a traditional, hardware-implemented process controller device, control module, process control function block, etc. However, unlike traditional, hardware-implemented process controller devices, traditional control modules, and traditional control function blocks, and advantageously, the compute fabric 400 may easily replicate multiple instances of a same configured control service 435 for various purposes, such as performance, fault tolerance, recovery, and the like. For example, a controller service (that executes in its own container) may be configured to execute a control module service (that executes in its own container), and the control module service may be configured to execute a set of control function block services (each of which executes in its own container, and each of which may be configured with respective parameters, values, etc.). As such, the set of configured containers corresponding to the set of configured control function block services may (though need not necessarily) be nested in the configured control module service container, and the configured control module service container may be nested in the configured controller service container. The set of configured containers corresponding to the set of configured function block services may be assigned to execute on different cores of a particular processor of the compute platform 405, e.g., for performance load-balancing purposes. When loads change, one or more of the configured function block service containers may be moved to execute on different processor cores, different processors, or even different compute fabric nodes in attempt to re-balance loads; however, the moved function block service containers would still be nested under the configured control module service container, and would execute accordingly.

In addition to control services 435, other types of application layer services 440 related to industrial process control may be provided by the application layer 412, such as, but not limited to, operator displays and interfaces, diagnostics, analytics, safety routines, reporting, historization of data, configuring of services, configuring of containers, communicating information with external or other systems, enterprise-level applications, process control and/or automation resource and/or resource group management, etc. For example, a process control and/or automation resource group management service may allow a user 155 to group and/or isolate various resources based on the NGPCAS 100 and/or other process control or automation considerations. For instance, resource groups may be formed based on physical characteristics, such as sites or physical locations, groups of sites/physical locations, subsets of sites or physical locations, geographical regions, etc.; based on logical characteristics, such as categories, containers and/or container types, control strategies, capabilities, timing, performance, user characteristics, etc.; based on functionalities, such as storage items, networking items, etc.; and/or based on other types of groupings and/or combinations thereof corresponding to the NGPCAS 100. Generally speaking, any process control or automation system-related functionality or business logic that executes during run-time of the NGPCAS 100 to control the industrial process, supports the NGPCAS 100, and/or relates to the NGPCAS 100 may be logically implemented in the compute fabric 400 as a respective application layer service 435, 440 executing in a respective container. For example, any one or more of the enterprise-level compute fabric functionalities 320 may be implemented in respective containers or as containerized services. Further, any of the containerized services 435, 440 may communicatively connect, e.g., via the SD networking layer 410, with respective physical components 135/138 disposed in physical locations of the NGPCAS 100 when required to do so by the business logic of the service 435, 440 and/or by the recipient physical components 135/138. Still further, any of the containerized services 435, 440 may communicatively connect any other containerized service 435, 440 to transfer data and/or information there between when required to do so by their respective business logic.

In a similar manner, each different subsystem 438 of the application layer 412 of the compute fabric 400 may be provided by or execute in a respective container. The set of subsystems 438 provide the virtual or logical process control-related subsystems of the logical process control system 445. In some cases (not shown in FIG. 4), a subsystem 438 may provide or include one or more application layer services and, as such, the configured containers of the services 435, 438 provided by the subsystem may be nested in the configured subsystem container. Generally, the set of subsystems 438 allow control services 435 and other services 440 to be easily and coherently grouped and/or managed. In a preferred embodiment, each node Ny of the compute fabric 400 hosts a respective instance of each subsystem of the set of subsystems 438, e.g., so that subsystem services are proximately and readily available to other application layer services 435, 440, 448 that are presently executing on each node Ny. Accordingly, changes to one or more of the subsystems 438 may be coordinated among the corresponding instances thereof executing at each node Ny (e.g., under the direction of the OS 410). As such, not only is the set of subsystems 438 highly and proximately available for any application layer service 435, 440, 448 executing on a same node Ny, but in the event of a compute fabric node failure, the failure of a compute fabric node component, or the failure of a particular subsystem instance at a compute fabric node, the functionalities provided by the set of subsystems 438 may be easily maintained for the logical process control system 445.

Examples of subsystems 438 which may be provided by the application layer 412 of the compute fabric 400 include, but are not limited to:

- a continuous process control subsystem to manage the scheduling and execution of the business logic of logical and physical control system entities such as controllers, I/O assignments, control modules, function blocks, ladder logic, and structural text-based control algorithms, etc.;
- a state-based process control subsystem for managing, tracking, assigning, changing, deriving, transitioning, analyzing, visualizing, recording, etc. the state of the process control system 445 as a whole, of containerized components/MEEEs/granules 140 of the process control system 445, and/or of physical components 105, 108 controlled by the process control system 445, as well as for driving the industrial process to achieve a desired process state within defined constraints, such as safety, environmental, and/or profitability constraints;
- an event-based process control subsystem including various control services that may be triggered to execute based on occurrences of one or more events;
- a batch process control subsystem including various control services which may perform batch control and tracking of regulatory items (e.g., for governmental traceability and manage regulatory records that are related to batch process control and that are generated during batch execution and at other times;
- a historian subsystem including various application layer services to record time series data for process I/O and events within the system 100;
- a diagnostic subsystem including various application layer services for collecting and providing diagnostic data from various other application layer services, other subsystems, compute fabric nodes Ny, components of the software defined networking layer 410, and/or other components of the system 100;
- a process I/O subsystem including various application layer services to manage I/O connections and configurations for process I/O within the process control system 445, such as the packet router/switch service 442;
- a user subsystem including various application layer services 440 to verify and/or validate user credentials when users attempt to access the compute fabric 400, e.g., via APIs 160, 165;
- an alarm subsystem including various application layer service for maintaining the definitions, statuses, and states of alarms within the system 100 such as, for example, process alarms, hardware alarms, maintenance alarms, unit alarms, networking layer alarms, I/O alarms, hardware asset alarms, software asset alarms, diagnostic alarms, and the like;
- a licensing subsystem including application layer services 440 to verify or ensure that a user has privileges in accordance with the license level of the compute fabric 400 and/or system 100 (such as perpetual licenses, time subscription licenses, consumption-based licenses, remote licenses, etc.), to enforce licenses and prevent unlicensed activity from occurring, to provide for administration of licenses, to report and log licensing status and activities, and the like;
- a distributed event subsystem including various application layer services to distribute generated events (or notifications thereof) across all nodes Ny of the compute fabric 400, along with corresponding time stamps indicating respective times of occurrences at respective event sources so that consistent record keeping may be provided across all nodes Ny; and
- a configuration subsystem which manages the storage, updating, and version control of a configuration database that stores configurations of various services provided by the application layer 412, such as control configurations. A respective instance of the configuration database may be stored at each compute fabric node Ny, so that the compute fabric 400 provides fault tolerance of the configuration database across all nodes Ny. Writes to the configuration database may be atomic across all fault tolerant instances throughout the system 100, and reads from the configuration database may be from a single local instance of the configuration database. In some situations, a large read request may be segmented and results provided in a parallel manner from the multiple nodes Ny.

Further, the application layer 412 of the compute fabric 400 may include additional or alternate subsystems 438 which may be utilized by the system 100. For example, the subsystem 438 may include a control strategy subsystem directed to higher-level and/or overall control strategies, e.g., to achieve product and process performance and quality targets; an analytics subsystem; an optimization subsystem, a mass and energy balancing subsystem, a security subsystem, which may include one or more specialized algorithms for detecting security intrusions, etc.

Software Defined Router/Switch Service

The software defined packet router/switch service 442 generally operates as an application or service that is responsible for transferring packetized I/O data (and, in some scenarios, other types of packetized data or information) between endpoints of the NGPCAS 100, e.g., from a physical component 135/138 to a containerized component/MEEE/granule 140 at the application layer 412 of the compute fabric 400 and vice versa; from a physical component 135/138 to a containerized component/MEEE/granule 140 at the networking layer 410 of the compute fabric 400 and vice versa; from a containerized component/MEEE/granule 140 at the application layer 412 to another containerized component/MEEE/granule 140 at the application layer 412; from a containerized component/MEEE/granule 140 at the networking layer 410 to another containerized component/MEEE/granule 140 at the networking layer 410; from a containerized component/MEEE/granule 140 at the application layer 412 to a containerized component/MEEE/granule 140 at the networking layer 410 and vice versa, and the like. For example, the packet router/switch service 442 may communicatively couple the respective endpoints and transfer data there between using any suitable data delivery or data transfer paradigm, including request/response, publish/subscribe, etc. In an embodiment, when at least some of the software defined application layer software components 435-448 are deployed as microservices/MEEEs/granules that are communicatively connected by a microservice/MEEE/granule bus (not shown), the packet router/switch service 442 (in some cases, in conjunction with the OS 410 and its support services 415-425) may support and/or manage the microservices/MEEEs/granules and microservice/MEEE/granule bus so that the microservices/MEEEs/granules may transfer data and/or information there between (e.g., in a packetized format). In an additional or alternative embodiment, the software defined packet router or switch service 442 may use any one or more packet-based networks or links (such as the networks 402 and/or software defined links provided by the compute fabric 400) to transfer packetized data and information between one or more containerized components/MEEEs/granules 140 and/or physical components 135/138 of the NGPCAS 100.

It is noted that FIG. 4 depicts the software defined packet router/packet switch service 442 as being a separate service at the application layer 412; however, this is for clarity of discussion (and not limitation) purposes. In other embodiments, the packet router/switch service 442 may be included in a subsystem 438 of the compute fabric 400, and/or at least a respective portion or an entirety of the software defined packet router/switch service 442 may be implemented in the HCI Adaptor 430 or in the compute fabric operating system 410.

Alternately, the packet router/switch service 442 may be an application layer software defined service 440 which is in its own, stand-alone subsystem within the application layer 412, or which is not associated with any subsystem. At any rate, and generally speaking, the software defined packet router/packet switch service 442 may be typically implemented as a containerized component/MEEE/granule 140 of the compute fabric 400.

As such, the containerized packet router/switch service 442 may be accessed by other containerized components/MEEEs/granules 140 of the compute fabric 400 (both at the application layer 412 and the networking layer 410) for the purposes of data transfer or data delivery. In some situations, the packet router/switch service 442 may utilize the APIs 428 to thereby cause the transfer of packetized I/O data and/or other types of packetized data, e.g., via the OS support services 415-425. In some situations, the packet router/switch service 442 may cause data to be transferred via the microservice/MEEE/granule bus. In effect, the packet router/switch service 442 serves as a logical or gateway (e.g., an API gateway) that causes packetized process I/O and/or other types of packetized data to be routed between configured containers of the compute fabric 400, and that causes packetized process I/O, packetized control signals or instructions, and other types of packetized information to be routed between configured containers of the compute fabric 400 and physical components 135, 138 deployed in the field environment 120 of the NGPCAS 100.

As will be understood, one significant advantage of the system described herein is that it reduces the data movement and data storage needed to support applications or other usages executing in in real-time in the compute fabric. In particular, because of the secured, real-time communication structure provided in the NGPCAS described herein, including the use of secured, encrypted data links (e.g., VPNs) between various software and hardware elements both in the compute fabric and in the physical locations (e.g., the plants), elements such as MEEEs in the compute fabric can access data from anywhere in the system (i.e., from any other element where that data was created or resides) in real-time. This feature means that applications and other application usages executed in or by higher level system elements or platforms (e.g., a control application, a maintenance application, a data logging or tracking application, a fleet management application, etc.), or any individual MEEE or granule thereof can access data wherever this data resides (e.g., in another MEEE or granule anywhere in the system, in a compute fabric database, in a physical location database or server, in a field device at a physical location, etc.) in real-time using, for example publish/subscribe communications, dedicated data calls, etc. In fact, individual MEEEs or other compute elements (granules) that make up or implement a particular application or usage can include a pointer or reference that points to the data it needs for operation wherever that data resides in the system and the granule can access that data in real-time when it is needed or used by the MEEE or granule. Thus, granules can, for example, access and use data wherever that data is created and/or initially stored. This feature means that data does not need to be moved from, for example, a server in a physical location to a cloud-based server in the compute fabric prior to being usable or accessible in real-time by an application or element (e.g., granule) in the compute fabric. This feature thereby speeds up computing operations and reduces data flow that was, in the past, performed simply for the purpose of moving data from one location to another to make that data available for use in real-time to applications which use that data. The system described herein thus enables data to be used wherever it resides or is generated by direct data calls or publish/subscribe communications, whether that data resides in or is generated by a device within the compute fabric or by a device at a physical location or plant.

Logical/Virtual Components

Further, at the application layer 412 of the compute fabric 400, at least some physical process control devices or components (e.g., controllers, safety logic solvers or devices, data storage devices, etc.) of traditional process control systems may be logically implemented in the logical process control system 445 as a respective service 435, 440 or subsystem 438 executing in a respective container. Such logical or virtual instances of process control devices or components may be configured in a manner similar to their physical counterparts, if desired, by configuring the logical devices with control routines, other application layer software components 412, parameters, reference values, lists, and/or other data. For example, a controller service may be configured with several control modules, a display view service may be configured with user access controls and graphical elements, etc. Configured logical or virtual process control devices or components (e.g., container images of process control devices or components) may be identified within the logical process control system 445 via a respective device tag or identification, for example, and respective signals that are received and generated by configured logical or virtual instances of process control devices may be identified within the logical process control system 445 via respective device signal tags or identifiers. A logical or virtual instance of a process control device may be uniquely identified within the system 100 and operate as an individual entity in lieu of any corresponding physical device of the system 100, or a logical or virtual instance of a process control device may be a proxy or digital twin of a physical device included in the system 100, such as previously described.

At the software defined application layer 412, the compute fabric 400 also includes software defined storage entities or components 413, which may provide abstracted data storage (and access thereto) for the services and subsystems 435-448 of the SD application layer 412. For example, historian databases, configuration databases, and other types of process control system databases and data storage entities as well as temporary storage utilized by various process control application services 435-448 during execution may be provided by the software defined storage entities 413. The storage databases, areas, devices, etc. may virtualized or logical storage entities or components, which may be assigned or allocated (and may be re-assigned and re-allocated) to various storage resources of the nodes Ny of the computing platform 405 by the compute fabric operating system 410. For example, a single software defined logical database may be implemented over the hardware memory resources of multiple nodes Ny. Additionally, the SD Storage service 418 of the compute fabric operating system 410 may assign/re-assign and re-assign/re-allocate software defined storage entities 413 at the application layer 412 to different storage resources provided by the nodes Ny based on performance, resource, and configuration needs of the storage entities or components 413 and optionally of other components of the SD application layer 412.

Orchestration

Returning now to the software defined networking layer 410 of the compute fabric 400, FIG. 4 depicts a particular compute fabric OS service, i.e., the Orchestration service 422, separately from the depictions of the other compute fabric OS services 415-420, 425 for ease of discussion purposes. Generally speaking, the Orchestration service 422 instantiates container images (e.g., of application layer control services 435, subsystems 438, third-party services 448, and other software defined services 440) into running or executing containerized applications or services on respective hardware and/or software physical compute nodes Ny, as well as assigns various SD data storage entities to reside on respective hardware storage and/or software storage nodes Ny. For example, the Orchestration service 422 may instantiate and assign various instantiated container images to execute on and/or utilize resources of a single node Ny, or resources of two or more nodes Ny. Further, the Orchestration service 422 may assign various SD data storage entities or components 413 of the application layer 412 to reside on physical layer storage resources of a single node Ny, of multiple nodes Ny, etc., e.g., for ease and speed of access by resident containerized components, for redundancy purposes, for balancing of memory usage across the physical platform, etc. In doing so, the Orchestration service 422 not only establishes the running containerized applications and services, but also manages the fault tolerance, load-balancing, quality of service (QoS), and/or other performance aspects of the running containerized applications and services of the compute fabric 400, e.g., via QoS configuration services 452, fault tolerance services 455, load-balancing services 458, and optionally other performance-related services 460 provided by the OS 410. As such, the Orchestration service 422 may be invoked or accessed by the other OS services 415, 418, 420, 425, and the Orchestration service 422 may in turn invoke or access one or more of the performance-related services 452-460. Generally speaking, the Orchestration service 422 allocates resources to containerized components and SD data storage entities of the logical process control system 445 so that the containerized components are able to operate efficiently and safely, e.g., to control the industrial process, at least at a best-effort performance level.

To this end, the performance-related services 452-460 of the OS 410 may monitor performance parameters, resource usage, and/or criteria during run-time, detect any associated conditions which occur and/or which are predicted to occur, and provide and/or implement any changes in assignments of application layer software components (e.g., containerized components) 412 to hardware and/or software resources of the computing platform 405. Accordingly, during run-time of the system 100, as various expected and/or unexpected hardware and/or software conditions arise and are detected, the Orchestration service 422 responsively adjusts the allocation of hardware and/or software resources of various compute fabric nodes Ny to instantiated container images to maintain (or attempt to maintain) a target or best-effort level of performance and fidelity of operations. Detected conditions which may cause the Orchestration service 422 to modify allocations and/or assignments between containerized components 412 and physical resources of nodes Ny may include, for example, hardware faults or failures, software faults or failures, overloading of a specific compute fabric node, increased or decreased bandwidth of various networking components, addition or removal of compute fabric nodes and/or clusters of compute fabric nodes, hardware and/or software upgrades, pinning and/or unpinning of containerized services and/or applications, diagnostics, maintenance, and other routines which may cause hardware and/or software resources to be temporarily unavailable for run-time use, etc. Possible responsive and/or mitigating administrative actions which may be taken by the Orchestration service may include, for example, re-assigning containerized services and/or applications to execute using different software and/or hardware resources (in some cases, on different nodes Ny), activating and/or deactivating software and/or hardware resources, changing priorities of various containerized components' access to various software and/or hardware resources, etc.

Accordingly, and generally speaking, the services, subsystems, and other software components of the software defined application layer 412 (e.g., 435, 438, 440) may determine, define, or specify the processing, containerization, networking, and storage needs of the logical process control system 445, both at an individual container level and at aggregate levels (e.g., at a subsystem level, unit level, area level, and/or the process control system 445 as a whole). By way of the APIs 428 (and, in some configurations, also by way of the HCI adaptor layer 430 and APIs 432), the OS 410, its support services 415, 418, 420, 422, 425, and its Orchestration service 422 administer and manage the hardware and software resources of the compute fabric nodes Ny to support those needs. For example, in some embodiments, the SD Orchestrator 422 may cause different instances of a particular control routine 435 or of a particular other service 440 to execute on different nodes Ny, e.g., for fault tolerance, quality of service, and/or other performance criteria of the compute fabric 400. Advantageously, as the needs of the logical process control system 445 dynamically change over time, the OS support services 415, 418, 420, 422, 425 and/or the Orchestration service 422 may modify, change, and adjust the usage of the hardware and software resources of the nodes Ny, e.g., in a responsive and/or in a predictive manner.

For example, when the logical process control system 445 creates additional instances of control services 435 executing in additional containers, the OS support services 415-425 may responsively (via the APIS 428 and optionally the HCI adaptor 430 and the APIs 432) assign the newly created containerized components to execute on corresponding compute fabric nodes Ny, may re-balance existing containerized components among nodes Ny, may assign specific hardware memory resources to support the logical memory resource needs of the additional containerized components, may adjust routing tables utilized by the nodes Ny to support the logical routing needs of the newly created containerized components, etc. In another example, when a particular cluster C2 needs to be taken out of service (e.g., expectedly for maintenance purposes or unexpectedly due to a lightning strike), the OS support services 415-425 may pre-emptively re-assign containerized components that are presently assigned to execute on cluster C2 to other clusters in accordance with the present needs of the logical process control system 445 and the availability of hardware and/or software resources of the other clusters, and the support services 415-425 may adjust routing tables utilized by the clusters Cx accordingly so that continuity of execution of said containerized components is maintained even when the cluster C2 is taken out of service.

As such, the software defined networking layer 410 automatically, dynamically, and responsively determines, initiates, and performs changes to the allocation of hardware and software resources of the nodes Ny of the computing platform 405 to different application layer software components 412 based on detected conditions, such as improvement in performance of individual logical and/or physical components or groups thereof, degradation of performance of individual logical and/or physical components or groups thereof, fault occurrences, failures of logical and/or physical components, configuration changes (e.g., due to user commands or due to automatic re-configuration by services of the compute fabric 400), etc. Consequently, the compute fabric 400 may automatically redistribute hardware and software resources of the nodes Ny responsive to changing conditions and components of the compute fabric 400 to thereby support the process control system 245 and other services executing at the application layer 412 of the compute fabric 400.

Simulation

In some implementations, the compute fabric 400 may implement simulations of or changes to various application services 435, 440, 448, to the entire software application layer 412, to various support services 415-425, 452-460, and/or to the entire software defined networking layer 410. That is, a simulation of the target components/layers may execute in concert with the active software defined components/layers on top of the computing platform 405, and thereby receive run-time data from the field environment of the industrial process plant and operate accordingly, e.g., with the same logic, states, timing, etc. as the active target components/layers, or with the simulated test logic, states, timing, etc. However, the I/O and other types of data generated by the simulation are prevented from being delivered to the field environment, and simulations may be paused, sped up, slowed down, fed test inputs, and otherwise managed to observe behavior and make modifications to the simulated components/layers. Accordingly, upon approval of a simulated portion of the compute fabric 400, the simulated portion may simply be activated for use during run-time operations of the industrial process plant, without needing to pause or take part of the compute fabric 400 out of service to do so.

Example Security Features of the NGPCAS

Next, various security features of the Next Generation Process Control and Automation System (NGPCAS) 100 are described. As previously discussed, present-day process control and automation systems that are designed around the Purdue model suffer from many drawbacks, including increased complexity (and thus, more opportunity for component and process failure), decreased performance, and greater risk of cyber-intrusion, to name a few. For example, in present-day process control and automation systems, typically at least three different domains may exist between Levels 2, 3, and 4, and the security policies for each domain may be different and require different security management techniques. As such, cross-level connectivity is challenging to implement, as well as can introduce significant delays for the delivery of data across multiple Purdue levels, e.g., from Level 2 to Level 4 and above. Further, industries are looking towards being able to deliver instructions, commands, and/or other information from higher levels of the Purdue model to lower levels. For example, a technician or other process plant personnel may be working remotely via his or her portable computing device, and may want to monitor run-time process plant operations and adjust configurations, parameter values, settings, etc. within the process control system in response to monitored conditions. In such situations, when instructions and information move from higher levels of the Purdue model to lower levels (e.g., via "holes" that are added to the established security mechanisms for these purposes), outbound firewalls and other currently implemented security mechanisms that are designed and utilized to prevent the inflow of external information into the plant must necessarily be compromised, thereby introducing significant additional risk of external parties accessing the information and data in the protected lower levels of the plant and other types of cyber-intrusion. Moreover, the multiple security mechanisms implemented between Purdue layers, either as initially designed or with any added "holes," create a highly complex network, which is difficult to engineer, maintain, and utilize to efficiently deliver information between Purdue levels.

Further, in present-day systems that perform some process control and/or automation functionality in the cloud, other undesirable issues are introduced. For example, when the process plant of such systems loses Internet connectivity, the cloud cannot be accessed and any control or automation functionality provided by the cloud is unavailable. Additionally, still further latency, bottlenecks, and complexity are added with cloud-based implementations beyond those introduced by Purdue-model implementations. Moreover, sufficiently secure mechanisms for supporting native communication between process control devices (e.g., field devices) and the cloud do not exist.

The security features of the NGPCAS 100 address at least these known security issues of Purdue model implementations as well as provide additional security, improved performance, easier engineering and maintenance of the NGPCAS 100, as well as other benefits and advantages. Examples of such security features are described below. Any of the described security features may be used as a stand-alone security feature or in combination with any other one or more security features. In some embodiments, various security features of the NGPCAS 100 may be implemented as services 425 provided by the software defined networking layer 410 of the compute fabric 400. Additionally, the software defined networking layer 410 may provide other services 415 that manage resources and/or groupings of hardware and/or software resources of the software defined networking layer 410 and/or the physical layer 405 of the compute fabric 400 that are allocated and/or utilized to support the security features of the NGPCAS 100.

Example Network Security Features of the NGPCAS

As previously discussed, communications between nodes, configured containers, locations, devices, and/or other portions of the NGPCAS 100 as well as human-operated computing devices 155 (if any) may be secured via one or more VPNs, which may include mutually-exclusive and/or nested VPNs. As previously indicated, for ease of discussion and not limitations purposes, the term "VPN" is utilized herein to generally and categorically refer to various types of secured, encrypted point-to-point (PTP), peer-to-peer (P2P), and/or point-to-multipoint (PTM) connections. At any rate, each VPN, nested or otherwise, may block traffic from nodes, components, etc. that are not included in the VPN, and endpoints of the VPN may communicate with each other over the VPN via respective sessions. The VPN configuration (e.g., the number of VPNs, types of VPNs, nesting of VPNs, etc.) of the NGPCAS 100 may be implemented over one or more public and/or private networks, including private enterprise networks, the public Internet, etc. Additionally, the VPN configuration of the NGPCAS 100 may be customized to meet the security needs and requirements of the enterprise and/or of the architecture provider manager, for example. If desired, at least one of the VPNs of the NGPCAS 100 may be a permanent VPN.

Referring to FIGS. 1 and 4 to illustrate, in an example minimal VPN configuration, communications between the physical or field environment 120 of the NGPCAS 100 (e.g., all of or an entirety of the components, devices, etc. of the NGPCAS 100 that are disposed in the field environment 120) and the compute fabric 102 of the NGPCAS 100 (including all of or an entirety of the containerized components included in the compute fabric 102) may be protected via only a single VPN. In an example maximal VPN configuration, communications between any pair of entities of the NGPCAS 100 (e.g., exposed APIs 160, 165, other containerized components/MEEEs/granules 140, the compute fabric 102, physical components 135, locations 115, 118, the entire physical environment 120, user applications and/or devices 155, architecture provider/manager applications and/or devices 161, etc.) may be protected via a respective VPN. For instance, in the maximal VPN configuration, a configured container providing control service functionality that requires the use of a utility functionality to execute the control service may communicate with a configured container providing the utility functionality via a respective VPN. In embodiments, a VPN configuration of the NGPCAS 100 may include one or more of:

A point-to-point VPN, e.g., a VPN exclusively servicing communications between only one physical component 135 and only one containerized component/MEEE/granule 140;

A point-to-multipoint VPN, e.g., a VPN exclusively servicing communications between only one physical component 135 and multiple containerized components/MEEEs/granules 140, a VPN exclusively servicing communications between multiple physical components 135 and only one containerized component/MEEE/granule 140, etc.;

- a multipoint-to-multipoint VPN, e.g., a VPN exclusively servicing communications between only a subset of an entirety of physical components 135 at a location 115 and a subset of an entirety of containerized components/MEEEs/granules 140 at the compute fabric 120;
- a VPN exclusively servicing communications between different layers of the compute fabric 400, e.g., communications between the software defined application layer 412 and the software defined networking layer 410;
- a VPN exclusively servicing communications between one or more selected services, subsystems, and functionalities of different layers of the compute fabric 400, e.g., between a selected one or more of the services and/or subsystems 435, 438, 440 at the application layer 412 and a selected one or more of the software defined services and/or functions 415, 418, 420, 425 at the networking layer 410;
- a VPN exclusively servicing only an API 160 and an instance of a user application 155, and one or more other VPNs exclusively servicing the API 160 and one or more containerized components/MEEEs/granules 140 and/or physical components 135, 138 needed to obtain or provide data to the user application 155, e.g., in point (e.g., API 160)-to-point and/or point (e.g., API 160)-to-multipoint manners;
- a location-to-location VPN, e.g., a VPN exclusively servicing communications between only a single location 135 and the compute fabric 102 as a whole;
- a multi-location VPN, e.g., a VPN exclusively servicing communications between the compute fabric 102 and multiple locations 115, 118 that collectively are only a subset of an entirety of the locations of the NGPCAS 100;
- and/or other types of VPNs that protect and secure communications between designated or defined endpoints within the NGPCAS 100 (e.g., nodes, configured containers (which may include APIs 160, 161), locations, devices, and/or other portions of the NGPCAS 100). Indeed, in embodiments, each endpoint may be required to authenticate to each VPN that the endpoint will utilize for sending and/or receiving communications with one or more other entities that have respectively authenticated to the VPN.

Example User Security Features of the NGPCAS

As previously mentioned, the users 155 of the NGPCAS 100 may include a human user operating a computing device at which one or more applications (e.g., a web browser, a thin client, or another user interface) execute to communicate with the NGPCAS 100, such as an operator, a configuration engineer, a third-party person who has been approved by the enterprise to access at least a portion of the system 100, another agent of the enterprise, or an agent of the architecture provider/manager 161, to name a few. Additionally or alternatively, the users 155 may include an automated user such as an external application or service that does not have a user interface and that executes on an external (e.g., remote) computing device or system. The external application/service users 155 may be enterprise-based, e.g., applications and/or services that have been configured by enterprise personnel, or may be third-party applications and/or services. Some of the external application/service users 155 may be applications and/or services provided by the architecture provider/manager 161, for utilization by the architecture provider/manager 161 and/or by enterprises. At any rate, to secure the system 100 against possible cyber-attacks when legitimate users 155 access system data and/or functionalities, each user 155 may be required to utilize one or more exposed APIs 160 to interface with and/or access the system data and/or functionalities provided by the NGPCAS 100. For example, the functionalities that are provided by the NGPCAS 100 for users 155 to utilize may be implemented in the compute fabric 102 as respective containerized components/MEEEs/granules 140, and such containerized components may be exposed to users 155 only via APIs 160 (e.g., as websites, services, etc.), where the APIs 160 may be accessed by the users 155, for example, via web browsers or thin clients. Typically, any functionality (e.g., all functionalities) that are provided by the NGPCAS 100 for users 155 to utilize is accessible to users 155 only via one or more respective APIs 160. Further, for still additional security, communications between the user 155 and the one or more APIs 160 may be secured via respective VPNs 158. For yet further security, the user 155 may be required to first be authenticated to the VPN 158 before being able to take advantage of the APIs 160, and human users in particular may be subject to multi-factor authentication in order to obtain access to the VPN 158.

In some situations, particular users 155 may be authenticated and/or authorized to utilize only a subset of the available, exposed APIs 160. That is, the set of APIs 160 that are exposed to different users 155 and/or that different users are authorized to access may differ based on the users' respective credentials. For example, authorization of different users 155 to different APIs 160 may be based on the containerized component(s) 140 (e.g., applications and/or services) to which access is provided by the APIs 160. Additionally or alternatively, authorization of different users 155 to different be APIs 160 may be implemented on an enterprise-basis (e.g., users 155 of enterprise A are allowed access to a first subset of the APIs 160 and users 155 of enterprise B are allowed access to a second, different subset of the APIs 160); on a location-basis; on a node-basis, on a user-credential basis (e.g., roles, responsibilities, and/or skills of the user), on a time-basis, and/or based on combinations thereof.

As such, by using VPNs to secure communications within the NGPCAS 100, security mechanisms which are utilized between layers of Purdue model-based systems (e.g., firewalls, data diodes, DMZs, and other mechanisms) to secure cross-level communications may be eliminated. Indeed, in an embodiment, the NGPCAS 100 does not include (e.g., excludes) any firewalls, data relays, data diodes, and DMZs that are utilized to secure communications and data delivery to, from, and within the NGPCAS 100, thereby simplifying the design, engineering, configuring, maintenance, and runtime performance of the NGPCAS 100 as compared to Purdue model-based systems. Further, as each VPN blocks or does not process any traffic that originates from outside of the VPN, and as any and all human users and/or automated users 155 of a VPN must be authenticated to the VPN, data utilized within the process control or automation system is exposed only to those components/entities that have been authorized to access the VPN over which the data is delivered. Accordingly, opportunities for externally-initiated cyber-security breaches and the spread of malware are significantly decreased as compared to present-day systems, or even, in some cases, are eliminated.

Still further, as access to selected functionalities provided by the NGPCAS 100 is provided to users 155 via APIs 160, and as users 155 must be authenticated to a VPN 158 and optionally authenticated to utilize particular APIs 160 as discussed above, cyber-security risk is even more significantly decreased as compared to the cyber-security risks of present-day systems. For example, such security techniques utilized within the NGPCAS 100 eliminate the need for any NGPCAS-specific software to be installed on some external computing devices (such as those operated by human users). That is, such external computing devices may have no (e.g., zero) installed, NGPCAS-specific software, thereby eliminating another possible avenue for cyber-security breaches. In another example, computing devices which are operated by users 155 (human or automated) may be authenticated to a VPN 158 that is not utilized by any component of the NGPCAS 100. That is, the VPN(s) that are utilized by users 155 (and optionally by the APIs 160 which are exposed to the users 155) and the VPN(s) that are utilized by other, non-user components and/or entities of the NGPCAS 100 may be mutually exclusive VPNs, thereby further eliminating other possible avenues for cyber-security breaches. In yet another example, unauthorized (but otherwise valid) users 155 may be prevented from any access at all (including read-only access) to the NGPCAS 100 or portions thereof.

Example Identity Security Features of the NGPCAS

As previously mentioned, each component of the NGPCAS 100 (each containerized component/MEEE/granule 140, each physical component 135, each device 105, 125, 108, 128, 148, each location 115, 118, the compute fabric 145, the architecture provider/manager 161, or generally speaking, any component which may serve as an endpoint within NGPCAS 100 networks) may be uniquely identified within the NGPCAS 100 by a unique network identifier. In embodiments, the unique network identifier of a subject component is based on an identification of the subject component as defined within a configuration database of the NGPCAS 100. In a manner similar to that discussed above for the users 155 of the NGPCAS 100, each component may be authenticated and authorized based on its unique network identifier in order for the component to access one or more VPNs, to communicate with one or more nodes, configured containers, locations, devices, and/or other components, etc. Generally speaking, components of the NGPCAS 100 (e.g., all components of the NGPCAS 100) having unique network identifiers can be discovered within the NGPCAS 100 and may be required to utilize a respective certificate to be authenticated and authorized for access.

At least some of the physical devices 105, 125, 108, 128, 148 included in the NGPCAS 100 may also include a device identifier that is unique across an enterprise, such as described above with respect to FIGS. 5A_5? In these devices, an indication of the association between the device's unique device identifier and the device's unique network identifier may be stored, e.g., within the device itself, in a configuration database of the NGPCAS 100, in a network manager of the NGPCAS 100, etc.

Example Communications Security Features of the NGPCAS

To further secure the NGPCAS 100, all communications that are sent and received via the networks of the NGPCAS 100 (e.g., via the VPNs 130, 158, 162 between various authenticated and authorized components) may be required to be signed and encrypted. Additionally or alternatively, plaintext protocols (such as HTTP) may be forbidden or otherwise prevented from being utilized within the NGPCAS 100. For still further security in arrangements in which an architecture provider/manager 161 manages multiple NGPCASs 100 for multiple enterprises, each enterprise may have a different Certificate Authority (CA), and self-signed certificates may be forbidden or otherwise prevented from being used. Generally speaking, to maintain security within the NGPCAS 100 over time, certificates may support revocation, have modifiable key sizes (e.g., to support system growth), and may auto-refresh without any enterprise intervention.

Example Compute Fabric Security Features of the NGPCAS

With particular regard to securing the compute fabric architecture 400 and components thereof, various security techniques may be employed within the NGPCAS 100. For example, as mentioned above, containerized components/MEEEs/granules 140 of the compute fabric 102/400 (e.g., APIs 160, 165; services and subsystems 435, 438, 440 448, 413 442 at the software defined application layer 412; services and functions 415, 418, 420, 422, 425, 452, 455, 458, 460 at the software defined network layer 410; APIs 428, 432 and/or other services provided at the adaptor layer 430, etc.) may be configured for client certificate access, where the client may be, for example, another containerized component/MEEE/granule 140, a user 155, or the architecture provider/manager 161. That is, no anonymous access to containerized components/MEEEs/granules 140 may be allowed, and only certain clients may be provided access to certain containerized components/MEEEs/granules 140 (e.g., via corresponding client certificates). Further, client certificates may be automatically and frequently rotated. Additionally, in embodiments, unused features (e.g., applications, services, etc.) may be placed in a disabled (not enabled) state.

Further, containerized components/MEEEs/granules 140 may be signed and scanned regularly for known vulnerabilities. Containerized components/MEEEs/granules 140 may be required to execute or run (e.g., always run) with least privilege, and the runtime of containerized components/MEEEs/granules 140 may be required to utilize a maximum level of container isolation, e.g., by default. In some implementations, the definition of groupings of containerized components may be prevented or restricted. For example, the NGPCAS 100 may be allowed to only define groups of containerized components that are specifically related to process control system components. For instance, a group of containerized components utilized for a bioreactor maybe defined or configured as a bioreactor grouping (e.g., by using a pod or other suitable mechanism provided by the operating system 410 of the compute fabric 400) so that the bioreactor grouping of containerized components can be co-located and moved together, e.g., to execute on different nodes, clusters, segments, etc.

At the physical layer 405 of the compute fabric 400, access to different nodes Ny, different segments of hardware, different clusters C1, . . . Cn, etc. may be controlled, e.g., on a server-basis, on an API-basis, etc. Still further, static data and disks may be encrypted at rest.

Example Hardware Security Features of the NGPCAS

In embodiments, field devices, hardware I/O devices, gateways, and other devices may include one or more forms embedded device identification ("EDID"). In the same way that a serial number indicates a specific instance of a product, and may indicate additional information about the model, options, or other data about the product, the EDID is associated with and/or indicates an individual instance of a device or product and/or may be associated with and/or indicate additional information. As will be described below, the EDID may facilitate faster and less labor-intensive commissioning of process plants, in addition to a variety of security and other benefits.

Figure 5A:
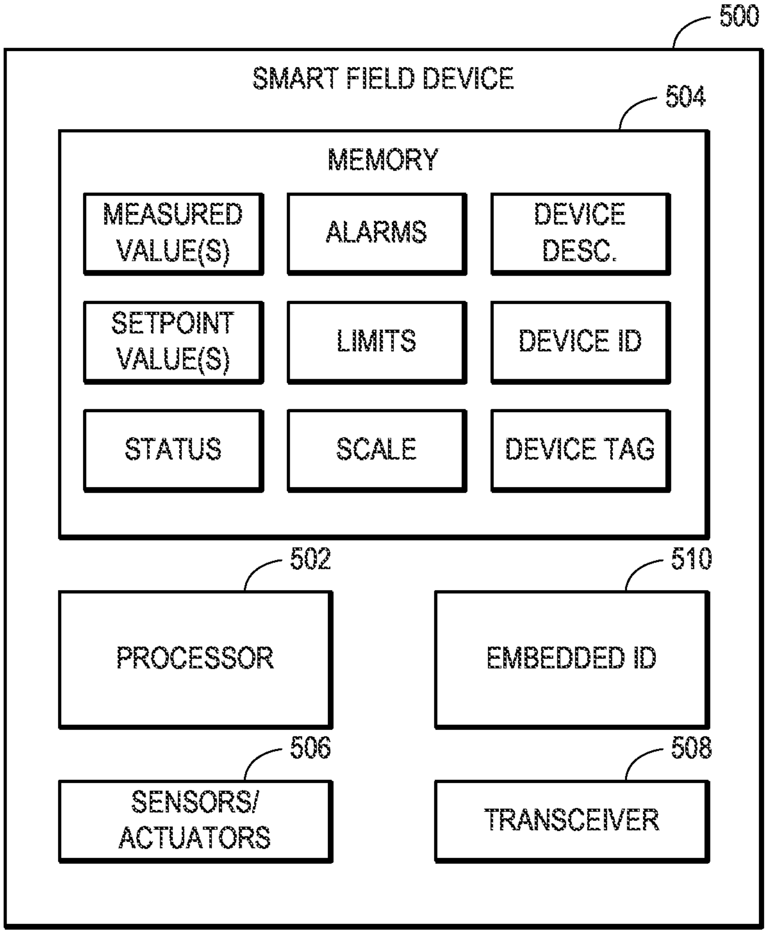
FIG. 5A is a block diagram depicting a smart field device implementing an embedded device identification (EDID).
Figure 5B:
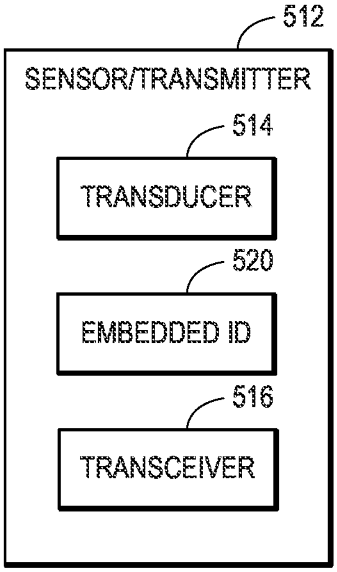
FIG. 5B is a block diagram of a sensor/transmitter device implementing an EDID.
Figure 5C:
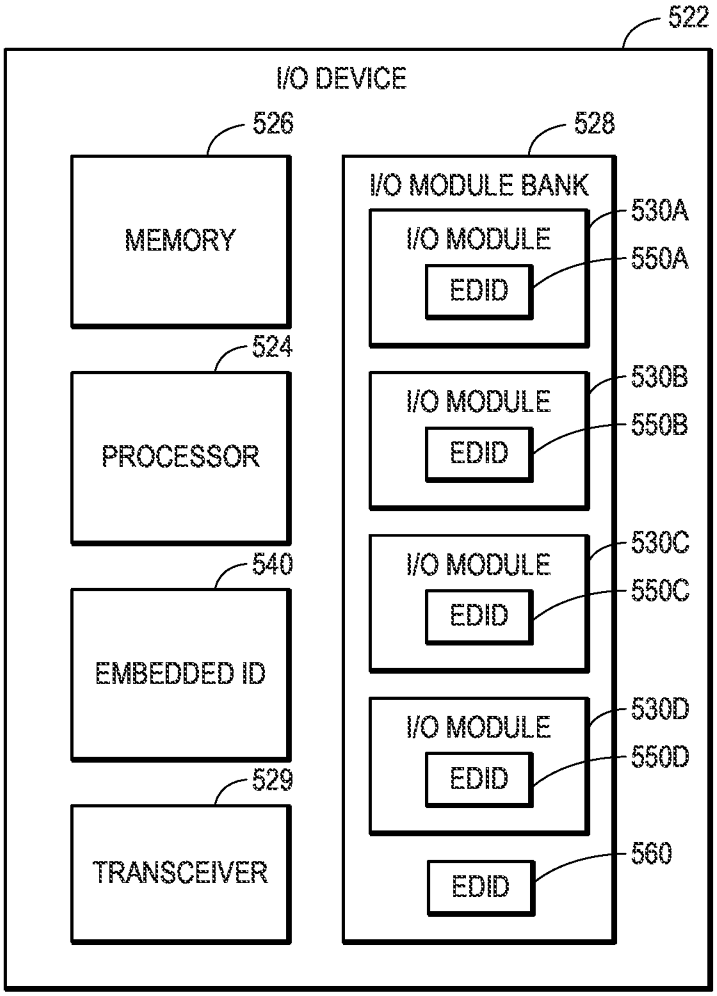
FIG. 5C is a block diagram of an I/O device implementing an EDID.

FIGS. 5A-5C illustrate the implementation of an EDID in various types of hardware devices. FIG. 5A, for example, is a block diagram depicting a smart field device 500, such as a Foundation Fieldbus device. As should be understood, the smart field device 500 may be any number of device types includes valves, valve controllers, sensors, transmitters, or any other type of field device having a process, a memory, and a communication channel capable of communicating multiple types of data (settings, measured values, calculated values, device tags, etc.). The smart field device 500 includes a processor 502, one or more memories 504 storing a variety of data (e.g., measured values, setpoint values, status information, scale information, limit values, alarms, device descriptors, device IDs, device tags, and the like) readable according to the Foundation Fieldbus protocol, as would readily be appreciated by those of skill in the art. The smart field device 500 also includes one or more sensors and/or actuators 506, and a communication transceiver 508, as would be understood. In the smart field device 500 depicted in FIG. 5A, the device also includes an embedded device ID (EDID) 510.

FIG. 5B is a block diagram depicting a sensor/transmitter device 512. The sensor/transmitter device 512 includes a transducer 514 operable to measure a parameter, and a transmitter 516 operable to transmit to a receiving device (e.g., an I/O card, a smart field device, a gateway, a service operating on the computing fabric, etc.) an indication of the measured parameter. The sensor/transmitter 512 also includes an EDID 520.

An I/O device 522 is depicted in the block diagram of FIG. 5C. The I/O device 522 depicted in the figure is of a type commonly known in process control (excepting for the inclusion of one or more EDIDs), and may facilitate conversion of one or more I/O signals from one or more respective field devices into signals that may be forwarded to a control device or service (e.g., a controller service operating in the compute fabric), and conversion of one or more signals from a control device or service into signals that may be forwarded to the respective field devices. The I/O device includes a processor 524, a memory 526, and a bank 528 of I/O modules 530A-530D, each of which couples a respective field device to the process control system through the I/O device 522. The I/O device 522 also includes one or more EDIDs 540, 550, 560. The EDIDs 540, 550, 560 included on the I/O device 522 may include a single EDID 540 associated with the I/O device 522 as a whole, an EDID 560 associated with an I/O module bank 528 (e.g., a set of terminals each configured to accept a respective I/O module 530A-530D that couples respective field devices to the I/O device 522), and/or one or more EDIDs 550A-550D each associated with a respective one of the I/O modules 530A-530D. In some embodiments, each individual component—I/O device 522, I/O modules 530A-530D, and the I/O module bank 528—may have an EDID, while in other embodiments only the I/O device 522 may have an EDID, etc. Additionally, while the I/O device 522 is depicted as having four I/O modules 530A-530D, in various embodiments, the I/O device 522 may have more or fewer I/O modules 530, and in other embodiments, the I/O device 522 may utilize another means (i.e., other than I/O modules) of coupling the field devices to the I/O device 522.

Each EDID 510, 520, 530, 540, 560 is a built-in unique identity for the device. While, in embodiments, the EDID 510, 520, 530, 540, 560 may include multiple pieces of information, in preferred embodiments, each EDID 510, 520, 530, 540, 560 is simply a unique identifier that is associated in a relevant database with other relevant information about the device. The EDIDs 510, 520, 530, 540, 560 may be embedded on their respective devices in any number of ways. For example, in embodiments, the EDID 510, 520, 530, 540, 560 is burned into a non-volatile read-only memory (e.g., an EEPROM, UV-ROM, etc.). In other embodiments, the EDID 510, 520, 530, 540, 560 is hard-wired into the device at the level of the printed circuit board (PCB) by, for example, a series of shorted and/or open signals. In still other embodiments, the EDID 510, 520, 530, 540, 560 may be embedded within a chip at manufacture. In still other embodiments, the EDID 510, 520, 530, 540, 560 may be the result of a physically unclonable function that utilizes variations in the manufacturing process of one or more components to generate what is essentially a random value. Regardless of the means of embedding the EDID 510, 520, 530, 540, 560 in the respective device, the EDID 510, 520, 530, 540, 560 is generally difficult to modify and/or over-write without, at a minimum, opening the device to access the device's internal hardware.

Figure 5D:
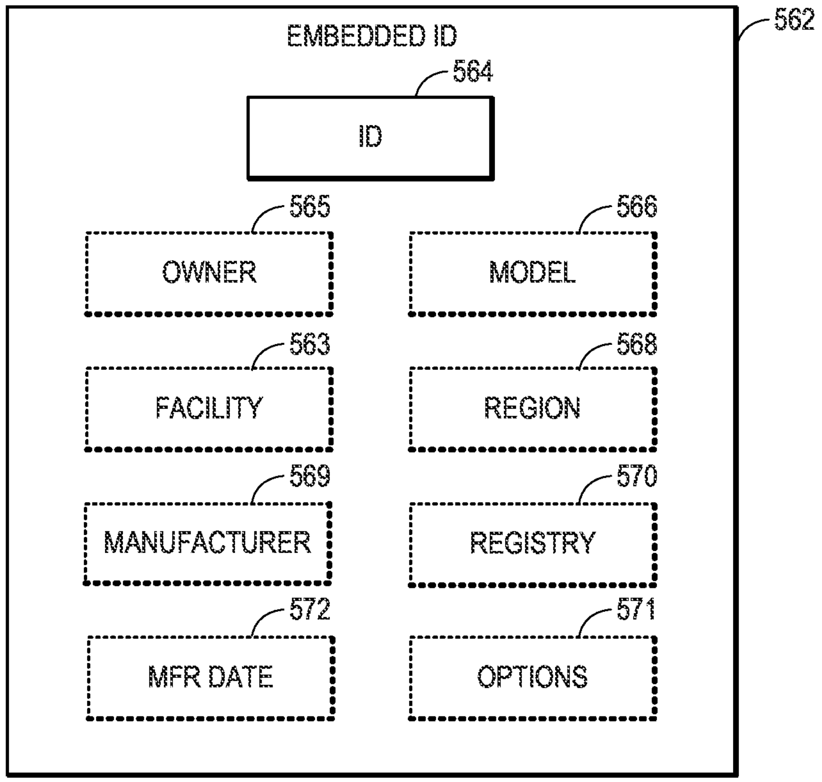
FIG. 5D depicts example information that may be stored as an EDID.

FIG. 5D depicts an example EDID 562 that may be embedded on a hardware device. The EDID 562 may include only or at least a unique identifier 564. However, in instances in which the EDID 562 includes multiple pieces of information, the information may be stored on the device as a series of values. Example optional values (indicated by the dotted line boxes) that may be included in the EDID 562 include values indicative of: the owner/enterprise/customer 565 associated with the device, the model 566 of the device, a facility 567 associated with the device, a geographical region 568 associated with the device, a manufacturer 569 of the device, a registry 570 associated with the device, one or more options 571 present on the device, the manufacturing date 572 of the device, etc.

Figure 5E:
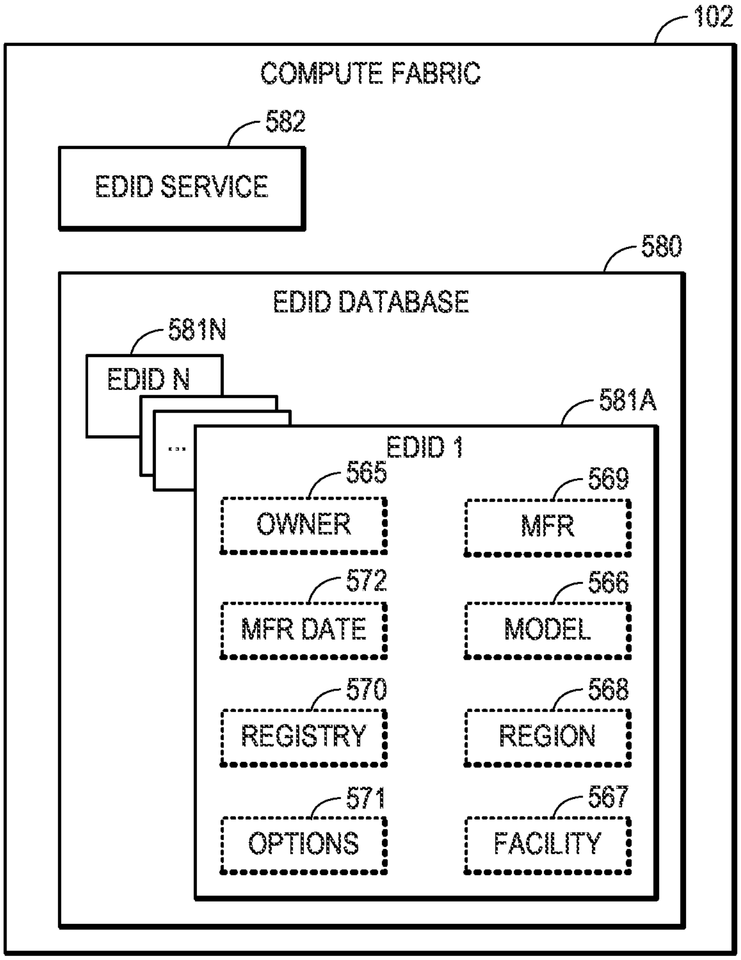
FIG. 5E is a block diagram depicting components in a compute fabric that may allow a process control system to use the EDIDs to secure and/or commission a process plant.

Particularly in embodiments in which the EDID on the device includes only a unique ID, a database 580 may associate each EDID with the values indicative of the various information 565-572 as desired and as depicted in FIG. 5E. The various information 565-572 associated with each EDID may be stored in the database 580 upon sale of the device, upon shipping of the device, or even dynamically upon first use of the device. The database 580 may be stored, for example, on the compute fabric 102 and accessed by an EDID service 582 that may be responsible, in whole or in cooperation with other services, for authenticating and/or determining whether to allow the devices to operate in a particular process control system.

In embodiments, upon connection to the compute fabric 102 (e.g., upon commissioning, process start-up, reboot, etc.) each hardware device must authenticate to the system. A discovery service operating on the compute fabric 102 requests and/or receives and/or discovers from each hardware device its EDID. The discovery service transmits to the EDID service 582 (which may or may not be separate from the discovery service, in embodiments) each EDID received and, querying the database, determines one or more pieces of information associated with the EDID to determine whether to validate the EDID and, by extension, the device associated with the EDID. By way of non-limiting example, the EDID service 582 may determine: whether a given EDID is associated with the owner/enterprise/customer associated with the process plant in which the device is located; whether a given EDID is associated with the geographical region in which it is presently operating; whether a given EDID is installed at a facility for which it was intended; etc. In the event that the EDID service 582 determines that the device is valid/validated, the EDID service 582 may communicate to other services (e.g., security services, certificate authority services, etc.) that the device should be allowed to operate within the system (or to operate at all). Alternatively, if the EDID service 582 determines that the device is invalid, stolen, counterfeit, off-site, in the wrong plant, in the wrong geographical region, etc., the EDID service 582 may communicate to the other services not to allow the device to operate within the system and, in some embodiments, may remotely disable the device rendering it completely inoperable.

In this manner, the EDID may be utilized to increase security by making it more likely that devices operating in the secure environment of a process plant are of a known origin before issuing security certificates that allow the devices to connect to the secure networks over which devices and services communicate across the compute fabric 102. That is, devices that are not validated will not be granted certificates by the certificate authority. The EDID may also be utilized to prevent black market sales of devices (e.g., to contravene sanctions or trade restrictions), to deter theft, to prevent reverse engineering, to prevent counterfeiting, etc., by disabling or otherwise preventing from running any device that is off-site (not in the possession of the associated customer, not at the associated plant, not in the associated geographical region, stolen, etc.)

The implementation of the EDIDs 510, 520, 530, 540, 560 may also facilitate improved commissioning of process plants. In embodiments, the information associated with each EDID may include information about the configuration of the field device and/or the options installed on the field device. In embodiments, the information associated with each EDID may include one or more device tags and/or one or more control modules associated with the field device. As such, the discovery/EDID service may be able, based solely on the EDID, to determine, for a particular process, which services should send data to and receive data from the field device, may configure I/O services for the field device, may set up appropriate secure connections between the device and other components, etc. In short, the use of EDIDs may allow process plants to be brought online to produce products in less time (and therefore with less expense).

Figure 5F:
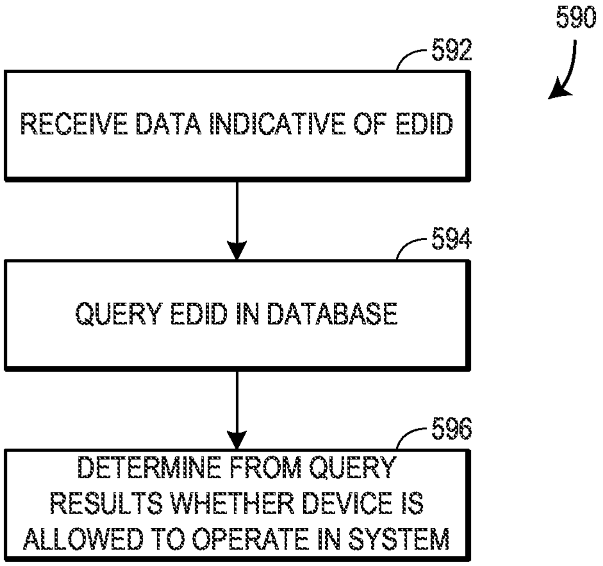
FIG. 5F is an example method for implementing EDIDs in a process plant.

FIG. 5F depicts an example method 590 for implementing the use of an EDID in a process control system. The method includes receiving data indicative of an EDID (block 592), querying in a database the received EDID (block 594), and determining from the query results whether the device is allowed to operate in the system (block 596).

Other Example Security Features of the NGPCAS

In addition to the security features described above, the NGPCAS 100 may include one or more other security features that protect other functionalities and aspects of the system 100, at least some of which may be provided out-of-the box, and at least some of which may be customized and adjusted, e.g., by enterprise agents, by system provider agents, etc. Such security features may include, for example, role-based access control (RBAC) of various applications and human users, service principles, security policies, security audit logs (and optionally analysis and optimization of data included therein), network security groups (e.g., by application, location, human users, and/or other categories), firewalls, and access control lists (ACLs), to name a few. Further, secrets that are utilized by the system 100 (e.g., keys, certificates, etc.) may be stored in one or more secured vaults.

Figure 5G:
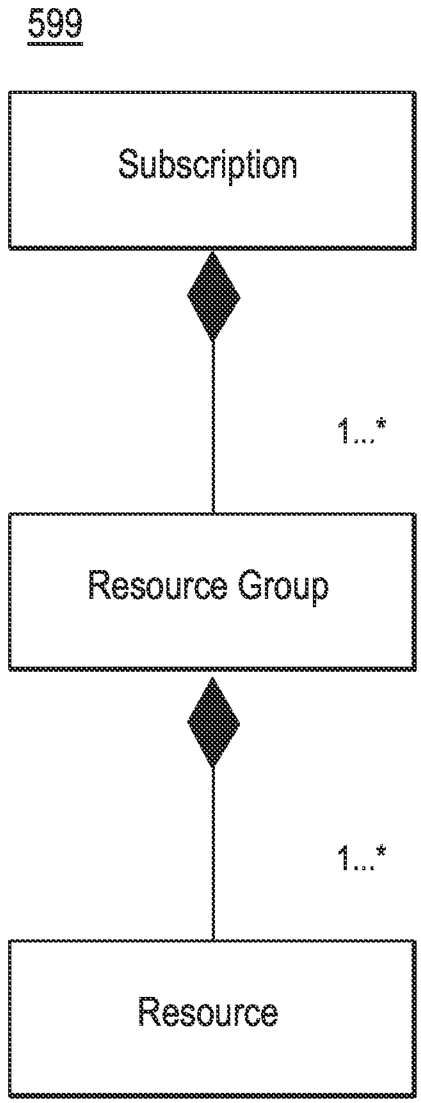
FIG. 5G is an example resource security technique which may be utilized in the NGPCAS of FIGS. 1A and 1B.

Still further, resources of the system 100 may be secured in a leveled manner, such as illustrated in the example resource security technique 599 illustrated in FIG. 5G. Resources, as previously discussed, may include hardware and/or software resources such as components, clusters, nodes, services (e.g., configured containers), etc. At an individual or unitary resource level, each individual resource may be protected (e.g., based on its identity, using keys and certificates, etc.) in manners such as described above. At a higher level, resources may be grouped (e.g., in manners such as described above), and each resource group may be secured and protected as a group (e.g., by group identities, keys, certificates, etc.). Groups of resources may be defined and/or created based on any category, such as by location (e.g., on premises with field devices, at a remote location, in the compute fabric, etc.), by functionality, by time of day, etc. At a still higher level, subscriptions to various individual resources and/or to various resource groups may be utilized, so that only users that have subscribed to a particular resource or resource group may access the particular resource or resource group. That is, access to particular resources or resource groups may be limited to only those users that have subscriptions thereto, thereby providing further security to the system 100. It is noted that an individual resource may be included in one or more different resource groups and/or be accessed via one or more different subscriptions. Additionally, it is noted that the resource security technique 599 may be applied on-premises at locations at which field devices are disposed, off-premises at other physical locations, and/or in the compute fabric, as desired. Of course, other resource security techniques may be additionally or alternatively utilized in the NGPCAS 100.

Additional Architectural Features of NGPCAS

Due to the decentralized and highly configurable nature of the compute fabric of the NGPCAS described herein, the NGPCAS for a particular enterprise may be configured or set up by an enterprise to enable new types of data management and execution management to be performed within the compute fabric, which enables an enterprise to uniquely configure global, or inter-plant data flow and execution management in manners not possible with previous control systems. In particular, the compute fabric of an enterprise that has multiple physical plants or locations can be set up in a hub and spoke configuration in which multiple different compute fabric "hubs" may be created to support various different physical locations or plants which are connected to the hubs via communication networks which implement the communication "spokes." Each hub may have compute resources confined to or implemented in a particular geographical or sovereign region. These regions may be, for example, continents (e.g., North or South America, Europe, Africa, etc.), countries (e.g., the United States, Russia, China, Australia, Germany, France, etc.), states or defined regions of a particular country (e.g., California, Florida, etc.) or any other geographical or geo-political region. In this case, the compute fabric hardware may be implemented in a cloud environment or at other physical locations that is physically disposed in or contained within a particular region (or a particular set of regions) to form a compute hub. Each compute hub may be connected to one or more physical locations or plants of the enterprise via the communication infrastructure described herein that forms a spoke from the compute fabric hub to the physical location. In some cases, more than one compute fabric hub may be connected to the same physical location and each such compute fabric hub may receive all or a subset of the data from that physical location. Moreover, in some cases, a compute fabric hub may connect to one or more physical locations within the same region as the hub via one or more communication spokes, and/or may connect to physical locations in one or more different regions than the hub via other communication spokes.

Figure 6A:
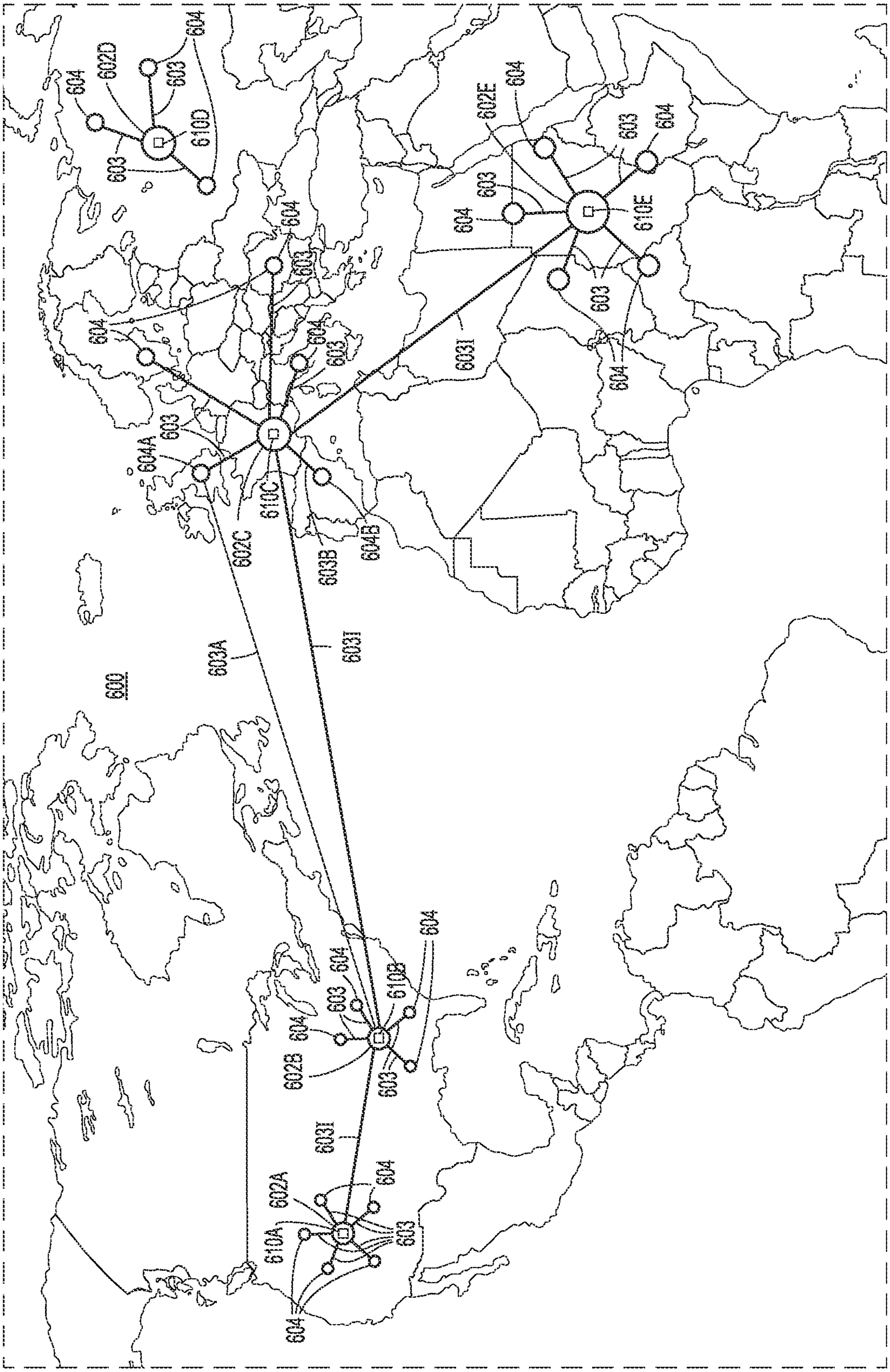
FIG. 6A illustrates an example manner in which an enterprise may implement the NGPCAS described herein using compute fabric hub and communication spoke configurations to support a plurality of different physical locations which may use different data and execution governance rules.

FIG. 6A illustrates an example enterprise NGPCAS system 600 having a number of compute fabric hubs 602 located in various regions, in this case countries or common political regions (e.g., the European Union), connected to various physical locations via one or more communication spokes 603. In this example, the enterprise includes two compute fabric hubs 602A and 602B located in the United States, one compute fabric hub 602C located in Europe (e.g., in one or more countries associated with the European Union (EU)), one compute fabric hub 602D in Russia and one compute fabric hub 602E in Africa. Each of the compute fabric hubs 602 includes one or more terminal communication spokes 603, with each terminal communication spoke 603 going from a hub 602 to a physical location 604. As will be understood, the spokes 603 associated with a particular hub 602 may connect the hub 602 to different physical locations which may be in the same region or within different regions as the hub 602. Moreover, if desired, one or more communication spokes 6031 may be disposed or configured to provide communications between two hubs 602 to enable direct inter-hub communications. In this manner, data received from a particular physical location 604 at a first hub 602 via a communication spoke 603 at that hub 602 may be routed to a second compute fabric hub 602 via an inter-hub spoke 6031. Likewise, communications from a first hub 602 (such as control signals, data requests, configuration changes, etc.) may be sent to a particular physical location 604 by a first hub by sending that data via an inter-hub spoke 6031 to a second hub 602, which may then provide that communication to a physical location 604 via a communication spoke 603 established between the second hub 602 and the physical location 604. As illustrated in FIG. 6A, a particular compute fabric hub 602, such as the hub 602A, may in some cases only include terminal spokes 603 to physical locations 604 in the same region (for example, the United States). Of course, in other cases, a particular compute fabric hub 602, such as the hub 602B, may include terminal spokes 603 going to physical locations 604 in multiple different regions (such as to physical locations in both the US and the EU). Likewise, such as the case with hubs 602B and 602C and the physical location 604A, multiple different hubs 602 may be connected through different spokes to the same physical location 604.

Importantly, this hub and spoke configuration enables data and execution management to be configured and maintained separately at each compute fabric hub 602 to enable an enterprise having physical locations in multiple different regions comply with various different laws or data governance rules within the particular regions at which the physical locations and/or the compute fabric hubs 602 are disposed. For example, different regions (such as the United States and the EU) may have different data privacy, data export and data management laws and regulations, and so it may important to separate and track the different data that is sent to and stored at a particular compute fabric hub 602 for treatment and handling in a manner that is in compliance with appropriate laws and regulations of the hub 602. However, these laws and regulations typically apply only to data at rest, and not to data in motion. The hub and spoke structure described herein therefore also enables data (either all of the data or some subset of the data) collected by devices at a particular physical location to governed by a set of data privacy laws associated with one particular region by enabling that collected data to be sent to and only stored at a compute fabric hub 602 located in a region at which the data privacy laws and regulations are to be applied. Thus, data collected at a physical location 604A disposed in the EU may be sent directly to a compute fabric hub 602B, for example, in the United States, without being stored at the hub 602C at the EU. In this case, a direct communication spoke 603A may be established between the hub 602B in the United States and the physical location 604A in the EU and this data may or may not be sent to or stored in the hub 602C in the EU. However, in another case, the data from the physical location 604B in the EU may be first sent via a spoke 603B to the hub 602C in the EU. However, the compute fabric hub 602C in the EU may immediately send that data via the inter-hub communication spoke 6031 to the hub 602B in the United States without storing that data, to thereby assure that the data is not governed by the data laws and regulations in the EU.

Of course, the hub and spoke configuration described herein may also or instead be used to manage or direct execution and operation activities at various different hubs and/or at various different physical locations using the same concepts. For example, different compute fabric hubs 602 may manage the execution of applications and services and provide for or manage user or application authorizations differently by storing and applying different sets of rules or policies to be implemented by each compute hub 602 at the physical locations 604 to which the hubs 602 are connected. The ability of each compute fabric hub 602 to be able to store and to apply different data governance, application and other system execution rules provides for great flexibility within the enterprise in managing and storing data and in managing and controlling application execution differently at different physical locations 604 and at different compute fabric hubs 602. This feature therefore enables different configuration paradigms to be used at each different hub 602 or even at each different physical location 604, even though each of the different hubs 602 or physical locations 604 are associated with the same enterprise.

Generally speaking, to perform these data and execution management activities, the compute fabric for a particular hub 602 stores a set of rules, such as data governance rules, execution rules, access authorization rules, etc. (illustrated as components 610A, 610B, 610C, 610D and 610E at the hubs 602A, 602B, 602C, 602D and 602E, respectively), which are then implemented or applied automatically by the appropriate compute fabric components at the hubs 602A to 602E to manage data flow, application and services execution, user and services authorizations, etc. Moreover, the architecture provider/manager may provide an interface for each hub 602 to enable the enterprise (e.g., one or more authorized configuration engineers associated with the enterprise) to define, set up and store the data governance and execution rules 610 to be used at each of the hubs 602.

Figure 6B:
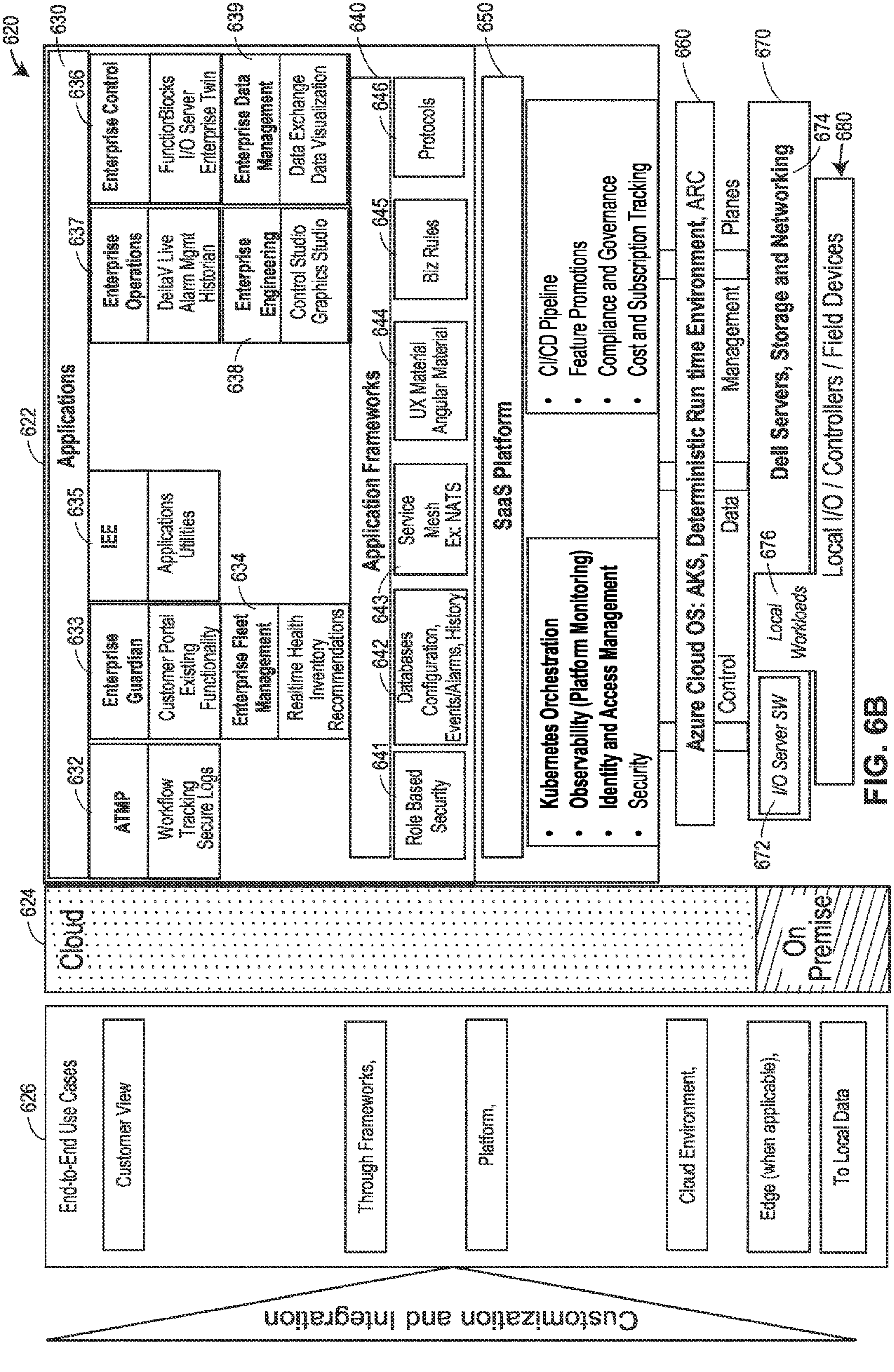
FIG. 6B is a chart illustrating an example system hierarchy associated with an enterprise using the NGPCAS described herein.

FIG. 6B is a chart 620 illustrating an example system hierarchy associated with an enterprise using the NGPCAS described herein and illustrating the manner in which the various different components of the NGPCAS system, as described herein, are related and may be implemented in the structural elements described herein. In particular, as illustrated in FIG. 6B, the chart 620 includes three columns with the right-most column 622 including software, hardware and firmware components associated with the NGPCAS listed in a hierarchical grouped view, with the middle column 624 indicating the physical or virtual execution location of the associated elements in the column 622, and with the left-most column 626 indicating the purpose or operation of the elements in the column 622. Thus, as illustrated in FIG. 6B, the column 622 includes applications 630 providing a customer or enterprise view (as indicated in the column 626) into the NGPCA, with the applications 630 being stored and executed in the compute fabric in a cloud environment (as indicted in the column 624). The applications 630 may include any customer or enterprise facing and accessible applications including, for example, one or more ATMP applications 632, providing workflow tracking and secure logs for, for example, one or more batch processes or production facilities; one or more Enterprise Guardian applications 633 which provide customer portals into exiting functionality in the enterprise; one or more Enterprise Fleet Management applications 634 which provide and track the real-time health and inventory status of enterprise equipment and which may make recommendations for changes, updates, etc., and one or more Utilities applications 635 (such as an IEE application). Still further, the applications 630 may include one or more enterprise control applications 636 (which may include any of the process control elements described or mentioned herein such as containerized control modules, containerized function blocks, enterprise or device twins, etc.) Likewise, the applications 630 may including one or more operations applications 637, engineering applications 638 and data management applications 639. The operations applications 637 may include applications that enable insight into and control of process operations such as a DeltaV Live application, operator interface applications, alarm management applications, data historian applications, etc. Likewise, the engineering applications 638 may include control and graphics configuration applications for defining and configurating control routines and user interfaces for control operations. The data management applications 639 may include data exchange and data visualization applications to enable enterprise users to obtain access into and/or a view of data within the enterprise. Of course, any other desired applications, such as device maintenance applications, could be included in and supported in the NGPCAS at this level. As noted in column 626, the applications 630 are user facing and so are visible and used directly by the authorized users of the enterprise.

Additionally, as illustrated in FIG. 6B the NGPCAS includes a set of application frameworks 640 which support and enable the applications 630 and which are implemented, in this case, in a cloud environment which is used as at least part of the compute fabric for the enterprise NGPCAS. The application frameworks 640 may include, for example, frameworks which provide, manage and implement role based security (application access) 641, database (such as event and alarms databases, historians, etc.) access, configuration and support 642, service mesh frameworks 643, material support databases 644, business or other rules 645 to be applied by the applications 630, and protocol support frameworks 646 which support communication protocol use and translations. The rules 645 may define the data governance and application execution rules described with respect to FIG. 6A. Of course, the frameworks 640 described herein are only an example set of frameworks which can be used and supported in the NGPCAS, and other frameworks can be included or used as well or instead. Moreover, while the frameworks 640 are configurable and accessible by the enterprise, these frameworks 640 are not directly user facing but instead support the user facing applications 630.

Still further, the NGPCAS of the chart 620 includes one or more platforms 650, which may be implemented as software as a service (SaaS) platforms in a cloud environment of the compute fabric (as illustrated by the column 624) to implement and support the application frameworks 640 and applications 630. The platforms 650 may include, for example, Kubernetes (or other) container management and orchestration platforms, observability and platform monitoring platforms (used by one or both of the enterprise or the architecture provider/manager), identity and access management platforms, security management platforms, CI/CD pipeline platforms, feature promotion platforms, compliance and governance rule storage and implementation platforms (such as the rules 610 described with respect to FIG. 6A), cost and subscription tracking platforms, etc. Of course, the platforms 650 listed or described in FIG. 6B are examples only and may be used to support the various features of the NGPCAS described herein. However, other platforms may be used or provided as well. Moreover, the platforms 650 need not necessarily be implemented as SaaS platforms. As will be understood, the platforms 650 are managed by the architecture provider/manager with input from the enterprise.

Still further, as illustrated in FIG. 6B, the NGPCAS hierarchy includes cloud support structure 660 for implementing the cloud environment as part of the compute fabric. In particular, the cloud, environment support structure 660 include, for example, a Microsoft® AZURE cloud operating system which implements an AKS or deterministic runtime environment, and ARC services, as described herein. Of course, other cloud environment support structure or services could be used or provided as well or instead, and the NGCPAS described herein and is not limited to the listed cloud support structures 660. Of course, as illustrated in FIG. 6B, the cloud environment 660 provides control, data and management planes (via VPN or other communication connections) to edge devices 670, which are, as illustrated in the column 624, located on premise at various different physical locations. The edge devices 670 may include, for example, I/O or other servers 672, data, networking and storage servers 674 (such as data aggregators and/or VPN gateways), and local workload servers 676, which may be connected to local hardware 680, such as local controllers, field devices and other on-premise hardware, as illustrated by the column 624. Of course, the edge elements 672, 674 and 676 and the local hardware, such as controllers, I/O devices and field devices, are located on premise to generate, measure or provide local access to data and to perform other activities, such as control, maintenance and support activities.

As will be understood, the hierarchical structure of FIG. 6B illustrates a manner in which all of the required applications, services, containers, microservices/MEEEs/granules, platforms, software, etc. which has been described herein as being part of the NGPCAS can be implanted to provide a complete process control and application services system for an enterprise, with the components of this system being distributed within the compute fabric (in this case illustrated as a cloud environment) and at one or more physical locations or facilities. More particularly the graph 620 of FIG. 6B illustrates a manner in which the user facing applications, including control applications, maintenance applications, data storage and tracking applications, process control and configuration applications, management applications, workflow management applications, etc. can be layered onto and incorporated into the NGPCAS be operate in an execution environment.

Configuration and Support Features of NGPCAS

As will be understood, the NGPCAS as described herein provides for or enables the software implemented components thereof to be highly configurable, transportable and editable, as most of the control and support components (e.g., control modules, containers, etc.) are located in and are executed in the compute fabric without needing to be tied to specific or predetermined computer hardware (e.g., specific servers, processors, computer nodes, etc.) This feature enables system set up and configuration activities to be performed more quickly and easily than traditional control systems, as it enables enterprise system owners or managers to store configuration components for their systems in the compute fabric, to access these components from anywhere, to copy these components to create or add additional control system structure associated with, for example, new plants or new physical locations being added to the enterprise, to new hardware installed at an existing physical location, etc. without needing to specify the location of or specifics of the computer hardware used to implement the additional configuration components. Moreover, this architecture enables an architecture provider/manager (also referred to herein as an "APM") to simultaneously oversee the operation of multiple different enterprise systems during operation of those different enterprise systems, which enables the APM to provide both general and specific support for the different enterprise systems. For example, the APM may monitor and capture quality of service statistics and/or other data related to or defining the operation of the various software and hardware components operating in the compute fabric of the various different enterprise systems while these enterprise systems are executing to perform control and manufacturing activities. The APM can provide these measures to the different enterprise systems and can upgrade or change the configuration or usage of the computer equipment within the compute fabric, such as by adding additional compute fabric computer equipment (nodes, servers, computers, processors, etc.), by reducing compute fabric equipment (nodes, servers, computers, processors, etc.), by changing compute fabric equipment (such as using processors with higher processing speeds, larger memories, etc.) or by taking other actions in the compute fabric based on the quality of service metrics, to assure better quality of service or to reduce costs where the quality of service meets expectations (e.g., meets the quality of service metrics promised or guaranteed with a particular enterprise license).

The APM can also provide or implement various data analytic applications on the various different enterprise systems to suggest changes to those systems, which may improve operation of those systems. Still further, the APM may aggregate data from different enterprises and analyze that data to detect trends, problems, etc. and then provide general guidance to particular enterprise systems based on that analysis. The APM may, for example, use data analytics to compare the operation of control systems used for the same or similar products or manufacturing steps from the same or from different enterprise systems to determine which systems or which system configurations run better or worse than each other, which operate better or worse than an average or a baseline system, etc. The APM may then use other data analytics to determine why a particular system is running better or worse, for example, to determine if the variance is related to the presence of different equipment, different control routines, different interactions or configuration set-ups of virtual control components or actual control system hardware, etc. The APM may then produce general guidance or best practices for one or more enterprise systems based on the knowledge determined in these analyses.

Still further, architecture described herein enables faster development of and testing of components to be added to a control system as the architecture enables control or other system containers or products to be developed and provided in a container registry or in a product registry for download and implementation by an enterprise system at the will of and the timing of the enterprise system or the enterprise system manager. Feedback from the operation of these downloaded and implemented containers or products can also be automatically provided back, from the compute fabric of an enterprise, to the developer to test, upgrade and change the container or product as part of the development cycle. This architecture enables or results in a quicker development cycle as it provides for quicker implementation of new features or products and provides for automatic feedback regarding the operation of new or changed components. However, this development is still performed and implemented in a manner that enables each enterprise operator or manager to control when new containers or products are downloaded to and implemented in their systems.

Figure 7:
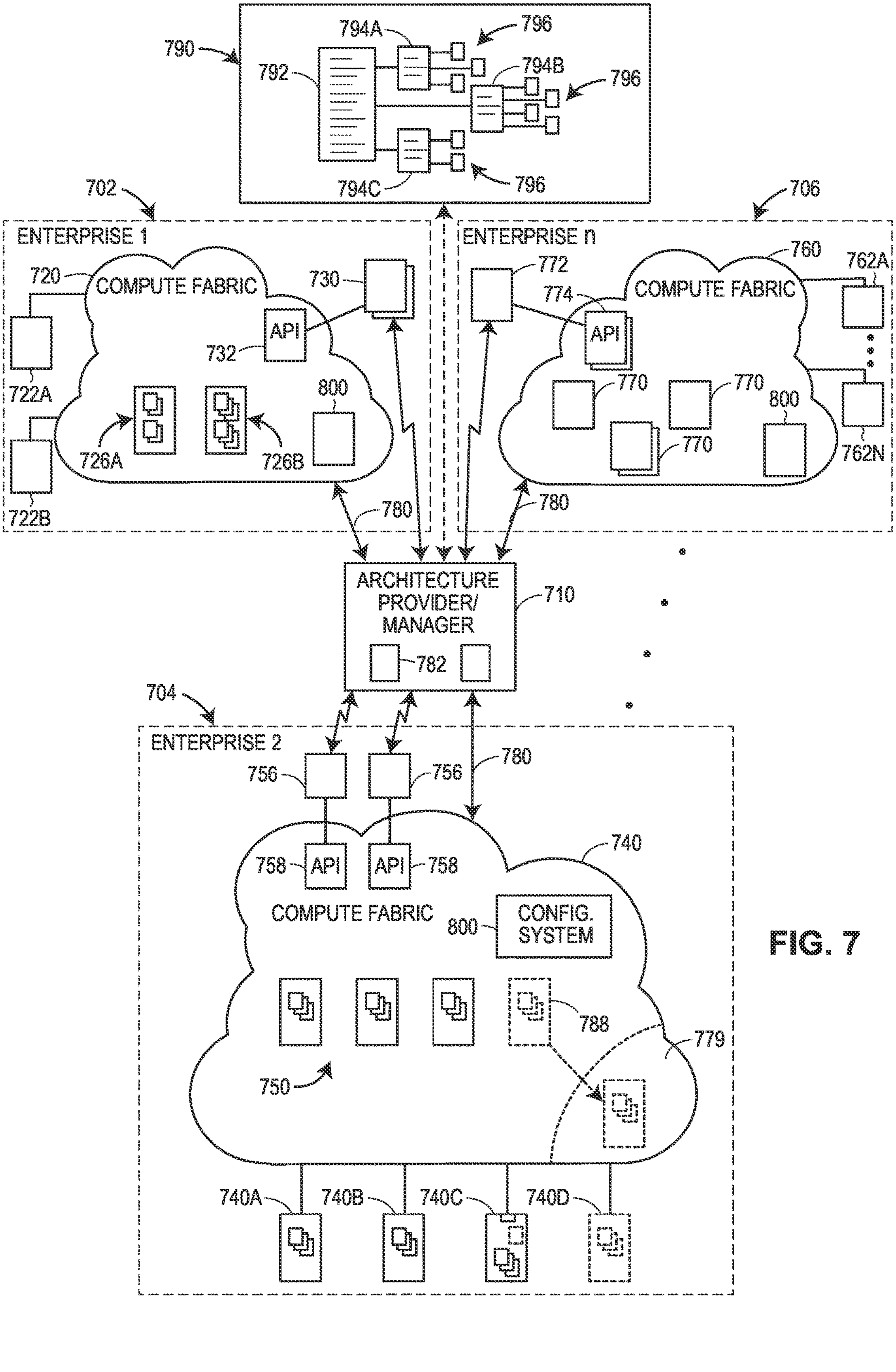
FIG. 7 is a diagram illustrating the interconnections between an architecture provider/manager and a plurality of different enterprise systems each using an NGPCAS of FIGS. 1A and 1B, that enables manager oversite of and quick and easy configuration changes to the different enterprise systems.

FIG. 7 illustrates an overall NGPCAS architecture 700 including a plurality of different enterprise systems 702 (Enterprise 1), 704 (Enterprise 2), . . . 706 (Enterprise n) connected to an architecture provider/manager (APM) 710. In particular, each of the enterprise systems 702, 704, 706, implements an NGPCAS as described herein including a compute fabric and plant hardware at one or more locations, i.e., physical locations, at which gateway devices, I/O devices and field devices are located to perform a manufacturing or factory automation process. As illustrated in the example system of FIG. 7, enterprise 702 includes a compute fabric 720 connected to two physical locations 722A and 722B which may be, for example plants, buildings, areas or other physical locations at which gateway, I/O and field devices are located to perform a process, such as a factory automation or manufacturing process. Likewise, the compute fabric 720 of the enterprise 702 includes multiple different sets of containers as described herein for implementing control and related support features with respect to the equipment at the locations 722A and 722B. In particular, in the example of FIG. 7, the compute fabric 720 includes one or more sets of containers 726A that monitor and control physical equipment at the location 722A and one or more sets of containers 726B that monitor and control equipment at the location 722B. Of course, as described herein, the containers 726A and 726B in the compute fabric 720 could be set up in any desired manner and using any other desired configuration, and do not necessarily need to be separated or grouped based on the physical locations that they control. Still further, the enterprise 702 may include one or more user interfaces 730 which connect to and interface with the compute fabric 720 using one or more APIs 732 within the compute fabric 720. The user interfaces 730 and APIs 732 operate as described herein to enable owners, operators, configuration personnel, etc. of the enterprise 702 to perform configuration, monitoring and control activities with respect to the physical locations 722 using the containers 726 in the manners described previously herein.

Likewise, as illustrated in FIG. 7, the enterprise 704 includes a compute fabric 740 connected to multiple physical locations 740, including locations 740A to 740C which have already been installed. The physical location 740D is illustrated in dotted line to indicate that it will be added using configuration applications and techniques described later herein. Of course, as illustrated in FIG. 7, the compute fabric 740 of the enterprise 704 includes sets of containers 750 which are installed in and which execute in the compute fabric 740 to monitor, control and provide support services for the equipment at the physical locations 742. Still further, users or operators associated with the enterprise 704 may interface with the compute fabric 740 via user interfaces 756 and APIs 758 to perform monitoring, configuration and operational activities with respect to the containers 750 within the compute fabric 740 to, for example, visualize and control the operation of the control systems executed by or implemented by the containers 750 to control the equipment at the physical locations 742. Of course, owners, operators, managers, etc. of the enterprise 704 may interface with the compute fabric 740 in any desired manner as described herein to perform any configuration, control or monitoring function for the enterprise 704.

Still further, any other number of enterprise (as illustrated by the dots in FIG. 7 up to enterprise n 706) each includes a compute fabric 760 coupled to multiple different locations physical locations 762A to 762*n* and includes containers or groupings of containers 770 to perform control and support activities with respect to the locations 762A to 762*n*. Again, the enterprise 706 may enable users to interface with the compute fabric 760 using one or more user interfaces 772 and one or more APIs 774 as described herein.

As illustrated in FIG. 7, the APM 710 is connected via direct secured communication connections 780 into each of the compute fabrics 720, 740, 760 of each of the enterprises 702, 704, 706 via secured communication connections 780. The communication connections 780 may be configured to operate using separate security in any manner described herein, such as using separate VPNs for each of the compute fabrics 720, 740, 760. Importantly, the communication connections 780 provide the APM 710 information about the ongoing operation of, configuration of and associated information with respect to each of the containers, modules, programs, etc. within each of the compute fabrics 720, 740 and 760. Thus, in this manner, the APM 710 has a direct and ongoing connection into the compute fabrics of each of the enterprises 702, 704 and 706 and can use this connection to spin up, allocate, remove, reduce or change computer resources within each of the compute fabrics 720, 740, 760 of each of the enterprise systems 702, 704, 706, respectively. The APM 710 may use the direct and secure connections 780 to license, provide, configure or otherwise establish sufficient computer equipment in the compute fabrics for each of the enterprise systems 702, 704, 706 based on the licenses purchased by the enterprise systems 702, 704, 706. In some cases, the APM 710 may license or use computer equipment in the cloud, such as that provided by a third-party cloud computing provider, e.g., Microsoft Azure. In other cases, the APM 710 may have its own computer resources at one or more locations owned by or operated by the APM 710 that the APM 710 uses to provide computing resources for the compute fabrics 720, 740, 760 of the enterprises 702, 704, 706. In still other cases, the enterprises 702, 704, 706 may provide some or all of the computer resources used in the compute fabrics 702, 704, 706 and enable these resources to be managed by the APM 710. For example, the area 779 within the compute fabric 740 of the enterprise 704 marked with a dotted line indicates that elements executed in this portion of the compute fabric 740 are executed on computer hardware owned by, located at, or provided by the enterprise 704 and may be, for example, computer hardware at one of the locations 740A-740D or at a different facility associated with the enterprise 704.

As will be understood, the APM 710 has a direct and secure connection into the operating networks and compute fabrics of each of the enterprises 702, 704 706, etc. that the APM 710 manages or supports. As such, the APM 710 can simultaneously control the allocation of computer facilities or resources for each of the compute fabrics of any of the supported enterprises. Additionally, the APM 710 may store and execute software or data analytics modules 782 that analyze the operating data, such as metadata, from each of the compute fabrics 720, 740, 760 to calculate or determine various quality of service measurements or statistics for each of the compute fabrics 720, 740 and 760 of the enterprises 702, 704 and 706. In particular, the data analytics modules 782 may determine communication latency, CPU usage, and other computing operational statistics illustrating or defining a quality of service being provided or obtained within any of the compute fabrics 720, 740 and 760 by the computer hardware used in the compute fabrics 720, 740, 760 (regardless of who provides that computer hardware or where that computer hardware is physically located). Such data analytics or quality of service measurements may be used by the APM 710 to make changes to the underlining configuration of compute fabrics as provided by or managed by the APM 710 in order to increase or change the quality of service being provided to an enterprise or to a portion of an enterprise to, for example, meet expected, guaranteed or licensed quality standards, such as those mandated by the agreements between the APM 710 and the various enterprise owners of the enterprises 702, 704 and 706. The APM 710 may make these changes by making configuration changes within the computer hardware of the compute fabrics 720, 740, 760 via the secured connections 780 and/or may interface with any third-party provider of computer hardware or computational facilities used in the compute fabrics 720, 740 and 760, such as with a cloud computing provider like Microsoft Azure. Of course, the APM 710 may change the configuration of, the amount of, the identification of or any other configuration component of computer equipment used in or licensed from a third-party to provide the compute fabrics 720, 740 760 in any desired manner. In this manner, the APM 710 has ongoing control of the quality of service and of the configuration of the computer equipment provided by or licensed by the APM 710 and provided to the enterprises 702, 704, 706 which enables the APM 710 to maintain an adequate or expected quality of service for the control systems used in or implemented by those enterprises.

Likewise, APM 710 may interface directly with user interfaces associated with the different enterprises 702, 704, 706, such as the user interfaces 730, 756 and 772, to enable enterprise managers at the user interfaces 730, 756, 772 to obtain additional licenses for additional compute fabric equipment, to spin up additional compute fabric equipment, and to provide additional or new software products or containers (as developed by the APM 710 or by a third-party developer) to the enterprise owner or manager.

In any event, the APM 710 may analyze the data it receives from the compute fabrics 720, 740, 760 in any desired manner and at any grouping level. For example, as illustrated by the chart 790 in FIG. 7, the APM 710 may obtain and accumulate data from the various different compute fabrics 720, 740 760 of the enterprises 702, 704 and 706 and analyze the data from all of these enterprises together in order to obtain an overall measurement of quality of service being provided by the APM 710. This combined enterprise data is illustrated in the chart 790 by the block 792. Additionally, the APM 710 may analyze the data from each compute fabric 720, 740 760 separately to provide statistics or quality of service measurements on an enterprise by enterprise basis and may communicate with each enterprise separately to provide each enterprise with measurements of the quality of service or other statistical measurements associated with an entire enterprise. Such measurements or data is illustrated by the charts 794A, 794B and 794C for the enterprises 702, 704 and 706, respectively. Still further, the APM 710 may perform or determine analytical measurements or other analysis (such as quality of service measurements) on a physical location by physical location basis for a particular enterprise (as illustrated by the charts 796 of FIG. 7), on a control system by control system basis, on a set of container by set of container basis, on a container by container basis or in any other manner or based on any other groupings of components within or associated with the containers, modules, programs, control systems, etc. being executed in the compute fabrics 720, 740, 760. Of course, the APM 710 may break out or perform analyses in any other desired manner or perform analyses associated with any other groupings of plant hardware, software, containers, compute fabric hardware, etc. If desired, an enterprise owner may contract for or be provided with different reports according to various predetermined or desired groupings of hardware and/or software elements (at any level) within the compute fabric for that enterprise.

The APM 710 may additionally perform other types of analytics on any groupings of data associated with one or more of the enterprises to which the APM 710 is connected and may provide suggestions to the enterprises about potential changes to be made within the enterprises to increase performance, quality etc. within the enterprise or some component of the enterprise (such as at a physical location, a set of control systems, a control loop, a group of control loops of similar function, etc.) For example, the APM 710 may analyze the operation of one or more groupings of hardware, software, control systems, control loops, containers, etc. implemented within one or more enterprises to determine changes that may be made to improve control within the enterprise(s). As a particular example, the APM 710 may analyze data related to the operation of a control loop or a set of control loops within an enterprise, such as control loops used to control specific hardware at one or more plant locations, and may analyze timing signals, process variable measurements, response times, control loop statistics, etc. to determine if one or more changes to the analyzed components might provide for better performance in some manner. The APM 710 may use the results of the analyses to suggest various hardware and/or software configuration changes to be made, operations that may be performed, or actions that may be taken (such as running a tuning procedure), etc. to provide for better control operation, for example, to better control signal timing, variability, quality of product, cost of operations, etc. In some cases, the APM 710 may suggest new or different types of control or control loop algorithms, new tunings of process control devices or control loops, additional control algorithms or different control algorithms that might be useful, different equipment that might be used, different control hardware or software configurations, such as changing pinning or assigning of containers or groups of containers executed in the compute fabric, etc. Again, the analysis may be performed at any level, such as at an enterprise level, a physical plant or location level, a control loop level, a control module level, a container level, a container group level, a computer device level, etc. Of course, the APM 710 may perform other types of data analytics using data from multiple different enterprises or control systems, from a single enterprise, from a subset of components within an enterprise etc. In some cases, the APM 710 (which has access to data from multiple different enterprises) may look for commonalities or differences between operations at the different locations or different hardware of the same enterprise or at different locations or hardware of different enterprises to look for commonalities or differences in performance. The APM 710 may then perform further data analytics to determine the source or cause of those differences including differences which make the control system (control loop, control plant, etc.) operate better or worse than each other or better or worse than a baseline or average. The APM 710 may then provide the results of the analyses to the enterprises to make changes. In particular, the APM 710 may provide reports or analysis back to the enterprises to enable the enterprises to consider making changes to the control systems being implemented by the enterprises. In some cases, the APM 710 may provide one or more products or containers to be used by the enterprise to implement the suggested changes.

Additionally, as illustrated in FIG. 7 with respect to the enterprise 704, each enterprise may include a configuration system 800 having one or more configuration databases (which may be one or more different computer databases or memories) that stores configuration elements for the enterprise or for portions of that enterprise and one or more configuration applications that enables a user to view, change and manipulate the configuration database to effect and to implement configuration changes of the enterprise, including both configuration changes within elements executed in the compute fabric of the enterprise and within hardware within or associated with one or more physical locations of the enterprise. The configuration databases of the configuration systems 800 may, for example, store libraries of elements (e.g., containers, modules, applications, products, etc.) used in the enterprise and may store information defining the identity of and configuration of each element, groups of elements, containers, control systems, etc. as currently operating in the compute fabric or in devices within the physical locations of the enterprise. Moreover, the configuration applications may enable the enterprise owner or manager to view and to make changes to the configuration of any of the elements of the enterprise including making changes to the control systems, adding or deleting logical or physical equipment or components (and even physical locations) to or from the enterprise system, changing the location of or the pinning of various different resources or components (e.g., containers) within the compute fabric, adding new field devices, I/O devices, etc. Additionally, the applications of the configuration system may, upon instructions by the user, implement the configuration changes by downloading or changing logical or software elements (e.g., containers) within the compute fabric or within devices at the physical locations according to the user's changes. As the control elements within the compute fabric are generally not tied to specific computer hardware within the compute fabric, the configuration system 800 can easily make changes, deletions, additions, etc. to the elements actually running in the compute fabric without the user needing to specify where exactly to install those components, making it possible for the user to specify logical configuration changes to be made and pushing a button to implement those changes in actual hardware as currently operating in the compute fabric. The underlying compute fabric management system can then locate (or assign) the computer hardware implementing the changed or new components and make the changes seamlessly to the user. While the configuration systems 800 are illustrated as being stored in and executed in the compute fabric of the enterprise, one or more components of the configuration systems 800 could be located in computer hardware at one or more of the physical locations of an enterprise, in off-site compute fabric resources, spread or shared between compute fabric at one or more physical locations and offsite or licensed compute fabric hardware, stored in dedicated machines in the compute fabric or in one or more of the physical locations, or in any other manner.

Figure 8A:
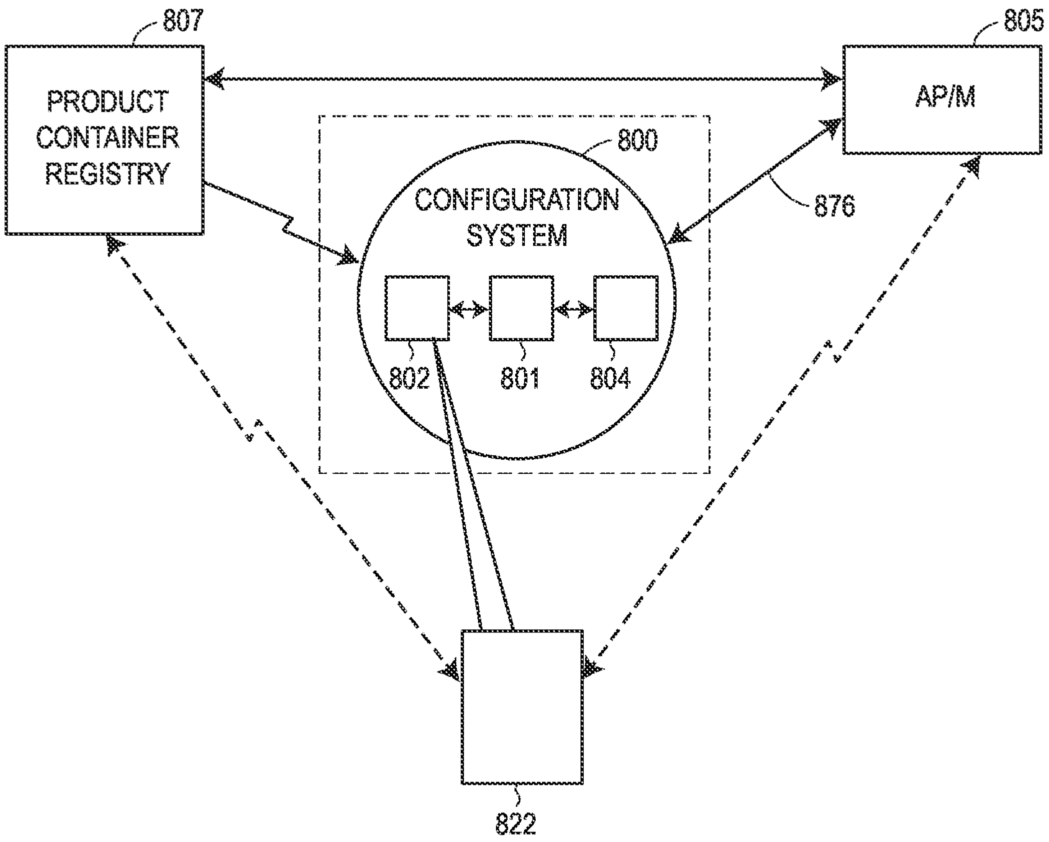
FIG. 8A is a diagram illustrating a configuration system that enables configuration activities at one of the enterprise systems of FIG. 7 to add, upgrade or otherwise change the operation of the enterprise system.

FIG. 8A depicts the operation of the configuration system 800 in an enterprise in more detail to illustrate a manner in which an enterprise owner, operator or other user can use the configuration system 800 to make control and configuration changes to an enterprise or to any part thereof in a manner that is quick and that is easy to use. In fact, in some cases, configuration changes can be provided, in essence, via a one button push mechanism that can be used to install additional software or new software components or to upgrade software within the compute fabric of an enterprise. More particularly, FIG. 8A illustrates a configuration system 800 that may be used at, for example, one of the enterprises, such as the enterprise 704 of FIG. 7, to add, change or otherwise alter the configuration and operation of one or more process control system elements within or associated with the enterprise in an easy to implement manner.

As will be seen, FIG. 8A illustrates the configuration system 800 for an enterprise communicatively coupled to an APM 805 and to a product/container registry 807. Generally speaking, the enterprise configuration system 800 is located in and executed in the enterprise to which it belongs, such as within the compute fabric of the enterprise to which it belongs. However, some or all of the configuration system 800 may be stored in and executed in hardware (which may be part of the enterprise compute fabric or not) at one or more physical locations of the enterprise, at one or more dedicated hardware locations for the enterprise outside of the compute fabric or in any other location. However, importantly, the configuration system 800 of the enterprise is connected to or is integrated into the compute fabric of the enterprise so as to be able to make changes directly to elements in the compute fabric of the enterprise using the management structure of the compute fabric. As illustrated in FIG. 8A, the configuration system 800 includes a configuration database 801, one or more configuration applications 802 and a configuration execution engine 804 which are communicatively coupled together. Of course, the configuration database 801 stores the configuration information for the enterprise, as currently configured. The configuration database may include one or physical databases that host data and relationships, for example the configuration of control modules and the relationships between them. Importantly, the configuration applications 802 may include one or more user interface applications that produce one or more user interfaces, such as a user interface 822 which is illustrated in more detail in FIG. 8B, that enables a user, such as a configuration engineer at the enterprise, to take varies actions with respect to changing or upgrading a control system or any element or component thereof. As will be understood, the user interface 822 may be displayed at any computer of the enterprise, and may be provided to offsite computers associated with an enterprise via the APIs discussed previously but not shown in FIG. 8A. Still further, the configuration engine 804 interfaces with the runtime system (e.g., the orchestrator and associated applications described herein) to implement configuration changes within the enterprise, such as within the compute fabric of the enterprise.

As illustrated in FIG. 8A, the configuration system 800 is connected, via communication connections such as those shown and described with respect to FIG. 7, with the APM 805 and may coordinate with the APM 805 to make certain types of configuration changes, such as licensing new software or hardware components in compute fabric managed or licensed from the APM or a third-party, reducing, increasing or changing the configuration of hardware within the compute fabric provided by the APM (or a third-party hardware provider), etc. Still further, the configuration system 800 is connected to a product or container registry 807 from which it may obtain new components, such as new containers, products, upgrades, etc. The configuration system 800 may access the product registry (which is located outside of the compute fabric for the enterprise) using any of the security features discussed previously. Generally speaking, the configuration system 800 includes components that interact with each other and with the APM 805 and the product/container registry 807 to enable a user to specify and implement configuration changes in the enterprise. These configuration changes may include adding new physical locations, adding new or changing computer or field device hardware (e.g., field devices, I/O devices, gateway devices, etc.) at new or existing physical locations, adding, deleting, or changing logical components (e.g., containers, control modules, control routines, monitoring routines, etc.) within the compute fabric of the enterprise, changing the pinned or other specified relationships between logical components within the compute fabric and/or between logical components and particular compute fabric hardware, etc.

As an example, one or more of the configuration applications 802 of the configuration system 800 may be used to view the current configuration of various different elements of the enterprise, including both hardware and software elements. In addition, the one or more configuration applications 802 may be used to enable a user to make changes to the configuration of the enterprise, such as to add new hardware and/or software elements, to change one or more hardware or software elements, to delete one or more hardware or software elements, to change the manner in which one more software elements, such as containers, are pinned to other software elements or to hardware elements, to add new physical locations or hardware at one or more physical locations, to change the configuration of elements at one or more physical locations, to specify or change the configuration of computer hardware within or associated with the compute fabric of the enterprise or a portion of the enterprise, and/or to implement any other desired configuration changes.

Figure 8B:
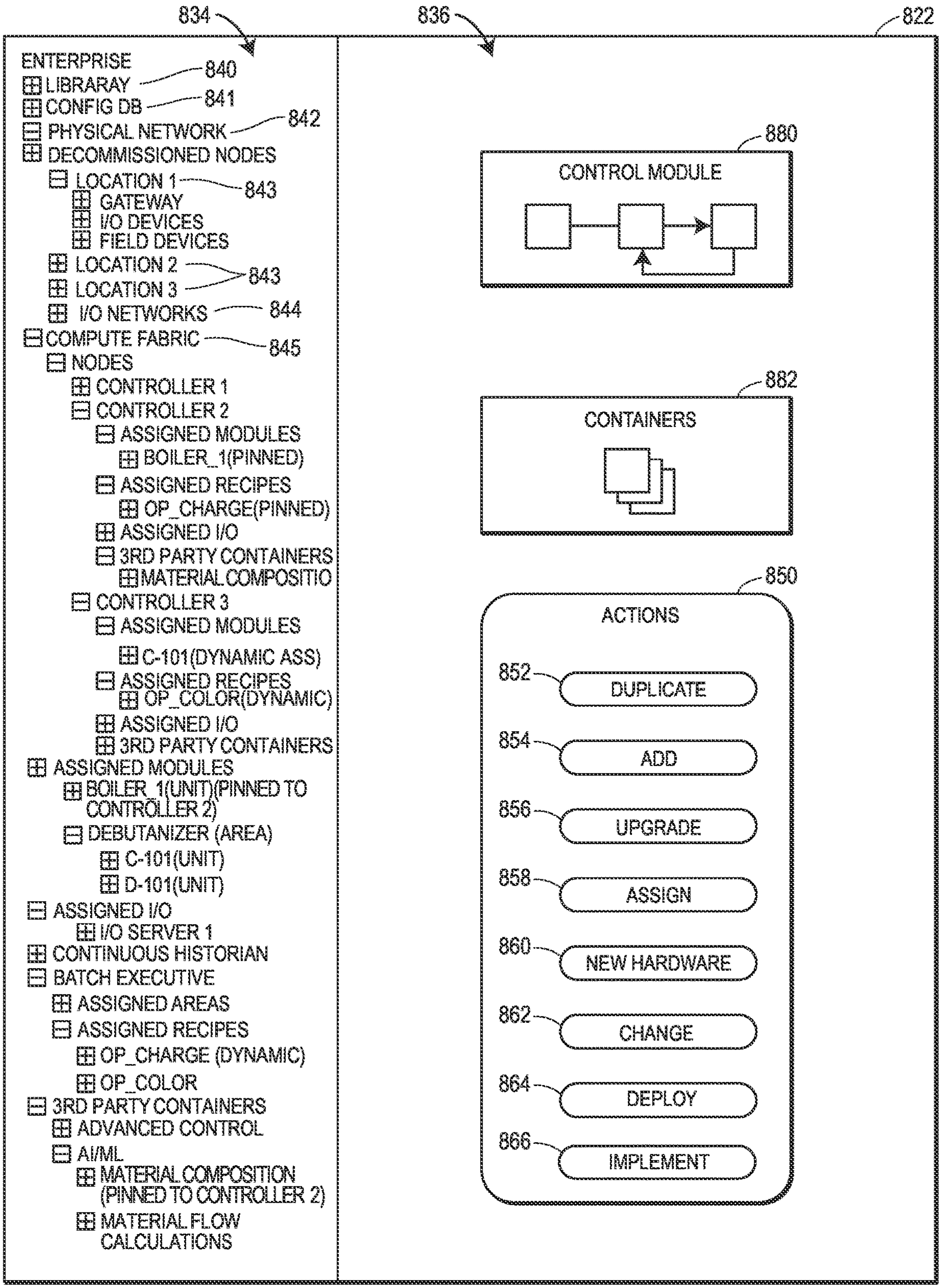
FIG. 8B is an illustration of an example user interface display that enables a user at an enterprise to make hardware and software configuration changes to the enterprise.

In one example, as illustrated in more detail in FIG. 8B, the user interface 822 may provide a configuration display screen that enables a user to view and make changes to the configuration of elements within the enterprise. In this example, the display screen 822 includes a configuration hierarchy section 834 and a diagram or programming section 836 which may be used by the configuration engineer or other user to graphically illustrate one or more configuration elements and/or to enable the configuration engineer (or other authorized user) to graphically program or make changes to the enterprise configuration at any level. The user may, for example, make changes to the configuration at the enterprise level (i.e., effecting the entire enterprise), at a sub-enterprise level, such as at one of the physical locations of the enterprise, at any grouping of components within the compute fabric of the enterprise, etc.

As illustrated in FIG. 8B, the hierarchy section 834 may include a hierarchy display illustrating the various different configuration elements of the enterprise at the various levels or sublevels of the enterprise (or any other groupings of components) to illustrate the configuration elements of the enterprise as they currently exist in an organized and easy to locate manner. For example, the enterprise hierarchy 834 may include a library section 840 that includes a storage of copies of configuration elements such as control modules, control routines, function blocks, containers, and/or any other configuration elements stored in the configuration database as library elements. These library elements may be copies or generic versions (i.e., non-instantiated versions) of control elements existing in the enterprise system, such as at one of the physical locations or in the compute fabric of the enterprise. Moreover, the hierarchy section 834 may include a Configuration Database section 841 for access to the actual configuration database of the enterprise, a Physical Network section 842 that includes information for each of the decommissioned nodes or locations and each of the current commissioned physical locations of the enterprise 843. As illustrated for the physical Location 1, each physical location may include configuration and identifier information about the gateway(s), I/O devices, field devices, communication networks, etc. at the physical location. Such elements may include, for example, I/O devices and gateway devices for each physical location, field devices and communication devices disposed at each physical location, databases, communication structure, etc. Still further, other physical I/O networks such as wireless networks may be listed under the section 844. Moreover, the hierarchy section 834 may include a hierarchy of installed configuration elements such as configuration elements associated with each physical location, with each of set of control routines or control modules, or any other control structure etc.

Still further, the hierarchy 834 may include indications of control logic or control elements (e.g., containers) in the compute fabric under the Compute Fabric section 845. Elements in the compute fabric may include, for example, logical or virtual controllers, control modules, containers, etc., and may indicate the manner in which these elements are pinned or otherwise associated with or grouped with (e.g., assigned to) one another during runtime. The control elements may also include or illustrate digital twins associated with iOS devices or field devices within the various locations, and may include any groupings or configured groupings of containers or other elements. Likewise, other groupings of containers or control elements in the compute fabric may be listed, such as Assigned I/O, and third-party containers. Likewise, the configuration hierarchy 834 may illustrate supporting elements, such as one or more batch or continuous historians, a batch executive, recipes, advanced control elements, data analytic programs or software (such as artificial intelligence (AI) programs or algorithms), monitoring software, etc. that is tied into and operating in the enterprise, such as in the compute fabric of the enterprise. Of course, it will be understood, that a user can drill down into each of the sections of the hierarchy 834 to see or access more information and specifics about those elements and the sub-elements listed therein.

The diagraming or programming area 836 of the display 822 may be used to add, change, delete, reconfigure, program and/or otherwise create configuration elements to be installed in the enterprise, such as in the compute fabric of the enterprise or in devices at one or more of the physical locations of the enterprise. In particular, a user may select and view one or more elements of the hierarchy 834 and place these elements (or copies thereof) in the programming area 836. The user may then make changes to these elements graphically to indicate the changes to the configuration of these elements to be made. In other cases, the user may add or copy library elements within the hierarchy section 834 to the programming area 836 and may then edit those elements to create new configuration elements for a control system within the enterprise. In still other cases, a user may download or obtain one or more new configuration elements from an exterior source or database, such as from the product/container registry 807. Of course, the configuration application 802 may enable the user to add, change, delete or otherwise modify configuration elements in any other manner as well.

As a further example, the user interface 822 may provide a pop-up window 850 which may display various actions that can be taken by the configuration engineer or user in the diagram or programing area 836 to perform configuration activities. In particular, the window 850 may include a duplicate button 852, an add button 854, and upgrade button 856, an assign button 858, an import new hardware button 860, a change button 862, a deploy button 864, an implement button 866, etc. While the window 850 of FIG. 8B illustrates these various specific buttons associated with specific configuration actions to be taken, the window 850 could provide or list other configuration actions that can be enabled via the pop-up window 850. Moreover, the display 822 may enable these or other configuration actions via other types of inputs or commands, such as using drop down menus, radial buttons, new screens, drag and drop actions, etc.

In any event, a user, such as a configuration engineer for an enterprise, may access or select some of the elements in the enterprise hierarchy 834, such as library elements or actual configuration elements, and may display or copy those elements into the configuration screen area 836 using, for example, the duplicate button 852. The user or configuration engineer may then edit these elements, which may be, for example, a control module, and entire control system, a container, a group of containers, etc., and may assign these edited or new elements to the compute fabric, to one or more new or existing devices at an already installed physical location, at one or more new physical locations, to one or more virtual controllers in the compute fabric, etc., using for example, the assign feature 858. Of course the configuration engineer may tie or assign these elements to devices (e.g., field devices) or other hardware within the enterprise. As another example, a user may use the configuration programming area 836 and/or the library 834 to assign or pin control elements or configuration elements to one another or to specific hardware or to the same hardware or to the same virtual elements (e.g., controllers) in the compute fabric of the enterprise. Of course, the user may drag and drop new or changed configuration elements within the hierarchy section 834 to assign containers such as control modules to specific virtual or physical elements.

In one example, a control routine or module 880 and a set of containers 882 are illustrated as being placed into the programming area 836. Here, a user may select particular elements in the control loop 880 or within the containers 882 and make changes to them as needed (via pop-up windows, drop down menus, etc.) to create a different control loop for a new element or new hardware, to change the configuration of an existing control loop, to change where to assign the control loop 880 or one or more of the containers 882 within the compute fabric, etc. When finished with the edits, the user may use one of the buttons in the window 850 to assign or deploy the configuration elements 880, 882 or to implement them in the compute fabric.

Still further, as illustrated in FIG. 8A, the user at the user interface 822 may have access to the product/container registry 807 which may include new containers elements, control system data analytics, control elements, or other products or modules that may be provided by the architecture provider/manager or by third-party developers for use in downloading into the compute fabric or other hardware of the enterprise. In some cases, the user may use the user interface 822 to obtain one or more containers or products or other software to be provided or used in the enterprise, such as in the compute fabric of the enterprise, from the product registry 807 and may download these elements and install them using the configuration screen 822. In particular, such containers or products may be provided as upgrades or fixes to other containers or products that already are being used or that are already installed in the compute fabric or in hardware at the physical locations of the enterprise. In this case, the new elements may be deployed into the compute fabric using the deploy button 864 (or by dragging and dropping these elements in the desired location of the hierarchy 834). In some cases, the user may have to subscribe to or obtain a license for these products or containers, in which case, the user may interface with the APM 805 (and possibly a third-party) to obtain the license. Of course, upon depressing to deploy button, the system may check to make sure that it is possible to deploy the updated or new elements within the enterprise system, and if so, the configuration engine 804 of the configuration system 800 may then deploy the new configuration elements in a manner that is seamless to the user. Because the computer hardware of the compute fabric on which the configuration elements are deployed is essentially divorced from or not specifically tied to these elements in a one-to-one manner, the configuration engine 804 of the configuration system 800 can upload these new or changed elements to the compute fabric without input from the user as to where to execute these elements.

As another example, a user may want to add a new physical location to the enterprise. In this case, the user may select a new hardware button 860 and create a new physical location in the configuration system by filling out various fields of a pop-up window. Here, the user may specify one or more hardware IDs for the new hardware, such as a gateway ID, and the configuration system or engine 804 may access that gateway and then perform an auto detect for hardware at the gateway. The configuration system may the auto-populate the hardware specifics for the new physical location in the configuration system 800. In some cases, the user may select a duplicate button 852 to duplicate hardware at another physical location for the new physical location where the new physical location is designed to use the same basic hardware or field devices to perform a process as an existing physical location. The addition of a new physical location is illustrated by the dotted lines 740D in FIG. 7 in which a new location illustrated by the dotted line 740D is being added to include all new hardware or new hardware having a gateway that connects to the compute fabric of the enterprise. In this case, the user may additionally copy or duplicate (or create new) control routines, modules or containers for the new physical location using the buttons 852, 854 and may assign these new configuration elements to the new hardware at the new physical location using the button 858. When finished, the user may deploy the new routines or containers in the compute fabric using the deploy button 864. If desired, a new node may be added (licensed, for example) in the compute fabric to execute the new containers for the new physical location, although this is not strictly necessary. This new node is illustrated by the dotted portion 788 of the compute fabric 740 of the enterprise 704 of FIG. 7. In any event, after changing or copying the hardware and/or control containers and other information from one of the other locations into the configuration programming screen or otherwise creating control routines and/or containers for the new hardware, the user may assign those elements to the new hardware or physical location to which it belongs using the assign button 858. The user may then use the deploy button 864 to cause the configuration engine 804 to execute to deploy those elements into the compute fabric in the configured manner to control the new hardware at the new physical location, which enables the process control system to start operating and functioning at the new location 740D.

In another example, the user may simply want to add additional hardware at one of the already establish locations such as the location 740C of FIG. 7, as illustrated by the dotted box in the location 740C. In this case, the user may also provide a new control routine or set of containers, or change the current configuration for that new hardware using the applications 802 and screen 822 of FIG. 8B. In other cases the user may do so by starting with the add button 854 in order to add new configuration elements such as containers, control loops, etc. for the new hardware. Still further, the user may, in another example, want to upgrade already existing configuration elements, such as containers or products, with new features as provided by the APM or a third-party provider. In this case, the user may obtain a copy of an upgraded version of the container or control loop with the new feature to be implemented, from the product registry or container registry 807. The user may then place these new or upgraded elements in the configuration location identified in the configuration screen 822 and identify the elements to which they are replacing in the already installed compute fabric. The user may then press the upgrade button 856 to instruct the configuration engine 804 to upgrade that element in the compute fabric with the new configuration component.

Still further, the user may use other buttons such as the change button 862 in order to reassign or change the assignment of one or more elements in the computer fabric in order to assign these elements to particular hardware, to particular locations, etc. For example, as illustrated FIG. 7, the user may want to assign configuration elements to run in compute fabric hardware physically located in one of the physical locations of the enterprise instead of running or executing in licensed compute fabric hardware. This configuration is illustrated by the dotted line 779 in the compute fabric that is associated with or owned by the actual enterprise system. Again, the user may use the assign button 858 and then select the compute fabric hardware on which selected configuration elements are to be executed, to thereby assign the operation of those elements in that compute fabric hardware. In this case, the configuration system 800 may operate to assure that the new configuration elements are stored down in the hardware machines of the new location 779 of the compute fabric prior to switching over control to those machines from the previous machine. Upon the change incurring, the configuration system 800 may delete or destroy the elements running the previously assigned sections of the compute fabric.

Of course, the user may take any other actions via the configuration system of FIGS. 8A and 8B to add, delete or otherwise change one or more configuration elements in the configuration system to enhance or change the control system at any level of the enterprise. As will be understood, the configuration system is integrated into the compute fabric and management systems thereof as described herein, and so enables an enterprise user to easily make changes to any element of the control system as actually implemented, because the actual computer hardware to which configuration elements are download will be either known to the configuration system 800 or will be determined automatically by the configuration system 800. This feature enables, essentially, a one-button push mechanism to perform configuration changes, which makes the updating or changing the configuration very quick and easy to perform.

Figure 9:
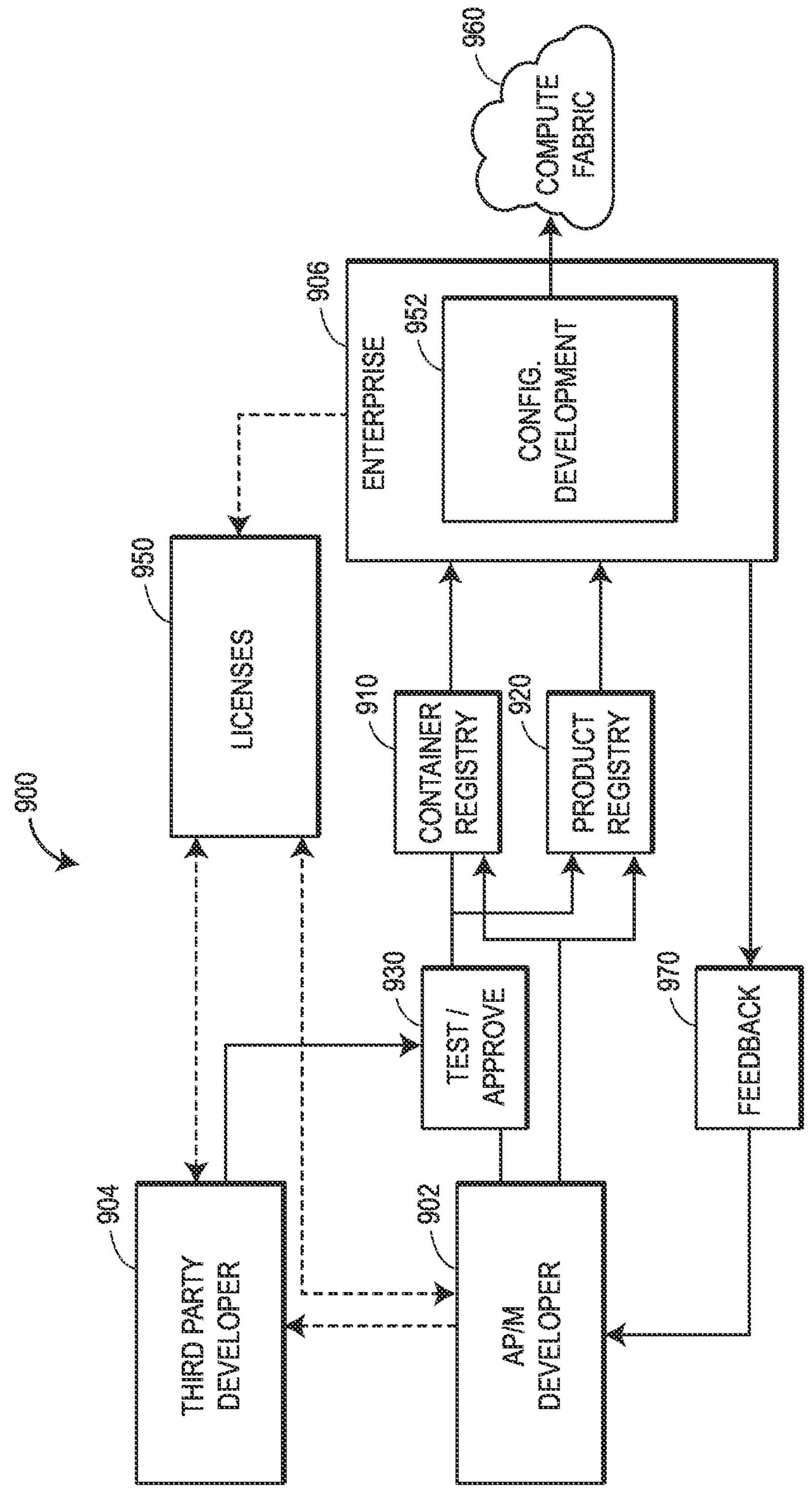
FIG. 9 is a diagram illustrating a development system used to develop and roll-out features, such as containers or products, at one or more of the enterprise systems of FIG. 7, in a manner that shortens development and roll-out time associated with next generation control system features while providing the enterprise system managers with the ability to control the timing of and selection of changes to the enterprise system.

FIG. 9 depicts a development system 900 that supports the deployment of and configuration of new configuration elements in a simple and easy to manage manner. In particular, the development system 900 includes an APM developer system or section 902 and a third-party developer section 904, both of which may provide new or changed products or containers to an enterprise 906 for deployment and use in the enterprise. In particular, developers associated with the APM 902 may create, edit, upgrade or otherwise provide new configuration products, such as containers, to be implemented at an enterprise or at some portion of an enterprise. When completed, these products or containers may be placed in a product registry 910 or a container registry 920 to be accessed by an enterprise at the timing schedule of the enterprise. Similarly, a third-party developer 904 may create, edit, upgrade or otherwise provide new configuration products, such as containers, and may send these products or containers to a test/approve step 930 in which the APM 902 reviews and tests the third-party developed products for functionality with the APM system or with a specific enterprise system. If and when approved, the product or container may be then placed into the product registry 910 or the container registry 920. While separate registries are illustrated in FIG. 9 for products and containers, a single registry for both could be used. Moreover, the product/container registry 807 of FIG. 8A could be one or both or the registries 910 and 920 of FIG. 9.

Of course, a new product or container placed into the registry could be any configuration element or elements and may be, for example, new or updated control elements, display elements, communication elements, data analytic elements, etc. As will be understood, the configuration element development at the boxes or steps 902 and 904 are performed, in a general sense, off-line from operation of an enterprise that is to use that element until the product or container is ready for deployment in the enterprise. Of course, the fact that a new or changed product or container (which may be an upgrade to an existing product or container) is available within the registry 910, 920 may be pushed out to the enterprise in the form of marketing or other information provided to the enterprise or to a user at the enterprise to enable the enterprise to know that the new container or product exists. In some cases, the new containers or products may be upgrades to existing containers or products already being used by the enterprise or the containers or products may be new containers or products that may be need a new license or an additional license by the enterprise in order to be downloaded and used at the enterprise.

In any event, once one of the registries 910 and/or 920 store a new or enhanced product or container, the enterprise owner may then access and download those containers or products at their leisure or convenience, without needing to have these products pushed to the enterprise at times when the enterprise is not ready to absorb them or use them. Thus, using this system, the enterprise owner 906 has full control of when it implements or installs new or upgraded products or containers. When ready, the enterprise 906 (or a user at the enterprise 906) may access and download a new or upgraded product or container from one of the registries 910, 920, such as using the system of FIGS. 8A and 8B. If needed, the enterprise 906 may use a license step 950 to obtain any licenses that are needed for the new or upgraded product or container, either from the APM and/or from a third-party developer 904. The license step 950 may additionally detect if a new license is needed or required, and if not, may authorize the enterprise to download the new product or container. The enterprise 906 and, in particular, a configuration system 952 of the enterprise 906 (such as the configuration system 800 of FIG. 8A) may be used to deploy the new container or product as described with respect to, for example, FIGS. 8A and 8B. This deployment is illustrated as being performed by deploying the new product or container to a compute fabric 960 of the enterprise 906. Additionally, once the new product or container is deployed in the compute fabric 960, the enterprise 906 may provide feedback data about the operation of the new product or container via a feedback step 970. This feedback may be provided to the APM developer 902 (who may provide it to a third-party developer 904, such as in a sanitized manner). This feedback data (which may be specified as part of the container or product, spelled out in a license, etc.) may be collected and sent automatically or at the control of the enterprise 906. In any event, the APM developer 902 and/or the third-party developer 904 may use this feedback data as provided by the block or step 970 to change or improve the operation of the containers or products provided and deployed at the enterprise 906. Additionally, as illustrated or described respect to earlier embodiments, the feedback step or block 970 may collect and provide information related to some or all of the containers or products operating in the compute fabric of the enterprise 906 to the APM developer 902 to develop new products, to enhance the operation of existing products, etc.

Importantly, the product development cycle 900 provides an easy and quick development cycle that enables rapid deployment of new products (e.g., containers) being created for an enterprise system 906. However, this development cycle also enables the enterprise owner to download and install or deploy new configuration elements at the convenience of and on the time schedule of the enterprise, instead of on the time schedule of the product developer as is common today. Still further, while only one enterprise 906 is illustrated in the loop or configuration development cycle 900 of FIG. 9, multiple different enterprises could simultaneously be tied into or use of container and product registries 910, 920 and the license and feedback loops 950 and 970 depicted in FIG. 9.

Enterprise-Level and Provider Features Provided by the NGPCAS

The Next Generation Process Control and Automation System (NGPCAS) described in the present disclosure may be used to support various enterprise-level services and functionalities, as well as services and functionalities of the provider of the NGPCAS with respect to enterprises. Enterprise-level services and functionalities, generally speaking, may execute to support implementation of one or more industrial and/or automation processes by each enterprise respectively. Each enterprise may, respectively, implement one or more industrial and/or automation processes, with each process being implemented among one, two, three, four or more physical locations or sites. At a very high level, and as will be described in further detail herein, the various enterprise-level services and functionalities may support the execution of processes themselves implemented by the enterprise (e.g., system configuration, control, operations, maintenance, data storage and management, etc.), support the execution of the underlying services serving as the functional building blocks of the compute fabric (e.g., creating and relocating containerized services), and support the management of the NGPCAS architecture and service/application framework by the system provider of the NGPCAS architecture (e.g., through compute fabric monitoring, physical layer resource allocation and monitoring, containerized service management, application distribution and upgrade management, etc.). The enterprise-level services and functionalities (also referred to herein as "applications") can be executed at least partially (and, in some cases, entirely) in the compute fabric of the NGPCAS architecture of the present disclosure (e.g., the NGPCAS architecture as described with respect to the foregoing figures, for example with services/applications herein being implemented as software modules in the application layer of the NGPCAS compute fabric). Provider services and functionalities, generally speaking, may execute to support operation of NGPCASs (and processes involved therein) for one, two, three, four or more enterprises.

The compute fabric, while executing any one or more services/applications on behalf of an enterprise or the provider, may be communicatively connected with the pool of physical process equipment in one or more physical locations via one or more transport networks as described in the present disclosure. The transport networks(s) may, for example, include one or more point-to-point, peer-to-peer, and/or point-to-multipoint connections (such as VPNs) to securely connect any containerized software component to another containerized component and/or a specific physical component to exchange information as needed by the service(s)/application(s) (e.g., real-time and/or historical process data, physical site or process configuration information, site personnel information, etc.). A human user may interact with the service(s)/application(s) via one or more client computing devices (e.g., laptop, tablet, mobile computing devices, etc.), using a secure communicative connection with the portion of the compute fabric implementing the service(s)/applications. The communicative connection may, for example, utilize a VPN, and the execution of the service(s)/application(s) at the client device may include executing a particular containerized component of the compute fabric that has been configured and authorized to run the service/application at the client device. Thus, without further repetition of the description of the NGPCAS as provided in the foregoing sections of this disclosure, it should be appreciated that execution of the services/applications described in this section may utilize any suitable ones of the structures, features, and functionalities of the NGPCAS previously described in this disclosure (e.g., containerized services, digital twins, VPNs and/or other communications/security features, user identity/access security features, process hardware security features, etc.).

Real-Time Control, Operations, and Monitoring Features

Services/applications supported by the NGPCAS may, at a high level, include various service/applications that support real-time control, operations, and/or monitoring of one or more physical sites operated by the enterprise (each physical site having physical devices of the enterprise), one or more NGPCASs of the enterprise, or of an entire enterprise (e.g., including multiple physical sites and/or multiple NGPCASs). While some of these services/applications support automatic control/operations/monitoring of the physical site(s) (e.g., without intervention by a human user), various services/functionalities described herein may further include exposing selected information to one or more human users (e.g., via dashboards) and/or receiving commands from the one or more human users to further support the control/operations/monitoring of the physical site(s). The term "enterprise user" will be used herein to refer to a human user in an enterprise that has purchased NGPCAS resources/capabilities from a system provider of the NGPCAS. "Provider" or "manager," as used herein, may refer to a human user which may have exclusive access to certain services or applications associated with management/administration of the NGPCASs of a plurality of enterprises. It should be appreciated that access of these services/functionalities by the enterprise user or provider may be subject to various authorization/authentication controls for the enterprise user or provider and for the client computing device(s) that the enterprise user or provider utilizes to access the services/functionalities. Generally speaking, whereas an enterprise user may generally have access to services/functionalities associated with the enterprise of which the user is a part, a provider/manager user may have access to services or applications associated with many NGPCASs or enterprises. Enterprise users and provider/manager users may have different permissions to access, view, and/or manipulate data at different times, with each of the enterprise user and provider/manager user permissions being respectively defined based upon policies that may be defined by the enterprise, by the system provider, or by some combination thereof.

The client device(s) may access these services/functionalities via the compute fabric from any location, e.g., from within a physical site to which the services/functionalities pertain, from within another physical site operated by the enterprise, from still another physical location agnostic to any particular physical site (e.g., a home office or a remote service center servicing one, two, three or more sites simultaneously), or otherwise from various remote locations (e.g., a mobile device).

Compute-fabric-based control, operations, and maintenance services/functionalities envisioned herein include, but are not necessarily limited to:

an enterprise-level viewing functionality to allow the enterprise user to navigate and view (and in some instances, modify) a real-time representation of site regions, sites, and/or sub-sites operated by the enterprise;

a site-level viewing functionality to allow the user to navigate and view a real-time representation of process entities operating in any particular site or sites (e.g., a hierarchical view of physical process equipment, control loops, I/O networks, etc.), the real-time representation of the process entities in some embodiments including real-time operational information associated with the process entities (e.g., setpoints, parameters, observed process variables, events, alarms, control inputs/outputs, diagnostics, production output volumes, quality metrics, etc.) and/or enabling modification of operation of the process entities (e.g., responding to events or alarms, activating or shutting down the process or particular equipment involved therein, modifying control behaviors, etc.);

a simulation and/or testing functionality to simulate operation of any particular site (e.g., of a process executing at the site) and to provide a view of the simulated operation and/or results thereof (e.g., simulated setpoints, process variables, events, alarms, control inputs/outputs, process inputs/outputs, etc.);

a personnel viewing and/or management functionality to view, create and/or modify information associated with personnel associated with one, two, three, four or more sites (e.g., to view, add, and/or remove authorizations and/or task assignments for process engineers, operators, maintenance personnel, etc.);

a personnel shift assistant functionality to provide, to a client device of a personnel (e.g., a process engineer, operator, maintenance personnel, etc.), real-time information, task assignments and/or instructions associated with operation of process entities in at least a portion of a site or sites for which the personnel is responsible (e.g., a site at which the personnel is located, or a site remotely located from the personnel);

a process configuration template functionality to allow users to create, define, store, modify, and/or push through the enterprise a library of template objects representative of process entities (e.g., field devices, controllers, I/O devices, data storage devices, etc.), the template objects being usable thereafter to define instances of process entities installed and/or operating in one, two, three, four or more physical sites operated by an enterprise (e.g., to import, copy, and/or re-use various templates enterprise-wide in various process display interfaces, operator interfaces, etc.);

an enterprise-level standard management functionality to allow a user to define fonts, naming standards, configuration practices, graphics, and/or other standards for use across a part or whole of the enterprise NGPCAS, and push the standards across the part or whole of the enterprise NGPCAS to modify enterprise functionalities to utilize the defined standards;

a process entity configuration functionality to define any particular process entity installed or operating in any particular physical site (e.g., by importing the entity from the template object library or from another site and defining various parameters for the entity such as a device name, device tag, setpoint, data input/output, process material input/output, event behavior, alarm condition, etc.);

a site-level configuration functionality to define the relative arrangements of two or more process entities installed or operating in any particular physical site(s) (e.g., to constitute a control loop, a flow or exchange of process materials between two or more pieces of process equipment, etc.);

a control algorithm configuration functionality to define parameters of a control loop or other control function (e.g., to define one or more inputs of a control algorithm, one or more outputs of the control algorithm, one or more mathematical functions included in the control algorithm, etc.);

a process display creation functionality to create and/or modify process displays to be used by process technicians (e.g., operators, engineers, maintenance personnel) to view real-time information associated with operation of one or more process entities in a single physical site, or with operation of one or more process entities simultaneously in two, three, four or more physical sites operated by the enterprise (e.g., to view operating parameters, diagnostics, alarms, events, etc.);

an enterprise-level diagnostics functionality to provide a real-time view of high-level diagnostics of two or more physical sites operated by the enterprise (e.g., indicating whether processes at each site are online, whether site networks are in normal operational states, etc.);

a site-level diagnostics functionality to provide a real-time view of diagnostics information (e.g., operating parameters, events, alerts, data logs, etc.) associated with process entities in the site, and/or to enable the user to take actions to respond to the provided diagnostics information;

a site comparison functionality to enable a user to compare configurations and performance parameters of two or more sites of the enterprise (e.g., to compare operation of similar process equipment in multiple sites to determine whether differences in site configurations may be associated with different observed performance parameters of the multiple sites);

a data governance functionality to allow a user to define data management policies at respective physical sites or across a part or whole of the enterprise NGPCAS including multiple sites (e.g., defining data storage, retention, distribution, access requirements for personnel, etc.); and/or any other functionality or functionalities of subsystems 438 of the application layer 412 of the compute fabric 400 as described with respect to FIG. 4, and/or any other enterprise-level or provider-oriented control, operations, and/or monitoring functionality/functionalities described in this disclosure, which may be performed in real-time during run-time and/or in an off-line or asynchronous manner with respect to run-time operations.

FIGS. 10A-10H depict example graphical user interfaces (GUIs) that may be displayed at a client computing device 700 of an authenticated/authorized enterprise user, in consideration of control, operations, and monitoring functionalities described in the foregoing. These control, operations, and monitoring functionalities are implemented with respect to one or more industrial/automation processes executing in one or more sites operated by an example enterprise ("Site 1," "Site 2," etc.). Accordingly, FIGS. 10A-10H depict the one or more sites as being located "on-premises" (e.g., among on-site field devices and/or I/O network), with the display/execution of the depicted GUIs being performed via the compute fabric. It should be appreciated that the portion(s) of the compute fabric executing the GUIs of FIGS. 10A-10H may include portions of the compute fabric that are on-premises at the one or more physical sites, and/or via portions of the compute fabric that are not located at any physical site of a process. The client computing device 1000 may include any suitable computing device(s) communicatively connected with the compute fabric via the techniques discussed in the present disclosure (e.g., the computing device 1000 may include a smartphone, tablet, laptop computer, desktop computer, etc. connected to the compute fabric via a VPN), and may be located on-premises or off-premises. Aspects and features of the example GUIs of FIGS. 10A-10H may be combined and/or interchanged, in various embodiments.

Figure 10A:
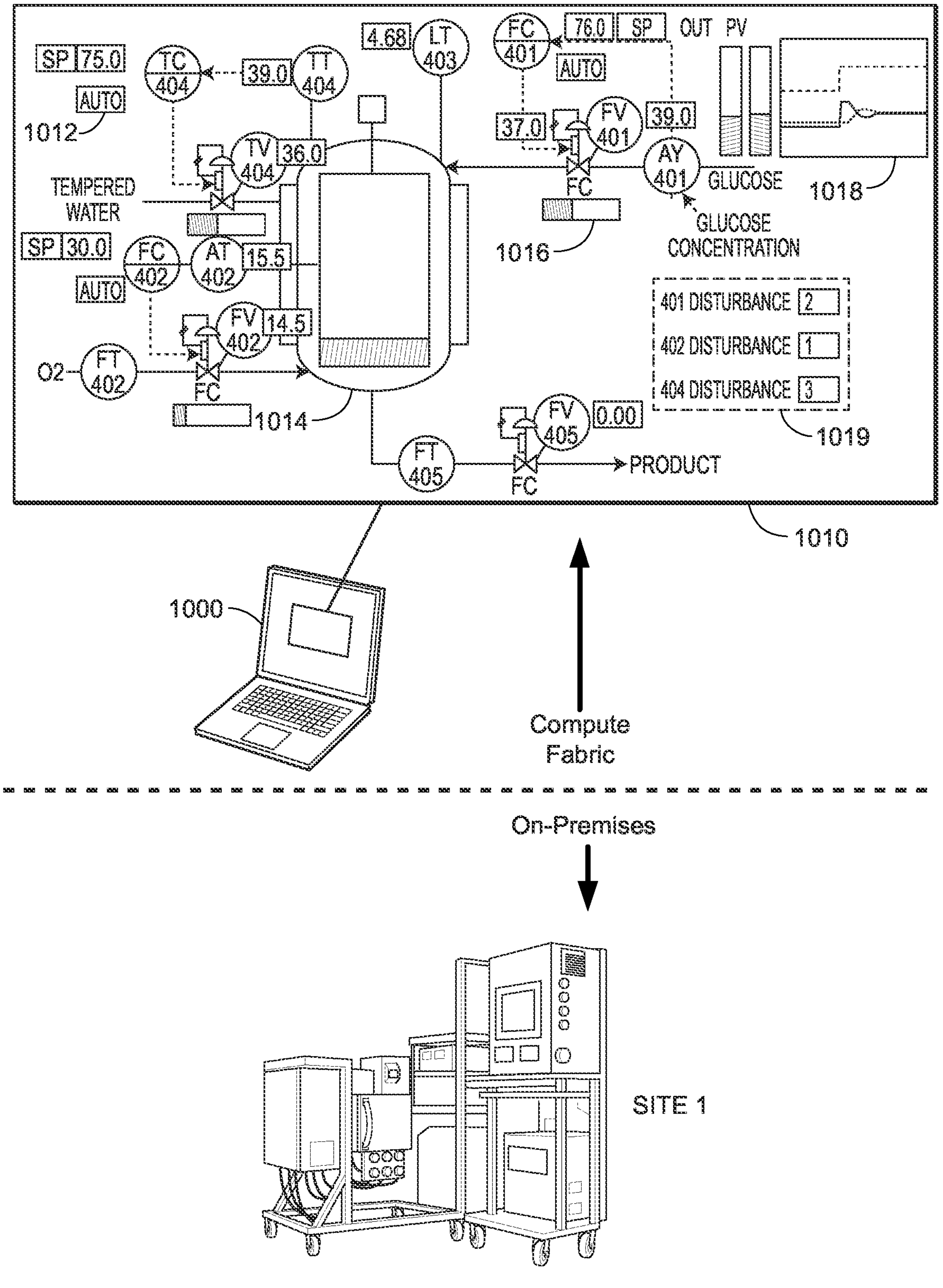
FIG. 10A depicts an example NGPCAS control/operations graphical user interface (GUI) for a physical site.

Turning first to FIG. 10A, an example control/operations GUI 1010 provides a real-time view of an example process or portion thereof executing at the physical site ("Site 1"). Information displayed in the GUI 1010 includes setpoint indicators 1012 indicating setpoint values for respective variables in the process. Setpoint indicators 1012 further indicate whether each variable is being controlled to its setpoint via automatic control ("Auto," e.g., controlled by a control algorithm) or via manual control. The setpoint indicators 1012 may enable the user (e.g., an operator) to modify the setpoint values and/or operational mode of the setpoints. A tank fill level indicator 1014 indicates a real-time fill level of a tank, and valve position indicators 1016 indicate respective real-time positions of valves and thus flow rates of process materials involved in the process (e.g., 0% open, 10% open, 25% open, 50% open, 100% open, etc.). Also included in the example GUI 1010 is a graph 1018, displaying values over time of setpoints, controlled variables, and/or other parameters associated with the process (e.g., tank fil status, valve open/close position, etc.). Still additionally included in the example GUI 1010 are status indicators 1019 indicating disturbances to respective physical equipment in the process and status codes associated with the disturbances. In various implementations, the GUI 1010 may enable the user to perform other actions associated with the depicted process (e.g., view additional operational parameters, shut down or recommission the process, perform diagnostics on depicted process equipment, etc.).

Figure 10B:
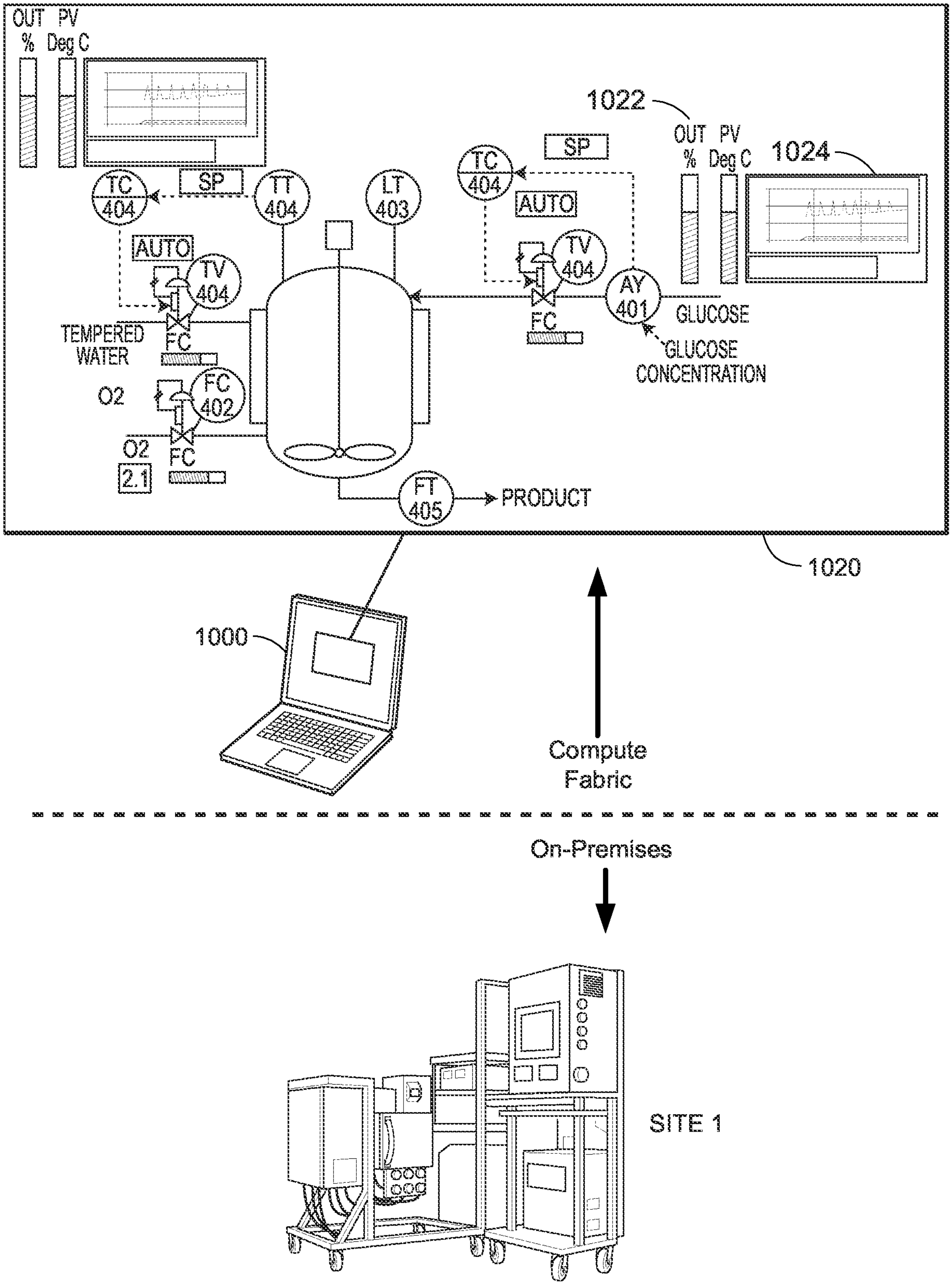
FIG. 10B depicts another example control/operations GUI for a physical site in an NGPCAS.

FIG. 10B depicts another example control/operations GUI 1020 similar to the GUI 1010 of FIG. 10A, providing a real-time view of the example process executing at Site 1. In FIG. 10B, additional graphical elements 1022 and 1024 various parameters of process materials included in the process (e.g., process material temperature, flow rate, concentration, or setpoints thereof).

Figure 10C:
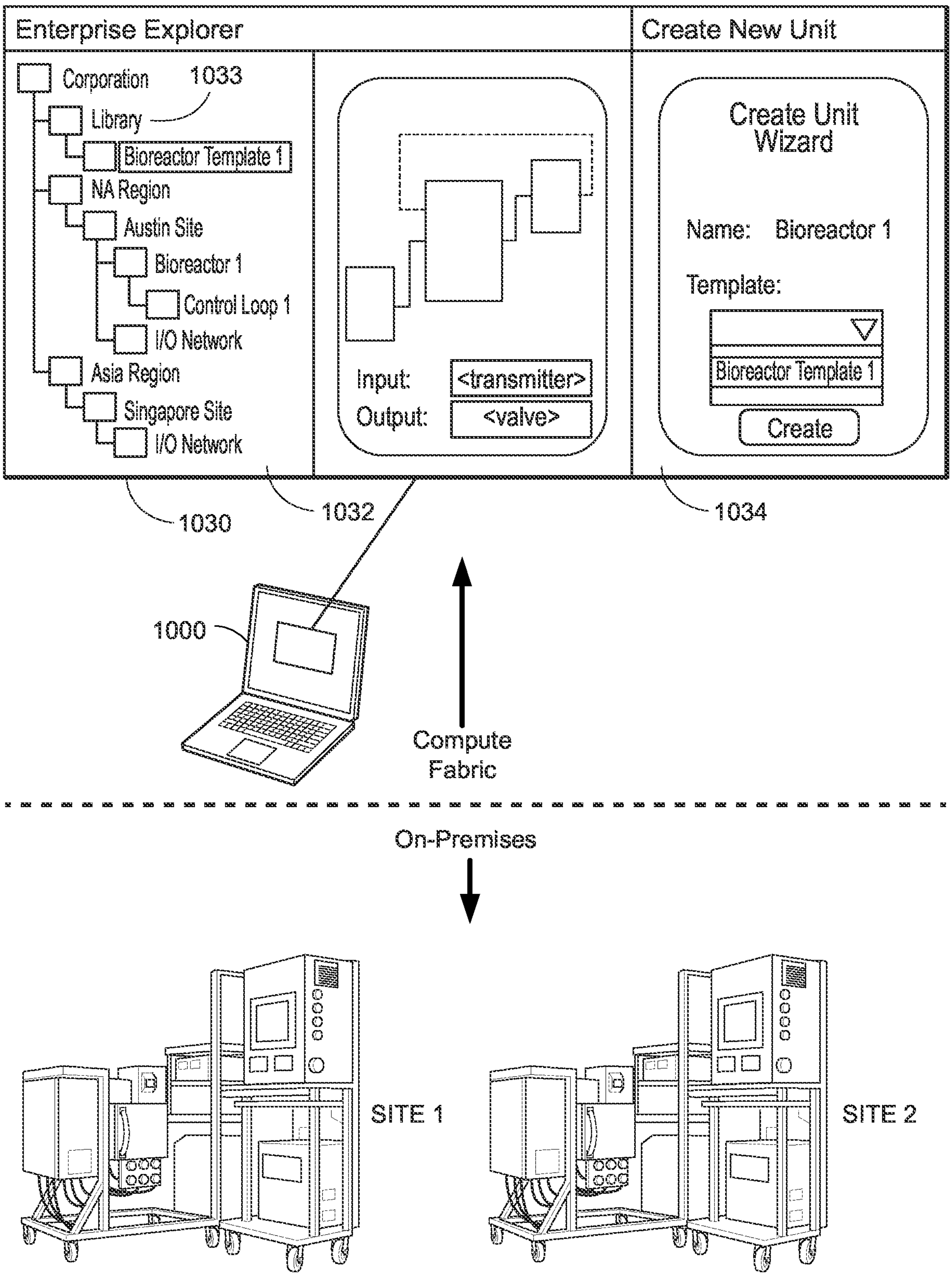
FIG. 10C depicts an example enterprise-level viewing GUI.

Turning to FIG. 10C, an example enterprise-level viewing GUI 1030 is provided. In the GUI 1030, an enterprise explorer region 1032 displays a hierarchical view of regions and physical sites operated by the enterprise. By interacting with the region 1032, the user can navigate downward into two or more regions in the enterprise, and two or more physical sites operated in each region (e.g., "Site 1" and "Site 2"). Within each physical site, the user can navigate further downward into process modules, I/O networks, field devices, and control loops operated in each respective physical site.

Figure 10D:
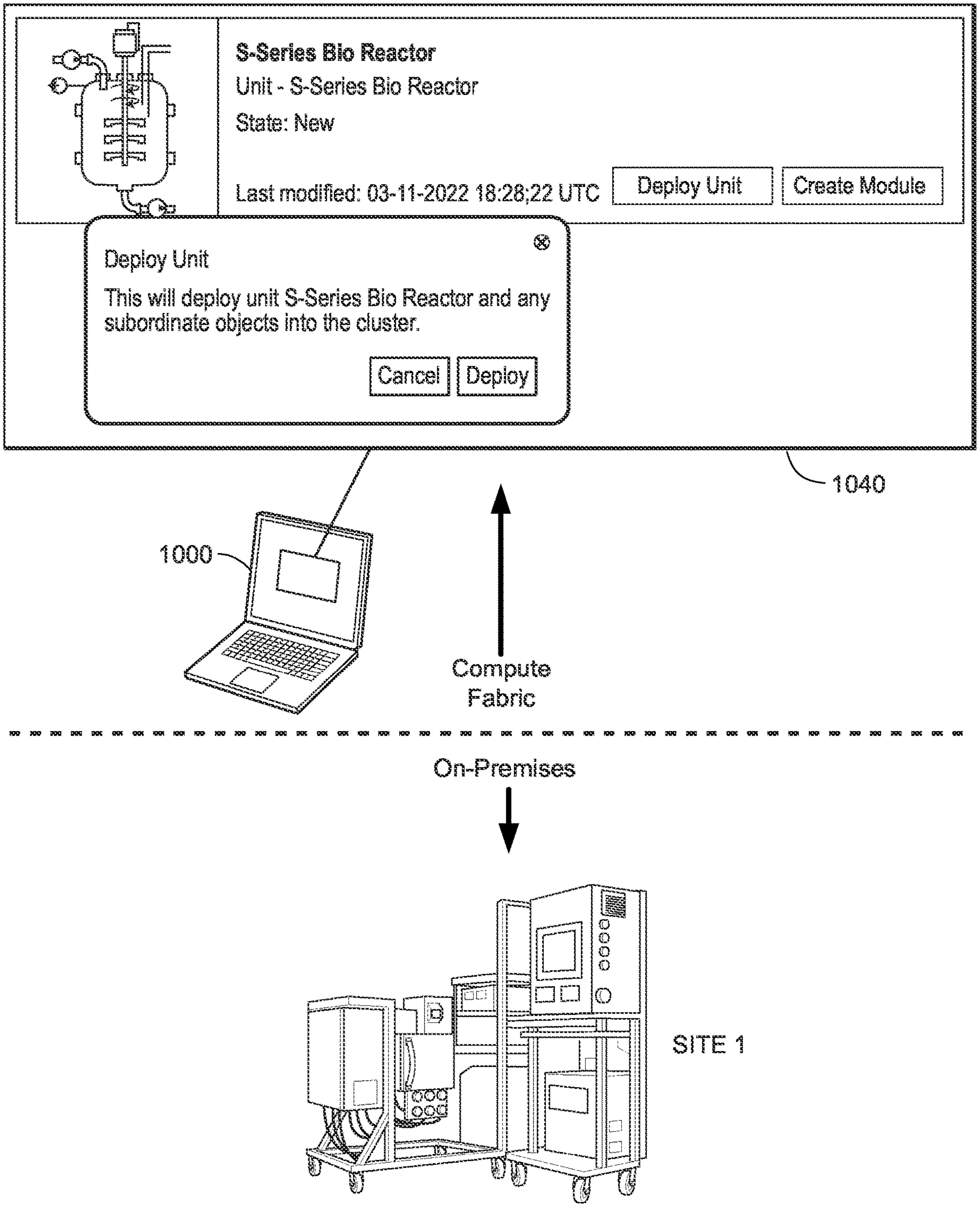
FIG. 10D depicts an example process entity deployment GUI.

The enterprise explorer region 1032 further includes a template library explorer 1033 that allows the user to navigate between template objects, each of which may be usable to configure and arrange new instances of sites, process modules, field devices, control loops, I/O networks, etc. For example, by interacting with a bioreactor template shown in the library explorer 1033, the user may summon a "Create Unit Wizard" region 1034 enabling the user to define, from the preconfigured bioreactor template, a bioreactor to be configured for one or more of the physical sites of the enterprise as defined in the region 1032. The template for the bioreactor may, for example, define bioreactor properties such as process material inputs/outputs, operating parameters of the bioreactor, etc. Continuing from FIG. 10C, FIG. 10D depicts an example deployment GUI 1040 enabling the user to deploy a configured process entity to the compute fabric operated by the enterprise (e.g., to deploy a new bioreactor to one or more physical sites operated by the compute fabric as shown in FIG. 10C). The deployment GUI 1040 includes controls to enable the user to create new control modules associated with operation of the bioreactor ("create module," e.g., to define operational setpoints, alarms, event handlers, historization of data, etc.).

Figure 10E:
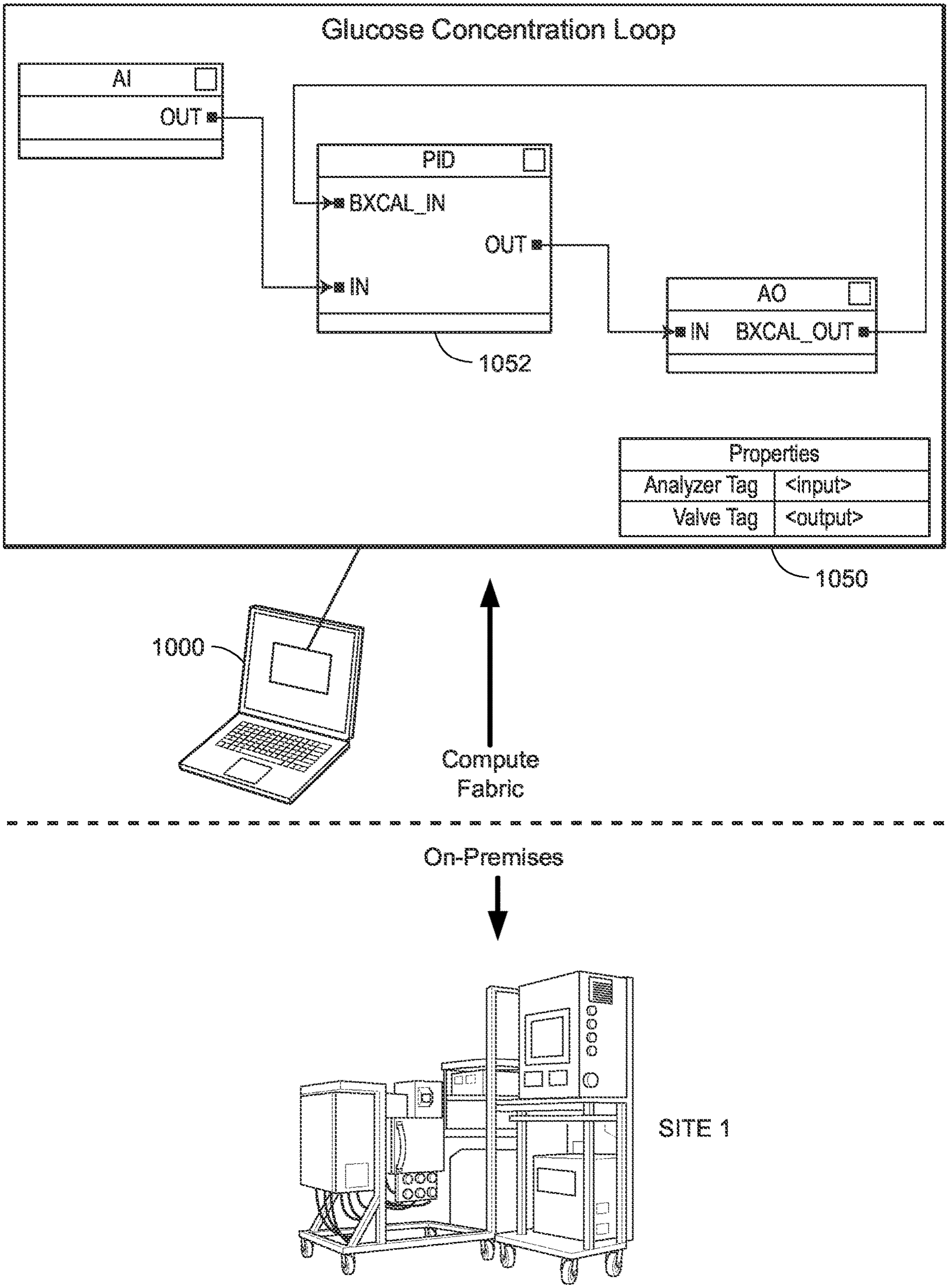
FIG. 10E depicts an example control loop GUI for a physical site in an NGPCAS.

FIG. 10E depicts an example control loop GUI 1050, which may be accessed for example by navigating from the enterprise explorer from FIG. 10C. The example control loop of FIG. 10E displays inputs to, and outputs from, PID control block 1052 (e.g., inputs from and outputs to other field devices, sensors, etc. defined for the physical site in which the control loop is operating). In various embodiments, an enterprise user may utilize the control loop GUI 1050 to define and/or redefine various aspects of the depicted control loop, e.g., inputs, outputs, device tags, event handlers or alarms, etc. Notably, an enterprise user may access and/or manipulate the control loop GUI 1050 at the enterprise level, e.g., by accessing/manipulating the control loop GUI 1050, and/or by concurrently accessing and comparing control loop GUIs of two or more different physical sites of the enterprise.

Figure 10F:
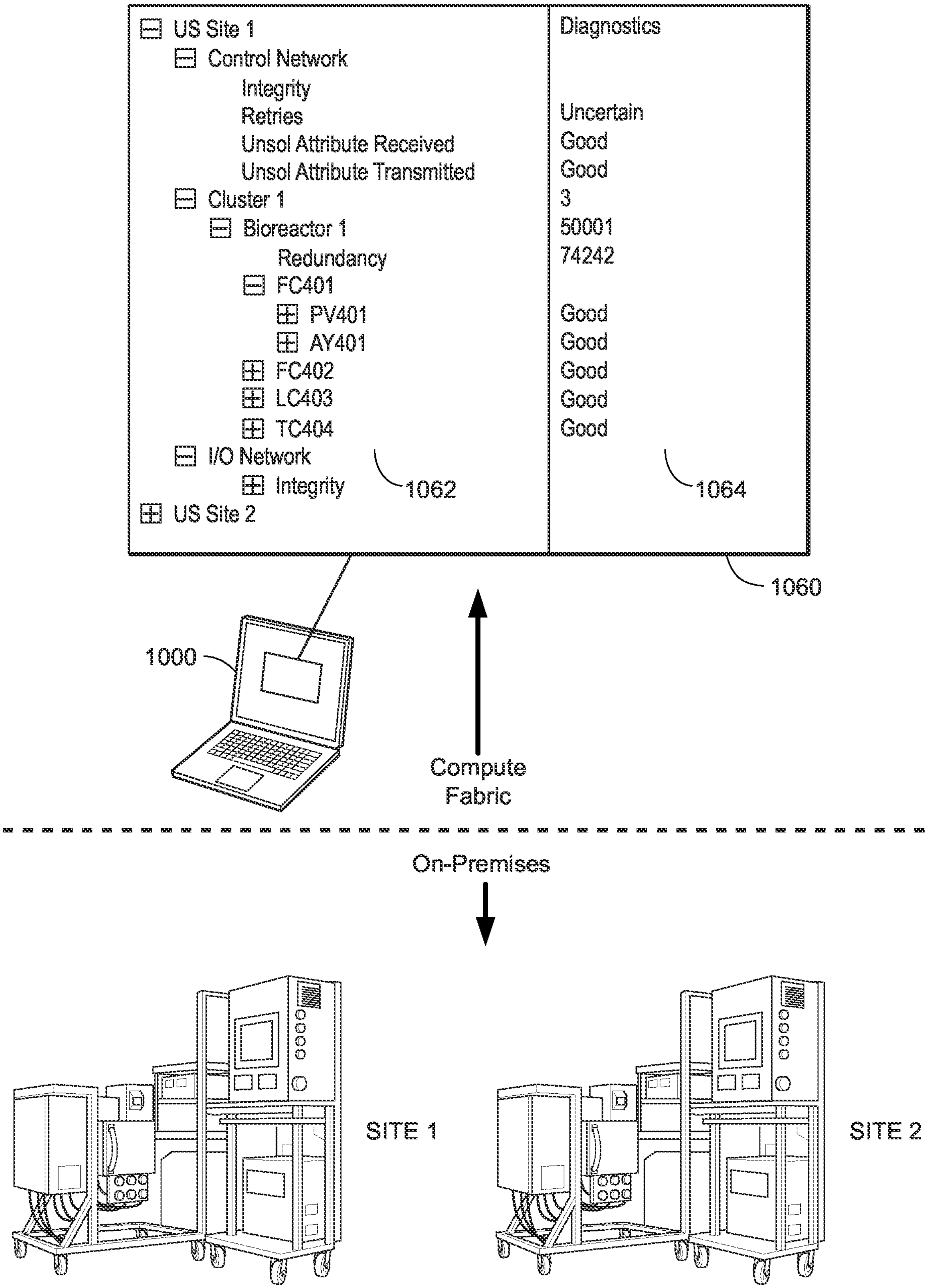
FIG. 10F depicts an example diagnostics GUI for multiple physical sites in an NGPCAS.

FIG. 10F depicts an example diagnostics GUI 1060, which includes an explorer region 1062 that provides a view of regions and sites of the enterprise (in a manner similar to the explorer region 1032 from FIG. 10C). Using the explorer region 1062, the user may navigate further into individual control loops, devices, I/O networks, etc. to view diagnostics particular to those process entities or groups of process entities. Diagnostics options displayed in the region 1062 for a given process entity may be updated dynamically to include real-time alerts associated with each process entity (e.g., a diagnostic option may be listed to alert the user of a mechanical issue with a field device, an I/O network integrity issue, etc.). Upon navigating to a process entity in the explorer region 1062, a diagnostics information region 1064 displays diagnostics information associated with the selected process entity or group of process entities.

Figure 10H:
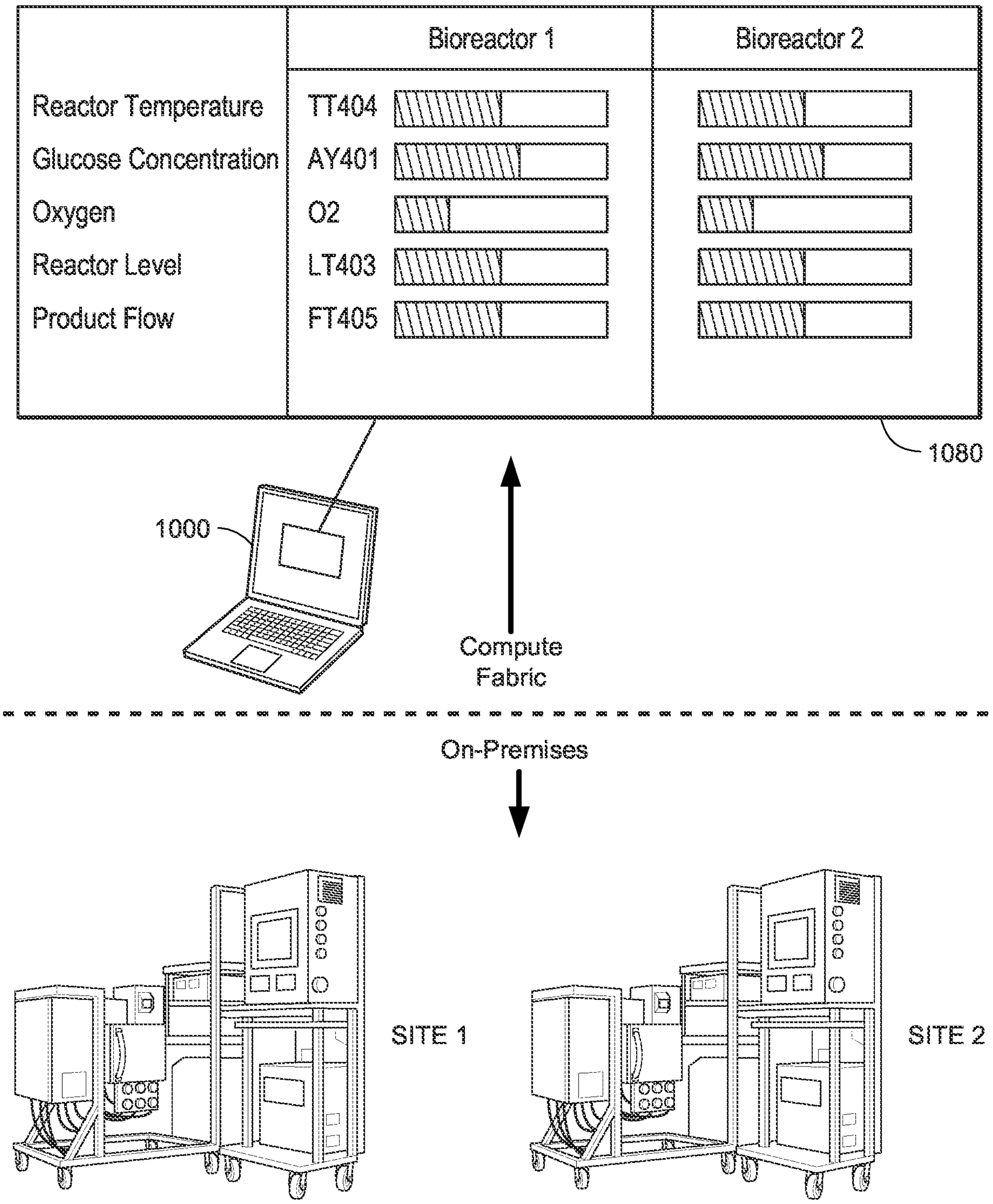
FIG. 10H depicts still another example diagnostics GUI for multiple physical sites in an NGPCAS.

FIG. 10G depicts another example diagnostics GUI 1070, which provides high-level diagnostics information associated with multiple sites operated by the enterprise ("Site 1" and "Site 2"). In implementations, the user may interact with information displayed in the GUI 1070 to view corresponding diagnostics information in further detail (e.g., by selecting the "System Integrity" or "Networking" option for Site 1, the user may view more detailed diagnostics information for the system or network in the manner depicted in the GUI 1060 of FIG. 10F). FIG. 10H depicts still another example diagnostics GUI 1080, which compares two similar physical sites (or portions thereof) operated by the enterprise. More particularly, the example GUI 1080 may compare setpoints, measured process variables, alerts, events, flow rates, data usage rates, and/or other information associated with two (or more) physical sites or comparable portions thereof.

Containerized Service Management Features

As discussed throughout the present disclosure, any of the services/functionalities of the NGPCAS described herein may be implemented as one or more sets of configured containers ("containerized services") which execute in the compute fabric to perform the actions attributed thereto (e.g., as described with respect to the compute fabric 400 in FIG. 4). Thus, any of the services/applications described above (and still other services/applications from the present disclosure, up to and including full operation of the enterprise and/or the physical sites therein) may be executed in the form of containerized services. The execution of these enterprise-level and provider services/applications via containerized services brings about a number of benefits, examples of which will be provided herein.

First, the containerized services executing any particular application (e.g., control containerized services) may be executed anywhere, e.g. at any physical location and/or in the remote compute fabric. Moreover, regardless of where the containerized services execute (e.g., on- or off-premises), the applications described herein may, in embodiments, remain accessible to users located at any physical location. For example, one or more applications operating a particular physical site (e.g., executing a control loop, performing site monitoring, etc.) may be implemented by a portion of the compute fabric in a location separate from the particular physical site (e.g., at another physical site, or at a remote operations facility which may jointly operate one, two, three, four or more sites). As another example, an application executing enterprise-wide functionalities pertaining to multiple physical sites of the enterprise (e.g., an enterprise-wide monitoring application) may be executed via portions of the compute fabric physically located on-premises at a particular site, at combinations of two or more sites, and/or at a site-agnostic remote location. In any case, for any remotely-executing containerized services operating on behalf of a particular site, compute-fabric resources on-premises at the site may execute redundant containerized services, such that control of the process plant can fail over to the on-premises compute fabric if necessary (e.g., in the event of failure of resources in the remote compute fabric, or loss of remote communicative connection to the site). Fail-overs may, for example, include (1) a fail-over from a node at a particular physical site to another node in the particular physical site of the enterprise, (2) a fail-over from a node at a particular physical site to a different physical site, (3) a fail-over from a node in the remote compute fabric to a node in a different portion of the remote compute fabric, or (4) a fail-over from a node in the remote compute fabric to a node in a physical site of the enterprise.

The containerized services executing any particular application may also be instantiated from any physical location and/or in the remote compute fabric. In other words, the location at which a containerized service is instantiated (manually by a human user, and/or automatically via a portion of the compute fabric) may be the same as, or different from, the location at which the instantiated containerized service ultimately executes. In some embodiments, for any containerized service instantiated within the NGPCAS, an orchestration service (e.g., orchestration service 422 from FIG. 4) may determine and assign the location at which the instantiated service is to be executed (e.g., based upon fault tolerance, load-balancing, quality-of-service (QoS) and/or other performance considerations described in this disclosure), thereby automatically causing the containerized service to execute at the determined location without further intervention from the instantiating service/user.

Moreover, the NGPCAS supports the movement of the execution of any particular containerized service(s) across two or more locations (e.g., via the Orchestration service 422 from FIG. 4). For example, a particular containerized service may be instantiated to execute on a remote (off-premises) portion of the compute fabric, and subsequently moved to an on-premises portion of the compute fabric at a physical site (or vice versa). Execution of containerized services may be moved on-demand (e.g., via instructions from a human user and/or automatically via other functionalities of the NGPCAS). Movement of execution of containerized services may be implemented for load balancing, and/or based upon actual and/or expected available processing or network bandwidth in the compute fabric. Additionally or alternatively, movement of service execution may be performed to reduce latency, e.g., by moving process-related services to a portion of the compute fabric that is closer to, or within, the physical site implementing the process that the service is configured to control, monitor, etc. In some implementations, configured containers holding containerized services may be pinned to a particular portion of the compute fabric and/or to other configured containers, so as to limit the potential for the NGPCAS to move execution of particular containerized services or to prevent the separation of a first set of containerized services from another set(s) of containerized services. In any case, movement of services may, for example, include (1) moving a service from a node at a particular physical site to another node in the particular physical site of the enterprise, (2) moving a service from a node at a particular physical site to a different physical site, (3) moving a service from a node in the remote compute fabric to a node in a different portion of the remote compute fabric, and/or (4) moving a service from a node in the remote compute fabric to a node in a physical site of the enterprise. As containerized services are moved between portions of the compute fabric and/or physical sites, the NGPCAS may perform automatic tuning of one or more control algorithms of one or more physical sites of the enterprise to account for differences in communication latencies that may be introduced by the movement of the containerized services.

In some implementations, execution of containerized services of an enterprise using the NGPCAS is moved regionally or globally across two, three, four or more physical locations to locate the execution of containerized services proximate to monitoring/control/operation facilities that are active and on-line in the NGPCAS at any given time. For example, execution of containerized services may be moved multiple times per-day to "follow the sun" across multiple remote locations, such that execution of the services is performed at each of the multiple locations during daylight hours of the respective locations (e.g., for an enterprise with remote monitoring/control/operation facilities in or near the cities of Denver, Frankfurt, and Sydney, execution of the services could be moved daily across portions of the compute fabric near the respective facilities (e.g., in the physical sites themselves or in remote locations nearer to such physical sites), such that services execute near each respective location when the respective location is between 09:00 and 17:00 hours). Thus, execution of services is moved dynamically to place the services close to personnel who can provide daytime service to the NGPCAS at any given hour. Of course, in alternate embodiments, execution of the containerized services need not be moved in order to control remote facilities. That is, in embodiments, one, two, three, or more enterprise facilities may operate to control multiple plant sites. For example, three control facilities may each operate in respective locales such that each control facility operates during daytime hours in its respective locale and such that, during those hours, the operating control facility coordinates control of all active plant facilities for the enterprise. Doing so can reduce overtime costs and, additionally, can provide high personnel redundancy with fewer additional personnel. In any event, in the case that containerized services are moved, the NGPCAS may perform automatic tuning of one or more control algorithms of one or more physical sites of the enterprise to account for differences in communication latencies that may be introduced by the movement of the containerized services.

In view of the above-described capabilities of the NGPCAS with regard to the containerized services, various application services/functionalities may be envisioned to allow enterprise users (or, in some instances, provider/manager users) to view and/or modify the locations and/or portions of the compute fabric via which other applications execute.

For example, in some implementations, any of the control, operations, and/or monitoring functionalities for a particular physical site may further provide an indication of where the underlying containerized services for the application are presently executing, and/or where redundant containerized services for the same application are located (e.g., in the physical site being controlled/operated/monitored, in a different physical site, or in any particular one of a number of remote operations centers). In another example implementation, a unified dashboard application provided by the NGPCAS for an enterprise may provide a unified view of containerized service execution locations for each of a plurality of services/applications in the enterprise NGPCAS and/or for a plurality of sites operated by the enterprise via the NGPCAS.

In any case, the NGPCAS may provide functionalities to enable to the user to cause transfer of the execution of containerized services for any given service/functionality between two locations (e.g., on-premises to off-premises, or vice versa). The user may cause the transfer of execution of the services to be performed immediately, performed at a future scheduled time (e.g., to "follow the sun" by moving the services at shift change between two or more disparate operations centers), and/or conditionally based upon performance measurements at the location from which the service execution is to be moved (e.g., containerized services are moved when the present execution location experiences a falls below a threshold network bandwidth, falls below a threshold processing availability measurement, experiences greater than a threshold latency time in essential communications with a physical site, etc.). Additionally or alternatively, in the event that a configured container fails and falls offline, the dashboard application may display an indication of failure of the configured container and enable the user to restore a state of operation of the configured container from a backup of the configured container (e.g., an on-premises backup).

Modular/Subscription-Based Distribution Features for Process-Related Services/Applications In view of the wide variety of industrial/automation processes that may be implemented by enterprises NGPCASs, the utility of various NGPCAS services/applications may vary significantly. Advantageously, the NGPCAS architecture of the present description allows an enterprise to acquire (e.g., purchase or subscribe to) and utilize these services/applications "a la carte," (i.e., independently of other services/applications). In other words, an enterprise user can individually select particular control, operations, monitoring, analytics, diagnostics, and/or other services/applications to implement in the enterprise NGPCAS (or a particular portion of the NGPCAS, such as a particular sites) to serve the particular needs of the enterprise.

In an implementation, a system provider hosts a marketplace or "store" that enables an enterprise-level user to acquire (e.g., purchase or subscribe to) various services/applications published by the system provider (e.g., as described with respect to "Example 3" in the foregoing sections of the present disclosure). The system provider may, for example, publish various control services/applications/modules that are particularly suitable for certain processes or process modules (e.g., for batch processes, for continuous processes, for processing of a particular process material through a particular process equipment, etc.). As another example, the system provider may publish various analysis, monitoring and/or diagnostics applications that are suitable for various process operations. As still another example, the system provider may publish still other system configuration tools, resource management tools, and/or other tools not specific to process operations but still pertaining to an enterprise's ownership or use of an NGPCAS. Applications may be packaged or distributed in various manners, e.g., some applications may be pre-packaged together as a unit, or some applications may be packaged together for inclusion upon initial purchase of NGPCAS resources by an enterprise.

In implementations, third-parties can similarly provide services/applications for purchase/subscription by other enterprises, e.g., for the other enterprise to access from a third-party via one or more APIs. A first enterprise, for example, may generate and distribute process functionalities utilized by the first enterprise and allow one or more other enterprises to run their own instances of the same functionalities via the respective NGPCASs of the other one or more enterprises of their own respective uses (e.g., one or more other enterprises may have interest in a control tool, analytics tool, or diagnostics tool offered by the first enterprise that implements a same or similar industrial process).

Upon an enterprise user acquiring a service/application from the marketplace (e.g., via subscription or via one-time-purchase), the system provider may automatically instantiate the acquired service/application into the compute fabric to enable the enterprise to utilize the acquired service/application (e.g., as described in this disclosure). In the case of services/applications that may materially affect operation of a physical site of the enterprise (e.g., an acquired control/operation algorithm, alarm module, etc.), the enterprise NGPCAS may first implement the acquired service/application in parallel with active control elements (e.g., in "simulation mode") to determine whether the service/application will operate safely and/or whether the service/application will improve operation of the physical site of the enterprise (e.g., based upon simulated process variable measurements, process setpoints, product quality metrics, process environmental metrics, etc.).

In view of the above, various NGPCAS marketplace/store functionalities may be envisioned. Any of these functionalities may be accessed and utilized by the authenticated/authorized user(s) from a suitable computing device(s) from any location using the compute fabric, e.g., from within a physical site to which the services/functionalities pertain, from within another physical site, or from still another physical location agnostic to any particular physical site. Moreover, the marketplace/store functionalities may enable an enterprise NGPCAS to utilize obtained services/applications in any portion of the NGPCAS once the enterprise has obtained the services/applications. By way of example and not limitation, NGPCAS marketplace/store functionalities may include any one or more of the following:

- a service/application inventory functionality to provide, to the enterprise user, a listing of services/applications acquired by the enterprise and the portion(s) of the enterprise NGPCAS in which the respective services/applications are downloaded and/or operating (e.g., which control modules in the enterprise an acquired control algorithm has been configured to control, which physical sites or processes a diagnostics application has operated upon in the last hour, day, week, month, etc.);
- a subscription management functionality to enable the user to view, modify, and/or terminate subscriptions to services/applications to which the enterprise has subscribed;
- a marketplace catalog functionality providing viewable listings of all first-party and/or third-party services/applications available for acquisition by the enterprise (to thereby incorporate service/applications into one or more NGPCASs of the enterprise);
- a marketplace catalog filtering functionality providing viewable filtered listings of the first- and/or third-party services/application available for acquisition (e.g., to filter listed services/applications based upon service/application name, publishing party, price, service/application type (e.g., control, operations, monitoring, diagnostics, analytics, etc.), reviews or ratings, tags, target process type (e.g., batch processes, continuous processes, refining, pharmaceuticals, etc.), target system requirements (e.g., controller or field device hardware requirements), and/or other service/application characteristics found in the present disclosure);
- a compatibility verification functionality to determine, and indicate to the enterprise user, whether a particular service/application in the marketplace is compatible for implementation with respect to a particular portion of a particular NGPCAS (e.g., whether the service/application is compatible to operate with respect to a software system of the enterprise or a hardware arrangement in one or more physical sites of the enterprise);
- a simulation functionality to cause a targeted service/application from the marketplace (or an upgrade thereof) to run in a simulation mode in an NGPCAS of the enterprise before and/or after acquisition of the targeted service/application, to determine whether the targeted service/application (or upgrade) is safe and effective to run in the NGPCAS (e.g., based upon simulated setpoints, process variables, field device hardware conditions, and/or product quality for a portion of a physical site with respect to which the service/application is to operate);
- a recommendation engine to generate and provide, to the enterprise user, recommendations of available services/applications in the marketplace that may produce improvements in the enterprise NGPCAS and/or physical site(s) upon implementation of the service/application, or that otherwise provide benefits if executed in the enterprise NGPCAS (e.g., based upon a simulated execution of the service/application in the enterprise NGPCAS, based upon results of operation of the recommended service/application in similar processes to those implemented by the enterprise, and/or based upon the system provider monitoring/comparing relative operation of different sites of one or more NGPCASs including sites using a recommended service/application and sites not using the recommended service/application);
- a service/application instantiation functionality to create (e.g., instantiate) containerized services (including backups thereof) in the NGPCAS of the enterprise to execute an acquired service/application upon the enterprise user acquiring the service/application via the marketplace;
- a version management functionality to receive and provide indications of (and, in some instances, automatically implement) software version upgrades to any services/applications previously acquired by the NGPCAS; and/or
- any other marketplace/store functionality described in the present disclosure, e.g., with respect to "Example 3" in the foregoing portion of this disclosure.

Figure 11A:
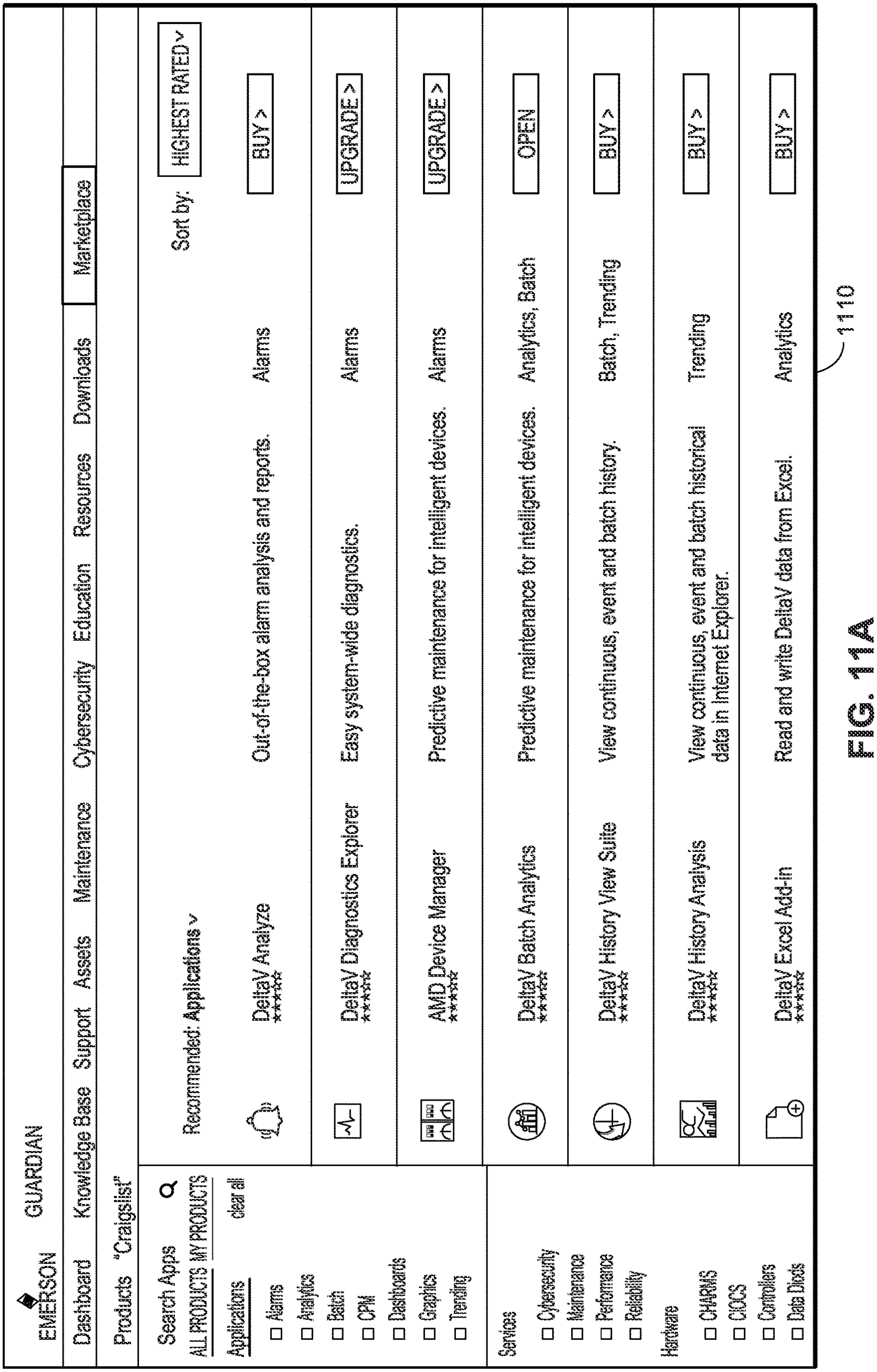
FIG. 11A depicts an example marketplace GUI for viewing and acquiring services/applications in an NGCPAS.
Figure 11B:
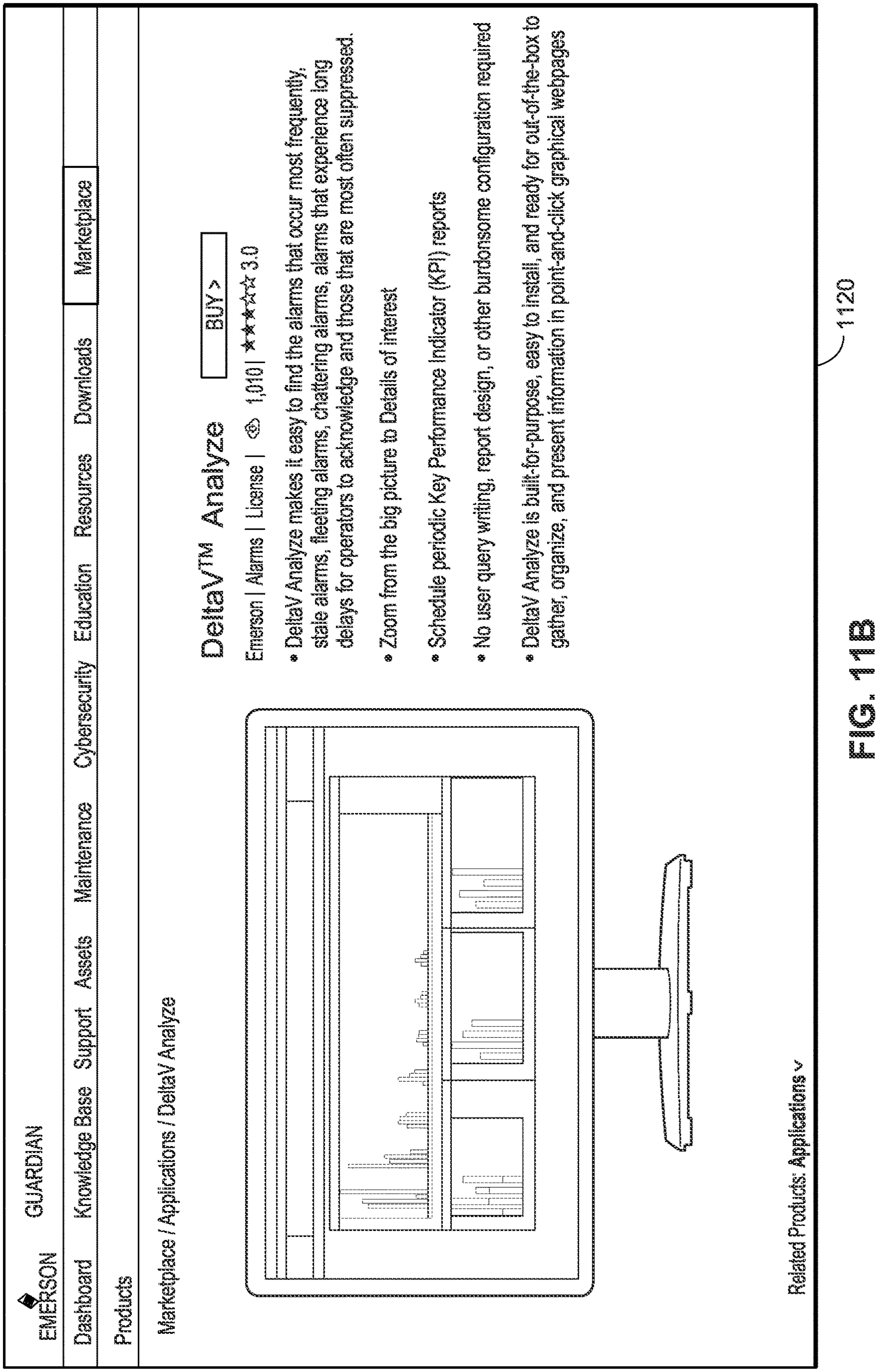
FIG. 11B depicts another example marketplace GUI for viewing and acquiring a particular service/application.

In view of the foregoing, FIGS. 11A and 11B depict example GUIs associated with a service/application marketplace offered by the NGPCAS system provider. The GUIs of FIGS. 11A and 11B may be displayed, for example, via the computing device 1000 as described with respect to FIGS. 10A-10H (e.g., communicatively connected to the compute fabric, either from within a physical site or remotely from a site-agnostic location).

First looking to FIG. 11A, an example catalog GUI 1110 provides a few of process-related services/applications available through the service/application marketplace described in the foregoing. The catalog GUI 1110 provides an indication of services/applications that are available for the enterprise to acquire (via one-time-purchase and/or subscription), which services/applications the enterprise has already acquired, and which services/applications have upgrades available. The catalog GUI 1110 includes filters that allow the user to sort services/applications, e.g., by service/application category, reviews, cost, and/or other parameters described herein. FIG. 11B depicts an example purchasing GUI 1120 displaying cost information and purchase options associated with a particular one of the services/applications selected from the catalog GUI 1110 of FIG. 11A. Upon completing a purchase of the selected service/application, the enterprise user can integrate the purchased service/application into the enterprise NGPCAS via the techniques described in the present disclosure.

Centralized Monitoring and NGPCAS Upgrades by System Provider

Still additionally to the capabilities the NGPCAS described above, the system provider of the NGPCAS may implement further system monitoring and administrative management functionalities with respect to respective NGPCASs operated by each of one, two, three, four or more enterprises (independently from the enterprises themselves). Generally speaking, centralized monitoring (and/or optimization) functionalities described herein are provided not only for process control functionalities (e.g., operations directly participating in implementation of a process), but also for quality of service and resource management of NGPCAS resources across an entire enterprise. In various implementations, enterprise users may customize the usage (or non-usage) of these multi-enterprise monitoring functionalities by the NGPCAS, e.g., by selecting preferences and permissions for data to be shared with the system provider for purposes of multi-enterprise monitoring (e.g., sharing of site-specific process data, compute fabric network traffic, application usage by enterprise users, etc.).

In some implementations, for example, the system provider may monitor process data (e.g., process setpoints, control inputs/outputs, measured process variables, product quality metrics, process environment data, site-specific network traffic in controllers, field devices, etc.) in one or more physical sites of the enterprise to identify and notify an enterprise user of potentially unsafe conditions in one or more sites (e.g., field device failures, unsafe environmental conditions, unsafe product quality, etc.). As another example, the system provider may monitor higher-level network traffic in the enterprise NGPCAS (e.g., across the compute fabric servicing one or more sites) to identify anomalies in use of the NGPCAS network by processes and/or users (e.g., potentially indicative of intrusions into a process control system, or compromise of a user account of an enterprise user). In some embodiments, the monitoring of process data and/or network traffic of the enterprise includes comparing the process data/network traffic to baselines established by comparison to one or more other enterprise NGPCASs (e.g., other enterprises of similar size, running similar processes at physical sites, etc.). Moreover, the monitoring of the NGPCAS may implement fault-handling and/or fault-protection measures for the enterprise, e.g., to protect against a large scale failure in one or more of the enterprise's physical sites or in large portions of the remote compute fabric (for example, the system provider may manage reallocation of the serving compute fabric among various remote compute fabric resources, or delegate primary operations for the enterprise to on-premises portions of the compute fabric).

Figure 12A:
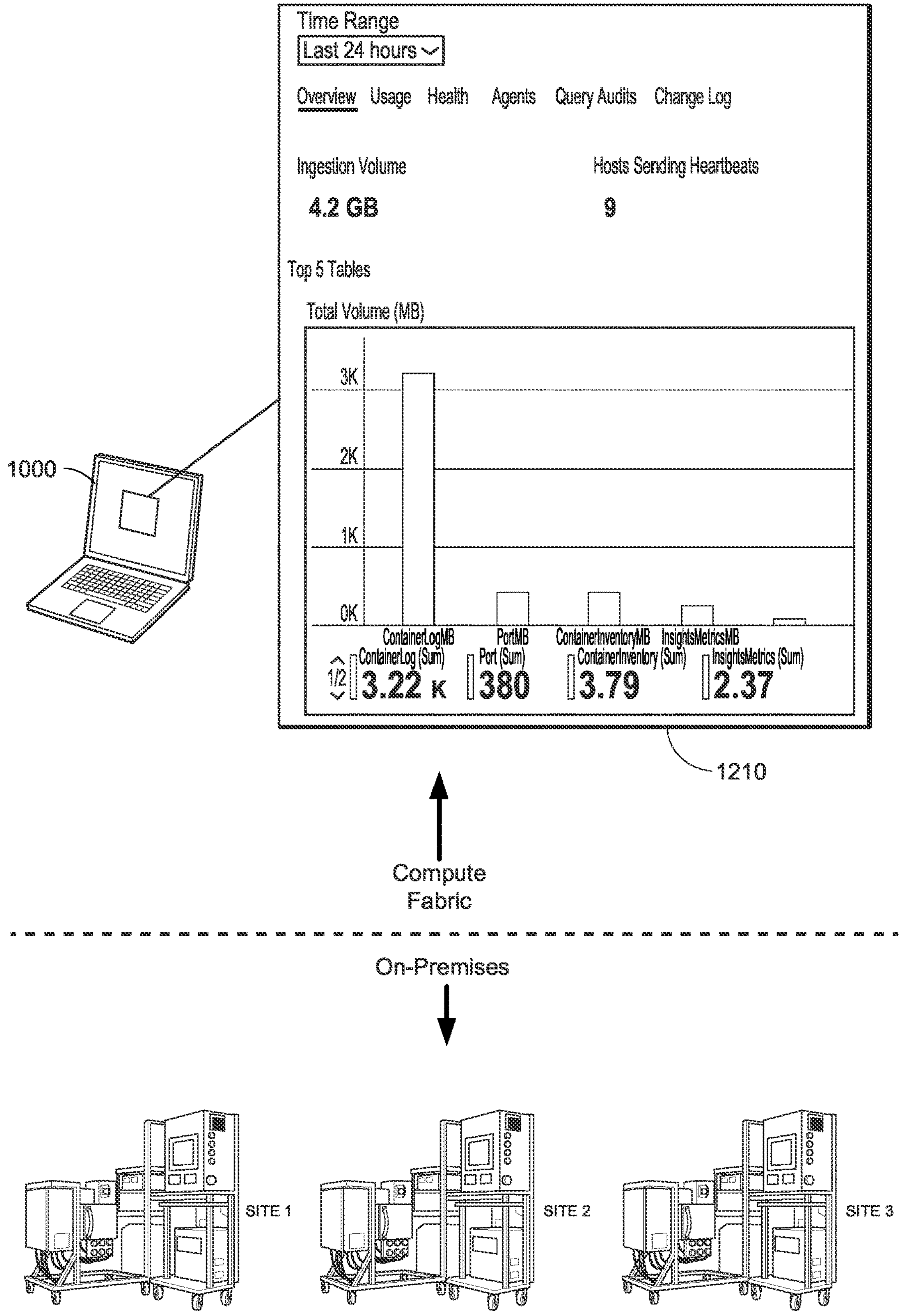
FIG. 12A depicts an example data ingestion GUI for multiple physical sites of an enterprise.
Figure 12B:
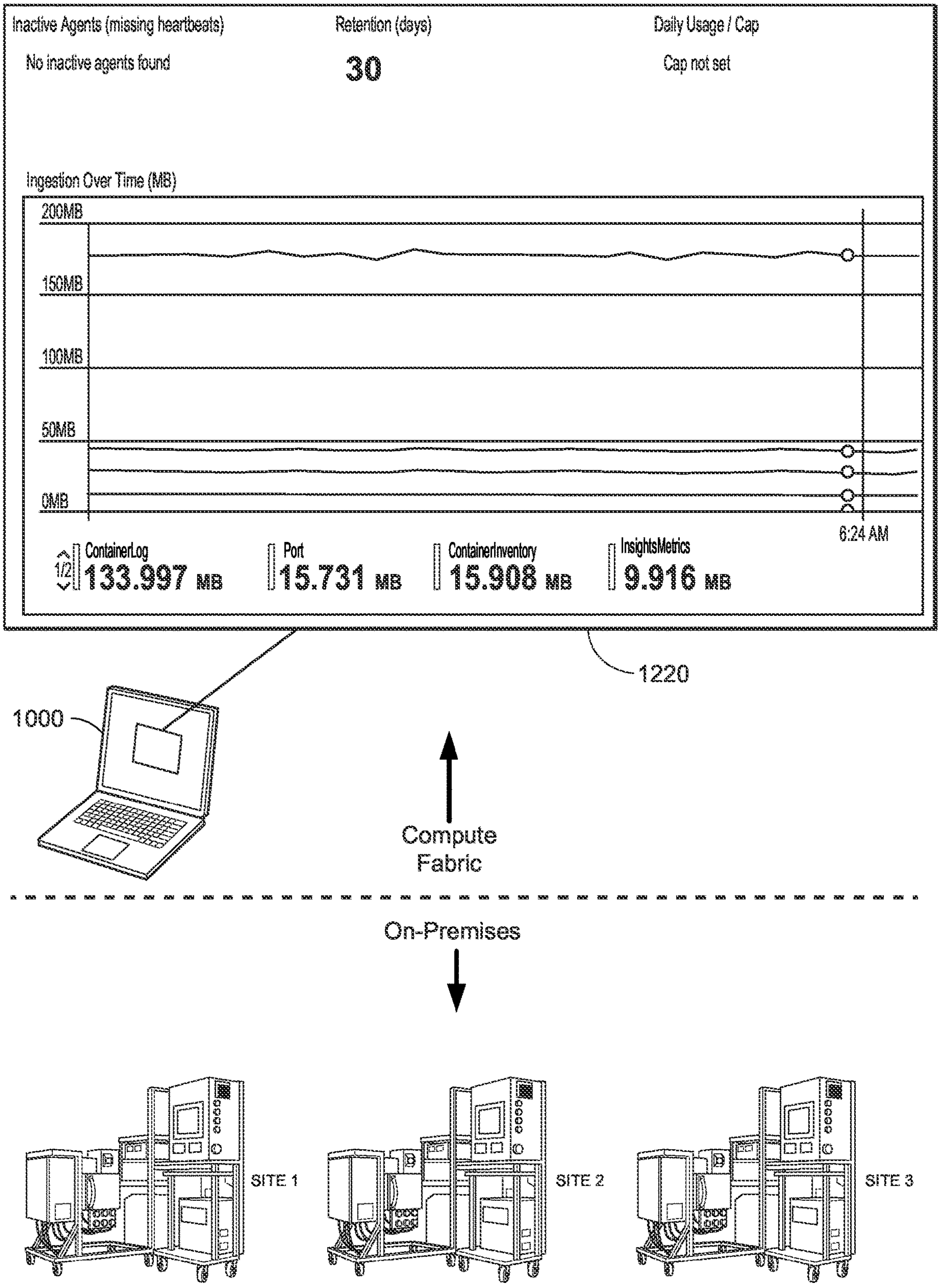
FIG. 12B depicts another example data ingestion GUI for multiple physical sites of an enterprise.
Figure 12C:
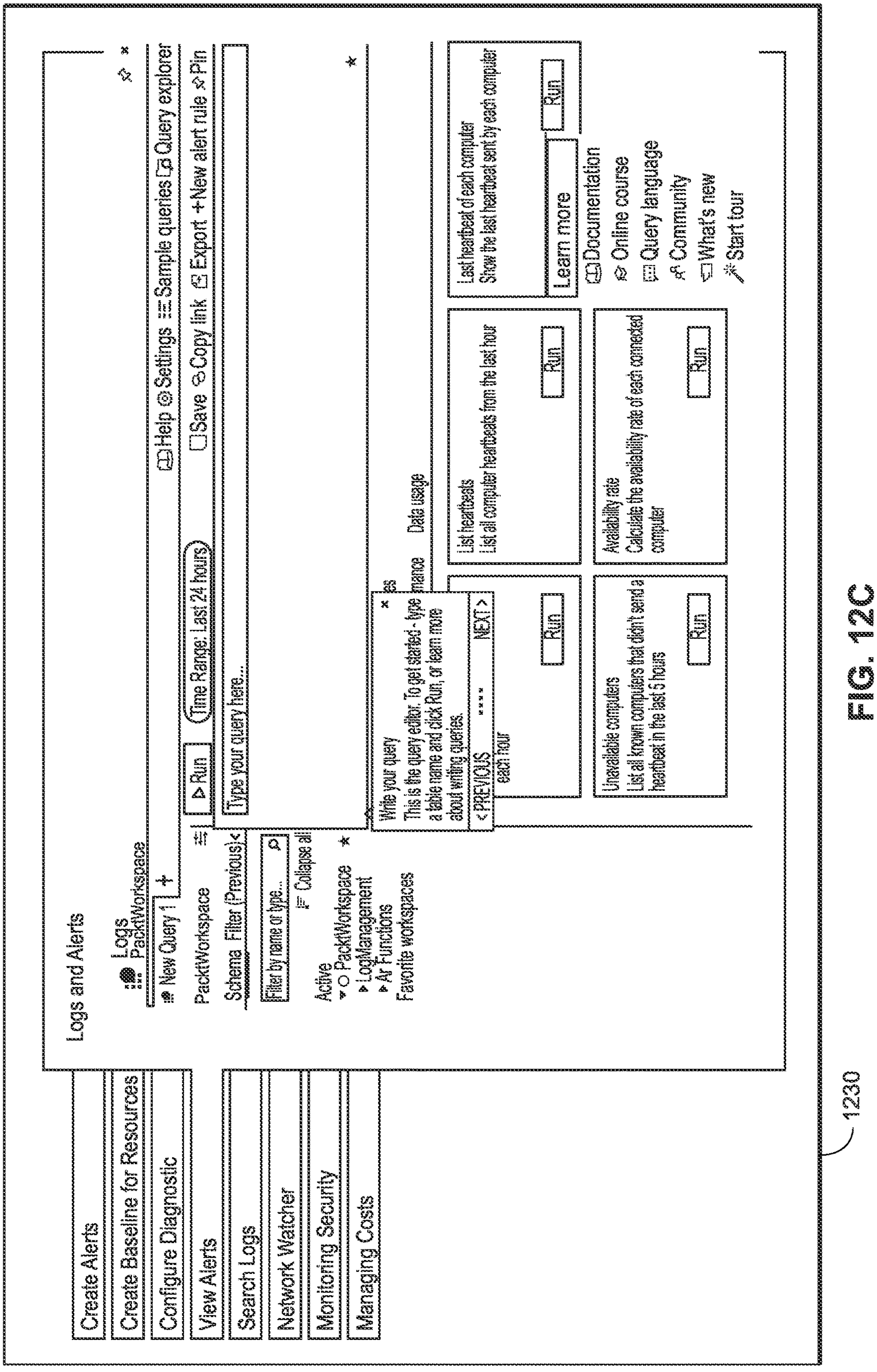
FIG. 12C depicts a diagnostics GUI for an enterprise NGPCAS.

FIGS. 12A-12C depict example enterprise or multi-enterprise monitoring GUIs that may be provided in accordance with the functionalities described above. Referring first to FIG. 12A, a data ingestion GUI 1210 may display data ingestion metrics associated with respective portions of one, two, three or more sites of an enterprise, and/or of two or more different enterprises or portions thereof. Similarly, FIG. 12B depicts another example data ingestion GUI 1220 charting data ingestion by the site(s)/enterprise(s) (or portions thereof) over a duration of time. FIG. 12C depicts a multi-enterprise diagnostics GUI 1230 that may enable a user in the system provider to view or create alerts, monitor network activity, and review usage logs for one, two, three or more enterprises.

In addition to performing centralized monitoring of multiple enterprises, the system provider can centrally manage hardware and software upgrades for the respective NGPCASs of a plurality of enterprises. For example, as described in foregoing sections of this disclosure, the system provider may centrally receive and implement upgrades to services/applications provisioned via the system provider marketplace (e.g., upgrades to first-party and/or third-party services/applications, implemented via new, upgraded containerized services created in the NGPCASs of enterprises that have acquired the service/application). Upgrades managed by the service provider can additionally or alternatively include control algorithms, field device or controller software, diagnostics software, etc. Moreover, as an enterprise installs new hardware (e.g., controllers, field devices, etc.), in one or more physical sites, the discovery service operating in the compute fabric may automatically discover the new hardware (e.g., based upon respective EDID detected from the hardware upon startup). Upon detecting the new hardware, the compute fabric may automatically upgrade and/or replace compute fabric resources of the enterprise to match the new hardware in the physical site (e.g., such that compute fabric representations of the hardware, including the digital twin of the hardware, match the hardware actually installed in the physical site).

Although the monitoring functionalities and graphical user interfaces described above are described as being accessed and utilized by the system provider, it should be appreciated that at least some of these monitoring functionalities/interfaces can be provided to any particular enterprise. In such instances, monitoring functionalities and information provided to an enterprise user are limited to the activity of that particular enterprise (e.g., the enterprise's own process data, network traffic, compute fabric usage, etc., without compromising information associated with other enterprises served by the system provider). Centralized management/monitoring by a particular enterprise may, for example, include monitoring of one, two, three, four or more physical sites of the enterprise, from any physical location (e.g., from within a site or from one or more locations agnostic to any particular site). Centralized management/monitoring by the particular enterprise can, for example, include monitoring operation of physical processes at one or more sites and/or monitoring of NGPCASs resources of the enterprise (e.g., on- or off-premises NGPCAS resources). Additionally or alternatively, an enterprise user may centrally manage various system upgrades and/or optimizations within one or more NGPCASs of the enterprise or within components of one or more NGPCASs of the enterprise (e.g., upgrades/optimizations to process control, operations, monitoring, etc., as described above with respect to the system provider).

Enterprise Fleet Management

As described in foregoing sections in this disclosure, the NGPCAS provides a wide array of access into various aspects into industrial or automation processes, sites, personnel, and/or business aspects of an enterprise. In some embodiments of this disclosure, more particularly, it is envisioned that one or more enterprise fleet management applications utilize the NGPCAS architecture to provide views into industrial or automation systems installed by enterprise end users into various physical sites (and into the corresponding industrial or automation systems running on the systems at the various sites). These industrial or automation systems installed by enterprise end users can, for example, include distributed industrial or automation process control systems, standalone process control systems, skid-mounted modular systems or sub-systems ("skids"), site condition monitoring systems, and/or other systems that are installed by an enterprise and that serve to implement or support one or more industrial or automation processes. Various examples of information and functionalities provided via the enterprise fleet management application(s) will be provided below. It should be appreciated, though, that these examples are not limiting. For example, functionalities of the enterprise management application(s) as described herein may be combined with (or, in some embodiments, replaced with) functionalities of the Enterprise Fleet Management application 634 of FIG. 6B, functionalities available to enterprise users and/or to an NGPCAS provider as described with FIGS. 10A-10H, 11A, 11B, and/or 12A-12C, and/or other functionalities available to enterprise users or to the provider as described in other sections of this disclosure.

In embodiments, the NGPCAS may enable access to the fleet management application(s) to a provider of the NGP- CAS to enable the NGPCAS provider to view, e.g., in real-time and/or by using live data, information regarding systems and operations of systems installed by each of one or more enterprises. The provider, as permitted by users in an enterprise, may use the fleet management application(s), for example, to monitor, support, or diagnose issues with any particular system of the enterprise, and/or to compare respective operations of two or more systems installed by the enterprise (e.g., comparing industrial or automation processes executing on different respective hardware sets and/or at different respective sites). Access by the provider to system operation information regarding any particular enterprise can be defined by an authorized user(s) associated with the enterprise. The enterprise user may, for example, set limits upon which sites, systems, processes, equipment, control loops, etc. are available to the provider, and/or upon what types of analyses the NGPCAS provider is permitted to perform with respect to obtained enterprise system information.

Additionally or alternatively, in embodiments, the fleet management application(s) described in this section are made available to enterprise end users to enable the enterprise end users to view, e.g., in real-time and/or by using live data, information regarding systems installed by the enterprise, operations of the system, and any other supporting infrastructure associated with the system. An authorized user in a given enterprise may, for example, use the fleet management application(s) (1) to monitor, support, or diagnose issues with any particular system of the enterprise, (2) to compare respective operations of two or more systems installed by the enterprise (e.g., comparing industrial or automation processes executing on different respective hardware sets and/or at different respective sites), and/or (3) to manage and delegate authority regarding operation/supervision of systems of the enterprise based upon information made available through the fleet management application(s). Access of any user in the enterprise to information or functionalities in the fleet management application(s) may be defined based upon data/personnel management policies defined by the enterprise.

In any case, the one or more enterprise fleet management applications described herein are built off of the NGPCAS architecture, and accordingly, may operate using various aspects of the NGPCAS architecture as described in this disclosure. For example, aspects of the one or more enterprise fleet management applications (e.g., individual dashboards, processes, etc.) may execute in micro-encapsulated execution environments as described in this disclosure (e.g., containerized components or other MEEEs 140 as described with respect to FIG. 1 and other portions of this disclosure). Likewise, the NGPCAS may provide access to the fleet management application(s) to the enterprise users and/or to the provider via one or more APIs over respective dedicated VPNs (e.g., using APIs 160, 165 and VPNs 158, 162 as described with respect to FIG. 1). Moreover, access to the fleet management application(s) may be safeguarded via use of the various other security features of the NGPCAS envisioned in the present disclosure (e.g., authentication of users, role-based access restrictions and authorization to information, VPN access to sites, security of individual MEEEs, etc.). Access to information from any given site may be provided to the fleet management application(s) by way of API calls from the application(s) (e.g., using REST, GraphQL, etc.) to retrieve information from the appropriate site(s) (e.g., via a respective gateway/router/aggregator 148 associated with any given site 115 as described with respect to FIG. 1). Accordingly, the functionalities of the fleet management application(s) described herein, being built off of the NGPCAS architecture of the present disclosure, reflect the advantages of the NGPCAS architecture over previously existing process control system architectures. For example, the fleet management application(s) provide secure and reliable access to various aspects of one, two, three, four or more sites operated by an enterprise, thereby enabling effective retrieval, analysis, and presentation of various operational aspects of the enterprise distributed throughout one site or across multiple sites at different respective physical locations (e.g., higher-level analyses of health of a control routine, system, site, or group of sites that may rely upon access to information from various physical locations, including real-time information in some instances). Moreover, because the operation of the compute fabric of the NGPCAS is agnostic or indifferent to physical location (e.g., as described with respect to FIG. 6A), various embodiments of the fleet management application(s) described herein built off of the NGPCAS may allow for viewing or reconfiguring of aspects of one or more process control systems/sites of the enterprise from a remote location.

Still further, it should be appreciated that the information provided by the enterprise fleet management application(s), being built off of the NGPCAS architecture, can include substantially real-time information reflecting current operation of an enterprise system(s), historical information reflecting past operation of the enterprise system(s), and/or information indicating future operation of the enterprise system(s) (e.g., results of simulated operation). Moreover, generally speaking, information provided by the fleet management application(s) may include data directly obtained, e.g., in real-time, from process sites (e.g., setpoints, measurements, etc.), and/or information obtained indirectly based upon the data from process sites (e.g., results of analyses of data performed via the fleet management application(s)). Still additionally, information generated via the fleet management application(s) (e.g., higher-level information generated via analyses of multiple control systems, sites, etc.) may, in embodiments, be accessed via MEEEs from other physical locations or sites via the APIs 162, 165 described with respect to FIG. 1.

In view of the above, examples of information and functionalities provided via the fleet management application(s) are provided below.

Process Health Information

The fleet management application(s) implemented via the NGPCAS may provide access to information reflecting the overall health of one or more industrial or automation processes implemented at one or more physical sites.

Process health information can include, for example, certain key process values that are indicative of the status, safety, quality, and/or efficiency of a process or portion thereof. These key process values can include, for example, values of temperature, pressure, volume/level, flow rate, data throughput rate, setpoints, and/or other parameters associated with particular equipment, control, etc. Process health information can additionally or alternatively include other properties of materials involved in the system or process, e.g., temperatures, pressures, or flow rates of process materials, quantities of used or unused materials, etc. The fleet management application(s) may use raw indicators such as these, directly or indirectly, to identify or diagnose higher-level phenomena associated with the process and indicative of a health condition or state associated with the NGCPAS, including for example (1) a hitting of a limit (e.g., what limit(s) and how frequently), (2) a number, frequency, and/or type of an alarm or alert associated with the process, (3) a determination of whether the process is behaving within normal operating regions (e.g., how often or for how long a monitored parameter is at, near, or outside a normal operating range, is a throughput in a normal operating range, etc.), (4) a failed device, controller, sensor, etc., (5) a number or frequency of retries in the process control system, and/or (6) a control slippage behavior associated with the process.

Process health information accessed via the fleet management application(s) can still additionally or alternatively include leading indicators associated with a system or a process implemented therein, e.g., values indicative of future process or equipment status. In these instances, the fleet management application(s) may ingest any raw information (e.g., real-time or historical health data or information, diagnostics information generated from the health information, and/or other information described herein), and execute one or more predictive analytics routines based upon the raw information to generate predicted values of same and/or different parameters associated with the process, the system, the site, etc. Predictive analytics may be performed, for example, on devices in the process control system (e.g., a valve, transmitter), on other equipment associated with the system (e.g., a reactor column), on distributed control system elements (e.g., a controller, I/O device, network device or traffic therein, etc.), and/or on other aspects of a process (e.g., product quality, composition, viscosity, etc.). In embodiments, the fleet management application(s) may use these predicted values to predict future higher-level process phenomena such as those described above (e.g., hitting of a limit, an alarm, etc.). Still yet additionally or alternatively, in embodiments, process health information made available via the fleet management application(s) can include quality or production metrics (e.g., quantity or production rate) associated with one or more products achieved via one or more industrial or automation processes implemented by the enterprise.

Equipment Health Information

Additionally or alternatively to the overall process health information described above, the fleet management application(s) implemented via the NGPCAS may include information associated with the overall health of physical equipment of one or more systems utilized in the implementation of one or more industrial or automation processes of the enterprise.

Equipment health information can include, for example, values of parameters associated with health or wear of physical equipment such as a reactor, a boiler, a tank, a process fluid line, a valve, an actuator, a generator or other electrical hardware, a wired signal transmission line, a router, gateway, or other network equipment, etc. (i.e., one or more of any such equipment), a disk or processor, infrastructure devices and/or equipment, and/or other equipment involved in the operation of a process or otherwise associated with a process site Additionally or alternatively, equipment health information can include values of parameters associated with health of other devices associated with implementation of one or more industrial or automation processes. These other devices may include, for example, a sensor, an alarm device, a display or status indicator light, an environmental monitoring device, etc. (i.e., one or more of any such device(s)).

Control Health Information

The fleet management application(s) implemented via the NGPCAS may provide access to information indicating the overall health of one or more control modules or routines used in implementation of one or more industrial or automation processes of an enterprise.

The fleet management application(s) may, for example, provide analyses of health of control loops implemented in a process. These analyses may, for example, indicate the variability of setpoints and/or measured process variables of the process, e.g. to raise issues regarding the health of the control loop based upon erratic or otherwise unexpected behavior of a setpoint of measured process variable over time. These analysis may additionally or alternatively indicate variation of outputs of control loops, e.g., indicating whether the loop is at a limit, whether the loop is cycling, etc., and/or statuses of units and/or signals involved in a control routine.

In view of the description in this disclosure of digital twins of components of a process control system, the fleet management application(s) may monitor and compare the status of digital twins to corresponding physical components in the process control system, and raise an alert and/or perform remedial steps upon a detection that a digital twin has deviated from its corresponding physical component. For example, if a sensor value produced via a physical sensor differs from a value produced via a digital twin of the sensor, the fleet management application(s) may produce an alert indicating that the physical sensor is drifting. In these scenarios, the fleet management application(s) may prompt an appropriate user in the enterprise to recalibrate the physical sensor, or may cause automatic recalibration of the physical sensor to correct the detected drift.

Process Control System Health Information

Still additionally or alternatively to the foregoing information, the fleet management application(s) implemented via the NGPCAS may provide access to other information indicative of the overall health of an industrial or automation process control system operated by an enterprise. The process control system health information may, for example, indicate the health of network nodes and/or node subsystems in the process control system, and/or of other communication devices in one or more communications system/subsystems of a site (e.g., connectivity, data throughput rate, data throughput volume, traffic patterns, security information, etc. associated with routers, gateways, etc.). The process control system health information may additionally or alternatively include information indicating health or operation of input/output (I/O) cards and/or other physical or virtual I/O devices between field devices in the process control system and the routers/gateways/aggregators, as well as of other types of devices included in the NGPCAS.

Configuration Information

Still yet additionally or alternatively to the foregoing information, the fleet management application(s) implemented via the NGPCAS may provide access to configuration information associated with an enterprise. Such configuration information may, generally speaking, indicate configurations of processes, process equipment, other hardware modules, software modules, and/or other aspects of the enterprise.

More particularly, configuration information accessed via the fleet management application(s) can include version information associated with software applications, instances, control routines, and/or other logical entities utilized by the enterprise in operation of one or more industrial or automation processes. Version information may be utilized in the fleet management application(s), for example, to ensure that processes are running on up-to-date versions when desired, and/or to revert a particular process, site, entity, etc. back to a previous version when needed (e.g., in response to failure of a newer version).

The configuration information accessed via the fleet management application(s) may additionally or alternatively include indicators of downloads of software and/or other information into sites, equipment, and/or other physical or logical entities of one or more process control systems in the NGPCAS.

Still additionally or alternatively, in embodiments, the fleet management application(s) may provide comparison of implemented hardware, firmware, and/or software to corporate standards defined by the enterprise, e.g., to ensure that operation of a particular site, system, or process complies with desired operation of the enterprise across a number of locations.

Security Information and Event Management

Still in addition to or alternatively to the other information described in the foregoing sections, the fleet management application(s) may provide security information and event management functionalities associated with user accounts, subscriptions, and traffic in a process control system or other portions of an NGPCAS.

The fleet management application(s) may, for example, monitor the use of user accounts across the enterprise, including for example the number of logins attempted per hour/day/month/etc. by any particular user or users, or failures in identity or authentication of a user performing any particular action in relation to a process or in relation to the NGPCAS. The fleet management application(s) may store and/or display session information relating to user logins and/or operation of software modules by the users.

Still additionally or alternatively, the fleet management application(s) may provide various information to a user indicating subscriptions and/or publishing roles of physical or logical entities with respect to other physical/logical entities in the NGPCAS (e.g., to display and/or reconfigure which entities are entitled to share information with which other entities in the NPGCAS). Still yet additionally or alternatively, the fleet management application(s) may obtain network traffic information regarding one or more systems, sites, processes, etc., e.g., to detect and alert application users of unusual traffic patterns in any particular portion of the NGPCAS.

Example Dashboards

In view of the information and functionalities provided by the fleet management application(s) as described herein, various dashboards and/or other functionalities may be envisioned for displaying and analyzing the operation of one or more systems of one or more enterprises. Examples of such functionalities will be provided below, but should not be seen as limiting. These functionalities may, for example, be substituted or combined with other provider features and/or enterprise-level features described in other sections of this disclosure.

In example embodiments, fleet management application(s) may include dashboards or other visualizations to compare the operation of processes implemented via two or more other systems and/or sites, e.g. to compare product production quantity and/or quality, process safety or efficiency metrics, or other process information among the two or more systems/sites.

As another example, in embodiments, the fleet management application(s) allow a user thereof to develop, configure, and/or customize health indicators for a physical or logical entity. For example, the user may specify or define thresholds against which the health of a corresponding entity is to be evaluated, e.g., to indicate the entity as being in good health (i.e., adequate operational state) when a value is above (or below) a threshold, or provide a notification or alert regarding the health of the corresponding entity when the value is below (or above) the threshold. Such health indicators may be configured for any of the physical or logical entities described in the foregoing sections, in various embodiments, and/or for any other physical or logical entity monitored via the NGPCAS using any standard (e.g., DeltaV, APL, HART, WirelessHART, Foundation Fieldbus, OPC UA, etc.). In particular, though, it should be appreciated that these health indicator configuration functionalities, being built off of the NGPCAS location-agnostic compute fabric, enables substantially real-time access to various aspects of multiple physical locations involved in the enterprise, may provide for configuration of higher-level health indicators involving various aspects of multiple physical sites (e.g., an indicator of health of a process control system or operation for generating a product(s) spanning across multiple physical locations).

In some embodiments, health indicators of the various physical and logical entities described herein include rolling health indicators, e.g., indicating highest, lowest, and/or average values for any given parameter over a recent duration of time (e.g., the last minute, ten minutes, hour, day, etc.), so as to reduce or eliminate false indications. In embodiments, users of the fleet management application(s) may customize the types of health indicators to be provided to the user regarding any particular physical or logical entities (e.g., to customize the time frame of a rolling health indicator).

As described above, information provided via the fleet management application(s) may include version and/or configuration information associated with various software entities associated with the NGPCAS of the enterprise. Accordingly, in embodiments, one or more dashboards are provided to enable a user to view and/or revise version and/or configuration information associated with the software entities. Additionally or alternatively, in embodiments, dashboards may be provided to allow an enterprise user to specify or define which physical or logical entities a provider monitors according to the techniques herein, and/or to configure or define dashboard graphical user interfaces (GUIs) configured to display information associated with the physical or logical entities (e.g., which entities are included and the GUIs, and the visual arrangements and presentations of the information included therein).

In any of the embodiments described herein, various querying, filtering, and searching functionalities may be included to allow a user to refine a view of information, for example based upon time (e.g., last hour, minute, day, week, month, year, etc., daytime vs. nighttime hours, a search for a particular historical time window, etc.), or based upon site and/or system/subsystem/device. In this sense, the fleet management application(s) may enable the user to see snapshots of operation of any particular physical or logical entity over any duration of time, alone or in comparison to another one or more physical or logical entities.

In embodiments, artificial intelligence functionalities may be incorporated into the fleet management application(s), for example to generate additional health indicators (parameters) associated with the health of a process (or system, site, etc.) to be displayed to the user via the fleet management application(s). Using supervised and/or unsupervised machine learning techniques, for example, one or more processing elements may analyze indicators associated with the operation of the enterprise NGPCAS (e.g., of a particular process(es), site(s), system(s), etc.) to identify particular parameters that correlate to desired operation of the NGPCAS (e.g., particular equipment parameter values, setpoint behaviors, network traffic patterns, etc. that correlate to desirable product quality or production numbers). Health modules in the fleet management application(s), configured to display a plurality of health indicators to a user to intuitively represent health of the NGPCAS or a portion thereof, may include one or more known building blocks (health indicators) and/or one or more new health indicators identified via these machine learning techniques. Additionally or alternatively, in embodiments, the predictive analytics routines described in the foregoing may utilize machine learning techniques. For example, one or more processing elements may be trained to predict future behavior of a field device, distributed control system element, other process equipment, process material/product qualities, and/or other parameters associated with operation of a site, system, process, etc.

Other Considerations

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present application has been described with reference to specific examples, which are intended to be illustrative only and not to be limiting, it will be apparent to those of ordinary skill in the art that changes, additions or deletions may be made to the disclosed embodiments without departing from the spirit and scope of the application.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present application. It is to be understood that other variations and/or modifications of the embodiments of the present application described and/or illustrated herein are possible in light of the teachings herein and should be considered part of the spirit or scope of the present application. Certain aspects of the application are described herein as example aspects below.

Aspect 1. A method of a fleet management application executing in a compute fabric associated with one or more process control or automation systems of an enterprise, the method comprising: first accessing, via a first one or more application programming interfaces (APIs), a first one or more micro-encapsulated execution environments (MEEEs) executing in the compute fabric; second accessing, via a second one or more APIs, a second one or more MEEEs executing in the compute fabric; via the first accessing, obtaining, from the first one or more MEEEs, a first set of operational parameter values regarding a first one or more operations of the one or more process control or automation systems of the enterprise at a first one or more physical sites; and via the second accessing, obtaining, from the second one or more MEEEs, a second set of operational parameter values regarding a second one or more operations of the one or more process control or automation systems of the enterprise at a second one or more physical sites.

Aspect 2. The method of aspect 1, wherein the first or the second set of operational parameter values comprise one or more health indicators associated with a health of an industrial or automation process associated with the enterprise.

Aspect 3. The method of aspect 1 or aspect 2, wherein the first or the second set of operational parameter values comprise one or more health indicators associated with a health of one or more industrial or automation equipment components associated with the enterprise.

Aspect 4. The method of any one of aspects 1 to 3, wherein the first or the second set of operational parameter values comprise one or more health indicators associated with a health of one or more industrial or automation process control routines associated with the enterprise.

Aspect 5. The method of any one of aspects 1 to 4, wherein the first or the second set of operational parameter values comprise one or more health indicators associated with a health of one or more industrial or automation process control systems located at least partially at the first or the second one or more physical sites.

Aspect 6. The method of any one of aspects 1 to 5, wherein the first or the second set of operational parameter values comprise one or more network security parameter values indicating at least one of (1) network traffic associated with the first or the second one or more physical sites, (2) user login data or information associated with one or more users associated with the enterprise, (3) session creation and/or deletion information associated with the one or more process control or automation systems, or (4) publication and subscription information associated with the one or more process control or automation systems.

Aspect 7. The method of any one of aspects 1 to 6, wherein the first or the second set of operational parameter values indicate at least one of: version information associated with instances, items, or other software included in the one or more process control or automation systems, or download indicators of the one or more process control or automation systems.

Aspect 8. The method of any one of aspects 1 to 7, further comprising: third accessing, via a third one or more APIs, a third one or more MEEEs executing in the compute fabric to thereby cause the first set of operational parameter values to be displayed at one or more computing devices disposed at a location remote from the first one or more physical sites.

Aspect 9. The method of any one of aspects 1 to 8, wherein the first one or more MEEEs execute at a location remote from the first one or more physical sites.

Aspect 10. The method of any one of aspects 1 to 9, wherein the obtaining of at least a portion of the first set of operational value parameters is via a dedicated virtual private network (VPN) operating exclusively to provide a secured connection between the first one or more MEEEs and the first one or more physical sites.

Aspect 11. The method of any one of aspects 1 to 10, further comprising fourth accessing, via a fourth one or more APIs, a fourth one or more MEEEs executing in the compute fabric to thereby provide a user interface via which users manually specify or define the first or the second set of operational values to be obtained from the first or the second one or more physical sites.

Aspect 12. The method of any one of aspects 1 to 11, further comprising: fifth accessing, via a fifth one or more APIs, a fifth one or more MEEEs executing in the compute fabric to thereby provide a user interface via which users graphically configure a dashboard graphical user interface (GUI) to display at least a portion of the first or the second set of operational values; and sixth accessing, via a sixth one or more APIs, a sixth one or more MEEEs executing in the compute fabric to thereby cause the configured dashboard GUI to be displayed at a computing device operated by a user.

Aspect 13. The method of aspect 12, wherein the display of the at least the portion of the first or the second set of operational values is updated, in real-time, at the configured dashboard GUI as the at least the portion of the first or the second set of operational values change within the one or more process control or automation systems.

Aspect 14. The method of any one of aspects 1 to 13, further comprising: seventh accessing, via a seventh one or more APIs, a seventh one or more MEEEs executing in the compute fabric to thereby generate one or more higher-level operational parameter values based upon the first and second sets of operational parameter values.

Aspect 15. The method of any one of aspects 1-14, wherein the obtaining of at least a portion of the first set of operational parameter values from the first one or more MEEEs includes obtaining the at least the portion of the first set of operational parameters in real-time as the at least the portion of the first set of operational parameter values are generated at the first one or more physical sites.

Aspect 16. A system configured to implement fleet management applications associated with process control or automation systems of an enterprise, the system comprising: a first one or more micro-encapsulated execution environments (MEEEs) executing in a compute fabric associated with one or more process control or automation systems of the enterprise; a second one or more MEEEs executing in the compute fabric; a first one or more application programming interfaces (APIs) via which the first one or more MEEEs are accessed to obtain a first set of operational parameter values regarding a first one or more operations of the one or more process control or automation systems of the enterprise at a first one or more physical sites; a second one or more APIs via which the second one or more MEEEs are accessed to obtain a second one or more operations of the one or more process control or automation systems of the enterprise at a second one or more physical sites; and a fleet management application executing in the compute fabric, the fleet management application configured to utilize the first and the second APIs to thereby obtain the first and the second sets of operational parameter values.

Aspect 17. The system of aspect 16, wherein the first or the second set of operational parameter values comprise one or more health indicators associated with a health of an industrial or automation process associated with the enterprise.

Aspect 18. The system of aspect 16 or aspect 17, wherein the first or the second set of operational parameter values comprise one or more health indicators associated with a health of one or more industrial or automation equipment components associated with the enterprise.

Aspect 19. The system of any one of aspects 16 to 18, wherein the first or the second set of operational parameter values comprise one or more health indicators associated with a health of one or more industrial or automation process control routines associated with the enterprise.

Aspect 20. The system of any one of aspects 16 to 19, wherein the first or the second set of operational parameter values comprise one or more health indicators associated with a health of one or more industrial or automation process control systems located at the first one or more physical sites.

Aspect 21. The system of any one of aspects 16 to 20, wherein the first or the second set of operational parameter values comprise one or more network security parameter values indicating at least one of (1) network traffic associated with the first or the second one or more physical sites, (2) user login data or information associated with one or more users associated with the enterprise, (3) session creation and/or deletion information associated with the one or more process control or automation systems, or (4) publication and subscription information associated with the one or more process control or automation systems.

Aspect 22. The system of any one of aspects 16 to 21, wherein the first or the second set of operational parameter values indicate at least one of: version information associated with instances, items, or other software included in the one or more process control or automation systems, or download indicators of the one or more process control or automation systems.

Aspect 23. The system of any one of aspects 16 to 22, further comprising a third one or more MEEEs executing in the compute fabric to cause a display of the first set of operational parameter values at one or more computing devices at a location remote from the first one or more physical sites; and wherein the fleet management application is further configured to utilize a third one or more APIs to access the third one or more MEEEs to thereby cause the display of the first set of operational parameter values.

Aspect 24. The system of any one of aspects 16 to 23, wherein the first one or more MEEEs execute at a location remote from the first one or more physical sites.

Aspect 25. The system of any one of aspects 16 to 24, further comprising a dedicated virtual private network (VPN) operating exclusively to provide a secured connection between the first one or more APIs and the first one or more physical sites.

Aspect 26. The system of any one of aspects 16 to 25, further comprising a fourth one or more MEEEs executing in the compute fabric to thereby provide a user interface via which users manually specify or define the first or the second set of operational values to be obtained from the first or the second one or more physical sites; and wherein the fleet management application is further configured to utilize a fourth one or more APIs to access the fourth one or more MEEEs to thereby provide the user interface.

Aspect 27. The system of any one of aspects 16 to 26, further comprising: a fifth one or more MEEEs executing in the compute fabric to thereby provide a user interface via which users graphically configure a dashboard graphical user interface (GUI) to display at least a portion of the first or the second set of operational values; and a sixth one or more MEEEs executing in the compute fabric to thereby cause the configured dashboard GUI to be displayed at a computing device; and wherein the fleet management application is further configured to utilize a fifth one or more APIs to access the fifth one or more MEEEs to thereby provide the user interface, and to utilize a sixth one or more APIs to access the sixth one or more MEEEs to thereby cause the configured dashboard GUI to be displayed. Aspect 28. The system of aspect 27, wherein the display of the at least the portion of the first or the second set of operational values is updated, in real-time, at the configured dashboard GUI as the at least the portion of the first or the second set of operational values change within the one or more process control or automation systems.

Aspect 28. The system of aspect 27, wherein the display of the at least the portion of the first or the second set of operational values is updated, in real-time, at the configured dashboard GUI as the at least the portion of the first or the second set of operational values change within the one or more process control or automation systems.

Aspect 29. The system of any one of aspects 16 to 28, further comprising a seventh one or more instantiated MEEEs executing in the compute fabric to generate one or more higher-level operational parameter values based upon the first and second sets of operational parameter values; and wherein the fleet management application is further configured to utilize a seventh one or more APIs to access the seventh one or more MEEEs to thereby generate the one or more higher-level operational parameter values.

Aspect 30. The system of aspect 29, further comprising an eighth one or more MEEEs executing in the compute fabric to cause a display of the one or more higher-level operational parameter values at one or more computing devices; and wherein the fleet management application is further configured to utilize an eighth one or more APIs to access the eighth one or more MEEEs to thereby cause the display of the one or more higher-level operational parameter values.

Aspect 31. The system of any one of aspects 16 to 30, further comprising a ninth one or more MEEEs executing in the compute fabric to thereby execute a control loop to control an industrial or automation process, the control loop including a field device disposed at the first one or more physical sites.

Aspect 32. The method of any one of aspects 1 to 15, in combination with any other suitable one of aspects 1 to 15.

Aspect 33. The system of any one of aspects 16 to 31, in combination with any other suitable one of aspects 16 to 31.

Aspect 34. The system of any one of aspects 16 to 31, configured to perform the method of any suitable one of aspects 1 to 15.

Aspect 35. Any one of aspects 1 to 34 in combination with any other suitable one of aspects 1 to 34.

What is claimed:

1. A method of a fleet management application executing in a compute fabric associated with one or more process control or automation systems of an enterprise, the method comprising:

first accessing, via a first one or more application programming interfaces (APIs), a first one or more micro-encapsulated execution environments (MEEEs) executing in the compute fabric, the first one or more MEEEs executing remotely from a first one or more physical sites of the enterprise, and including process control software for controlling an industrial or automation process including a field device at the first one or more physical sites of the enterprise;

second accessing, via a second one or more APIs, a second one or more MEEEs executing in the compute fabric;

via the first accessing, obtaining, from the first one or more MEEEs, a first set of operational parameter values regarding a first one or more operations of the one or more process control or automation systems of the enterprise at a first one or more physical sites; and via the second accessing, obtaining, from the second one or more MEEEs, a second set of operational parameter values regarding a second one or more operations of the one or more process control or automation systems of the enterprise at a second one or more physical sites.

2. The method of claim 1, wherein the first or the second set of operational parameter values comprise one or more health indicators associated with a health of an industrial or automation process associated with the enterprise.

3. The method of claim 1, wherein the first or the second set of operational parameter values comprise one or more health indicators associated with a health of one or more industrial or automation equipment components associated with the enterprise.

4. The method of claim 1, wherein the first or the second set of operational parameter values comprise one or more health indicators associated with a health of one or more industrial or automation process control routines associated with the enterprise.

5. The method of claim 1, wherein the first or the second set of operational parameter values comprise one or more health indicators associated with a health of one or more industrial or automation process control systems located at least partially at the first or the second one or more physical sites.

6. The method of claim 1, wherein the first or the second set of operational parameter values comprise one or more network security parameter values indicating at least one of (1) network traffic associated with the first or the second one or more physical sites, (2) user login data or information associated with one or more users associated with the enterprise, (3) session creation and/or deletion information associated with the one or more process control or automation systems, or (4) publication and subscription information associated with the one or more process control or automation systems.

7. The method of claim 1, wherein the first or the second set of operational parameter values indicate at least one of: version information associated with instances, items, or other software included in the one or more process control or automation systems, or download indicators of the one or more process control or automation systems.

8. The method of claim 1, further comprising:

third accessing, via a third one or more APIs, a third one or more MEEEs executing in the compute fabric to thereby cause the first set of operational parameter values to be displayed at one or more computing devices disposed at a location remote from the first one or more physical sites.

9. The method of claim 1, wherein the obtaining of at least a portion of the first set of operational value parameters is via a dedicated virtual private network (VPN) operating exclusively to provide a secured connection between the first one or more MEEEs and the first one or more physical sites.

10. The method of claim 1, further comprising fourth accessing, via a fourth one or more APIs, a fourth one or more MEEEs executing in the compute fabric to thereby provide a user interface via which users manually specify or define the first or the second set of operational values to be obtained from the first or the second one or more physical sites.

11. The method of claim 1, further comprising:

fifth accessing, via a fifth one or more APIs, a fifth one or more MEEEs executing in the compute fabric to thereby provide a user interface via which users graphically configure a dashboard graphical user interface (GUI) to display at least a portion of the first or the second set of operational values; and sixth accessing, via a sixth one or more APIs, a sixth one or more MEEEs executing in the compute fabric to thereby cause the configured dashboard GUI to be displayed at a computing device operated by a user.

12. The method of claim 11, wherein the display of the at least the portion of the first or the second set of operational values is updated, in real-time, at the configured dashboard GUI as the at least the portion of the first or the second set of operational values change within the one or more process control or automation systems.

13. The method of claim 1, further comprising:

seventh accessing, via a seventh one or more APIs, a seventh one or more MEEEs executing in the compute fabric to thereby generate one or more higher-level operational parameter values based upon the first and second sets of operational parameter values.

14. The method of claim 1, wherein the obtaining of at least a portion of the first set of operational parameter values from the first one or more MEEEs includes obtaining the at least the portion of the first set of operational parameters in real-time as the at least the portion of the first set of operational parameter values are generated at the first one or more physical sites.

15. A system configured to implement fleet management applications associated with process control or automation systems of an enterprise, the system comprising:

a first one or more micro-encapsulated execution environments (MEEEs) executing in a compute fabric associated with one or more process control or automation systems of the enterprise, the first one or more MEEEs executing remotely from a first one or more physical sites of the enterprise, and including process control software for controlling an industrial or automation process including a field device at the first one or more physical sites of the enterprise;

a second one or more MEEEs executing in the compute fabric;

a first one or more application programming interfaces (APIs) via which the first one or more MEEEs are accessed to obtain a first set of operational parameter values regarding a first one or more operations of the one or more process control or automation systems of the enterprise at a first one or more physical sites;

a second one or more APIs via which the second one or more MEEEs are accessed to obtain a second one or more operations of the one or more process control or automation systems of the enterprise at a second one or more physical sites; and a fleet management application executing in the compute fabric, the fleet management application configured to utilize the first and the second APIs to thereby obtain the first and the second sets of operational parameter values.

16. The system of claim 15, wherein the first or the second set of operational parameter values comprise one or more health indicators associated with a health of an industrial or automation process associated with the enterprise.

17. The system of claim 15, wherein the first or the second set of operational parameter values comprise one or more health indicators associated with a health of one or more industrial or automation equipment components associated with the enterprise.

18. The system of claim 15, wherein the first or the second set of operational parameter values comprise one or more health indicators associated with a health of one or more industrial or automation process control routines associated with the enterprise.

19. The system of claim 15, wherein the first or the second set of operational parameter values comprise one or more health indicators associated with a health of one or more industrial or automation process control systems located at the first one or more physical sites.

20. The system of claim 15, wherein the first or the second set of operational parameter values comprise one or more network security parameter values indicating at least one of (1) network traffic associated with the first or the second one or more physical sites, (2) user login data or information associated with one or more users associated with the enterprise, (3) session creation and/or deletion information associated with the one or more process control or automation systems, or (4) publication and subscription information associated with the one or more process control or automation systems.

21. The system of claim 15, wherein the first or the second set of operational parameter values indicate at least one of: version information associated with instances, items, or other software included in the one or more process control or automation systems, or download indicators of the one or more process control or automation systems.

22. The system of claim 15, further comprising a third one or more MEEEs executing in the compute fabric to cause a display of the first set of operational parameter values at one or more computing devices at a location remote from the first one or more physical sites; and wherein the fleet management application is further configured to utilize a third one or more APIs to access the third one or more MEEEs to thereby cause the display of the first set of operational parameter values.

23. The system of claim 15, further comprising a dedicated virtual private network (VPN) operating exclusively to provide a secured connection between the first one or more APIs and the first one or more physical sites.

24. The system of claim 15, further comprising a fourth one or more MEEEs executing in the compute fabric to thereby provide a user interface via which users manually specify or define the first or the second set of operational values to be obtained from the first or the second one or more physical sites; and wherein the fleet management application is further configured to utilize a fourth one or more APIs to access the fourth one or more MEEEs to thereby provide the user interface.

25. The system of claim 15, further comprising:

a fifth one or more MEEEs executing in the compute fabric to thereby provide a user interface via which users graphically configure a dashboard graphical user interface (GUI) to display at least a portion of the first or the second set of operational values; and a sixth one or more MEEEs executing in the compute fabric to thereby cause the configured dashboard GUI to be displayed at a computing device; and wherein the fleet management application is further configured to utilize a fifth one or more APIs to access the fifth one or more MEEEs to thereby provide the user interface, and to utilize a sixth one or more APIs to access the sixth one or more MEEEs to thereby cause the configured dashboard GUI to be displayed.

26. The system of claim 25, wherein the display of the at least the portion of the first or the second set of operational values is updated, in real-time, at the configured dashboard GUI as the at least the portion of the first or the second set of operational values change within the one or more process control or automation systems.

27. The system of claim 15, further comprising a seventh one or more instantiated MEEEs executing in the compute fabric to generate one or more higher-level operational parameter values based upon the first and second sets of operational parameter values; and wherein the fleet management application is further configured to utilize a seventh one or more APIs to access the seventh one or more MEEEs to thereby generate the one or more higher-level operational parameter values.

28. The system of claim 27, further comprising an eighth one or more MEEEs executing in the compute fabric to cause a display of the one or more higher-level operational parameter values at one or more computing devices; and wherein the fleet management application is further configured to utilize an eighth one or more APIs to access the eighth one or more MEEEs to thereby cause the display of the one or more higher-level operational parameter values.

29. The system of claim 15, further comprising a ninth one or more MEEEs executing in the compute fabric to thereby execute a control loop to control an industrial or automation process, the control loop including a field device disposed at the first one or more physical sites.

* * * * *